United States Patent [19]
Deaton et al.

[11] Patent Number: 5,649,114
[45] Date of Patent: Jul. 15, 1997

[54] METHOD AND SYSTEM FOR SELECTIVE INCENTIVE POINT-OF-SALE MARKETING IN RESPONSE TO CUSTOMER SHOPPING HISTORIES

[75] Inventors: David W. Deaton; Rodney G. Gabriel, both of Abilene, Tex.

[73] Assignee: Credit Verification Corporation, Abilene, Tex.

[21] Appl. No.: 457,299

[22] Filed: Jun. 1, 1995

Related U.S. Application Data

[63] Continuation of Ser. No. 139,983, Oct. 20, 1993, abandoned, which is a continuation-in-part of Ser. No. 96,921, Jul. 23, 1993, which is a continuation-in-part of Ser. No. 63,413, May 17, 1993, Pat. No. 5,621,812, which is a continuation of Ser. No. 886,383, May 19, 1992, abandoned, which is a continuation-in-part of Ser. No. 826,255, Jan. 24, 1992, abandoned, which is a continuation of Ser. No. 345,475, May 1, 1989, abandoned.

[51] Int. Cl.⁶ ................................................. G06F 17/60
[52] U.S. Cl. ................................................. 395/214
[58] Field of Search ......................... 235/375, 381, 235/383; 395/214, 221

[56] References Cited

U.S. PATENT DOCUMENTS

| | | | |
|---|---|---|---|
| 3,959,624 | 5/1976 | Kaslow | 235/61.11 E |
| 4,109,238 | 8/1978 | Creekmore | 340/149 A |
| 4,554,446 | 11/1985 | Murphy et al. | 235/487 |
| 4,670,853 | 6/1987 | Stepien | 364/70 |
| 4,674,041 | 6/1987 | Lemon et al. | 364/401 |
| 4,723,212 | 2/1988 | Mindrum et al. | 364/401 |
| 4,748,668 | 5/1988 | Shamir et al. | 380/30 |
| 4,750,119 | 6/1988 | Cohen et al. | 364/401 |
| 4,791,281 | 12/1988 | Johnsen et al. | 235/383 |
| 4,821,186 | 4/1989 | Munakata et al. | 364/405 |
| 4,882,675 | 11/1989 | Nichtberger et al. | 364/401 |
| 4,908,761 | 3/1990 | Tai | 364/401 |
| 4,910,672 | 3/1990 | Off et al. | 364/405 |
| 4,941,090 | 7/1990 | McCarthy | 364/405 |
| 4,949,256 | 8/1990 | Humble | 364/401 |
| 4,982,346 | 1/1991 | Girouard et al. | 364/550 |
| 5,010,485 | 4/1991 | Bigari | 364/408 |
| 5,053,955 | 10/1991 | Peach et al. | 364/401 |
| 5,056,019 | 10/1991 | Schultz et al. | 364/405 |
| 5,091,634 | 2/1992 | Finch et al. | 235/375 |
| 5,128,520 | 7/1992 | Rando et al. | 235/375 |
| 5,173,851 | 12/1992 | Off et al. | 364/401 |
| 5,179,375 | 1/1993 | Dick et al. | 340/825 |
| 5,185,695 | 2/1993 | Pruchnicki | 364/401 |
| 5,201,010 | 4/1993 | Deaton et al. | 382/7 |
| 5,245,533 | 9/1993 | Marshall | 364/401 |
| 5,249,044 | 9/1993 | Von Koborn | 358/86 |

FOREIGN PATENT DOCUMENTS 5547560A of 0000 Japan.

OTHER PUBLICATIONS

Article, Direct Marketing, v53, n9, Jan. 1991, Neal, Quaker's direct hit. (Quaker Oats Co.'s advertising subsidiary Quaker Direct), pp. 1–5.

"Front End Electronic Marketing Frequent Shopper & Other Programs" Food Marketing Institute, 1991, Carlene A. Thissen.

"Perspectives on Electronics Marketing with Emphasis on Promotion Inside Supermarkets", Food Marketing Institute, 1990, Carlene A. Thissen.

"What's New in Supermarket Promotion", New York Times, Jun. 18, 1989, Lynette D. Hazelton.

(List continued on next page.)

*Primary Examiner*—Jack B. Harvey
*Assistant Examiner*—Xuong Chung-Trans
*Attorney, Agent, or Firm*—Baker & Botts, L.L.P.

[57] ABSTRACT

A system and method for customer promotion. A terminal enters a customer's identification code, along with customer transaction data, at the point-of-sale. A memory stores a database of previously entered customer identification codes and transactions data. Circuitry is provided for generating a signal representative of a customer's shopping history, wherein incentive coupons may be issued to customers in dependence upon the signal.

23 Claims, 65 Drawing Sheets

OTHER PUBLICATIONS

"In this Computer Age, Who Needs Coupons", New York Times, Jun. 15, 1989, Michael Freitag.

Progressive Grocer, vol. 66, No. 5, May 1987, pp. 133–134, 136, Ronald Tanner.

Less H. Sun, "Checking Out The Customer", The Washington Post, Sunday, Jul. 9, 1989.

"A New Dimension in Marketing," Progressive Grocer, vol. 66, No. 5, May 1987, pp. 133–136.

"UKROP's Test Data Base Marketing Program Eletronic Couponing Tracks Buying Behavior of Valued Customers", Chain Store Age Executive, Sep. 1987.

"Grocery Stores Copies Airlines a Frequent Flyer Bonuses", Wall Street Journal & Stoh, Eastera, Aug. 7, 1986.

"S&H, Soffer Reece and Frequent Shoppers", Advertising Age, Mar. 16, 1987, p. 22.

"Frequent Buyer Programs Get off the Ground", Dairy Foods, Nov. 1989, p. 64.

"Giant to List Supermarket Cash Rebates", Washington Post, Jun. 14, 1989, pp. A1,A32.

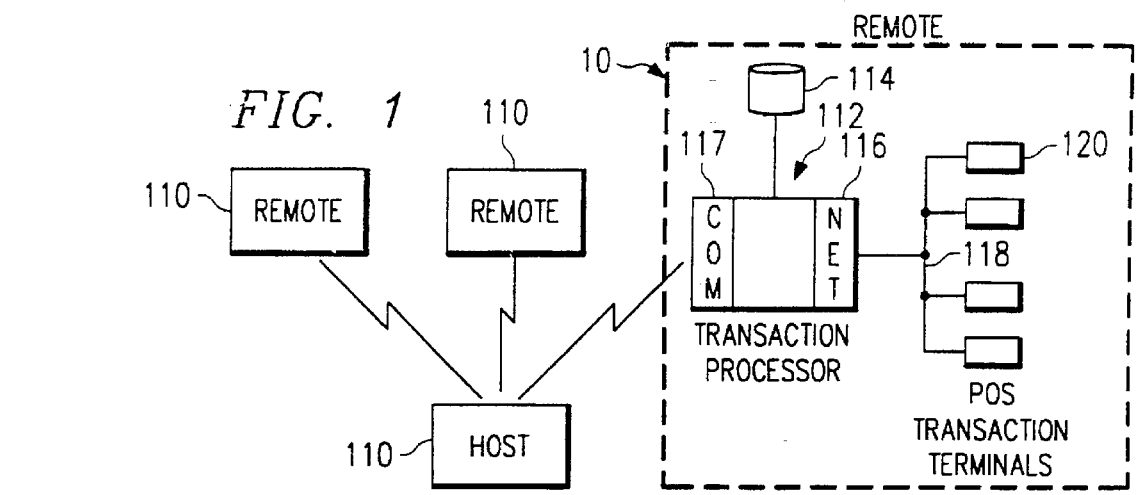
FIG. 1
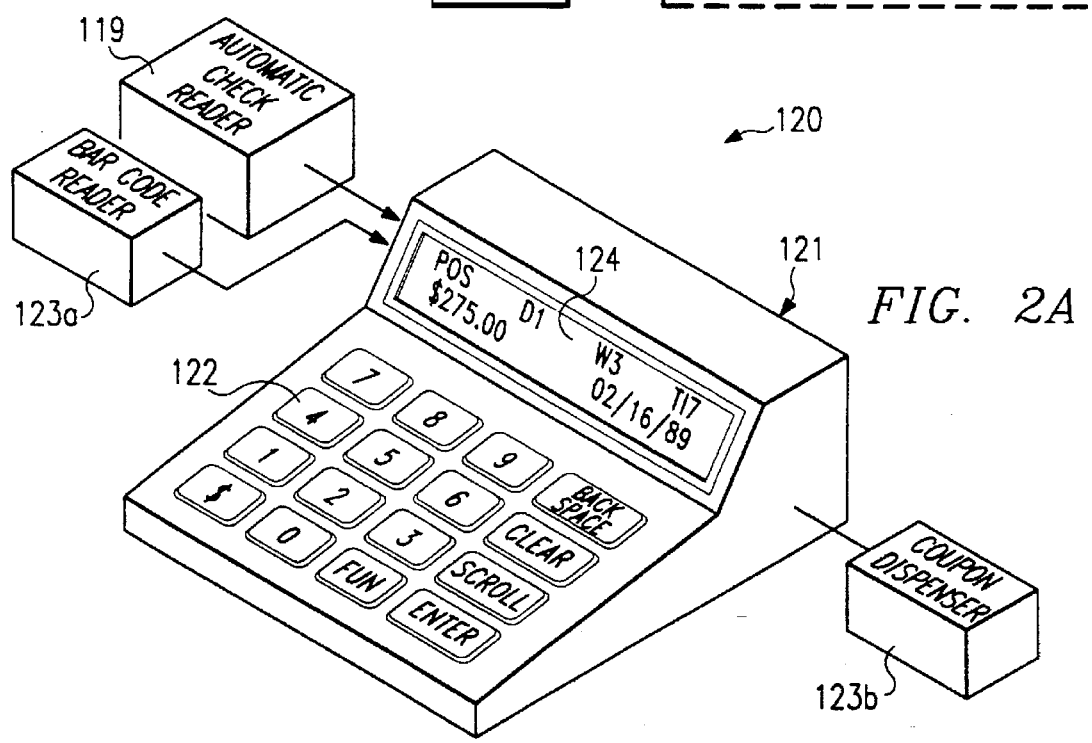
FIG. 2A
FIG. 2C

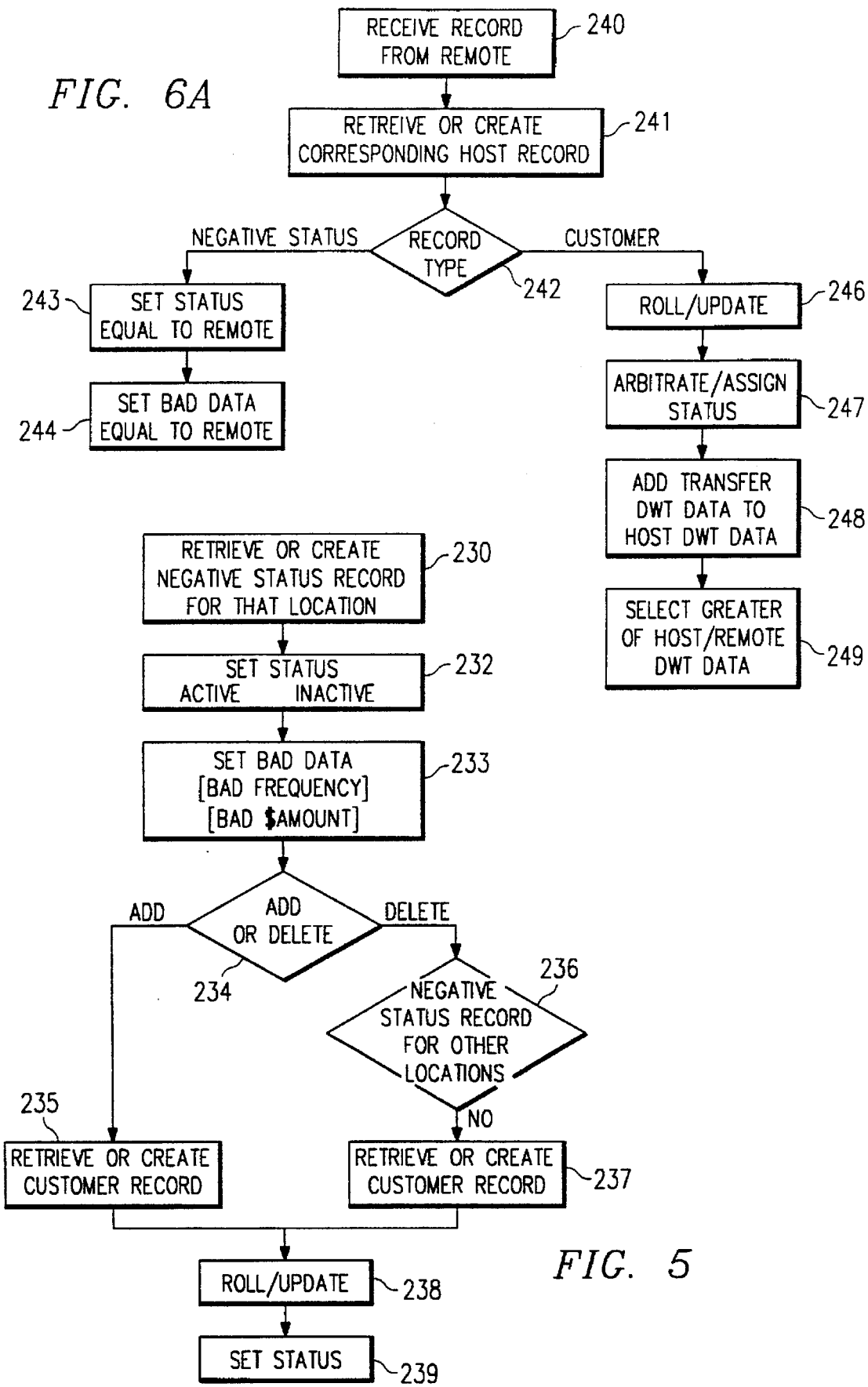

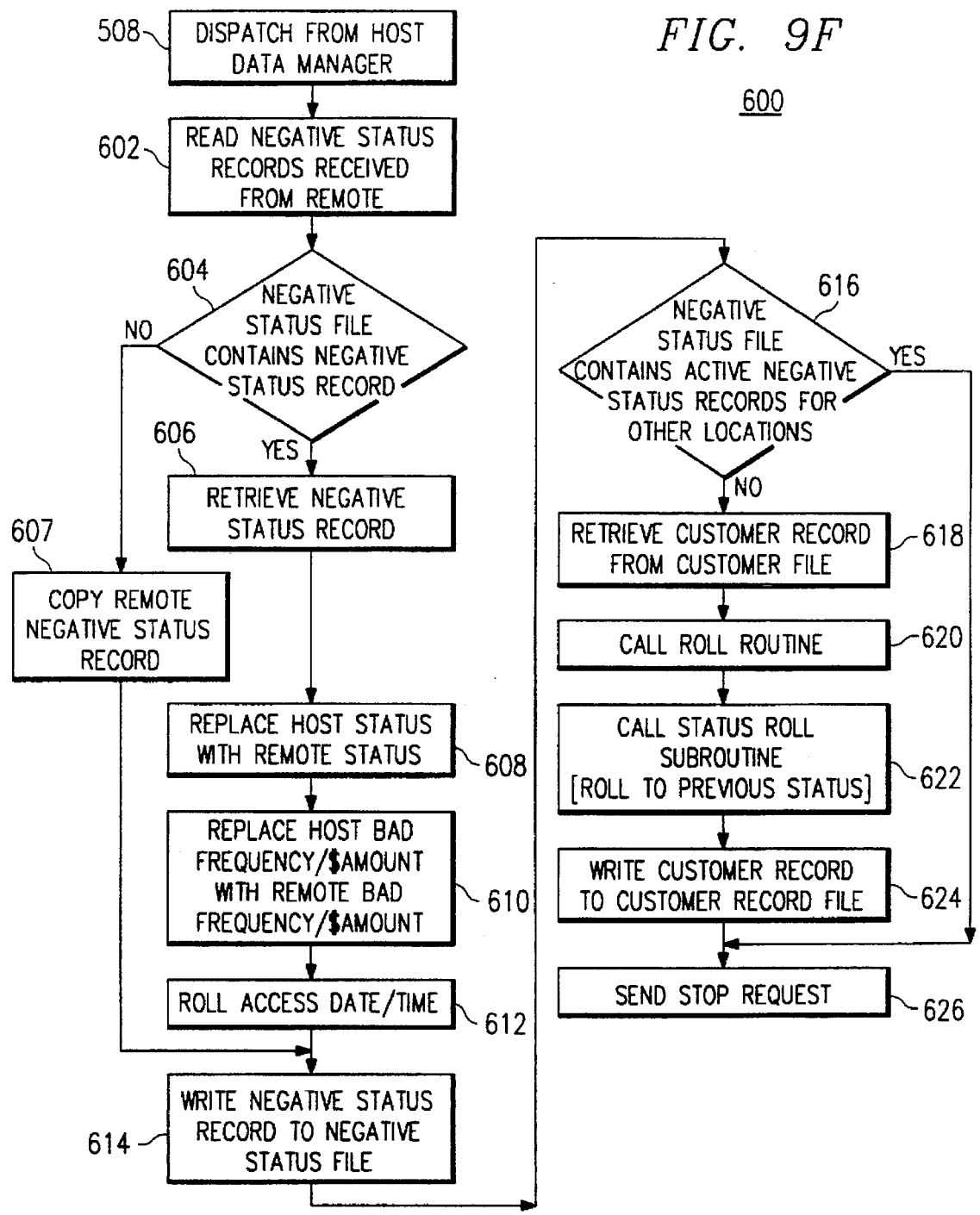

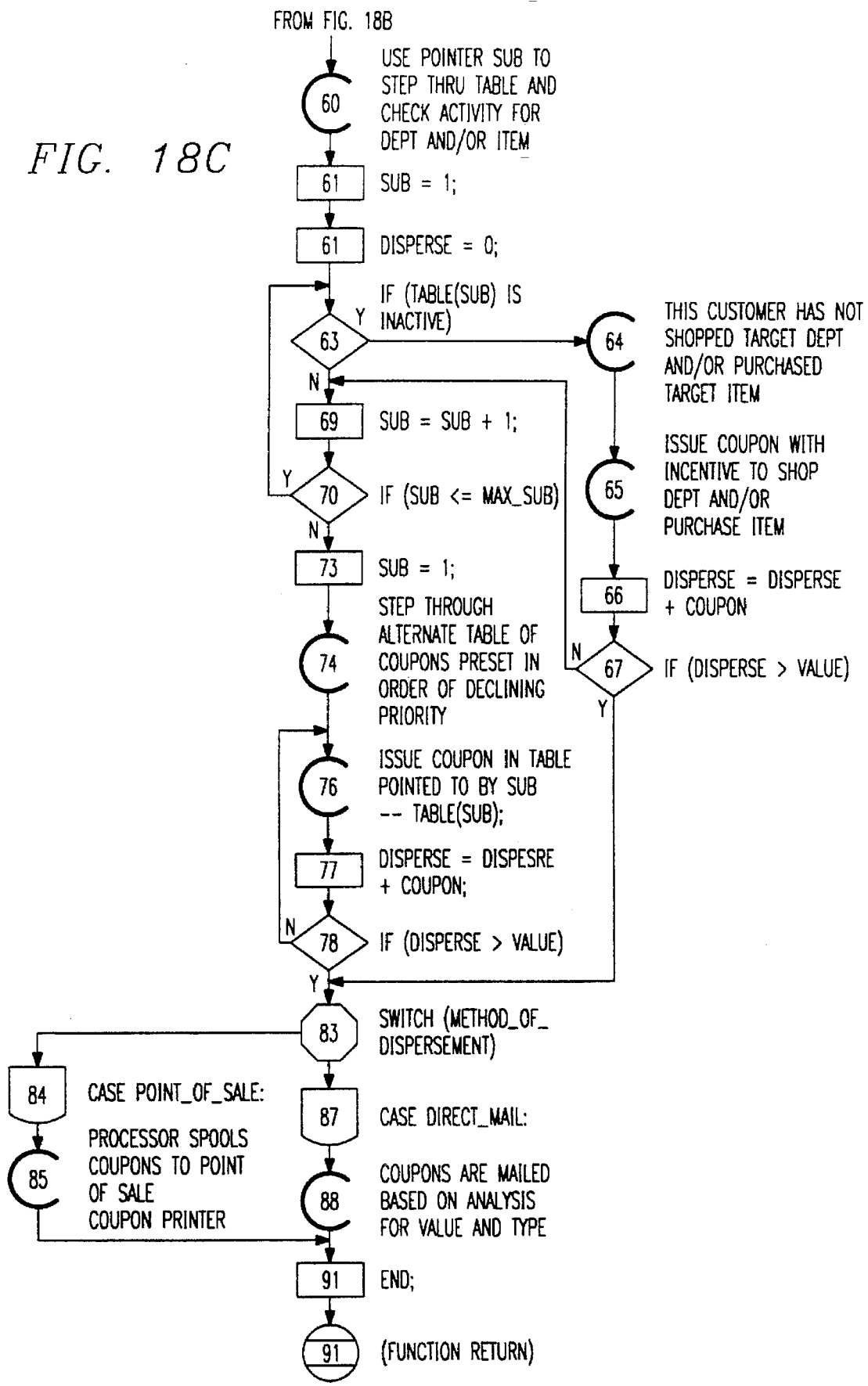

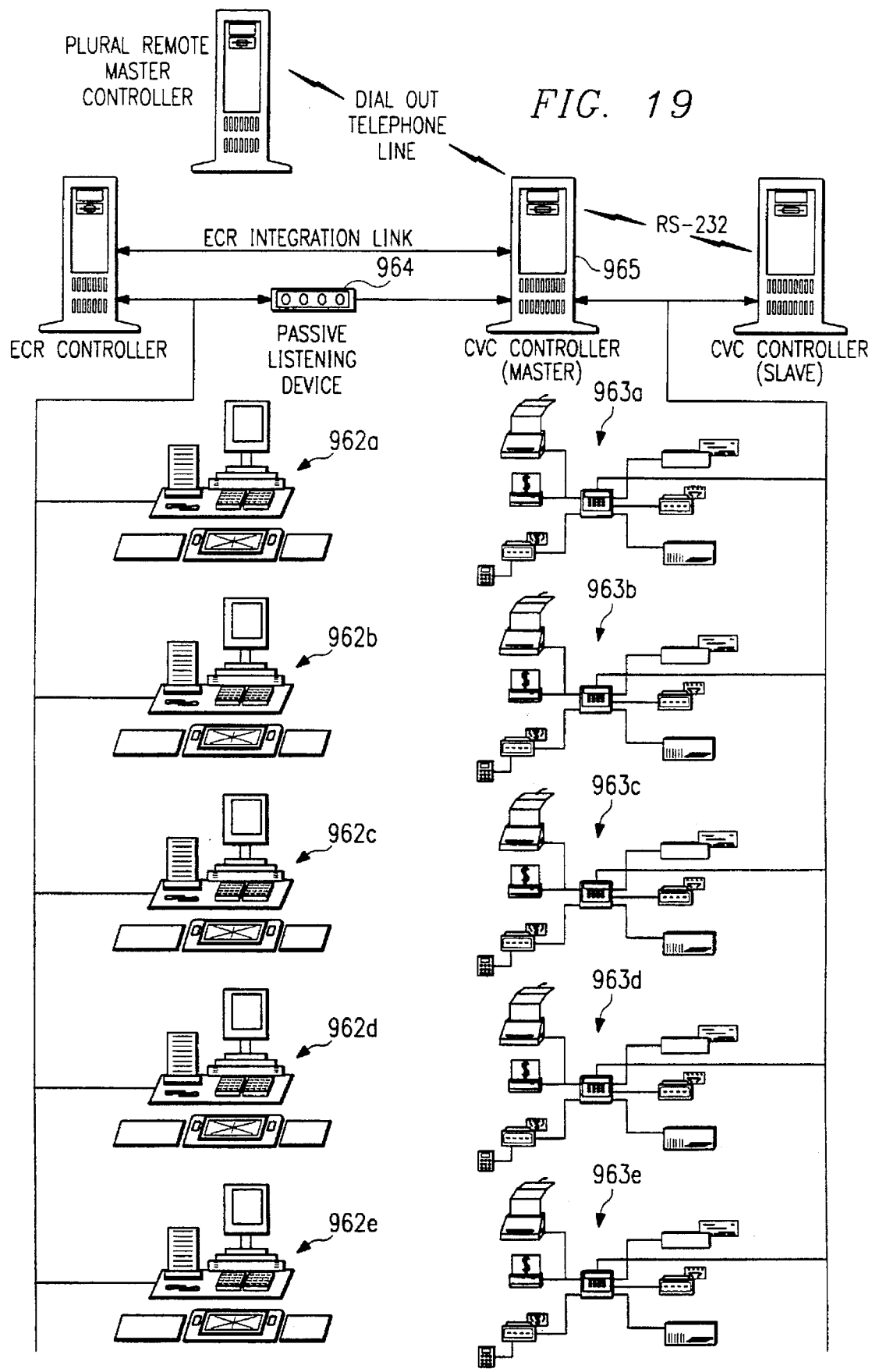

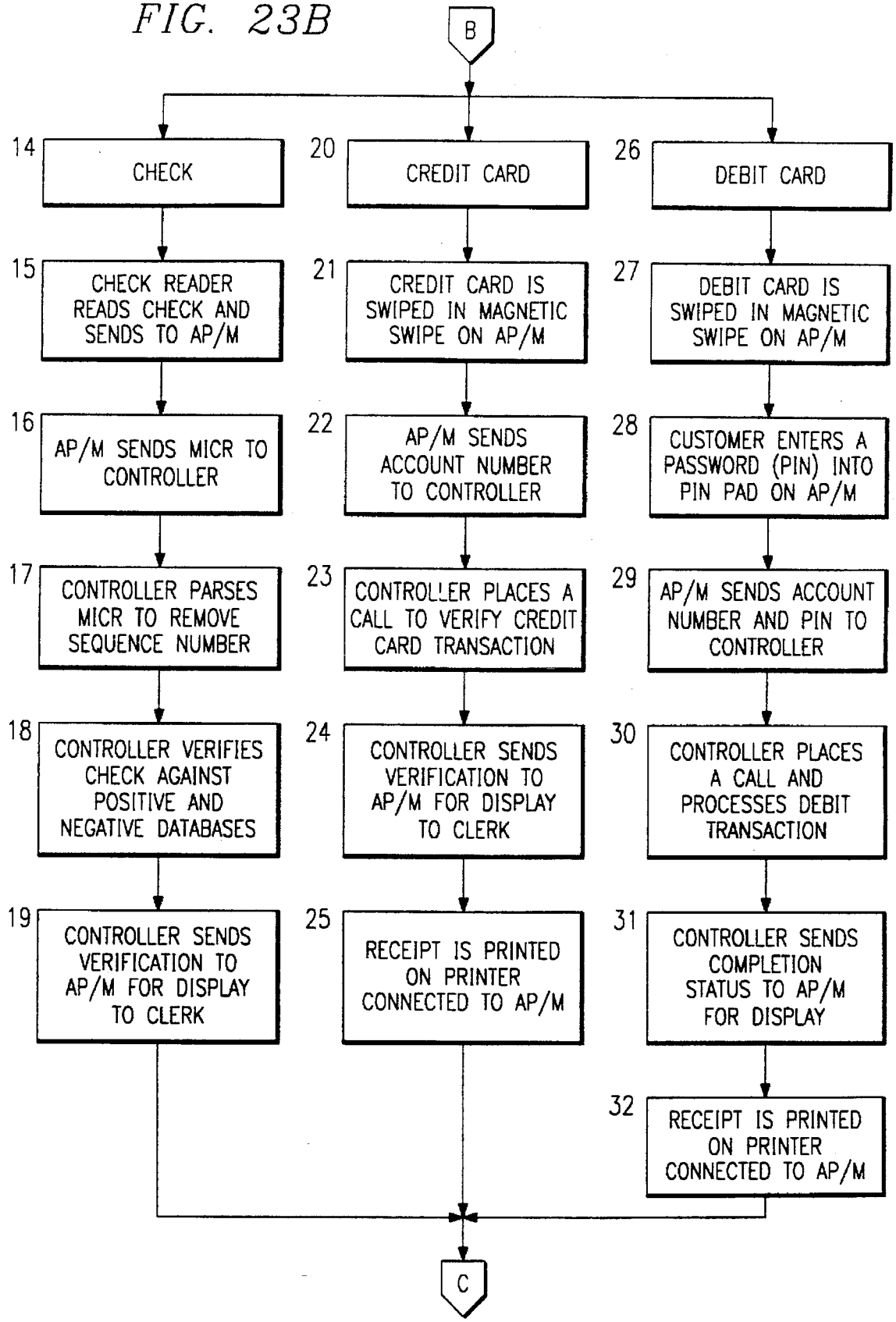

FIG. 41
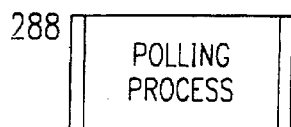
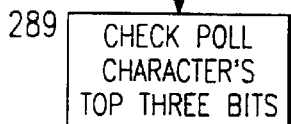
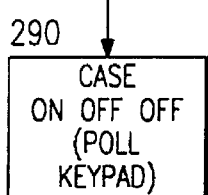
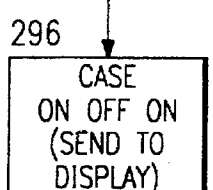
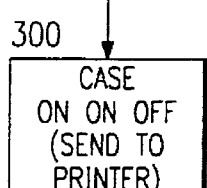
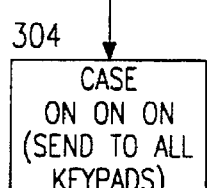
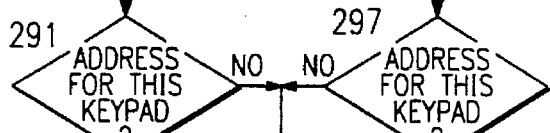
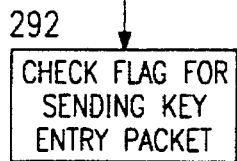
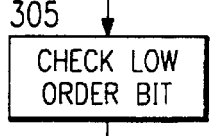
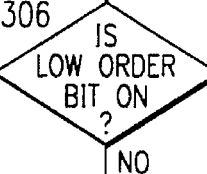
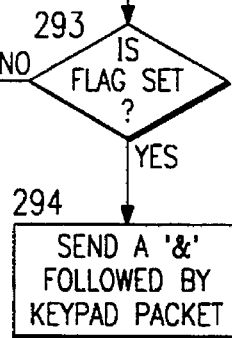
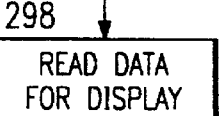
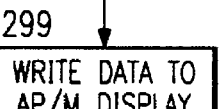
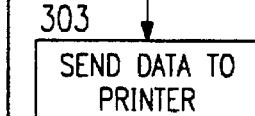
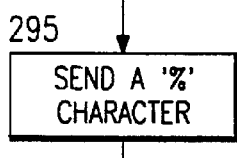

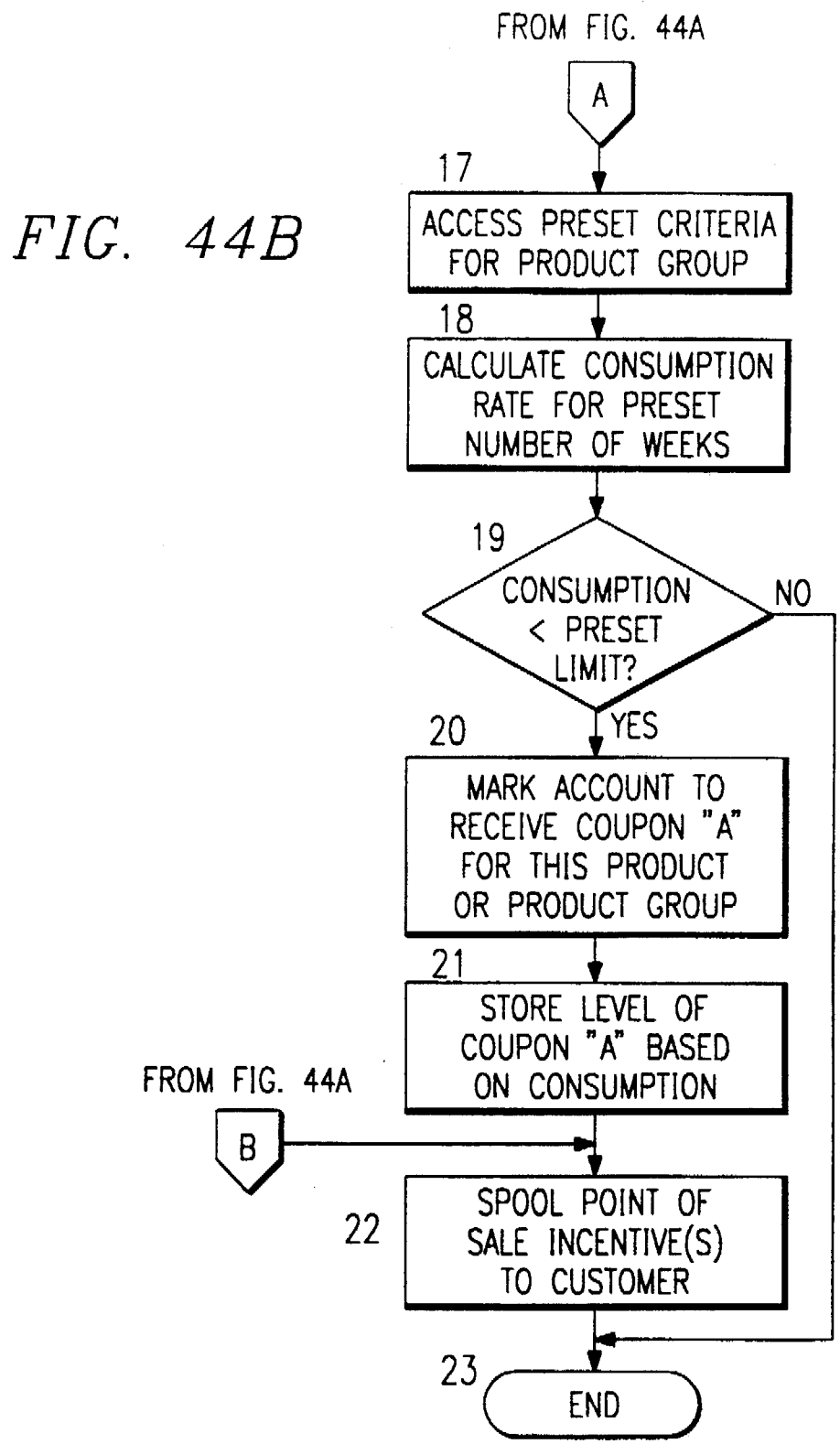

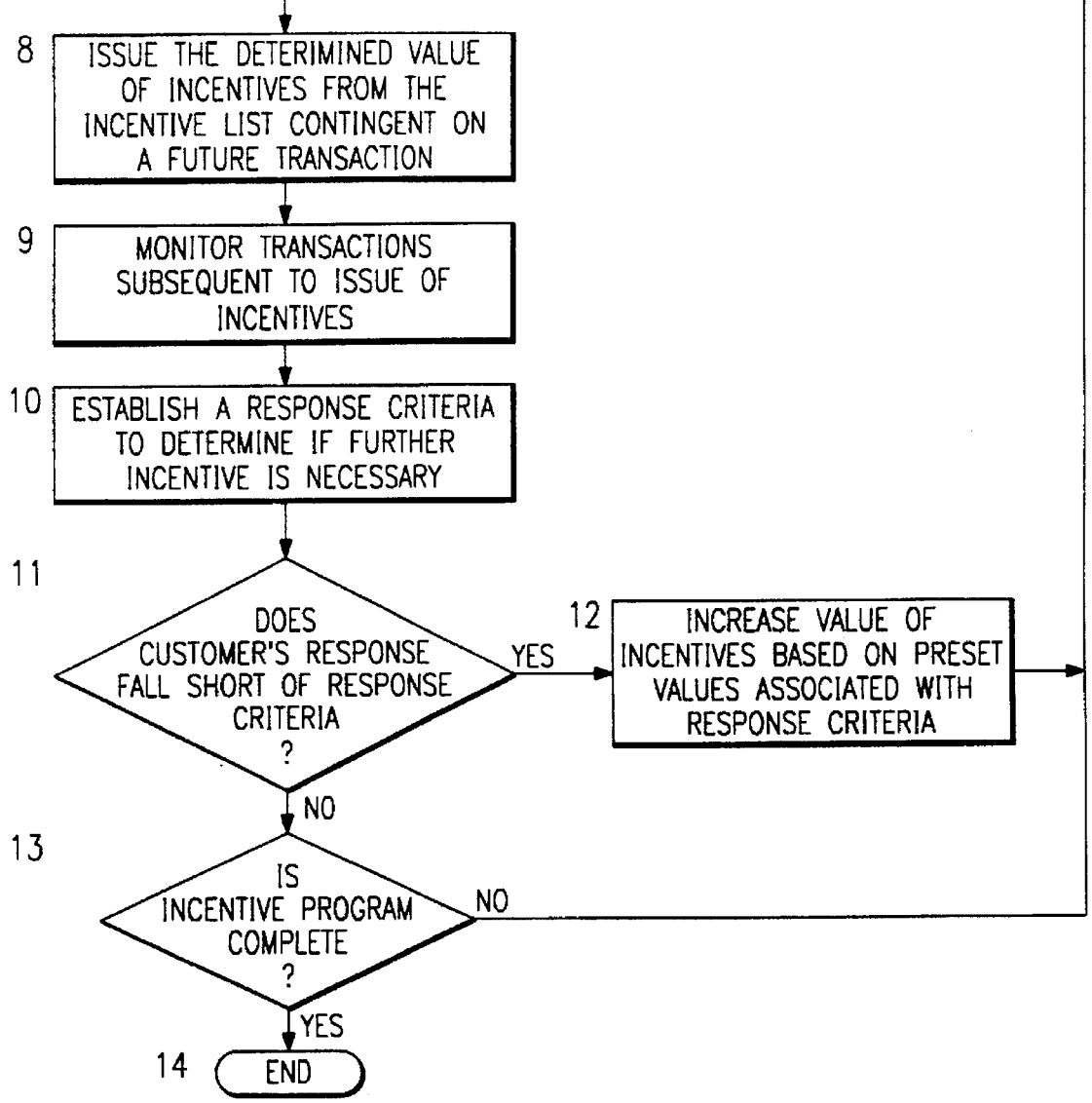

METHOD AND SYSTEM FOR SELECTIVE INCENTIVE POINT-OF-SALE MARKETING IN RESPONSE TO CUSTOMER SHOPPING HISTORIES

RELATED APPLICATIONS

This application is a continuation of U.S. application Ser. No. 08/139,983, filed Oct. 20, 1993 and entitled "Method and System for Selective Incentive Point-of-Sale Marketing in Response to Customer Shopping Histories", abandoned, which is a continuation-in-part of U.S. application Ser. No. 08/096,921, filed Jul. 23, 1993, pending, which is a continuation-in-part of U.S. application Ser. No. 08/063,413, filed May 17, 1993, U.S. Pat. No. 5,621,812, which is a continuation of U.S. application Ser. No. 07/886,383, filed May 19, 1992, abandoned, which is a continuation-in-part of U.S. application Ser. No. 07/826,255, filed Jan. 24, 1992, abandoned, which is a continuation of U.S. application Ser. No. 07/345,475, filed May 1, 1989, abandoned.

This application also relates to U.S. application Ser. No. 07/885,649, filed May 19, 1992, now U.S. Pat. No. 5,237,620, issued Aug. 17, 1993; U.S. application Ser. No. 07/886,382, filed May 19, 1992, now U.S. Pat. No. 5,305,196, issued Apr. 19, 1994; U.S. application Ser. No. 07/886,385, filed May 19, 1992, now U.S. Pat. No. 5,201,010, issued Apr. 6, 1993; U.S. application Ser. No. 08/016,991, filed Feb. 10, 1993, now U.S. Pat. No. No. 5,327,508 issued Jul. 5, 1994; U.S. application Ser. No. 08/117,951, filed Aug. 30, 1993, pending; U.S. application Ser. No. 08/134,071, filed Oct. 8, 1993, pending; U.S. application Ser. No. 08/141,471, filed Oct. 20, 1993, pending; U.S. application Ser. No. 08/177,690, filed Jan. 4, 1994, now U.S. Pat. No. 5,388,165, issued Feb. 7, 1995; U.S. application Ser. No. 08/178,056, filed Feb. 28, 1994, pending; U.S. application Ser. No. 08/178,052, filed Jan. 4, 1994, pending; U.S. application Ser. No. 08/221,622, filed Mar. 30, 1994, now U.S. Pat. No. 5,448,471 issued Sep. 5, 1995; U.S. application Ser. No. 08/302,521, filed Sep. 6, 1994, pending; U.S. application Ser. No. 08/303,631, filed Sep. 8, 1994, pending; U.S. application Ser. No. 08/336,880, filed Nov. 9, 1994, now U.S. Pat. No. 5,430,644 issued Jul. 4, 1995; U.S. application Ser. No. 08/429,938 filed Jun. 3, 1995, pending; U.S. application Ser. No. 08/457,786 filed Jun. 1, 1995, pending; U.S. application Ser. No. 08/457,300 filed Jun. 1, 1995, pending; U.S. application Ser. No. 08/456,462 filed Jun. 1, 1995, pending; U.S. application Ser. No. 08/457,231 filed Jun. 1, 1995, pending; U.S. application Ser. No. 08/457,230 filed Jun. 1, 1995, pending; U.S. application Ser. No. 08/456,458 filed Jun. 1, 1995, pending; U.S. application Ser. No. 08/456,340 filed Jun. 1, 1995, pending; U.S. application Ser. No. 08/458,172 filed Jun. 1, 1995, pending; and U.S. application Ser. No. 08/458,786 filed Jun. 1, 1995.

TECHNICAL FIELD OF THE INVENTION

This invention relates to transaction processing and analysis methods and systems, including check, credit card and debit card verification and marketing systems, and more particularly, to a method and system for processing and developing a customer database of customer information, such as credit verification status and transaction frequency and dollar volume over specified intervals, that can be used for credit verification, targeted customer marketing and other customer relations purposes.

BACKGROUND OF THE INVENTION

Retail and other business establishments that serve a large number of customers generally have a problem obtaining transactional information about their customers, such as for identifying new customers and determining transactional patterns for repeat customers (such as transactional frequency and dollar volume).

For those stores that experience a high volume of transactions, an immediate customer information problem is determining whether to authorize a transaction, whether check, debit card or credit card, in the typical situation where the sales clerk does not personally know the purchaser. Beyond this immediate problem of credit verification, these stores have a broader need for gathering transactional information that could be used in developing customer profiles useful in targeting and implementing advertising, marketing and promotions.

For example, a typical grocery store does a high transactional volume with checks comprising a significant percentage of the total transactions (typically as much as 85%). These businesses strive for maximum efficiency in completing transactions at the checkout counter, which results in a minimum of contact between the customer and the sales clerk. In this sales environment, neither clerks nor store managers typically develop any significant personal relationship with an individual customer.

Since check transactions account for such a significant percentage of a grocery store's business, these stores naturally make an effort to minimize the number of bad checks that will be returned. Typically, the store will require an additional piece of identification, such as a driver's license and/or a major credit card. However, this requirement for additional identification reduces the efficiency of the checkout process, and inconveniences the significant majority of check transaction customers who do not write bad checks—typically, a grocery store's bad check experience will be approximately 2% of its check transactions.

Thus, check verification presents a store with problems in customer relations and risk management. A store naturally seeks to improve customer relations with the great majority of customers who do not present check transaction problems by efficiently and quickly authorizing check transactions. However, the store must guard against the financial risks from customers who do write bad checks, either as part of a concerted bad check scheme or as a result of less larcenous conduct that may range from simple bookkeeping mistakes to overly aggressive check floating. In the former case, bad check risk is greatly dependent upon abnormal check transaction activity over a given interval. In the latter cases, the bad check risk is greatly dependent upon check transaction history (total check transaction frequency and dollar volume at a store).

The check transaction risk management problem has two principal aspects—the risk that a person will write a bad check and the risk that a bad check cannot be recovered. Again, both of these risk factors are greatly dependent upon a customer's historical check transaction activity. As the total number of check transactions by a customer at a particular store increases, both the risk that the customer will write a bad check decreases, and more significantly, the risk that store will not be able to recover on a bad check decreases.

For example, a customer with fewer than 200–300 check transactions at a store presents a relatively high risk in terms of recovery on a bad check, while a customer with more than 600–700 check transactions presents a minimal risk. Thus, a store practicing risk management should put substantially more restrictions in terms of check transaction frequency and total dollar volume over given intervals in the former case than in the latter.

These risk management problems are multiplied in the case of multiple store businesses, particularly in the case of concerted bad check cashing schemes. In that case, the typical pattern is to move from store to store within a relatively short period of time. Such credit risks are also present with other forms of financial instruments, such as credit cards, or debit cards unless credit verification procedures are in place.

Beyond these check and credit verification and risk management problems, grocery and other retail stores have a broader problem in accumulating customer information because of the emphasis on minimizing the amount of time required for a sales transaction, and the attendant impersonality of the customer relationship. Thus, it is extremely difficult to develop any meaningful customer profiles, or to identify customer groups such as regular customers and new customers who might become regular customers. If a store could accumulate more detailed customer information, customer profiles could be developed and used for targeted advertising, marketing and promotional programs.

Accordingly, a need exists for a transaction processing system for individual stores (in both single and multiple store environments) that facilitates transactions by improving the efficiency of the verification process, and that maintains a local customer database containing transactional information about the store's customers useful for verification risk management, and for other customer relations purposes such as identifying new customers and profiling regular customers.

Prior credit verification systems require connecting a point-of-sale terminal through telephone lines to a remote transaction processing system, thereby increasing not only the cost of operating the systems, but also increasing the time for providing check or credit verification. Also, existing systems typically do not focus on maintaining a local customer database useful not only for check or credit or debit card transaction processing, but also for identifying new customers and developing customer profiles for regular customers.

In prior systems, information regarding checks returned to a store by its bank is entered into a computer (PC). This PC stores information on that check (name, address, dollar amount of the check, reason for the return of the check, etc.) and this PC can be programmed to transfer that data to other processors controlling point-of-sale keypad terminals, both in the same and in other store-based operations. Responses displayed by one of these point-of-sale terminals may be altered pursuant to these transfers of data. Alternatively, data on returned checks may be entered into a multiple tasking computer environment in which the same processor simultaneously manages the operations of returned check entry and point-of-sale keypad operation. This multiple tasking processor can be programmed to transfer data to other similar store-based operations by telephone communications.

Copending patent application Ser. No. 07/826,255 discloses a system and technique wherein a customer's checking account number may be used as a unique customer identification number to provide credit verification and also to perform marketing functions. In such a prior system, such customer checking account numbers have been manually entered by the retail store clerk, thus causing delay and possible inaccuracies. A need has thus arisen for an automated system for providing quick and efficient check verification and marketing follow-up. Previous automatic readers have, however, not been satisfactory for such purposes, because of their inability to uniformly detect desired account information on all checks in a consistent manner.

Marketing by retail stores has previously been confined to advertising to large segments of the population, and often to existing customers. Competition among stores has made it more important to target advertising, and a need has arisen for marketing techniques to target non-customers or infrequent customers. It would be particularly advantageous if such targeted marketing could be accomplished in conjunction with a check or credit verification system.

Retail stores have heretofore attempted to provide marketing to its customers by the issuing of cards bearing individual numbers associated with a customer (which may or may not be smart cards) which contain information which may be automatically detected by a reader. Before a customer can obtain such a card, the customer has to fill out a substantial amount of information, such information is being entered into the system prior to the card being issued. Stores, however, have found that it is difficult to get a large segment of its customers to provide such information and customers also do not wish to or forget to use such cards at the checkout terminal. Hence, use of such cards for marketing purposes has not been particularly successful.

For example, when such cards are used, another form of financial payment has to be implemented into the system, such as by accepting cash, verifying and accepting a check or verifying and accepting a credit or debit card or the like. Use of such shopping cards thus creates additional delays at the terminals and has not been found to enable stores to reach high-target individuals such as the infrequent shopper, since such people are unlikely to have or to utilize such cards. Moreover, prior stores which have used such shopping cards have tried marketing such as direct mail to an untargeted group of customers or for immediate discounts on current transactions. The providing of such rewards without requiring some future activity by the customer has not been found to provide good marketing results by inducing the customer to do some act in the future.

A need has thus arisen for a method and system utilizable by retail stores to provide targeted incentive marketing to customers by utilizing account codes on such financial instruments as a check, credit card or debit card, without the combination of a marketing card. It would be further advantageous for such a method and system to be able to utilize a multiplicity of transaction documents in order to identify individual customers to enable such targeted marketing. It would further be desirable to provide such targeted marketing in combination with credit verification.

SUMMARY OF THE INVENTION

Important aspects of the present invention are to facilitate transactions by reducing the requirements for customer identification, to enable a store to adopt a risk management approach to credit verification based on a customer's transactional history (frequency and dollar volume over specified intervals), and to improve a store's marketing and other customer relations programs by collecting transactional data for that store, both current and historical, that can be used to identify new or infrequent customers, develop customer profiles and to perform targeted marketing.

More specifically, this invention is a transaction processing system that uses a customer's financial instrument account number (check, credit card, debit card or the like) as a unique customer identification number. Thus, the system does not require time-consuming checking of additional customer identification, but only requires the speedy entry of the customer's account number by use of an improved automatic reader in accordance with the present invention. The system operates at an individual store, and maintains at that store a local customer database of customer records, each identified by the corresponding customer identification number. The customer records also include customer information, such as verification data (such as verification status) as well as other selected transactional data (such as transaction frequency and dollar volume), the verification and transaction data being regularly updated with new data (such as during transaction verification).

The system includes one or more transaction terminals, coupled to a transaction processor that stores the customer database. A transaction terminal is used to transmit a customer information request (such as for check or credit card transaction verification), which includes an automatically read customer's identification number, from the point-of-sale (POS) to the transaction processor.

The transaction processor processes the customer information request, using the identification number to search the customer database and retrieve the corresponding customer record, if any. Based on the customer information in the customer record, or the lack of a customer record, the transaction processor returns an appropriate response (such as credit verification status) and marketing response information to the transaction terminal.

Thus, the method of this invention for transaction processing involves various aspects of: (a) identifying a customer by automatically reading the customer's unique ID; (b) developing and maintaining for a store a local customer database of customer records, each identified by the corresponding customer identification number, and each including customer information (such as verification status and transactional data); (c) generating a customer information request; (d) processing the request using the customer identification number to access the corresponding customer record, if any; (e) returning an appropriate customer information response based on the customer information in the customer record; (f) updating the customer database regularly to reflect new customer information; and (g) utilizing the database to perform targeted marketing functions based upon the customer's prior shopping history.

More specific aspects of the preferred embodiment of the invention are the following:

One form of the transaction terminals and the transaction processor form a token ring data communication network, although other types of networks are possible. Each transaction terminal includes (a) an automatic reader constructed in accordance with the present invention for automatically entering identification numbers, along with a keypad for entering function codes and appropriate transaction data, which form customer information requests, and (b) a display for displaying the requests and the returned responses.

The customer records in the customer database include an assigned check verification status, such as POSITIVE (transaction authorized), NEGATIVE (transaction not authorized) or CAUTION (transaction should be scrutinized or subject to certain conditions). The first time a customer attempts a check transaction at a store (i.e., a search of the customer database pursuant to a check verification request indicates no existing customer record), a new customer record with a CAUTION status is created, and a CAUTION response is returned to the transaction terminal. The customer remains in the CAUTION status for a period of time sufficient for this initial check to clear or be returned. If this CAUTION/POSITIVE interval passes, the system automatically updates status to POSITIVE; if the check is returned, customer status is updated by inputting a NEGATIVE status.

In addition to, or in place of, check verification status data, the local customer database may include credit or debit card data and transactional data such as transaction frequency and dollar volume over specified intervals. This transactional data can be used to place conditions risk management on transaction verification over and above verification status. For example, in the case of a customer with either CAUTION or POSITIVE status, if a transaction exceeds certain specified transaction limits frequency and/or dollar amount over a specified interval (such as day, week or total), a CALL MANAGER response is returned in response to a verification request, regardless of customer status.

Moreover, because the transactional data is generated and maintained locally, it provides significant information about the store's customers over and above the information necessary for verification risk management. New customers are readily identified, and prior shopping history such as frequency and dollar volume information may be used to establish customer profiles and to target advertising, marketing and promotional programs, and for other customer relations purposes.

In the case of a multiple store business, each store has a local transaction processing system, with one of the systems being designated a host site and the rest being designated remote sites. At selected intervals, each remote system transmits to the host selected customer information from its local customer database (such as customer records for those customers with CAUTION and NEGATIVE status including transactional data), which is used to update the host customer database to include this global customer information. The host, in turn, transmits that global customer information to the other remote systems.

Transaction processing is implemented by a multi-tasking program executing in the transaction processor. The program includes: (a) a terminal manager task that implements network data communication for the transaction terminals, communicating customer information requests and responses; (b) a Data Manager Task that controls the database operations necessary to respond to customer information requests and to update the customer information in the database; and (c) an Event Manager Task that implements system activities such as backup and database purge, and in the case of multiple-store systems, implements host/remote communications activities to transfer selected customer information among the stores for updating each store's local customer database with the selected global customer information.

Important features and advantages of this invention are the following. The transaction processing system uses the automatic reading of the customer's identification number, which is used as a unique customer identification number, thus avoiding the requirement for additional identification and the attendant delay in completing the transaction.

The system develops and maintains a local customer database, allowing the store to accumulate customer information relevant to the store's customers over and above that information necessary for credit verification. The system provides for the selection of procedures and criteria for database management and credit verification, allowing the store owner/manager considerable flexibility in developing and using the customer information in the store's customer database.

For check verification, the system uses three primary status levels—POSITIVE, NEGATIVE and CAUTION— allowing the store to identify those customers with a bad check outstanding, and to identify new customers and establish selected interim risk management procedures for granting those customers check transaction privileges. In addition to check verification status, the system collects and accumulates selected additional transactional data, including frequency and dollar amounts over specified intervals (such as Day/Week/Month/Quarter/Total) and other historical information such as departments shopped, products purchased and the like, thus allowing the store to adopt risk management approach to check verification tailored to the store's particular customer and financial situation by conditioning check authorization on meeting certain selected transactional limits regardless of customer status (the CALL MANAGER response), and allowing the store to develop customer profiles and to target advertising, marketing and promotions, and otherwise improve customer relations.

For multiple-store businesses, the system can use automatic host/remote transfer of selected customer information to upgrade the local customer database at each store with global customer information (such as those customers with CAUTION and NEGATIVE check verification status), thereby maximizing protection against bad checks while maintaining the local character of the store's customer database.

The transaction processing system is implemented by a multi-tasking program, and uses local area network data communication among the transaction terminals and the transaction processor, allowing efficient operation of the system at each individual store.

The system and method of the invention also provides automatic targeting of individual customers based upon their shopping history. Thus, at the point-of-sale, coupons or other incentives may be generated which are specifically targeted to a specific customer based upon his prior history. Alternatively, coupons may be later mailed to selected customer. For example, substantial rewards may be given to an infrequent shopper, while less substantial rewards may be given to a more frequent shopper. A marketing program may be implemented whereby a customer is sequentially induced to purchase additional volume or additional products based upon the customer's prior history. Based upon that customer's prior history, the types of incentive coupons can be varied by the system. Further, the redemption and efficiency of the coupons are subsequently monitored, and subsequent coupons are varied in dependency upon the monitoring. All of these and many other marketing techniques described herein are able to be accomplished in coordination with a check verification or credit authorization system without requiring additional customer identification codes.

Other objects, features and advantages of this invention will be apparent from the drawings and the following detailed description of the preferred embodiment, and the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 shows the check transaction processing system of this invention, including a multiple store remote/host configuration;

FIG. 2A shows a POS terminal, including the check reader, display and the keypad;

FIG. 2C illustrates a typical check with MICR symbols for reading by the check reader;

FIGS. 4A-1 through 4A-3 illustrate the MICR parsing function;

FIG. 5 diagrams the local status update function for both Add and Delete NEGATIVE status;

FIGS. 6A and 6B diagram the global update function for, respectively, the host and a remote system;

FIGS. 9B-9H are program flow diagrams of selected function execution routines in the Data Manager Task, respectively, verify roll, add NEGATIVE, delete NEGATIVE, host global update (negative status records), host global update (customer records), and remote global update (customer records);

FIG. 19 is a block diagram of a second embodiment of the invention which provides check, credit card, debit card or the like transaction processing as well as targeted marketing;

FIG. 22 illustrates scanning in of a product by the bar code scanner of FIG. 20;

FIG. 41 is a program flow diagram of the Perform Polling Process subroutine of FIG. 40;

DESCRIPTION OF THE PREFERRED EMBODIMENT

Figure 2B:
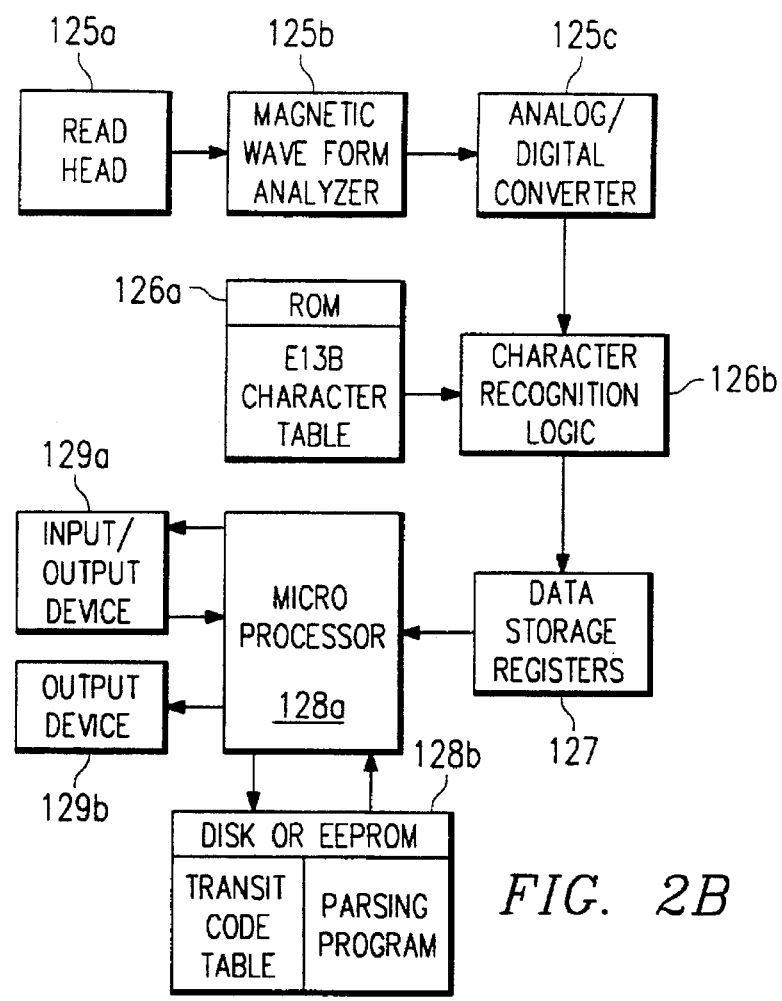
FIG. 2B shows a block diagram of the automatic check reader.

A first embodiment of the present invention and its advantages are best understood by referring to FIGS. 1 through 18A–C of the drawings, like numerals being used for like and corresponding parts of the various drawings. A second embodiment is shown in FIGS. 19 through 47.

The check transaction processing system of the present invention enables a store with a significant volume of check transactions to accumulate and process transactional customer information for check verification and customer profiles for target marketing. The system operates at the store using a local database of customer information useful in that store's business.

A customer's bank checking account number provides a unique identification for that customer—using this check ID, a customer record is created and included in the local customer database. The customer record includes an assigned customer verification status, as well as selected transactional data. Customer status designations include POSITIVE, NEGATIVE and CAUTION, while transactional data includes transaction frequency and dollar volume over given intervals (such as Day/Week/Total or DWT). Selected transactional (CALL MANAGER) limits are assigned to both CAUTION and POSITIVE status. This customer information (customer status and transactional data) in the customer database is continuously updated (a) on a local basis through either processing check verification requests, or inputting customer status, and (b) in the case of a multiple store business, on a global basis through inter-store transfers of selected customer information (such as CAUTION and NEGATIVE status information).

The description of the first and second embodiment of the check transaction processing system is organized as follows:
1.0 Hardware Description
    1.1. System Overview
    1.2. Data Communications Network
    1.3. POS Terminal
    1.4. Multiple-Store Configuration
    1.5. Exemplary Components
2.0 Functional Description
    2.1. Database Structure
    2.2. Function Codes
    2.3. Verify/Query
    2.4. Local Status Update
    2.5. Global Update
    2.6. Purge
    2.7. Event/Activities
    2.8. Communications
    2.9. System
    2.10. Risk Management
    2.11. Customer Information Reporting
3.0 Program Description
    3.1. General
    3.2. System Kernal
    3.3. Data Manager Task
    3.4. Terminal Manager Task
    3.5. Event Manager Task
    3.6. Modem Manager Task
4.0 Alternative Embodiments
5.0 Targeted Marketing Features
    5.1. Automatic Building Of A Database For A Retail Store Marketing Program
    5.2. Targeted Marketing Program
    5.3. Infrequent Shopper Database And Marketing Techniques
    5.4. Marketing Based On Range Of Last Shopping Dates
    5.5. Dissemination Of Point-Of-Sale Coupons And Direct Mail Coupons Based Upon Shopping History
    5.6. Dissemination Of Point-Of-Sale Coupons And Direct Mail Coupons Based Upon Scanned Data

5.7. Second Alternate Embodiment Of Payment Processing And Point-Of-Sale Marketing System

1.0 Check Transaction Processing System 1.1. The check transaction processing system is located at a store, and maintains a local customer database for that store. For a multiple store business, a local system is located at each store and global customer information transfers are used to supplement the essentially local customer database.

Figures 1, 4A:
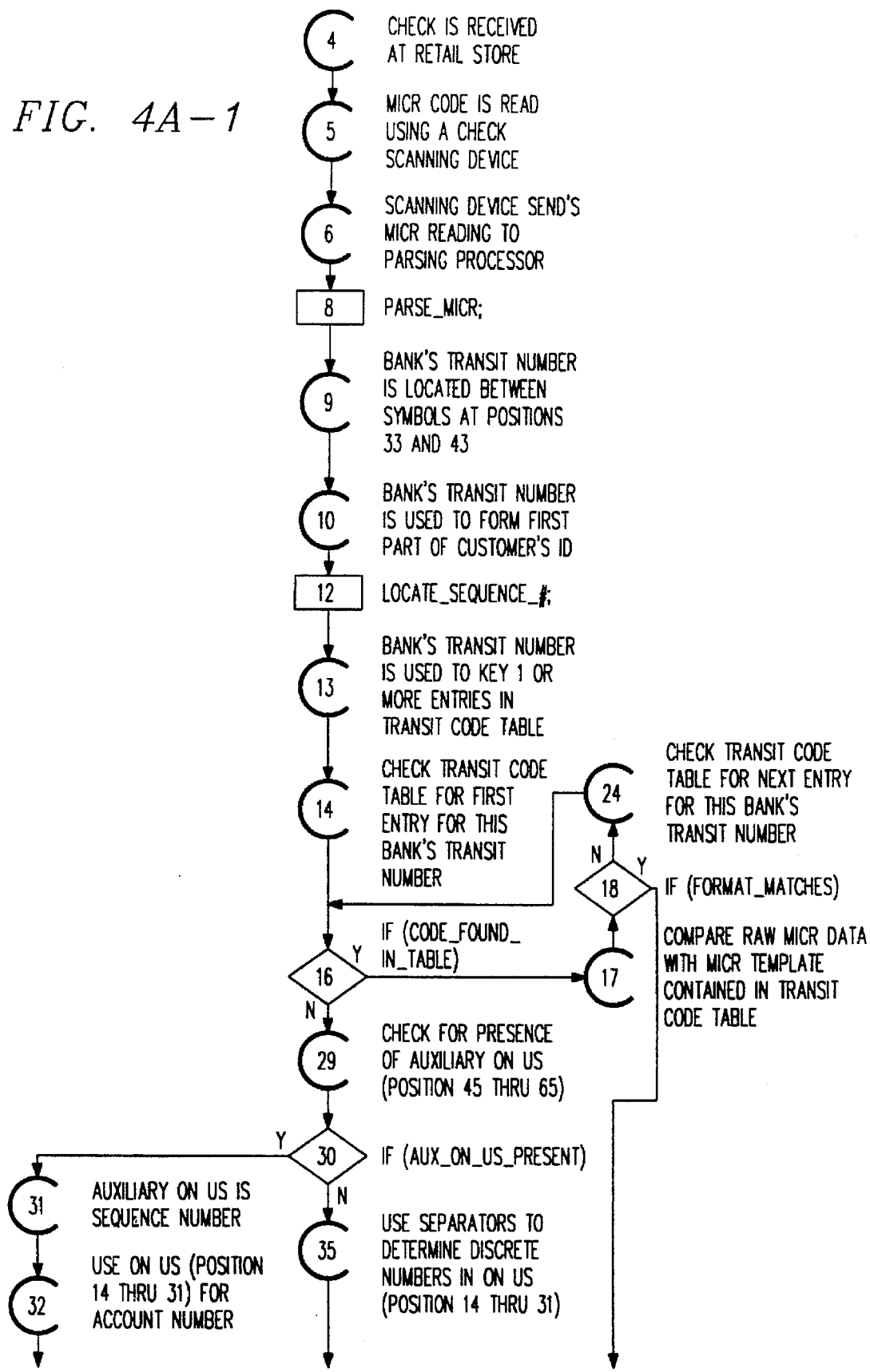
Figures 2, 4A:
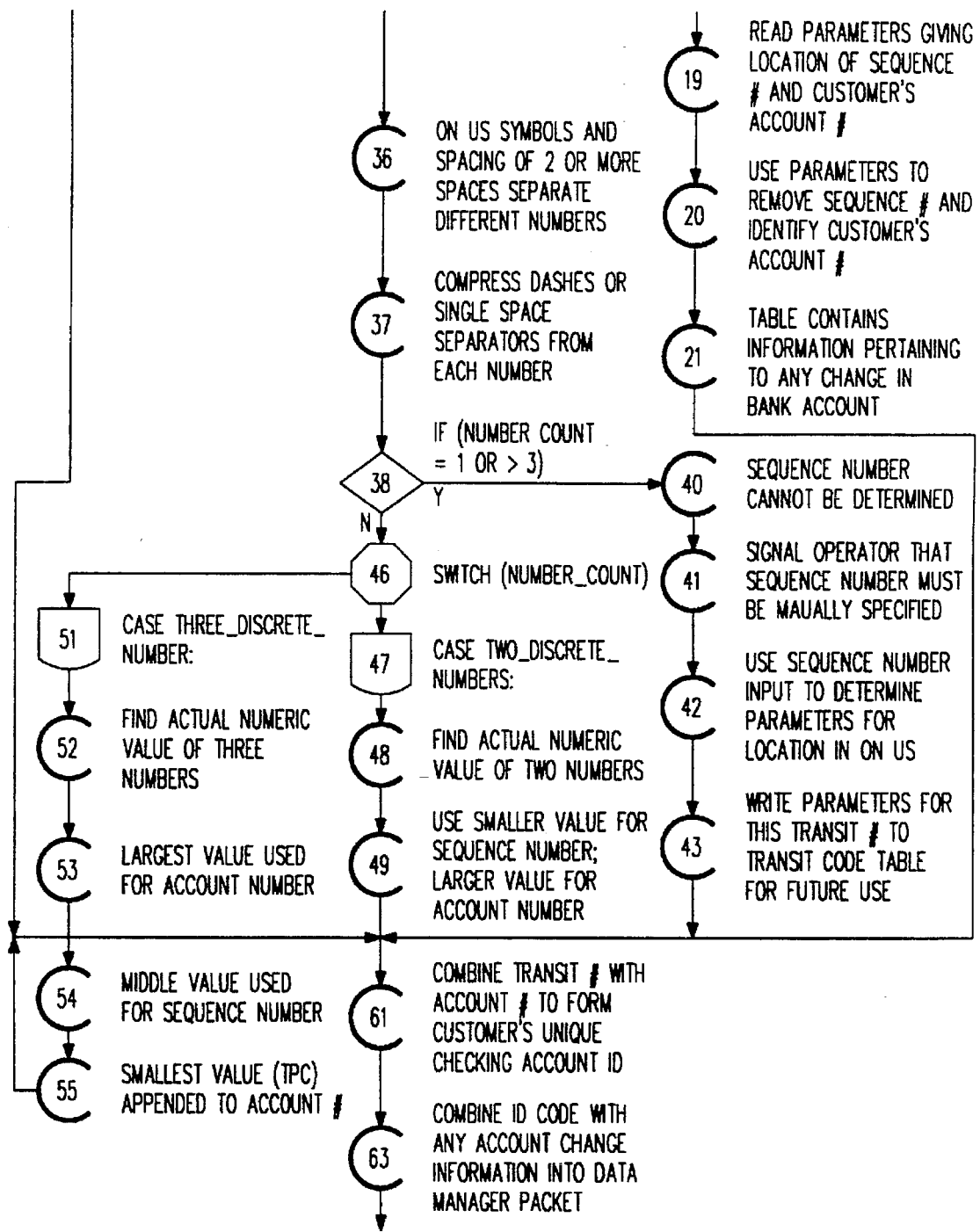
Figures 3, 4A:
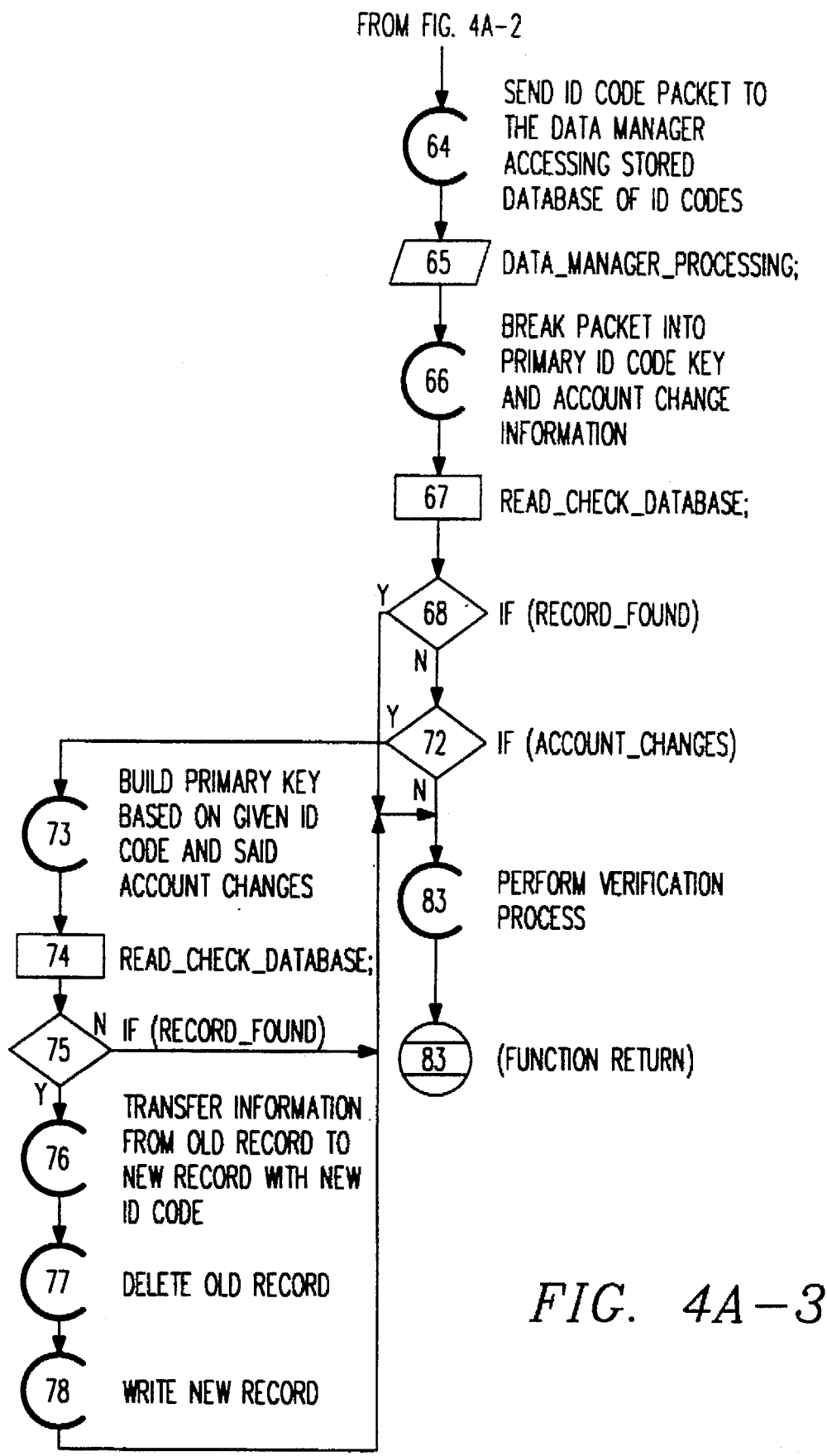

1.1. System Overview. As shown in FIG. 1, a check transaction processing system 110 located at a store includes a transaction processor 112 coupled to a disk system 114 that stores the customer database used in check transaction processing. Transaction processor 112 handles all file I/O for accessing, managing and updating the customer database.

Transaction processor 112 is coupled through a network data communications interface 116 (including network communications ports and associated drivers) and a network bus 118 to a plurality of transaction terminals 120. Transaction processor 112 is able to communicate with other check transaction processing systems through a telecommunications interface 117 (including a modem).

Transaction terminals 120 are each located at a point-of-sale (such as a grocery store checkout stand). Transaction terminals 120 are used to communicate information to transaction processor 112 for check transaction processing and customer database management. A transaction terminal transmits a request (including a function code identifying the requested function together with other request data) to the transaction processor, which processes the request and returns an appropriate response.

For example, in the case of check verification, a transaction terminal is used to transmit a verification request—the customer's check ID, the verification function code, and the dollar amount. The transaction processor processes the request, updates the customer database to reflect that transaction, and returns a customer verification status response.

1.2. Data Communications Network. Data communications between transaction processor 112 and transaction terminals 120 is implemented using a multi-drop token ring network. Network bus 118 connects the transaction terminals to the transaction processor in a star configuration so that all data signals transmitted over the network are received at each node. Each transaction terminal 120 is assigned a unique terminal address to identify its data communications.

Transaction processor 112 implements a token-passing protocol by broadcasting polling sequences (or cycles) in which tokens are sequentially addressed to the transaction terminals. For each poll, the transaction processor sends to a terminal one of two tokens (which both include the terminal address):

| | |
|---|---|
| POLL Token | An invitation for the terminal to transmit data |
| RXDATA Token | Includes data requested by the terminal |

In response to a POLL token, the transaction terminal transmits back one of two answers:

| | |
|---|---|
| TXDATA Answer | Includes data entered into the terminal |
| NODATA Answer | Indicates no data |

During any given polling sequence, each transaction terminal is in one of three polling states that control the polling operation:

| | |
|---|---|
| Poll | Send a POLL token |
| Wait | Do not send a token until requested data is available |
| Data | Send an RXDATA token that includes the requested data in the terminal's buffer |

For example, in response to a POLL token, a transaction terminal may transmit a TXDATA Answer containing a check verification request. Once the request is transmitted, the terminal is placed in the Wait state until the verification response from the transaction processor is available. The response is placed in the terminal's buffer, and the terminal is placed in the Data state. The response is included in an RXDATA token sent to the terminal during the next polling sequence, and the terminal is placed in the Poll state ready to receive a POLL token in the next polling sequence.

For the preferred embodiment, network communications interface 116 provides 32 ports for up to 32 transaction terminals. The data communications network uses the RS485 line protocol, which specifies differential signal lines SIG+ and SIG–, as well as +12 V and ground lines. The network communications interface and the corresponding interfaces for each transaction terminal use a differential line driver for signal communication over network bus 118, which provides the necessary 4-wire signal path.

1.3. POS Terminal. As shown in FIG. 2A, each POS terminal 120 includes an automatic check reader 119 and a transaction terminal 121 which includes a keypad 122 and a display 124. A bar code reader 123a is also connected to terminal 121 and is used to read bar code numbers on products purchased at the point-of-sale. Further, a coupon dispenser 123b is connected to terminal 121 to dispense coupons at the point-of-sale. Keypad 122 is a 4×4 key matrix that includes specific keys for Function, Enter, Scroll, Clear and Back Space, as well as 0–9 and $. Display 124 is a liquid crystal display capable of displaying two lines of up to twenty characters each.

For example, to initiate a check verification request, check reader 121 automatically scans the magnetic ink character recognition (MICR) data printed along the bottom edge of the customer's check and then the store clerk operates the keypad 122 to enter the amount of the check, along with the function code designating check verification. This request is displayed on display 124, and sent, along with data from the check reader 121, to transaction processor 112. The check verification response, including the customer's verification status (such as POSITIVE, NEGATIVE or CAUTION), and marketing information (such as the type of coupon to be dispensed) returned by the transaction processor is then displayed on display 124.

FIG. 2B illustrates a block diagram of an automatic check reader 119 in accordance with the present invention. Automatic check readers have been heretofore known, and the descriptions of such previously developed automatic check readers are found in U.S. Pat. Nos. 4,277,689; 4,143,355; 4,396,902 and 5,054,092, the subject matter of which is incorporated by reference herein. The present automatic check reader differs in that it contains a properly programmed processor and sufficient memory to enable the desired "parsing" and omitting of certain portions of the MICR code contained at the bottom of checks being read.

The MICR encoding of checks is known, and a detailed explanation of the MICR encoding scheme may be found in

*The MICR Handbook* by Rylla R. Goldberg, published by Heath Printers, the subject matter which is hereby incorporated by reference. As noted in *The MICR Handbook*, and as will be subsequently described, the field of the MICR symbology located on the bottom of the check is broken into various data fields in which different banks can place different data at different locations. Conventional automatic check readers such as those noted in the above-noted patents often cannot detect a customer's checking account number because it is interspersed with other data such as the check sequence number.

The present automatic check reader is provided with structure which enables the customer checking account number and the bank transit number (which identifies the bank) to be detected within the code printed on the customer's check. This process involves detecting or parsing (the examination or analysis of a string of numbers or characters which is designed to detect or identify various subgroupings or sets within the string) followed by extraction of that set or sets which have been defined as the customer checking account number. The present automatic check reader is thus provided with circuitry which enables the customer's checking account number and the bank transit number to be parsed or detected and the remainder of the data extracted or omitted, such that the customer's checking account number and the bank transit number may be used as the unique customer identification code for the present invention. The present check reader thus provides substantial advantages over prior check readers which have not been useful for check verification or marketing techniques because it was not possible for such prior check readers to consistently detect customer account numbers on checks presented from different banks and bank branches.

Referring to FIG. 2B, the check reader 119 of the present invention incorporates a read head 125a which comprises a magnetic or optical read head operable to read MICR characters imprinted on checks which are passed through the check reader. The output from read head 125a is applied to a magnetic wave-form analyzer 125b which applies an analog signal to the analog to digital converter 125c. A digital output from converter 125c is applied to the character recognition logic 126b of the present invention. A disk or EEPROM 126a contains stored therein an E-13(b) character table which is applied to the character recognition logic 126b. Utilizing conventional technology, the logic 126b generates recognition data to data store registers 127 for application to microprocessor 128a when required. The disk or EEPROM data storage 126a includes a transit code table and a parsing program, and provides data and instructional programming for the microprocessor 128 to perform a parsing program discussed in more detail in FIG. 4B. An input/output device 129a is connected to microprocessor 128a, as is an output device 129b.

Figure 2D:
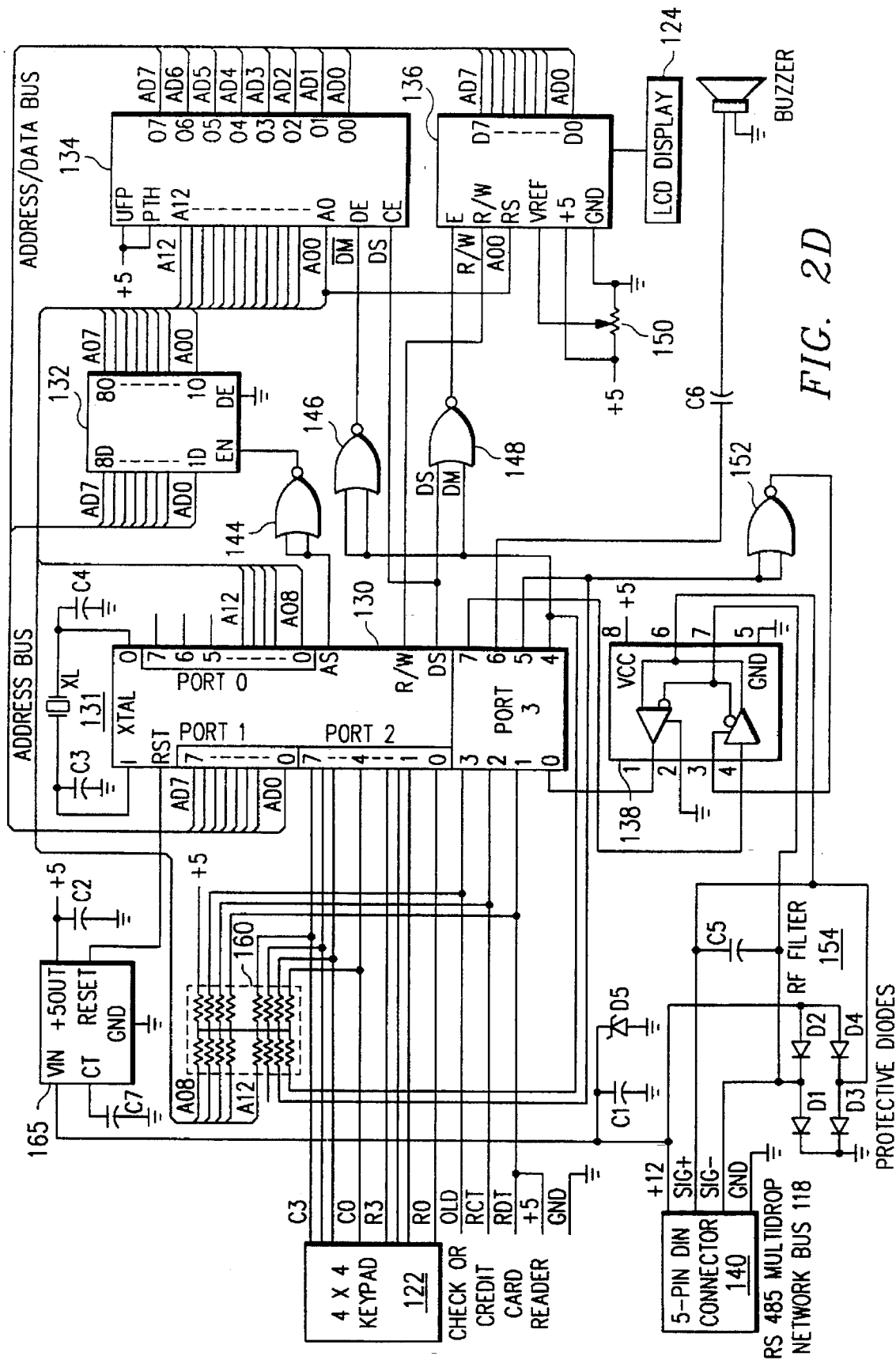
FIG. 2D shows schematic circuit detail for the transaction terminal.

In operation, the read head 125a reads MICR characters on the check and applies signals to the analyzer 125b to provide an output from the analog to digital converter 125c of the MICR characters being detected. The character recognition logic 126b provides optical character recognition to generate an indication of the characters represented by the MICR symbology on the check. This data is stored in the data stored registers 127 for application to the microprocessor 128a. The microprocessor 128 utilizes information from the transit code table in the disk or EEPROM 128b to determine the particular bank whose check is being scanned and also the particular location of the customer account number in the MICR code for that particular bank. The parsing program 128 is then operable to parse or eliminate all aspects of the MICR code except for the desired customer account number. The microprocessor 128 then generates an output to the output device 129b which indicates the desired customer account number of that particular check. The output device 129b is connected to pins 1–3 which serve as the I/O of the transactional terminal 121 circuitry which is shown in FIG. 2D, to be subsequently described.

The detected customer account number and bank transit number are then subsequently used in the various programs and subroutines of the present invention to provide check verification and marketing techniques in accordance with the invention. As noted, the present automatic check reader differs from previously developed check readers in its ability to detect the location of the customer account number and to omit all other portions of the MICR code except for the desired account number and perhaps the transit number. In this way, the present automatic check reader may be used to process all checks from all banks and their branches, regardless of the location of the customer account number and regardless of which branch of a particular bank is being utilized or even in such situations where a branch is sold or transferred to another entity.

FIG. 2C illustrates a typical check which will be used to illustrate the operation of the automatic check reader of the invention. As described in *The MICR Handbook* by Rylla R. Goldberg, and as is commonly known, the MICR check field contains four fields, namely the Amount, On Us, Transit, and Auxiliary On Us fields. Conventionally, the Amount field includes positions 1–12 in the MICR field, the On Us field includes positions 14–31, the Transit field positions 33–43 and the Auxiliary On Us field encompasses positions 45–65 in the MICR band. In the illustrated check in FIG. 2C, the Transit field comprises symbols plus the transit number sequence 101010733. This transit number identifies the particular banking institution. This transit number is set apart from the data contained in the On Us field, which field contains the customer's account number and also contains the number of the particular check. In this instance, the number sequence in the On Us field is 179201476663. The last two digits 0 and 1 in the MICR field are optionally included on many checks and may be offset by a symbol to indicate the branch number of the particular bank.

It can thus be seen that the sequence 179201476663 contains both the sequence number of the particular check, which in this particular instance is 1792, and also the customer's checking account number 01476663. As noted, it is very important in the present invention to automatically detect the customer's checking account number. It is common for many banks to provide symbology which separates the number of the particular check and the customer's account number. However, with many banks, as in the illustrated check of FIG. 2C there is no symbology which separates two pieces of information and therefore it has not been heretofore possible to automatically determine the actual customer's account number in all banks by conventional check readers. For example, conventional check readers which would scan the On Us field for the account number would indicate that the customer's account number was 179201476663, whereas the customer's true account number is 01476663.

An important aspect of the present invention is the ability of automatic check reader 119 to find the sequence number of the check and omit that number to leave the true customer account number. The encoding scheme may be different for each bank. This is accomplished by utilization of the disk or EEPROM 128a which contains tables which designate what encoding scheme is used in the MICR band for each bank.

For example, the table stored in EEPROM 128b would indicate that the Mills County Bank, identified by the transit number 101010733, had a convention of always placing the check number in the first four locations of the On Us field. In the case of the check in FIG. 2C, the check reader 119 would access this information to know that the first four digits of the On Us field were merely the number of the check and should thus be omitted or parsed in order to determine the true checking account number of the customer, which was 01476663. Specifically, in the check illustrated in FIG. 2C, it can be seen that the number of the check at the upper right hand corner is 1792. This number would then be omitted by the check reader 119 to provide the true customer account number. In some instances, the customer account number may be combined with the transit number to provide a unique ID number.

It will be understood that the check number advances one unit each time a new check is written and therefore the data contained in the On Us field of the Mills County Bank would be continuously changing. Only by the check reader of the present invention having a stored knowledge of a particular location of the check number of the Mills County Bank would it be able to detect and omit or parse out the unwanted check number information.

The present check reader of the invention can determine the instances when the On Us field contains a space or suitable symbology separating the check number from the customer's account number, in addition to the scheme previously noted. In such cases, the check reader parses and omits the shortest number, which will be the check number. A particularly important aspect of the present invention is that the automatic check reader can read the MICR code of all banks and accurately pick out the customer's account number for utilization as a unique customer ID to perform the advantages of the invention.

Figure 3:
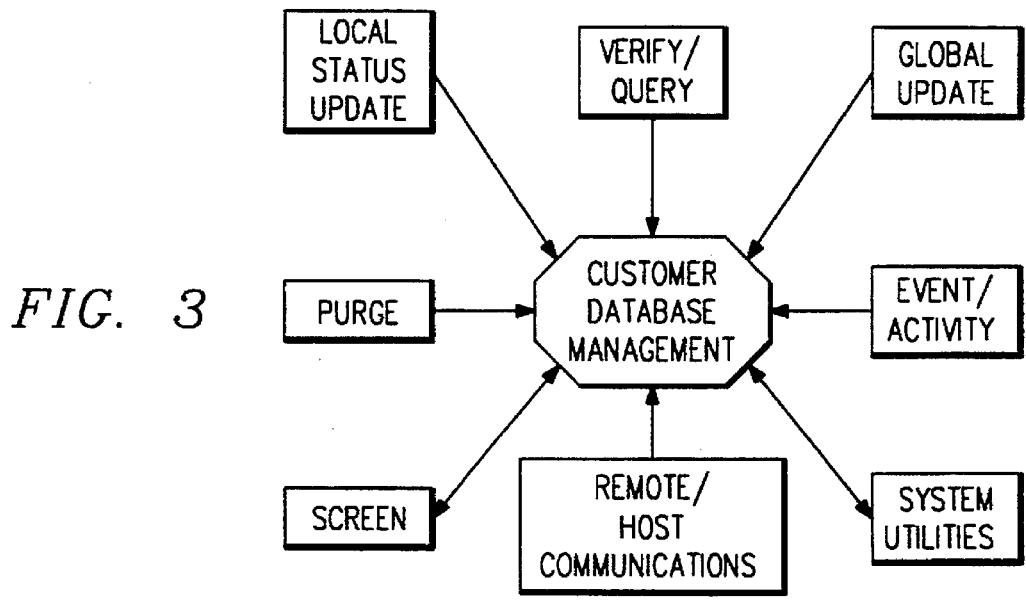
FIG. 3 functionally diagrams the check transaction processing system.

Another important aspect of the invention, as will be described in greater detail in FIGS. 4A-1 through 4A-3, is the ability of the automatic check reader 119 to be taught by the operator to recognize the eccentricities of each bank's MICR code. For example, if the system were for the first time attempting to read a check by the Mills County Bank and thus could not pick out the customer's account ID because it did not know the code for Mills County Bank, the present system could be taught by the operator and the new knowledge stored in table 128b. From that point forward, the system would be trained to recognize the customer's account number and to omit the unwanted check number in the first four positions of the On Us field.

The present automatic check reader 119 also can be taught to detect changes of a bank's branch number, and instances in which institutions are purchased and their transit number is changed, and cases wherein financial institutions run into difficulties and are required to change owners and therefore change transit IDs. Previous check readers were not able to keep track of such changes in banks and transit numbers. With the present check reader 119, such information can be stored in the transit code table 128b. Therefore, if the Mills County Bank of FIG. 2C changes its transit number or its branch number, that information can be entered into the transit code table 128b and from that point forward, the system will continue to recognize Jack Smith's checks and his unique checking account number even though the bank's transit number has been changed. With prior check readers, such changes in transit numbers would be scanned and considered to be a different bank and therefore Jack Smith's account number would not be recognized as belonging to the particular Jack Smith.

In addition, banks often have different types of accounts such as money markets, now accounts, commercial accounts, personal accounts and the like. So for a given bank transit number, there may be several non-obvious embedded locations for the particular next sequence number. For example, in the check shown in FIG. 2C, the first four digits in a personal checking account are known to represent the check sequence number. However, for a savings, NOW or money market account for the Mills County Bank, the check sequence number might be moved to the middle or the end of the On Us field. The information for each particular bank is stored in the transit code table 128b of the present reader 119 such that all branches and types of accounts of a bank may be accurately detected. The ability to teach or train the system to accommodate such new information upon the occurrence of changes is also important, as such new information may be input by the operator into the transit code table 128b and used from that point onward to detect accurately the customer's checking account number, as well as all customers for that bank.

Another important aspect of the invention is that the MICR parsing operation previously described and shown in FIGS. 4A-1 through 4A-3 does not have to be accomplished inside the automatic check reader 119. Indeed, the transit code table and parsing program may be incorporated in the host computer 110. A conventional check reader may thus be used to read in the information and the parsing program shown in FIGS. 4A-1 through 4A-3 can be accomplished in the host computer 110. It will also be understood that the automatic check reader 119 might be incorporated into the transactional terminal 121 and that both the automatic check reader 119 and the transactional terminal 121 might be incorporated or associated directly with an automatic cash register commonly in use by retailers.

The important aspect of the invention is the ability to always recognize a customer's checking account number in a MICR line automatically, no matter which bank or which type of account is involved. With the ability to generate an extremely accurate indication of the customer's account number and the bank transit number, a unique customer identification code is provided which may be utilized to provide the many advantages of the invention to be subsequently described.

While the preferred customer identification code comprises the checking account number and the bank transit number, it should be understood that various aspects of the invention may be practical using different customer identification codes. For example, many of the marketing and verification techniques hereinafter described can be accomplished by the store clerk manually entering the name, address and/or phone number into the system through data terminal keypad 122. This unique identifying data could then be used to identify the store customer. While such manual entry is slower and not as efficient or accurate as the automatic reading of the MICR code, the manual technique may have applications in certain circumstances.

As shown in FIG. 2D, the transaction terminal 121 includes:

(a) A Z8 microprocessor 130;
(b) An associated address latch 132;
(c) An EPROM 134;
(d) An LCD (liquid crystal display) module 136; and
(e) A differential transceiver 138.

Address and data paths are provided by an Address/Data Bus and a separate Address Bus.

The transaction terminal is coupled to the RS485 multi-drop network bus (118 in FIG. 1) through a 5-Pin DIN connector 140. The RS485 network bus provides signal lines SIG+ and SIG−, along with a +12 volt power line and a ground line.

EPROM 134 provides program memory for microprocessor 130, while LCD module 136 constitutes data memory. That is, the LCD module functionally interfaces to the microprocessor as memory, providing an 80-character display data register that is treated by the microprocessor as data memory.

EPROM 134 stores programs to control keypad 122, display 124 (i.e., LCD module 136) and network data communications. The keypad program includes conventional routines for decoding key-struck signals and receiving entered characters, as well as key-debouncing and N-key rollover. The display program includes conventional routines that write characters to and read characters from the display data register in LCD module 136. To that end, the display program provides mode control commands to LCD module 136 that control read/write operations, as well as operations for cursor positioning, backspace and scroll. The network program controls token-ring network communications, including establishing a terminal polling address when the transaction terminal becomes active, detecting POLL tokens addressed to the transaction terminal, building and sending NODATA and TXDATA answers, and receiving RXDATA tokens containing response data for the transaction.

LCD module 136 is a self-contained liquid crystal display module that includes liquid crystal display 124, and provides many display control functions internally. Display 124 is arranged in two lines of 20 characters each, with the internal 80-character display data register providing 40 characters of display memory for each line. Each line is independently scrolled under control of the LCD module in response to microprocessor mode control commands (for example, when the scroll key on keypad 122 is depressed). In addition to the internal display data register, the LCD module includes an internal control/status register. Logically, these registers are treated as, respectively, data and control/status ports. Data may be read to or written from the data port, while control is written to and status is read from the control/status report.

From above, the display control program in EPROM 134 provides the various mode control commands that invoke the display control functions implemented by the LCD module. For example, in response to appropriate mode control commands, the LCD module performs the necessary internal operations to move the cursor, output the character under the cursor, write a character in the cursor position, delete a character in the cursor position, clear the display, and output sequentially all characters in the display data register (such as after the enter key is depressed).

Microprocessor 130 provides four input/output ports 0-3. Port 0 is output only, and provides the higher order address bits A08–A12 over the Address Bus (the 3 higher order bits A13–A15 of the 16-bit Z8 microprocessor address are not used by the transaction terminal). Port 1 is input/output, providing the lower order address bits A00–A07 and receiving 8-bit data bytes over the Address/Data Bus. Port 2 is input only, and is coupled to the column/row matrix lines of the 4×4 keypad matrix for keypad 122, i.e., column lines C0–C3 and row lines R0–R3.

Port 3 (0–7) is a multi-purpose input/output port. Pins 0 and 7 are a serial I/O port for an internal UART (universal asynchronous receiver transmitter). Pin 5 is an output drive enable line that controls the transmit/receive state of differential line driver 138. Pin 4 is a data memory DM line used to select either program memory (i.e., EPROM 134) or data memory (i.e., LCD module 136). Pins 1–3 are an I/O port for the check reader 119 or for a credit card reader, and Pin 6 is an output port for a buzzer.

In addition to the four I/O ports, microprocessor 130 provides an address strobe line AS, a data strobe line DS and read/write line R/W.

A clock circuit 131 includes a crystal oscillator that establishes a 7.3728 MHz system clock. The Z8 microprocessor is clocked down (from its 12 MHz specification) to accommodate the LCD module's response time.

Address latch 132 receives the lower order address bits A00–A07 from microprocessor port 1 over the Address/Data Bus during the first address cycle. The address latch is enabled to latch these address bits by a microprocessor address strobe provided through an inverter 142. The latched address bits A00–A07 are available at the output of address latch 132 which is coupled to the Address Bus.

EPROM 134 receives a 12-bit address A00–A12 from the Address Bus. The lower order bits A00–A07 are provided by address latch 132, and are available on the Address Bus during the second address cycle when the higher order bits A8–A12 are provided by microprocessor port 0 over the Address Bus. Thus, EPROM 134 receives the complete 12-bit address A00–A12 from the Address Bus during the second address cycle. The addressed data byte AD0–AD7 is available from the EPROM output port over the Address/Data Bus and may be read when microprocessor 130 provides a data strobe DS to the chip enable CE input to the EPROM.

LCD module 136 includes an I/O port (pins D0–D7) coupled to the Address/Data Bus (lines AD0–AD7). To connect either the display data register or the control/status register to the I/O port, Microprocessor 130 selects either data port operation or control/status port operation with a register select signal provided by the address bit A00 from the Address Bus to the R/S input of the LCD module—if A00 is even (logic 0), the display data register is connected to the I/O port, and if A00 is odd (logic 1), the control/status register is connected. Read/write operation is selected by R/W signal from microprocessor 130 to the R/W input to LCD module 136.

LCD module 136 is enabled for output over the Address/Data Bus by an enable signal from a NOR gate 146, which receives input from the microprocessor's data strobe DS line and data memory DM line (port 3, pin 4). That is, LCD module 136 may be read only if both the data strobe and data memory lines are active. In contrast, EPROM 134 is enabled for a read operation only if the data strobe line is active while the data memory line is inactive causing an active output from an inverter 144. In this manner, microprocessor 130 uses the data memory line to select between program memory (EPROM 134) and data memory (LCD module 136).

A potentiometer 148 is used to adjust contrast for the LCD display 124. The potentiometer is connected between the pins +5 volts and ground on LCD module 136, with the potentiometer voltage being applied to the voltage reference pin VREF.

To read instructions from EPROM 134, microprocessor 130 provides a 12-bit address on the Address Bus—the lower order address bits A00–A07 from port 1 through address latch 132, and the higher order address bits A08–A12 from port 0. EPROM 134 is enabled for output by the data memory line (port 3, pin 4) being held inactive resulting in an active output-enable signal from inverter 144 to the EPROM. Conversely, LCD module 136 is disabled for a read operation because the inactive data memory line insures an inactive signal from NOR gate 146 to the LCD module, thereby insuring that EPROM 134 has exclusive access to the Address/Data Bus. During the read cycle, microprocessor 130 enables EPROM 134 to output the addressed data byte by providing a data strobe DS to the chip-enable input to the EPROM.

To read display data from the display data register in LCD module 136, Microprocessor 130 executes a read display routine in the display control program stored in EPROM 134. Microprocessor 130 first disenables EPROM 134 by holding the data memory line (port 3, pin 4) active, causing the output-enable output from inverter 146 to be inactive. LCD module 136 is then enabled for input/output when a microprocessor data strobe drives active the output from NOR gate 148, which now has both its inputs (DM and DS) active.

Once LCD module 136 has been given access to the Address/Data Bus, a display-data-register read operation is accomplished as follows. Microprocessor 130 outputs from port 1 an LCD mode control byte including a register select bit A00 over the Address/Data Bus. The register select bit is coupled through address latch 132 and the Address Bus to the RS input to LCD module 136 which selects bit is in the C/S state, causing LCD module 136 to select the control/ status register for I/O access to the Address/Data Bus. Microprocessor 130 also places its read/write R/W line in the write state, so that the mode control byte can be written into the control/status register. Microprocessor 130 then provides a data strobe DS that enables LCD module 136 to latch the mode control byte from the Address/Data Bus into the control/status register.

In accordance with this mode control command, LCD module 136 places a not-ready status byte in the control status register, makes the designated display character in the display data register available for output on the Address/ Data Bus, and then places a ready status byte into the control/status register. Microprocessor 130 switches the read/write line to read (the control/status register is still selected for I/O), and then provides a data strobe DS to read the status byte in the control/status register. (The microprocessor continually strokes the LCD Module until a ready status byte is returned from the control/status register.)

Microprocessor 130 then outputs a register select bit (A00) that causes LCD module 136 to select the display data register for output. Finally, the microprocessor provides a data strobe to read the first display data character over the Address/Data Bus into port 1.

This procedure—select control/status, read status, select display data, read display data—is continued until all requested display data characters have been read. That is, microprocessor 130 first reads the status register to determine when LCD module 136 is ready (i.e., when the next display data character is available), and then reads the character.

The procedure by which microprocessor 130 provides display data characters for display by LCD module 136, writing the characters into the display data register, is analogous to the procedure for reading display data characters. Executing a write display routine in the display control program, microprocessor 136 first writes a corresponding mode control command into the control/status register of the LCD module, and then reads status to determine when the LCD module is ready. Microprocessor 130 then selects the display data register, and writes the first display data character over the Address/Data Bus. Microprocessor 130 reads the status register to confirm that the LCD module is ready prior to writing the next display data character. This procedure of reading the status register and then writing a display data character is continued until all display data characters have been written.

Differential transceiver 138 controls data communications over the network bus 118 connected to connector 140. The RS485 communications protocol is implemented by microprocessor 130 executing the network communications program stored in EPROM 134. Port 3 of microprocessor 130 is used as a communications port, with pins 0 and 7 providing a serial I/O port, and pin 5 providing a transceiver drive enable line through an inverter 152 (the differential transceiver is in the transmit mode if the signal is active, and in the receive mode if the signal is inactive).

On the network side of differential transceiver 138, signal lines 6 and 7 are coupled, respectively, to the network bus signal lines SIG+ and SIG−. These signal lines are coupled to the +12 volt line through opposite sides of a protective diode network 154.

While waiting for a token (either POLL or RXDATA) over the network bus, microprocessor 130 holds the transceiver drive enable line inactive, thereby placing differential transceiver 138 in the receive mode. When a token is received through differential transceiver 138 into the serial I/O port (port 3, pins 0 and 7), microprocessor 138 switches the transceiver drive enable line active and transmits either a TXDATA or NODATA answer via the serial I/O port and the differential transceiver.

Keypad input is accomplished in a conventional manner using a 4×4 keypad matrix with column lines C0–C3 and row lines R0–R3. Key-struck decoding is accomplished as follows. Column lines C0–C3 are normally held high by a resistor network 160, while microprocessor 130 (port 2) holds the row lines R0–R3 low. When a key is struck, the corresponding column line is brought into contact with that key's row line, and the column line is brought low, which is detected by microprocessor 130. The microprocessor then switches the port 2 lines high, and sequentially drops a row line low until the key-struck column line goes low, thereby identifying the key that was struck by its row/column intersection.

Keypad control functions, such as debouncing and N-key rollover are accomplished in a conventional manner using program routines of the keypad control program stored in EPROM 134.

Power for the transaction terminal is provided by a voltage regulator 165 that receives +12 volts from the +12 volt line of the network bus. Voltage regulator 165 provides a stable +5 volt logic level.

A transaction terminal is initialized as follows. At power on, voltage regulator 165 provides a reset signal to microprocessor 130 when the +5 volt logic level is stable. Microprocessor 130 turns port 0 off, so that the Address Bus is controlled by the low-current resistor network 160, which holds the Address Bus lines A08–A12 high.

Microprocessor 130 outputs from port 1 an initialization address over the Address/Data Bus, which is latched into address latch 132 and placed on the Address Bus. EPROM 134 receives the initialization address A00–A12 (with bits A08–A12 being held high by resistor network 160), and makes the addressed instruction available at its data output port. Microprocessor 130 then reads the first instruction over the Address/Data Bus. Port 0 is turned on, so that resistor network 160 no longer controls the address lines A08–A12 of the Address Bus, and normal operation commences under control of microprocessor 130.

1.4. Multiple-Store Configuration. As shown in FIG. 1, for businesses with multiple stores, a check transaction processing system 110 is located in each store.

One store is designated as a "host" system, and the other stores are designated as "remote" systems. The host system coordinates the global exchange of check verification data and other customer information, but otherwise operates as a local system for that store in the same manner as the remote systems. Operation as a host does not affect concurrent local operation, i.e., host/remote status is transparent to the check transaction processing operation at each store.

Each store operates relatively autonomously in developing and maintaining its local customer database and providing check transaction processing. However, the stores are also able to globally exchange certain customer information useful to all of the stores, particularly for purposes of check verification. For example, while it is probably unnecessary from a credit standpoint for the stores to exchange information about customers who typically frequent only a single store and do not present check transaction problems, the stores will probably want to exchange information about customers who have written bad checks at one or more stores, or who are in a cautionary status as new customers. Moreover, the present system permits exchange of data between stores for marketing purposes. Such a global exchange of customer information reduces the likelihood that the business will experience a significant loss from a concerted bad check writer.

Each store's customer database is updated with both local and global customer information. Each local check transaction processing system 110, including the designated host system, continually updates its customer database with local customer information, either automatically through processing check transactions or through operator-input of customer status data (such as negative status information). At regular intervals, each remote system transfers to the host selected customer information (such as negative and caution status information). The host updates its customer database with this customer information, and transfers back to each remote system global customer information from all remote systems. Each remote system then updates its customer database with this global customer information.

1.5. Exemplary Components. The detailed specifications for transaction processor 112, and its associated disk storage 114, and network communications interface 116 are not critical to this invention, being a matter of design choice. For the preferred embodiment, transaction processor 112 uses a Western Digital Processor Board Model No. WD286-WDM2 based on the Intel 80286 processor chip. Disk storage unit 114 is a Seagate Technologies Model ST225, and communications interface 116 is Sealevel Systems RS485 Communications Board Model No. SIO-485. The transaction processor runs MSDOS 3.3.

The detailed specification for point-of-sale transaction terminals 120 is not critical to this invention, being a matter of routine design specification. For the preferred embodiment, transaction terminal 120 includes the following components:

| | |
|---|---|
| Microprocessor 130 | Zilog Z8 (86C9112PSC) |
| Address Latch 132 | 74HC373 |
| EPROM 134 | 27C64 |
| LCD Module 136 | Optrex DMC16207 |
| 4 × 4 Keypad | Standard 4 × 4 matrix |
| Diff. Transceiver | 75176 (R5485 compatible) |
| Voltage Regulator | LM2925 |

Alternative similar point-of-sale units are commercially available, such as from Omron Business Systems Model No. C.A.T. 90.

2.0 Functional Description

As diagrammed in FIG. 3, the check transaction processing system performs the following general functions:

(a) Verification (with Transactional Update) and Query
(b) Local Status Update
(c) Global Update
(d) Event-driven activities
(e) Customer database purge
(f) Host/Remote communications as well as the customer database management operations necessary to support these functions. In addition, certain system information and diagnostic functions are performed.

The verification function involves sending a request for check transaction verification from a point-of-sale terminal 120 to the transaction processor, which performs the necessary database operations to process the request, update the customer database with transactional data (such as frequency and dollar amount) to reflect the current transaction, and return an appropriate response. The local status update function involves continuously inputting customer status changes (particularly to reflect bad check experience) for customers in a store's local customer database. The global update function, for multiple-store systems, involves continuously transferring among the stores selected customer information (preferably caution and negative status information). The purge function involves removing obsolete or unwanted customer records from the customer database based on specified purging criteria. The event-driven activities involve certain database management functions (such as purge and backup), as well as host/remote communications for global update, automatically performed at regular intervals.

2.1. Database Structure. The customer database includes all customer information used and maintained by the check transaction processing system. The customer database comprises two separate files containing customer information: the customer file and the negative status file. In addition, a system control file contains transactional limits used during check verification and purge limits.

The customer file contains customer records that include the following customer information:

| Field | Description |
|---|---|
| Check ID | Customer checking account number |
| Verification Status | POSITIVE, NEGATIVE, CAUTION, CASH ONLY, or STOLEN |
| User Flags | User assigned flags that designate a customer as PREAPPROVED for check transactions regardless of any transactional limits, or as being authorized for check transactions on a MANAGER ONLY approval basis regardless of actual status |
| Transfer Date/Time | Date/time the customer record was last accessed and updated (written to disk), used in host/remote transfers for global update (transfers from host to remote generally do not affect this date) |
| Access Date/Time | Last date/time the customer record was accessed and updated (a query function does not change the access date/time) |
| Status Change Date | Date/time customer status changed (e.g., CAUTION TO POSITIVE) |

| Field | Description |
|---|---|
| DWT Frequency | Day/Week/Total values for transaction frequency (updated transactionally during check verification and globally |
| DWT $Amount | Day/Week/Total dollar amounts (updated transactionally during check verification and globally |
| Previous Status | Customer's previous status (such as CAUTION prior to being rolled POSITIVE) |
| Frequency Since Transfer | Total number of check transactions since the last global transfer |
| $Amount Since Transfer | Total dollar amount volume since the last global transfer |
| Marketing Data | Purchases made of predetermined products, store departments and the like |

The file specification for a customer record is set forth in Table 1 at the end of the specification.

The customer file is indexed by (a) check ID, and (b) status/transfer date/check ID.

The preferred intervals for maintaining frequency and dollar amount transactional data are Day/Week/Month/Total, where the day is the current 24-hour period, the week is the previous 7 days, the month is trailing 30 days, and the total is the total since the customer's first check transaction. The DWT designation will be used throughout this specification to indicate the three separate values for either Frequency or $Amount. Preferably, DWT Frequency and $Amounts are maintained on a global basis, so that for those records that have been globally updated (such as NEGATIVE and CAUTION status customer records), the DWT values will be global rather than local. Alternatively, separate local and global DWT transactional data can be maintained in the customer records, as shown in Table 2.

A customer can be assigned one of five check verification status designations:

| Status | Description |
|---|---|
| CAUTION | The customer is a new customer, and a specified check clearance interval since the customer's first check transaction has not passed |
| NEGATIVE | The customer has one or more outstanding bad checks at any store location |
| POSITIVE | The specified check clearance interval since the customer's first check transaction has passed, and no bad checks are outstanding at any store location |
| CASH ONLY | The customer is not authorized to cash checks, even though no bad checks are outstanding |
| STOLEN | The customer has reported stolen checks |

Customer status is assigned during customer record creation, and then updated (transactionally, locally or globally) to reflect changes in customer status, such as due to elapsed time between check transactions or bad check history.

In addition, the local update function can be used to assign to a customer either of the following user flag designations, which override normal status responses to check verification or status query requests:

| User Flag | Description |
|---|---|
| PREAPPROVED | The customer has been preapproved for check transactions that may otherwise exceed certain transactional limits applied even to customers with POSITIVE status |
| MANAGER ONLY | The customer is not authorized to cash checks without manager approval, even though no bad checks are outstanding |

In response to a check verification (or status query) request entered at a transaction terminal, the transaction processor returns a response with either customer status, or if specified transactional limits have been exceeded, a CALL MANAGER directive, unless the PREAPPROVED or MANAGER ONLY user flags in the customer's record have been set. Generally, a check transaction will be authorized if the customer has a POSITIVE status or is PREAPPROVED, will require manager approval for MANAGER ONLY regardless of status, and will be refused if customer status is NEGATIVE, CASH ONLY or STOLEN. Check authorization for customers with CAUTION status is a matter of store policy. For example, check authorization can depend upon DWT Frequency or $Amount, or the type of check transaction (such as amount of purchase only), or upon having the check transaction approved by a store manager.

The CALL MANAGER directive is not a verification status contained in a customer record, but rather, is the response to a verification request if, for any status (including POSITIVE), the current check transaction causes transactional limits specified in the system control file for DWT Frequency and $Amount to be exceeded.

The negative status file contains negative status records that include the following customer information (by location for multiple store systems):

| Field | Description |
|---|---|
| Check ID | Customer checking account number |
| Location | The location identification for the store (each store having a NEGATIVE and/or CASH ONLY status history is assigned a separate negative status record) |
| NEGATIVE Status | Active -- That location has a bad check outstanding<br>Inactive -- That location has no bad checks outstanding |
| CASH ONLY Status | Active -- That location has designated the customer as CASH ONLY<br>Inactive -- That location has not designated the customer CASH ONLY |
| Access Date/Time | Last date/time the negative status record was accessed and updated (a query function does not change this date) |
| NEGATIVE Date/Time | Date/time the status first became NEGATIVE |
| CASH ONLY Date/Time | Date/time the status first became CASH ONLY |
| BAD Frequency | Total number of bad checks at that location |
| BAD $Amount | Total dollar amount in bad checks at that location |

The file specification for a negative status record is set forth in Table 2 at the end of the specification.

The negative status file is indexed by (a) status/check ID/location, and (b) status/access date/check ID/location.

The negative status file supplements the customer file for those customers with a bad check history by recording BAD Frequency/$Amount by location, and also maintains CASH ONLY status by location.

The system control file includes the following selectable limits:

| Limits | Description |
| --- | --- |
| CAUTION/POSITIVE | This limit defines a check clearance interval for new customers who will be rolled for check transactions after that interval (assuming the first check is not returned) |
| CALL MANAGER | Separate DWT limits are provided by status for both Frequency and $Amount, defining the transactional limits applied to each status |
| PURGE | Separate Purge limits are specified for each of the five customer status designations; also used to define a Reset/CAUTION interval |

The file specification for the system control file, including coupon control filer, is contained in Table 3 at the end of the specification.

These limits are all specified by the user during system configuration. The CALL MANAGER limits are used to override the normal customer status response to a verification request when any DWT Frequency/$Amount CALL MANAGER limit is exceeded by the current check transaction. As an alternative to using the Purge limits for deleting customer records with a specified (by status) degree of obsolescence, these limits can be used to roll a POSITIVE or any other status back to CAUTION if the specified Reset/CAUTION interval between check transactions (defined by the corresponding Purge limit) has passed. In addition to these limits, the system control file contains various system information.

The specific design of the customer database, and in particular the file specifications for the customer file, negative status file, and system control file, are not critical to the invention, being a matter of design choice. Any customer database will likely comprise customer records identified by the customer check ID, and include selected transactional/customer information; such as check verification status and transactional frequency and dollar volume over specified intervals.

2.2. Function Codes. The specific functions available in the check transaction processing system are invoked by entering at a transaction terminal 121 a request including an appropriate function code (function key plus code number) and request data (such as check ID and $Amount).

The specific check transaction processing functions are set forth in Table 4 at the end of the specification, with each function being described in terms of function code, description, keypad input, and keypad output. These functions are in the following general categories:

| Function | Description (Function Code) |
| --- | --- |
| Verify | Request check verification status for the current check transaction (F55) (updating the corresponding customer record to reflect the current transaction) |
| Query | Request information about status (F1), NEGATIVE status and locations (F2, F3, F4) and DWT Frequency and $ Amounts (F5) (the customer database is not updated) |
| Input Status | Add (F40, F41, F44) and Delete (F60, F61, F62, F63, and F66) the status values CASH ONLY, STOLEN and NEGATIVE, and Add (F42, F43) and Delete (F62, F63) PREAPPROVED and MANAGER ONLY user flags |
| Event Activity | Start (F950) and Stop (F951) an event activity, request event time (F952), and request activity status (F953) |
| System Information | Request certain system information, including memory usage (F902), disk usage (F903), customer file size (F904), negative status file size (F905), CAUTION/POSITIVE roll period (F906, F907), Purge limits (F906, F908–F912), CALL MANAGER limits (F906, F913–F917) |
| System Diagnostics | Request system diagnostic functions, including log-in/out (F77/F88), keypad debug (F960), modem debug (F970), data manager debug (F980), open/close customer database (F981/F982) and shutdown (F999) |

2.3. Verify/Query. The verify function is used both to provide verification status (such as POSITIVE, NEGATIVE or CAUTION) for a check transaction, and to update the transactional data in the customer database. The principal difference between the verify and query functions is that, while both functions retrieve the specified (by check ID) customer record (or in the case of query, the negative status record) to provide an appropriate response, only the verify function actually updates the customer database by writing the updated customer record back to disk.

As previously noted, check reader 119 reads the MICR code on checks and senses the customer account number in order to generate a unique customer ID for use by the processor of the present invention. As previously discussed, an advantage of the present check reader 119 is its ability to detect the customer account number on any and all bank checks, regardless of the location of the account number within the MICR number and regardless of whether the account number is properly identified by spaces or symbols. In addition, the present check reader operates to check against a stored Transit Code Table to detect changes in the bank's transit code and the like.

FIGS. 4A-1 through 4A-3 illustrate a flow chart illustrating the operation of the MICR parsing and omitting function of the present invention. This function can be accomplished in the processor and storage of the check reader 119 or in the host processor 110. Explanation of the MICR parsing and omitting function is as follows:

| Step | Description |
| --- | --- |
| 4 | Check is taken for tendering purchase at retail store. |
| 5 | Scanning device is used to read the MICR code from the bottom of the check. |
| 6 | Scanning device sends MICR data to parsing processor 128a. Processor may be in reader itself or external computer. |
| 8 | MICR code must now be parsed for meaningful data. ANSI standards specify the following field locations within MICR band:<br>Amount field       1–12 |

| Step | Description |
|---|---|
| | On Us 14–31 |
| | Transit 33–43 |
| | Auxiliary On Us 45–64 |
| 9–10 | Use transit field for the first part of the customer's ID number. |
| 12 | The check's sequence number (which matches the number on the top right hand corner of the check) must be located in order to determine the customer's bank checking account number. |
| 13 | A variable length, dynamic TRANSIT CODE TABLE is maintained for checks that cannot be successfully parsed. In addition, information for MICR changes such as new transit number or addition or change of Transaction Processing Code (TPC - used for branch banking) are indicated in the table. The indexed key for this table is the transit number allowing duplicates for multiple entries for each bank. Included for each table entry is the current MICR "mask" and a prior "mask" to show any changes. Updates to this table can be entered from the keypad or downloaded from another computer. |
| 14 | START a database query in the TRANSIT CODE TABLE at the FIRST entry with the transit number scanned from the check. |
| 16 | If NO entry is found for this transit number, proceed to the parsing functions starting at step 29. Otherwise continue to step 17 to determine if this table entry pertains to this check. |
| 17–18 | Use the current MICR "mask" in the table as a template to determine if this MICR data corresponds with this table entry. If they do match proceed to step 19, otherwise go to step 24 to try the next entry. |
| 19–20 | Locate the sequence number in the current MICR "mask" and use this to remove sequence number from MICR data. |
| 21 | If the prior "mask" indicates that the banking institution has either changed transit numbers or made additions to their account number (such as TPC code for branch banking), use this prior mask to build the key for the OLD record. Proceed to step 61; |
| 24 | Query for the NEXT entry in the TRANSIT CODE TABLE for this transit number. If no additional entry was found, proceed to parsing functions starting at step 29, otherwise go to step 17 to determine is this table entry pertains to this check. |
| 29–32 | Data in the Auxiliary On Us field, unless otherwise indicated in the TRANSIT CODE TABLE, is the check sequence number. This would indicate that all data in the On Us field make up the customer's bank account number. |
| 35–37 | Parse On Us field. Use any data within positions 13 through 32 as the On Us field. Discrete numbers are usually divided with 2 or more spaces or the ANSI On Us character. Embedded single spaces and the ANSI MICR dash are removed from within said discrete numbers. |
| 38 | Test for number of discrete numbers parsed from the On Us field. |
| 40–43 | If one, or more than three discrete numbers are located in the On Us field, the sequence number is either not present or is embedded in such a way that its location cannot be determined. The operator is signaled that the sequence number cannot be determined. Operator then enters the sequence number including any lead zeros. The system can then determine the relative position of the sequence number in the On Us field and stores this as an additional entry to the TRANSIT CODE TABLE. |
| 47–49 | If two discrete numbers are located in the On Us field, unless otherwise indicated in the TRANSIT CODE TABLE, the number with the lesser value is the check sequence number, and the number with the greater value is the customer's checking account number. |
| 51–55 | If three discrete numbers are located in the On Us field, unless otherwise indicated in the TRANSIT CODE TABLE, the number with the greatest value is the customer's checking account number. The smallest value is the Transaction Processing Code and is appended to the end of the checking account number. The middle value is the check sequence number. |
| 61 | Once the bank's transit number and customer's checking account number are parsed from the MICR band, they are combined (transit number followed by account number) to form the customer's unique checking account ID. |
| 63–64 | A packet such as following is built and passed to the Data Manager:<br>char source_id;    /* Node ID indicating source of packet */<br>char FLAG;    /* A flag signaling a change in account number */<br>char ID_CODE[30];    /* 30 byte field containing current ID CODE */<br>char OLD_CODE[30];    /* 30 byte field containing old ID CODE */ |
| 65–67 | Use ID CODE as primary key for accessing check database. |
| 68 | If record is found, go to step 83 for the verification process. Otherwise proceed to step 72 for possible account change processing. |
| 72 | If FLAG indicates there was a change in the account number, proceed to step 73 to locate the old record, otherwise go to step 83 for the verification process. |
| 73–75 | Using OLD CODE as primary key to query the check database. If no record is found, proceed to step 83 for the verification process, otherwise proceed to step 76 to transfer the information from the OLD record to the NEW. |
| 76 | Copy OLD record to NEW record. |
| 77 | DELETE OLD record from check database. |
| 78 | Move new ID code into NEW record. WRITE NEW record to check database. |
| 83 | VERIFICATION PROCESS. |

It can thus been seen that the check reader 119, in combination with the MICR parsing subroutine of FIGS. 4A-1 through 4A-3 operates to detect and extract the customer's account number on all checks, regardless of where located or even if improperly identified by a space or symbol. By teaching the processor any changes in the bank transit number or any unique positioning of the account number, the system thus is always able to promptly identify and detect a customer's unique ID for further use.

Figure 4B:
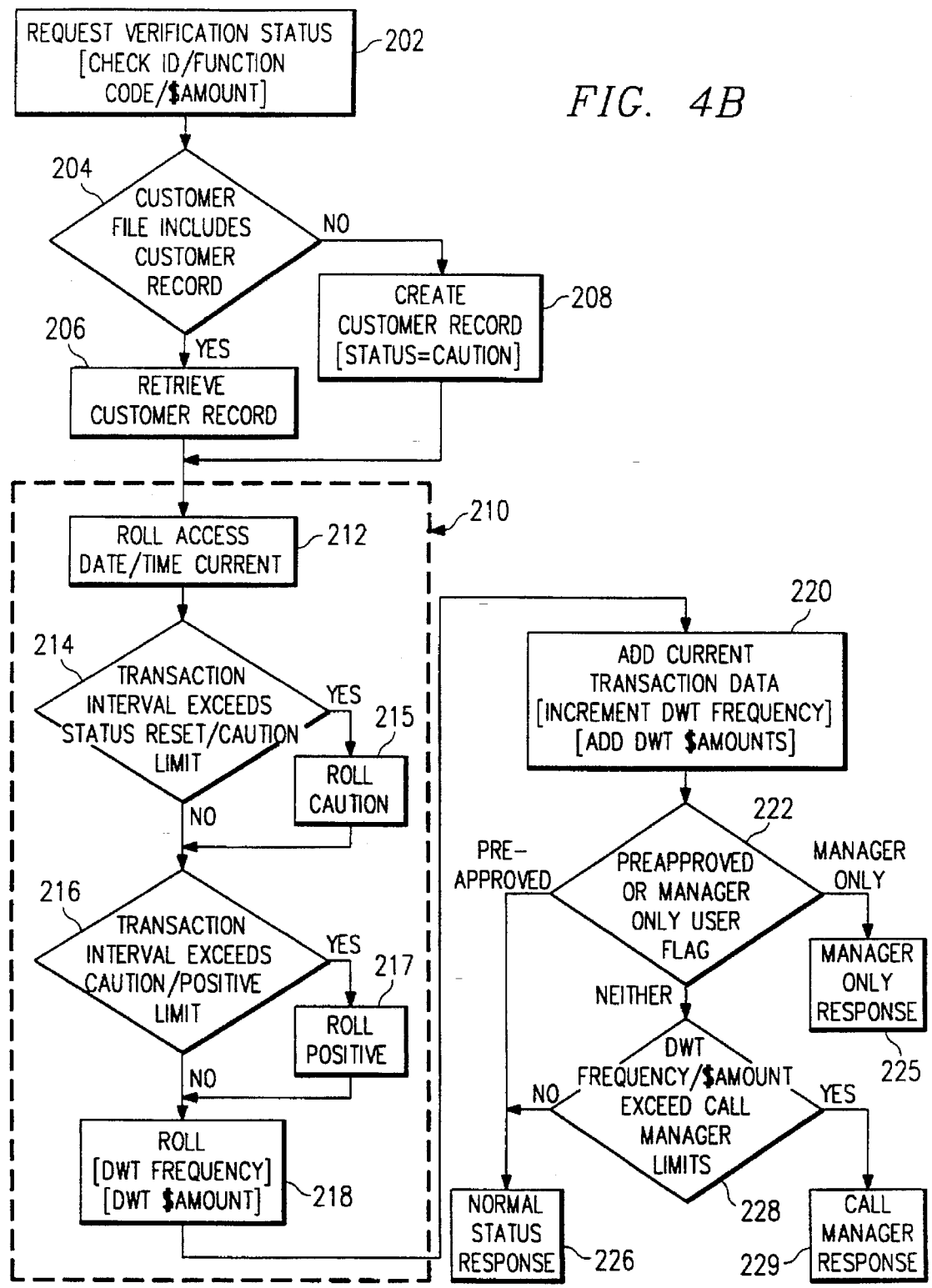
FIG. 4B diagrams the verification function.

FIG. 4B diagrams the check verification function. A check verification function is initiated (202) by entering a verify request (check ID/function code/$Amount) from a transaction terminal, which is transmitted to the transaction processor for check transaction processing and to determine the appropriate check verification response.

The transaction processor uses the check ID input from the MICR parsing subroutine of FIGS. 4A-1 through 4A-3 to search (204) the customer file for a corresponding customer record, which is retrieved (206), or if it does not exist, created (208) with a CAUTION status. The customer record is updated (210) by rolling Access Date/Time, Status and DWT Frequency and $Amount to reflect the current access date/time.

First, the Access Date/Time in the customer record is rolled (212) forward to the date/time for the current check transaction, establishing the transaction interval, i.e. the time elapsed since the customer's last check transaction.

Next, for a given status, the transaction interval is compared (214) with a corresponding selected reset/CAUTION interval—if the transaction interval is such that the reset/CAUTION interval for the customer's status is exceeded, Status is rolled (215) to CAUTION, and the customer is treated as a new customer from that time. If the customer record has a CAUTION status, the transaction interval is compared (216) with a selected CAUTION/POSITIVE limit defining a check clearance period—if this check clearance period has passed, the CAUTION status is rolled (217) POSITIVE.

The last roll/update operation is to roll (218) the DWT values for Frequency and $Amount to reflect the current access date/time.

After the roll/update operation (210) updates the customer record to reflect the current access date/time, the current transactional data are added (220) by incrementing DWT Frequency and adding the transaction $Amount to the corresponding DWT $Amount. The DWT transactional data in the updated customer record now reflects the current transaction.

Next, the user flags in the customer record are checked (222)—if the MANAGER ONLY flag is set, a MANAGER ONLY response is returned (225) regardless of status, while if the PREAPPROVED flag is set, the normal status response (POSITIVE) is returned (226) regardless of any transactional CALL MANAGER limits.

Finally, DWT Frequency/$Amount are compared (228) with the CALL MANAGER limits for the customer's status to determine whether any of these limits are exceeded. If not, a normal response with the customer's check verification status is returned (226); if any limit is exceeded, a CALL MANAGER response is returned (229).

For the status query function, the same roll/update operation (210) is performed to provide a customer record with updated Access Date/Time, Status and DWT Frequency/$Amount from which an appropriate status response can be derived. However, the updated customer record is only used to derive the response to the query request—the updated record is not written back to disk, so the customer database is not updated.

2.4. Local Status Update. Local status update of the customer database is accomplished by inputting certain status (and user flag) information to reflect bad check experience or store policy.

Status input functions are used to Add or Delete the status values NEGATIVE, CASH ONLY and STOLEN. Typically these functions will involve modifying the Status of an existing customer record and/or negative status record, although new records may be created. In addition, local input functions are used to Add or Delete user flags that designate the customer as PREAPPROVED or MANAGER ONLY.

For multiple store systems, a separate negative status record is kept for each location having a NEGATIVE and/or CASH ONLY status history. Thus, assuming negative status records are transferred during the global update function, each store's negative status file will contain separate negative status records for the various locations, sometimes for the same customer. Generally, a store can only affect through the local update function, negative status records for its location.

For each status input function, the update operation for the customer record includes the roll/update operation described in connection with FIG. 4B (210) to reflect the current access (update) to the customer record (which is written to disk to update the customer file).

FIG. 5 diagrams the local status input function for Add/Delete NEGATIVE status. A store uses this operation only for the negative status records for that location, and only when all bad checks have been recovered or otherwise resolved. For the Add NEGATIVE status function, the corresponding negative status record for that location is retrieved or created (230), and NEGATIVE status is set (232) Active and BAD Frequency/$Amount is adjusted (233) by adding the current bad check transaction. The corresponding customer record is then retrieved or created (235), and updated by the roll/update operation (238) but with status set (239) to NEGATIVE.

For the Delete NEGATIVE Status function, the corresponding negative status record is retrieved (230), and NEGATIVE Status is set (232) to Inactive and BAD Frequency/$Amount are set (233) to zero. If that customer has no other bad checks outstanding at any location (i.e., no other negative status records with NEGATIVE Status Active) (236), then the corresponding customer record is retrieved or created (237) and updated by the roll/update operation (238), but with status rolled (239) to its previous state (i.e., prior to becoming NEGATIVE).

For status input functions that Add/Delete CASH ONLY (which status is also kept by location in negative status file), the basic operation is the same as for Add/Delete NEGATIVE except that the BAD Frequency/$Amount data are unaffected.

For the status input functions that Add/Delete STOLEN, only the customer file need be updated. For the Add STOLEN function, the corresponding customer record is updated in accordance with the roll/update operation, but with status rolled to STOLEN. For the Delete STOLEN function, the corresponding customer record is updated and rolled to CAUTION.

For the user flag input functions that Add/Delete PREAPPROVED or MANAGER ONLY, again, only the corresponding customer record need be updated.

2.5. Global Update. For multiple-store systems, the global update function is used to coordinate the exchange of certain customer information among the individual stores.

Global update is accomplished by file (record) transfers between each remote system and the host system. The host system receives selected customer records and negative status records from each remote, updates its customer database, and then transmits globally updated records back to each of the remotes. Each remote is able to maintain a local customer database, supplemented with selected global customer information deemed to be useful to all stores in the system.

The type of customer information transferred by the global update function is based on store management policies. The recommended approach to exchanging global customer information is as follows:

(a) Negative Status Records—All NEGATIVE status records (NEGATIVE or CASH ONLY status) accessed (created or updated) since the last transfer; and (b) Customer Records—All customer records with status values CAUTION, NEGATIVE, CASH ONLY and STOLEN accessed (created or updated) since the last file transfer;

(c) POSITIVE status records (even those designated MANAGER ONLY) are not recommended for global transfer.

As a result, the local customer database contains negative status records (including NEGATIVE and CASH ONLY status and BAD Frequency/$Amount) for all store locations (although each remote system only transfers to the host the negative status records for its location). For those customer records transferred, DWT Frequency/$Amounts can be maintained either globally or locally and globally. That is, a store may decide not to maintain both global and local transaction data since, for regular customers that primarily frequent that store (i.e., the customers of primary interest) global and local transaction data are essentially the same anyway. On the other hand, a store may want to keep its local transaction data completely separate from the global data attributable to all stores.

The host/remote file transfers that support global update are accomplished automatically through the event/activity function described in Section 2.7. Generally, for each remote system, host/remote file transfer constitutes an activity automatically invoked at predetermined regular event intervals. This procedure insures that the local customer databases are regularly supplemented with globally updated status and other customer information affecting check verification.

A global update session is initiated by a remote system, or in the alternative by a host computer. The remote transmits only those negative status or selected customer records accessed (updated) since the last host/remote file transfer. Since a remote only updates (or creates) negative status records for its location (although negative status records for other locations may be queried), a remote only transfers those local records (but will receive back from the host recently updated negative status records for all locations). And, only those updated customer records meeting the selected status criteria are transferred (i.e., POSITIVE status records are not transferred, even if designated MANAGER ONLY).

Negative status records are extracted using the index [status/transfer/date/ID/location], while customer records are extracted using the index [status/access date/ID].

Figure 6B:
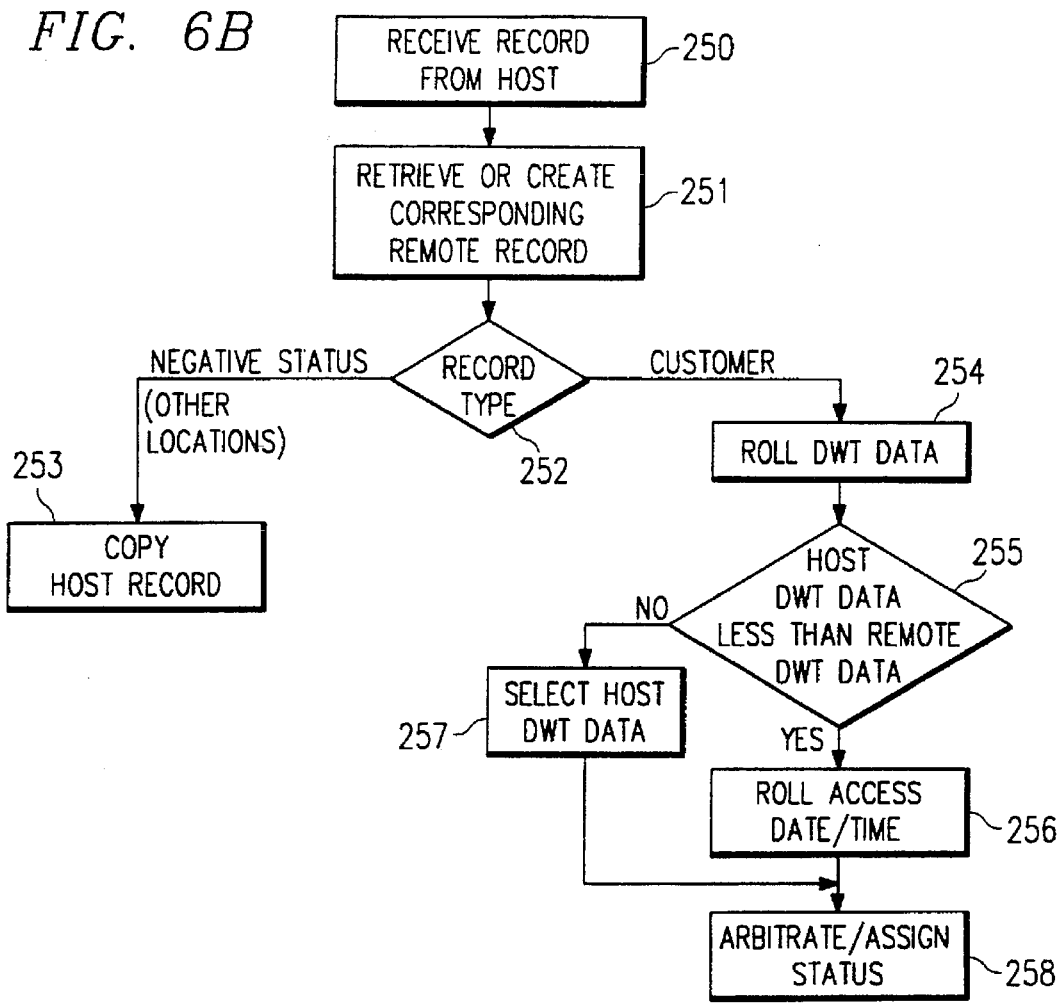

FIG. 6A diagrams the host global update function by which the host system receives recently updated negative status and customer records, and performs a global update of its customer database. For remote negative status records (remote location only), the host retrieves or creates (240) a corresponding host record, and sets (243, 244) host status (NEGATIVE/CASH ONLY, ACTIVE/INACTIVE) and host BAD Frequency/$Amount equal to the corresponding remote values. For remote customer records, the host retrieves or creates a corresponding host record, and updates existing host records using the roll operation (246). Host and Remote status are compared, and if different, the host assigns status (247) according to predetermined status arbitration criteria. The host then adds (248) the Frequency/$Amount accumulated at the remote since last transfer to the Host DWT Frequency/$Amount, and selects (249) the greater of host/remote DWT data as correct, updating the host record accordingly.

After global update of the host customer database, the host transmits to the remote all negative status records and selected customer records accessed (updated) at the host since the previous transfer. Because every remote record transferred to the host caused a corresponding host record to be created or updated, and therefore accessed, the host-to-remote file transfer necessarily includes all host records corresponding to the remote records transferred to the host during that session. In particular, host negative status records for all locations, meeting the recently accessed transfer criteria, are transferred to the remote. For negative status records from other locations, the remote merely copies (253) the host record (remote location records received from the host are necessarily the same as the remote record). For customer records, the remote first rolls (254) the DWT Frequency and $ Amount. If host DWT Frequency/$Amount is less than the corresponding remote DWT data (255), the remote rolls (256) access data to insure that the remote record is transferred back to the host during the next global update transfer session (to update the corresponding host record with the greater DWD data); otherwise, the remote selects (257) the host DWT data. That is, the global update function assumes that the greater DWT Frequency/$Amount is correct. Finally, the remote compares host/remote status, and if different, assigns status (258) according to predetermined status arbitration criteria.

2.6. Purge. The customer database purge function allows a store to orient its customer database toward active customers, stabilizing the database size by deleting certain customer records and negative status records deemed to be obsolete.

During database purge, customer records or negative status records with a given status are read, and the access data/time is compared with the corresponding purge limit from the system control file. Records not accessed during the interval defined by the purge limit are deleted.

Implementing the purge function is optional as a matter of store policy. For the preferred embodiment, the purge limits are also used to define a reset/CAUTION interval (described in connection with FIG. 4B). If a record is not accessed during that interval, its status is rolled to CAUTION. Thus, the check transaction processing system defaults to the reset/CAUTION operation if the purge function is not operational.

The purge limits are a matter of design selection. The following purge limits are recommended:

| | |
|---|---|
| CAUTION | 270 days |
| POSITIVE | 360 days |
| NEGATIVE | 360 days |
| CASH ONLY | 360 days |
| STOLEN | 360 days |

Because customer record status is not rolled automatically from CAUTION to POSITIVE, but only as a result of a transaction in which the access date/time is also rolled current, the customer database maintains an accurate record of CAUTION status for those first-time customers who do not return after the check clearance interval. Those CAUTION status customers who do not return to a store within a reasonable period of time can be eliminated from the customer database. Likewise, POSITIVE status customers who stop transacting business with a store can be eliminated from the active customer database.

Selected purge limits are entered into the system control file during system installation/configuration. If the purge function is selected, performing it automatically as an event-driven activity (described in Section 2.7) is recommended.

2.7. Event/Activities. Event-driven activities are performed automatically by the check transaction processing system to implement certain functions without operator intervention.

The configuration and timing of these activities is a matter of routine design selection. The following event-driven activities, and the associated event intervals, are recommended:

| | |
|---|---|
| Host/Remote File Transfer | Every 15 minutes |
| System Backup | Every 10 minutes |
| Purge | Every 24 hours |

In addition, certain report functions can be made automatic as event-driven activities, such as reporting every day all customer records with CAUTION or NEGATIVE status.

The specified event-driven activities and associated event intervals are contained in an event table established during system installation/configuration. These activities are then executed in background at the designated event times without user intervention, and without affecting other foreground functions such as check verification. Once the event table is configured, the various activities may be started or stopped by invoking appropriate functions from a transaction terminal (functions F950 and F951 in Table 4).

For multiple-store systems, performing the host/remote file transfers necessary for global update on a regular, event-driven basis insures that CAUTION/NEGATIVE status information for check verification purposes is kept current throughout the system. Performing such transfers at relatively short intervals keeps the individual host/remote communications sessions sufficiently short that other functions, such as check verification, are not significantly affected. Moreover, performing host/remote file transfers on a regular basis at short intervals helps guard against fraudulent bad check passing schemes.

Regularly, purging the customer database facilitates database stabilization, and focuses the database on reasonably regular customers. The need for regular, and often, event-driven driven backup is obvious, and is not burdensome of system computing resources because only those customer records actually updated during the short interval between backup events need be backed up.

2.8 Communications. The communications function is primarily used to support host/remote file transfers for global update in multiple-store systems. In addition, the communications function can be used for remote diagnostic operations.

The communications function is implemented in a conventional manner. Both the implementation of the communications function and the mode of communications (such as using modem communications over dial up lines) are a matter of routine design selection. Implementing the communications function so as to be essentially transparent to the local operation of the remote and host check transaction processing systems is recommended (see Section 3.6).

2.9. System. Certain system diagnostic and system information functions are available to users of the check transaction processing system.

These system functions are not critical to the inventory but are a matter of routine design selection. The recommended system functions are identified in Section 2.2 and Table 4, and include querying the customer database and system control file, obtaining disk usage and file size information, starting/stopping activities in the event file, and controlling certain keypad and modem configuration functions, as well as controlling certain system level functions such as log-on, log-off, open/close database, debug and system shutdown. In particular, these system functions are useful to store supervisory personnel for querying the customer database and for controlling event-driven activities, and to vendor support personnel for remote diagnostic purposes.

2.10. Risk Management. The check transaction processing system enables a store to adopt a risk management approach to check verification. Specifically, through selection of the CALL MANAGER limits for each status (including POSITIVE) a store has considerable flexibility in adjusting its check authorization policy to accommodate the different risks presented by different customers, both in terms of bad check risks and recovery risk.

Adopting specific risk management procedures for check verification is a matter of store policy implemented by routine design selection. In addition to selecting the CALL MANAGER transactional limits for each status, the reset/CAUTION interval can be selected to force customers who do not return for that interval into a CAUTION status. Moreover, the user flags—PREAPPROVED and MANAGER ONLY—can be used to assign special check verification treatment to selected customers regardless of status or transactional (CALL MANAGER) limits.

Adopting risk management approach to check verification through selecting transactional CALL MANAGER limits enables each store to make a policy decision about the degree of risk the store is willing to take within a given interval. Moreover, this approach can be tailored to the specific business climate of the store in terms of dollar volume, profitably, customer base and management philosophy. By specifying transactional CALL MANAGER limits in terms of status, frequency, dollar amount and transaction interval, the store's risk management approach to check verification can reflect statistical patterns for bad check/recovery risks.

For example, frequency and dollar volume limits are important for the CAUTION status to reduce the risk that a store will be hit by a concerted bad check scheme. (Global update is particularly important in this area.) Depending on past experience with its typical customer, or store policy, a new customer can be restricted in terms of numbers of checks and/or dollar volume during the selected check clearance interval.

Frequency and dollar volume limits are just as important for the POSITIVE status. A store should not assume any significant risk in terms of dollar volume (either for a current transaction or over a given relatively short interval such as a week) just because a customer has had one or a few checks clear. That is, total historical check transaction frequency is a significant factor in assessing the risk of cashing a given check; both in terms of likelihood that the check is bad and likelihood that a bad check will be recovered.

2.11. Customer Information Reporting. The check transaction processing system allows a store to build and maintain a customer database containing customer information useful for identifying new customers and developing customer profiles, in addition to its use for check verification.

Reporting customer information, such as verification status and DWT Frequency/$Amounts, is a matter of routine design selection and store policy.

Customer information reports are recommended (a) to identify new customers, and (b) to develop customer profiles, both of which can be used in targeting marketing, advertising and promotional programs, and for other customer relations purposes. Specifically, new customers are identified by regularly reporting customer records with a CAUTION status. Regular customers are identified by reporting customer records based on DWT Frequency data, while the level of a customer's business is identified by reporting customer records based on DWT $Amount data. Additional customer information that can be readily collected in the customer records includes zip code and marital status information useful in demographic analysis.

The check transaction processing system permits the customer information contained in the customer database to be collected in an unobtrusive and efficient manner during high volume check transactions.

3.0 Program Description

The various check transaction processing functions described in Section 2.0 are implemented using a check transaction processing system ("CTPS") program executed by the transaction processor.

The CTPS Program must implement several operations in real time:

(a) transaction terminal network communications, including communicating verification requests and the corresponding responses;

(b) database operations, including responding to verification requests and updating the customer database;

(c) event-driven activities, including global update, which must execute in the background while the check verification function is executing; and (d) host/remote communications to support global update.

Moreover, while the purge function may be run after-hours as a batch operation, system backup should be executed at regular intervals throughout a business day as an event-driven background activity.

To achieve acceptable performance using a 286-class engine for the transaction processor, the preferred embodiment of the CTPS Program uses a multi-tasking architecture. The various functions performed by the CTPS Program are implemented as separate program tasks executed by the transaction processor in a multi-tasking mode. For the preferred system configuration (described in connection with FIG. 1), a multi-tasking architecture for the CTPS Program is superior in performance to available alternatives, such as polled interrupts.

Figure 7:
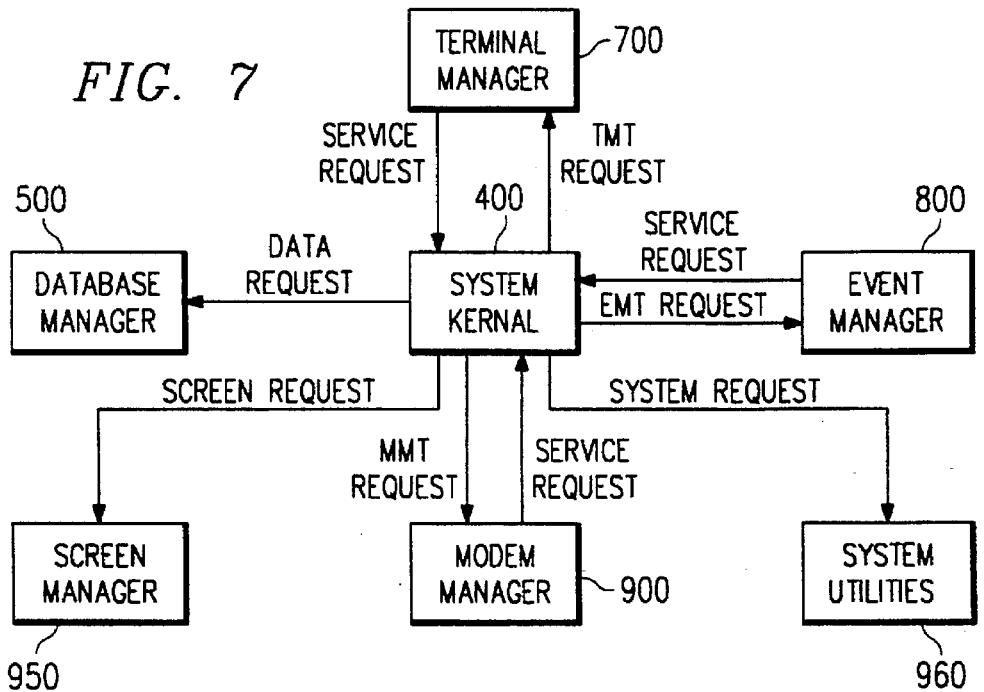
FIG. 7 shows the program tasks that form the check transaction processing program.

3.1. General. As shown in FIG. 7, the CTPS Program includes various task programs interfaced through a System Kernal. Since the preferred MS/DOS Operating System is not multi-tasking, the System Kernal is required to implement (a) task switching, and (b) intertask communications. In this operating environment, the MS/DOS operating system is used only for disk file I/O, with the System Kernal interfacing functionally to the individual task programs as an operating system.

System Kernal 400 controls task switching, intertask message communications (requests and responses), subtask spawning, and task synchronization using semaphores.

Data Manager Task 500 controls all database operations used in check transaction processing functions (such as verification with transactional update, query, local status update, global update and purge), executing function requests from the other task programs (such as the Terminal Manager Task and the Event Manager Task) and returning response data.

Terminal Manager Task 700 controls data communications over the transaction terminal network, receiving function requests from the transaction terminals and spawning terminal request subtasks that transmit a request to an executing task (usually the Data Manager Task) and then build an appropriate response from the response data provided by that executing task.

Event Manager Task 800 implements activities designated for automatic execution on an event-drive basis, such as host/remote file transfers for global update, spawning a background event subtask at the specified event time to execute the specified activities.

Modem Manager Task 900 controls telecommunications primarily for host/remote file transfer for global update, but also for remote diagnostic purposes.

In addition to these check transaction processing tasks, a Screen Manager Task 950 and a System Utilities Task 960 are provided for maintenance and diagnostic purposes.

In general, for the Verify/Query and Local Status Update functions, the Terminal Manager Task sequentially polls the transaction terminals which enter and transmit requests, such as:

Verify [Function Code/check ID/Function Code/$Amount]

Query [Function Code/check ID]

Add/Delete [Function Code/check ID/Status]

For each terminal request, the Terminal Manager Task spawns a corresponding terminal request subtask that dispatches the request to a corresponding function/request routine, which sends the request to the Data Manager Task. The Data Manager Task executes the request, and notifies the function/request routine (by a semaphore operation) that response data is ready. The function/request routine then builds the appropriate response from the response data, and writes it into the terminal buffer for the requesting terminal. The Terminal Manager Task sends the response to the requesting terminal in the next polling sequence.

For the Global Update function, the Event Manager Task running in a remote system sequences through an event table, and at specified event times and intervals, spawns a corresponding event subtask to execute the global update activities, i.e., send/receive customer records and negative status records. The subtask dispatches to corresponding activity routines, i.e. activities that send/receive customer and negative status records. The send activity routines first request the remote Data Manager Task to retrieve records accessed since the previous global update, and then request the remote Modem Manager Task to transfer those records to the host Data Manager Task for global update. The receive activity routines first send requests for globally updated records through the remote Modem Manager Task to the host Data Manager Task, and then requests the remote Data Manager Task to globally update the remote customer database using the records returned by the host.

3.2. System Kernal. The System Kernal Program is implemented functionally by a multi-tasking module and a system services module.

The multi-tasking module controls resource allocation through task switching, with multi-task execution being implemented using standard context switching to swap task instructions/data between (a) the program and data memory areas allocated to the task, and (b) the task execution registers (i.e., the program counter, stack and other specified and general purpose registers). To implement intertask communications, the multi-task module allocates for each task data memory areas for request and response data, and maintains a task control block that contains for each task (a) task queues for intertask requests, and (b) semaphore flags.

The system services module implements intertask communications through calls to the multi-task module. For intertask communication, the system services module implements semaphore operations on the allocated semaphore flags in the task control block.

Functionally, the System Kernal interfaces to the various task programs that comprise the CTPS Program as a multi-tasking operating system. The Kernal performs four principal operations that establish a multi-tasking environment for the check transaction processing system:

(a) task switching;

(b) task control block management for task queues and semaphores;

(c) intertask communication of task requests/responses using the task control block and allocated data areas; and (d) spawning subtasks.

The first two operations are performed by the multi-tasking module, while the second two operations are performed by the system services module.) In addition, the System Kernal manages the system control file, and performs diagnostic and system utility operations (these operations being implemented by the system services module).

The specific program implementation of the System Kernal is not critical to this invention, being a matter of routine design specification. Indeed, as described in Section 4.0., the System Kernal can be replaced with a commercially available multi-tasking operating system.

For the preferred embodiment, the multi-tasking module is implemented with a commercially available program, Time Slicer from Life Boat Systems. Time Slicer provides a conventional multi-tasking environment, including task switching (context switching) and task control block management (request queues and semaphore flags). These multi-tasking operations are implemented in a conventional manner. Alternative multi-tasking modules are commercially available.

At system initialization, the System Kernal allocates the task control block (queues and semaphores flags) and the data areas for the various tasks. Thereafter, the System Kernal receives service requests from a requesting task addressed to a responding task and written into the System Kernal's request queue.

The requesting task builds a service request in the following format responding task ID requesting task ID function code address of request data address for response data stope semaphore The function code is one of the function codes set forth in Table 4. The addresses for the request and response data are data memory locations allocated to the requesting task.

Figure 8:
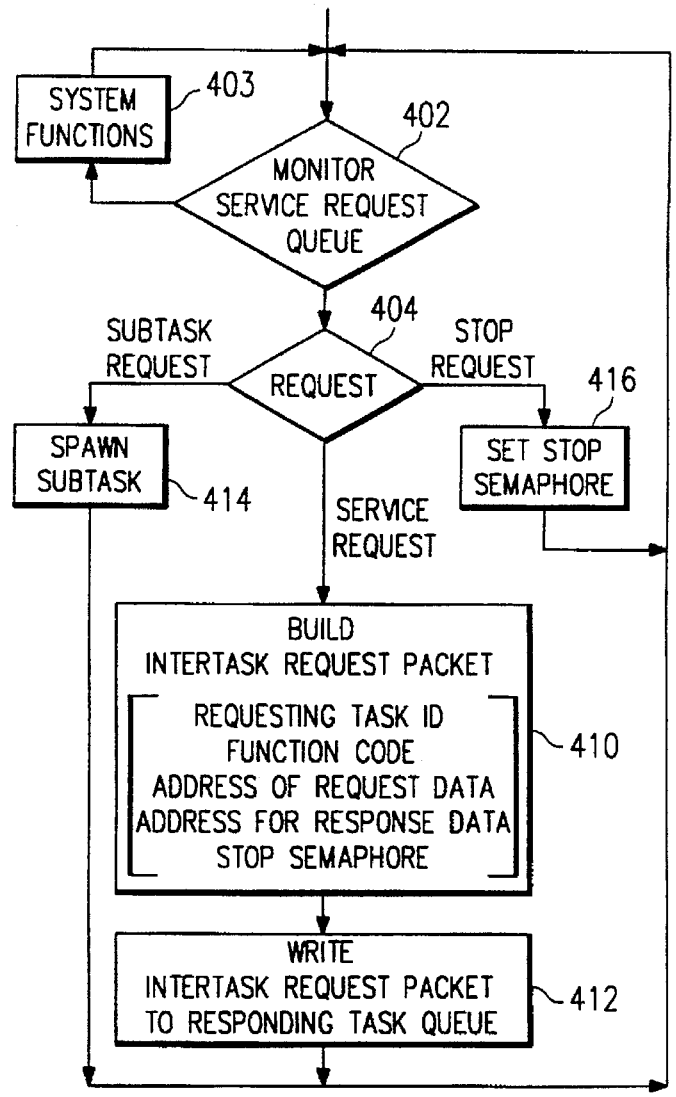
FIG. 8 is a program flow diagram of the System Kernal that provides task switching and intertask communication for the other program tasks.

FIG. 8 diagrams the intertask communication and subtask call functions implemented by the System Kernal. The System Kernal continually monitors (402) the request queue, executing service requests on a first-in first-out basis. The system kernal first determines (404) whether the next-in-line request is a service request or a subtask request from a requesting task, or a stop request (indicating request execution completed) from a responding task.

In the case of an intertask service request, the system kernal builds (410) a corresponding intertask packet, and writes (412) the packet into the responding task queue in the task control block. In the case of subtask request (which includes the subtask file name), the System Kernal spawns (414) the specified subtask (which typically executes the called function using intertask service requests). In the case of a stop request from a responding task, the System Kernal sets (416) the specified semaphore flag in the task control block, notifying the requesting task that request execution is complete and response data is ready.

The intertask request packet built by the System Kernal is in the following format:

requesting task ID function code address of request data address for response data semaphore flag That is, the intertask request packet includes the same information as contained in the service request from the requesting task, but without the responding task ID. That identification is unnecessary since each task is assigned a specific allocation of address space for its task queue and semaphore flags in the task control block, and for its data area. The stop request is the intertask request packet, which the System Kernal recognizes as a stop request when it appears in its request queue.

In general, intertask request execution is accomplished as follows: Each task monitors its task queue in the task control block. If the task queue does not contain a request, the task continues executing internal functions. When an intertask request packet is written into a task queue by the System Kernal (in response to a service request), the responding task reads the packet from the queue. The responding task decodes the request packet, and dispatches the request to an execution routine (either directly or by first spawning a subtask that handles dispatching). This execution routine reads the request data located in the requesting task's data area at the address specified in the intertask request packet, and executes the requested function using the request data. After request execution, the execution routine provides a response by writing response data to the specified address in the requesting task's data area, and sends a stop request (which is the intertask request packet) to the System Kernal indicating that request execution is complete and response data is ready. The System Kernal executes the stop request by setting the specified semaphore flag.

For example, in the case of a verification request entered at a transaction terminal, the Terminal Manager Task spawns (through the System Kernal) a terminal request subtask. The terminal request subtask dispatches to a verification/request routine that sends a verification request through the System Kernal to the Data Manager Task. The Data Manager Task reads from its task queue the verification request (i.e. the intertask verification/request packet), and determines that a verification function is requested. The Data Manager Task dispatches the request to an verification execution routine that reads the request data (check ID and $Amount) from the specified request data address, and performs the necessary customer database operations, including retrieving or creating a corresponding customer record and updating status and transactional data (DWT Frequency and $Amount) to reflect the current transaction. The execution routine then writes the updated customer record to the specified response data address, and sends a stop request (i.e., the intertask request packet) to the System Kernal. The System Kernal sets the specified semaphore flag, and the terminal request subtask reads the customer record and builds an appropriate response that is sent to the terminal by the Terminal Manager Task.

3.3. Data Manager Task. The Data Manager Task manages the customer database, maintaining the customer record file and negative status record file, and the related indices. The Data Manager Task controls all database operations for check transaction processing functions (such as verify/query and local and global update) and customer database management functions (such as backup and purge), including record creation, retrieval, modification and deletion.

The check transaction processing functions performed by the Data Manager Task are, generally:

(a) Verify (with Transactional Update)

(b) Query (c) Local Status Update (d) Global Update (Host and Remote)

The verify, query, and local status update functions are invoked from a transaction terminal. The global update function is an activity invoked by the Event Manager Task.

For the preferred embodiment, the Data Manager Tasks interfaces to the disk files (i.e., the customer, negative status and system control files) through a commercially available library of database management routines, C-Tree from Faircom Software. The C-Tree library, in turn, uses the MS/DOS File System (DFS) to handle disk file I/O. The configuration of those routines to operate with the Data Manager Task and the MS/DOS DFS is a matter of routine design specification. Other such libraries of database management routines are commercially available.

At system initialization, the Data Manager Task opens the customer and negative status files, and a password file (used for supervisor functions requiring a password).

Figure 9A:
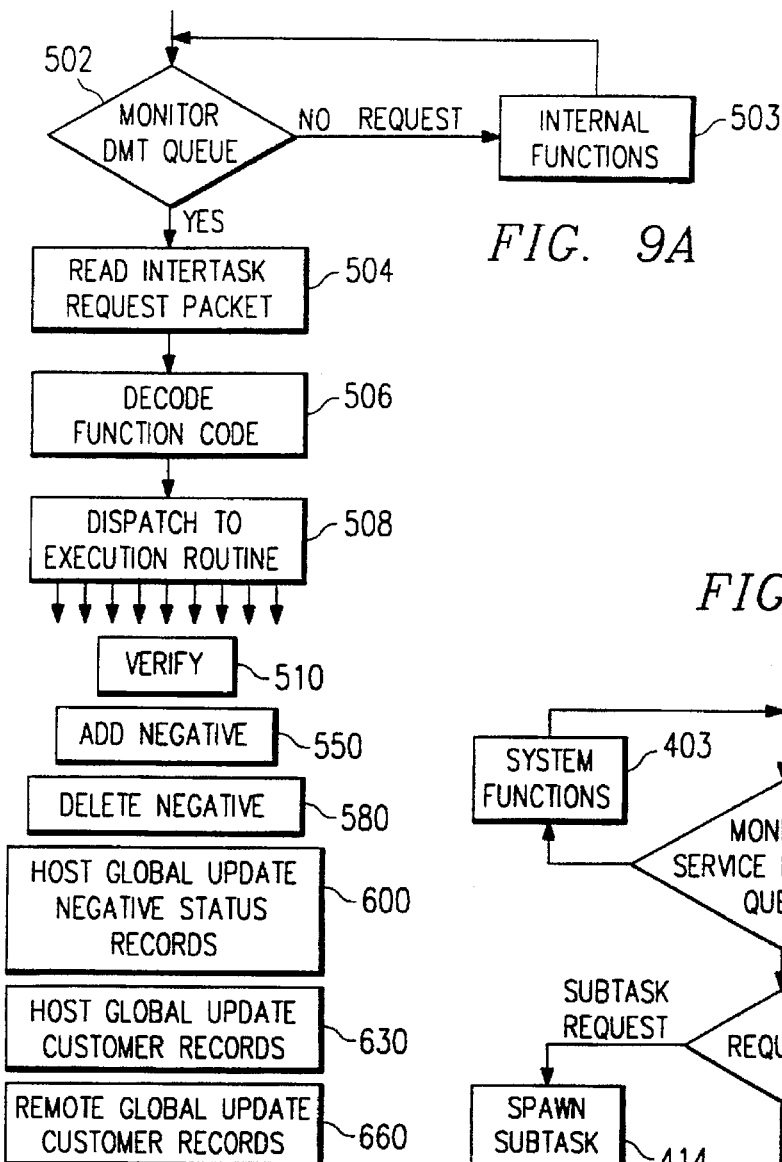
FIG. 9A is a program flow diagram of the Data Manager Task.

FIG. 9A is a program flow diagram for the Data Manager Task. The Task continually monitors (502) its task queue for requests (intertask request packets) written into the queue by the system kernal. These requests primarily involve database operations in connection with check transaction processing functions, and are received from the Terminal Manager Task (Verify/Query and Local Status Update) and the Event Manager Task (Global Update, Purge and Backup). Some requests involve system diagnostic or information requests such as for disk or database information (see Section 2.2).

If no requests are in the Data Manager Task queue, it executes internal functions (503). When the Task receives a request, it performs the following operations:

(a) reading (506) a function request packet from the task queue;

(b) decoding (506) the function code; and (c) dispatching (508) the function request to a corresponding function execution routine.

The function execution routine executes the function, performing the necessary database operations, and upon completion, writes appropriate response data into the location specified by the requesting task, and then sends a stop request (the intertask request packet) to the system kernal.

The various functions identified in FIG. 9A—Verify (510), Host Global Update (Negative Status) (600), Host Global Update (Customer) (630), and Remote Global Update (660)—are representative of the check transaction processing functions performed by the CTP Program. These functions, and the associated execution routines, are described in detail in connection with FIGS. 9B–9H.

Figure 9B:
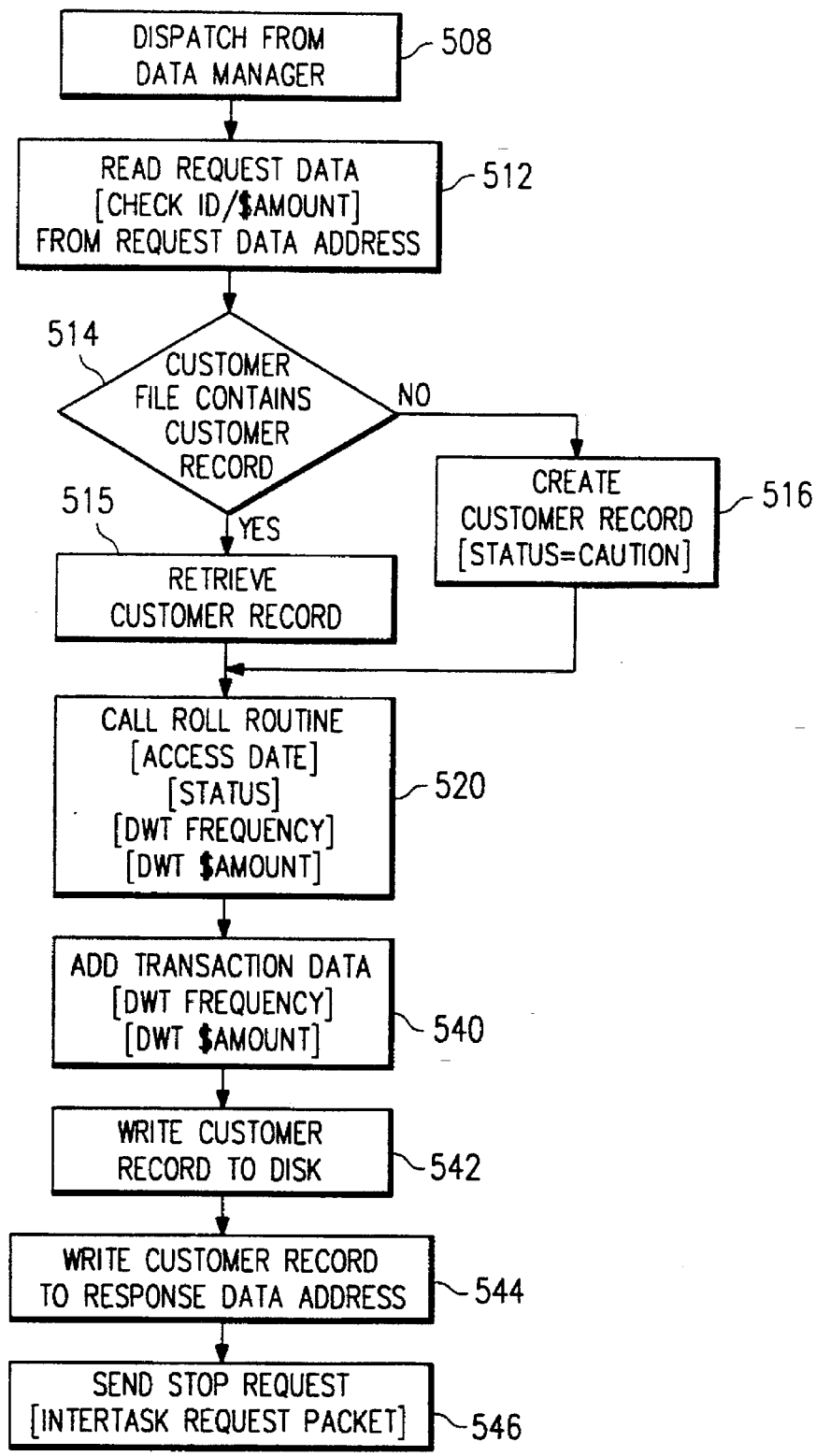

FIG. 9B is a program flow diagram for the Verify routine in the Data Manager Task. After receiving and decoding the appropriate intertask request packet from the Terminal Manager Task, the Data Manager Task dispatches (508) to the Verify Execution Routine 510.

The Verify routine reads (512) the verification request data (check ID and $Amount) from the request data location specified in the intertask request packet. The customer database is searched (514) using the check ID, and the corresponding customer record is retrieved (515) or created (516) with status set to CAUTION and DWT Frequency and $Amount set to zero.

The Verify routine then calls (520) a roll routine that updates status and transactional data in the record to reflect the current access date/time. The Data Manager Task does not independently update customer records to make status and DWT Frequency/$Amount reflect a current date/time. Rather, the customer records are updated in real time as they are accessed, such as during execution of verify and update functions. Because this roll/update operation is used by many of the function execution routines in the Data Manager Task, a separate routine is provided and called by these routines.

Figure 9C:
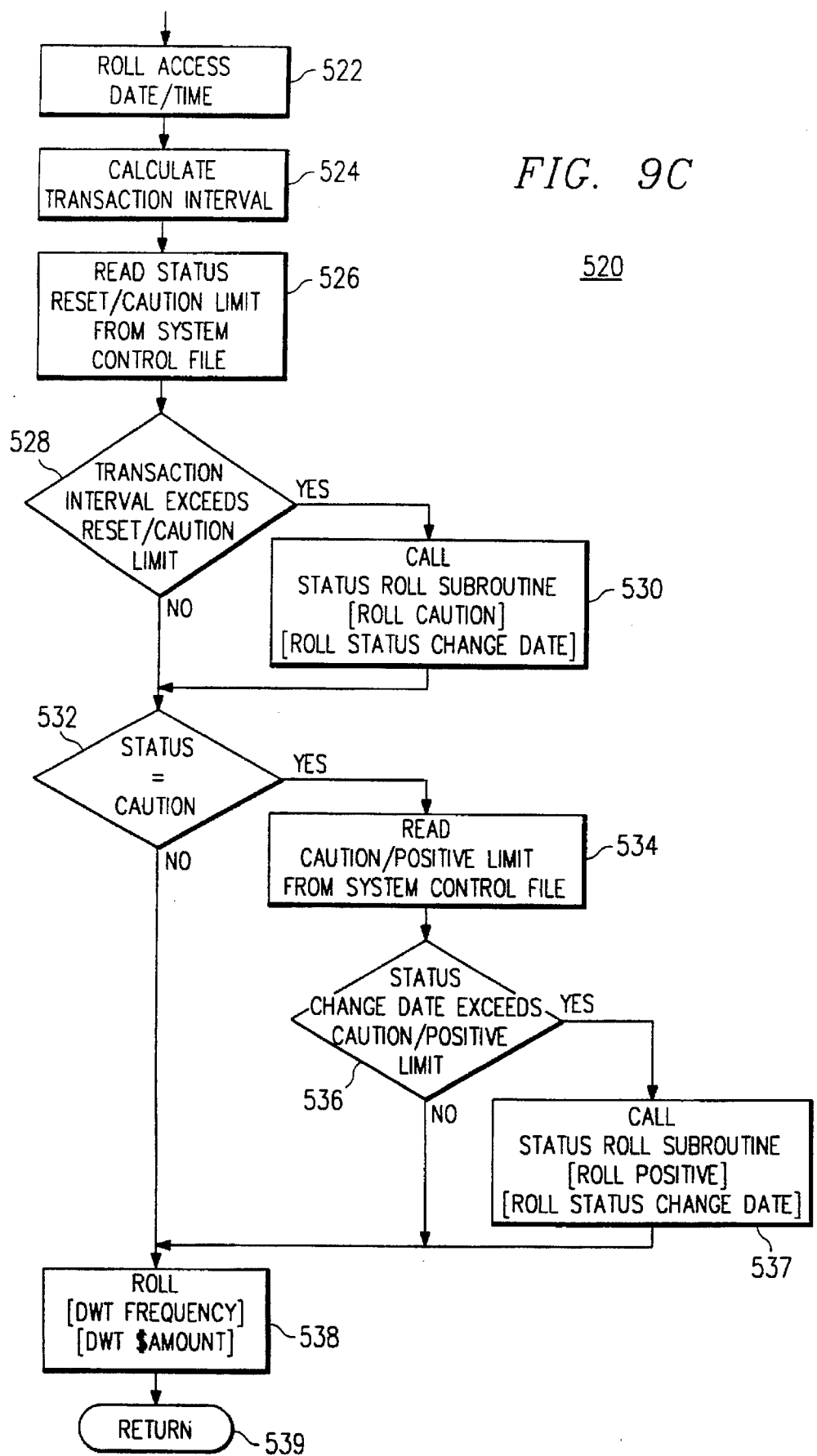

FIG. 9C is a program flow diagram for the roll routine. The routine first rolls (522) the Access Date/Time in the customer record to the current date, and then calculates (524) the transaction interval, i.e., the elapsed time since the customer's previous check transaction.

The purge limit for the customer's status is read (526) from the system control file and compared (528) with the transaction interval. If the transaction interval exceeds the purge limit, a status roll subroutine is called (530) and instructed to roll the status of the customer record to CAUTION. (This reset/CAUTION operation provides a default alternative to the purge function which would delete those customer records with access dates that exceed the corresponding status purge limit.)

Next, the roll routine determines whether, for customer records with a CAUTION status, the predetermined check clearance period defined by the CAUTION/POSITIVE limit has passed. If the customer status is CAUTION (532), then the CAUTION/POSITIVE limit is read (534) from the system control file and compared (536) with the status change date, i.e., the date on which the customer became a CAUTION, either because of an initial check transaction or because of a roll to CAUTION (such as through the reset/CAUTION procedure in 526, 528 and 530). If the period during which the customer has been a CAUTION exceeds the CAUTION/POSITIVE period, then the status roll subroutine is called (537) and instructed to roll customer status to POSITIVE.

The roll routine then rolls (538) the DWT totals for both Frequency and $Amount to reflect the current access date.

The customer record is now updated to the current access date, the roll routine having rolled/updated the Access Date/Time, Status and DWT Frequency and $Amount.

The status roll subroutine is called when any function routine rolls customer status from one value to another. As part of the call instruction, the status roll subroutine receives a new status, CAUTION in the case of the reset/CAUTION operation. Program state-logic then determines whether the roll is allowable according to specified roll state-logic: (a) if allowed, status is rolled to the specified new status; or (b) if not allowed, status is rolled to an allowable status value, or is not rolled, in accordance with the roll state-logic. The status roll subroutine then rolls the status change date in the customer record to the current date (if the subroutine effected a change in status). Thus, for customer records in which the transaction interval exceeds the status purge limit, the customer record is modified to reflect a CAUTION status with a corresponding status change date.

The roll routine returns (539) to the calling routine, in this case, the Verify routine in FIG. 9B. The verify routine adds (540) to the roll/updated customer record the current transaction by incrementing DWT Frequency and adding the current $Amount to the DWT $Amount. The customer record is now updated to reflect both the current access date and the current transaction. The updated customer record (with its transfer date updated current) is written (542) to disk, to update the customer database.

The updated customer record constitutes the response data for the verify request, and the Verify routine writes (544) the record into the response data location specified in the intertask request packet.

Finally, the Verify routine sends (546) a stop request to the System Kernal. The stop request comprises the intertask request packet received from the System Kernal by the Data Manager Task. The appearance of this packet in the Kernal's service request queue notifies the Kernal that request execution by the verify routine is complete. In response to the stop request, the System Kernal sets the semaphore flag specified in the intertask request packet to notify the Terminal Manager Task that the verification request is complete, and the response data is in the specified location.

The query function is used to query the customer database, and retrieve an updated customer record or updated negative status record from which the desired information may be extracted. For each query function, the Data Manager Task dispatches to a corresponding query execution routine that retrieves and updates the requested customer record or negative status record. The essential difference between the query routines and the verify routine is that no current check transaction data is involved, and the updated record is not written to disk to update the customer database.

For example, in the case of a query for customer information (such as status and/or DWT transactional data), the Data Manager Task dispatches the intertask query request packet to the corresponding Query execution routine. The routine reads the check ID from the specified location for the request data, and initiates a search of the customer record file. If no corresponding customer record is found, the query routine returns an error message response. If a corresponding customer record is retrieved, the Query routine calls the roll routine to update Access Date/Time, Status and DWT Frequency/$Amount. The roll/updated customer record is written to the specified location for the response data, and a stop request is sent to the System Kernal. The Query routine does not update the customer database by writing the updated customer record back to disk.

In addition to updating the customer database in real time through the verification operation, the Data Manager Task also implements the following local status update functions:

Add/Delete NEGATIVE

Add/Delete CASH ONLY

Add/Delete STOLEN

Add/Delete PREAPPROVED

Add/Delete MANAGER ONLY

These functions are used to input customer status and user flag information.

For multiple store systems, negative status records are kept by location, i.e. each location creates a negative status record for any customer with NEGATIVE or CASH ONLY status at that location. Global Update causes the negative status file at each location to contain negative status records for each location (assuming negative status records are selected for global update). Each location can access through the Add/Delete NEGATIVE and CASH ONLY functions only those negative status records for its location. The query function can be used to query negative status records from other locations.

Figure 9D:
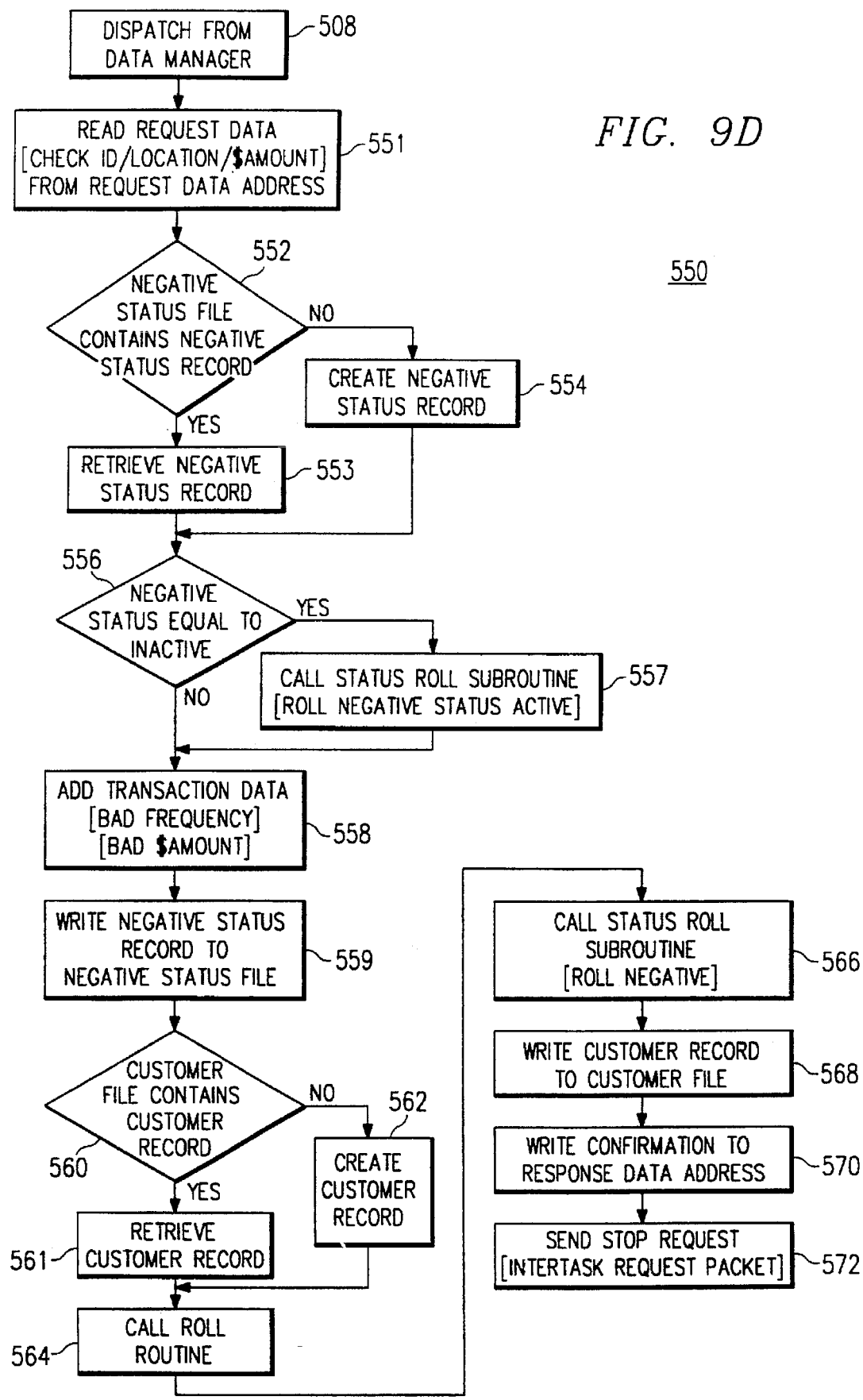

FIG. 9D is a program flow diagram for the add NEGATIVE local status update function. After receiving and decoding the appropriate intertask request packet from the Terminal Manager Task, the Data Manager Task dispatches (508) to the Add NEGATIVE execution routine (550).

The Add NEGATIVE routine reads (551) the request data (check ID/location/$Amount) from the location specified in the intertask request packet. The negative status file is searched (552) for a corresponding negative status record, which is either retrieved (553) or created (554). If NEGATIVE status is Inactive (556), the status roll subroutine in called (557) and instructed to roll to Active. The current bad check data is then added (558) to the BAD Frequency and $Amount totals for that location. The routine then writes (559) the updated negative status record into the negative status file.

The customer file is searched (560) for the specified customer record, which is either retrieved (561) or created (562). The roll routine is called (564) to roll/update the customer record (Access Date/Time, Status and DWT Frequency/$Amount) as described in connection with FIG. 9C. After roll/update, the status roll subroutine is called (566) and instructed to roll customer status NEGATIVE. The updated customer record (with its transfer date updated current) is then written (568) into the customer file.

After the add NEGATIVE function is accomplished, a confirmation response is written (570) into the specified response data location, and a stop request is sent (572) to the System Kernal (which sets the specified semaphore flag).

Figure 9E:
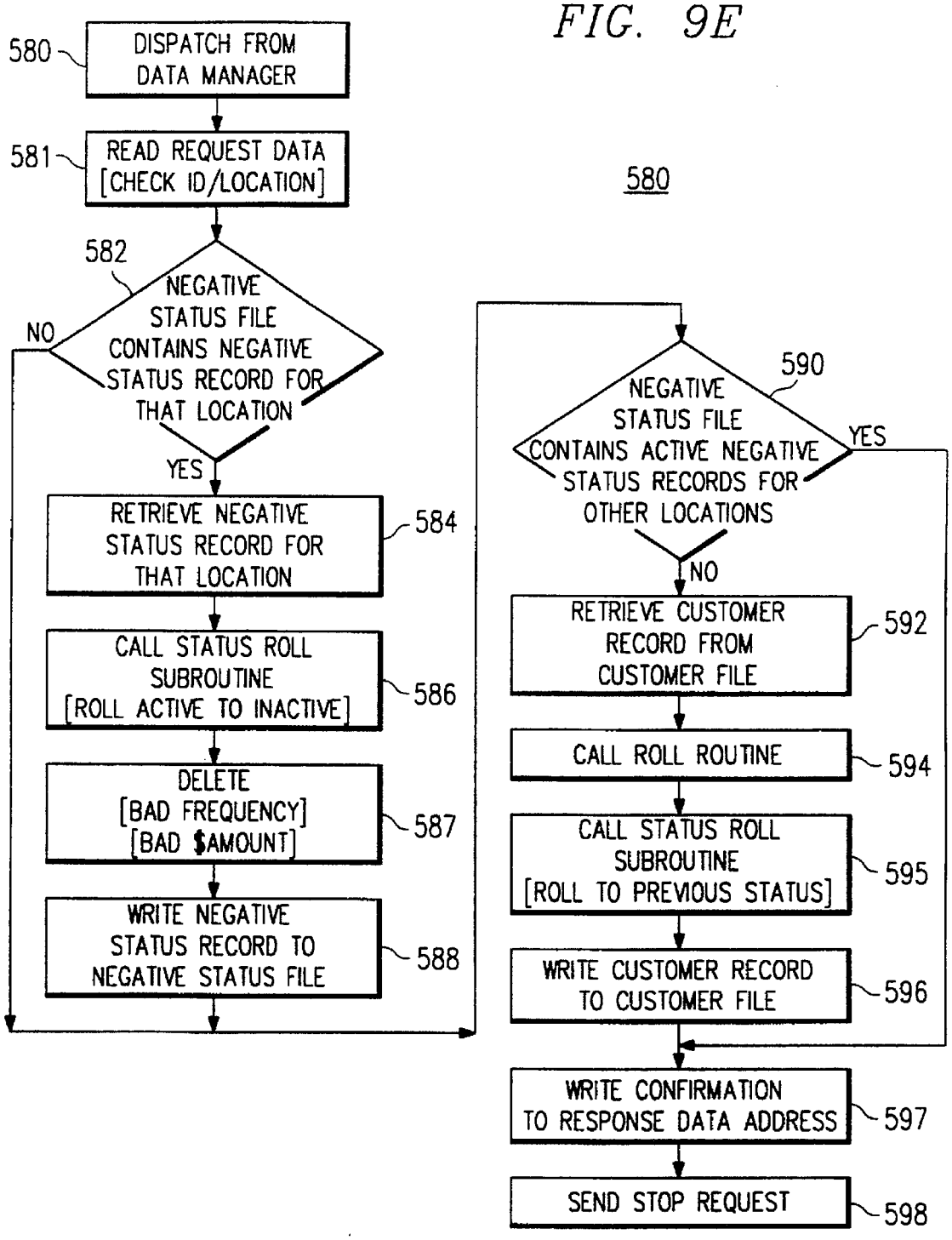

FIG. 9E is a program flow diagram for the delete NEGATIVE function. After receiving and decoding the appropriate intertask request packet from the Terminal Manager Task, the Data Manager Task dispatches (508) to the Delete NEGATIVE execution routine (580).

For multiple-store systems, the Delete NEGATIVE function is used according to the following criteria: (a) it is only used to delete NEGATIVE status for the location requesting the delete NEGATIVE function; i.e., to change NEGATIVE status from Active to Inactive only in the negative status record for that location; and (b) it is only used if all bad checks for that location have been paid off or otherwise resolved. Thus, each location can only affect its own negative status record—the global update function is used to distribute negative status records among all locations.

The Delete NEGATIVE routine reads (581) the request data (check ID/location) from the location specified in the intertask request packet. The negative status file is searched (582), and the negative status record for that location is retrieved (584), if it exists. The status roll subroutine is called (586) to roll NEGATIVE status from Active to Inactive. The BAD Frequency and $Amount data are then deleted (587) indicating that all bad checks have been paid or otherwise resolved.

Next, the routine determines (590) whether another negative status record exists for that customer, i.e., whether the customer has a NEGATIVE status active at other locations. If the negative status file contains no other negative status records for the customer, the customer file is searched to retrieve (592) the corresponding customer record. The roll routine is then called (594) to roll/update the customer record as described in connection with FIG. 9C, and the status roll subroutine is called to roll status to the previous status (i.e., the customer's status prior to becoming a NEGATIVE). The updated customer record (with its transfer date updated current) is then written (596) to the customer file.

After the delete NEGATIVE function is accomplished, a confirmation response is written (597) to the specified response data address, and a stop request is sent (598) to the System Kernal (which sets the specified semaphore flag).

The routines that Adding/Delete CASH ONLY operate analogously to the Add/Delete NEGATIVE routine because CASH ONLY is also maintained by location in a negative status record. These routines function in accordance with FIGS. 9D and 9E, except that transaction data (BAD Frequency/$Amount) is not involved (i.e., step 558 is unnecessary).

The routines that Add/Delete STOLEN affect only the customer file. Thus, these routines read the specified request data (check ID/status), and either retrieve or, for the add routine, create a corresponding customer record. The customer record is updated using the roll routine, and then rolled to STOLEN (add function) or to CAUTION (delete function) using the status roll subroutine. The updated customer record is written to the customer file, and a confirmation response is written to the specified response data location. The routine terminates with a stop request sent to the System Kernal.

The routines that Add/Delete PREAPPROVED and MANAGER ONLY operate to set/clear the corresponding user flags in the customer record in a manner analogous to the Add/Delete STOLEN routine. That is, these routines roll/update the corresponding customer record, set/clear the specified user flag, and then provide an appropriate confirmation response.

For the global update function, the host Data Manager Task receives negative status and selected customer records from all the remote systems, and executes a host global update function. Host negative status and selected customer records are then sent to the remote Data Manager Task which executes a remote global update function. The global update function is implemented by the remote Event Manager Task which executes a global update event/activity (see Section 3.5).

The criteria for selecting records for transfer in connection with global update are:

(a) Negative Status File—All records accessed since the previous host/remote file transfer for global update (NEGATIVE or CASH ONLY status); and (b) Customer File—All customer records accessed since the previous host/remote file transfer for global update, and having a status value of CAUTION, NEGATIVE, CASH ONLY or STOLEN.

Since a remote location only accesses (updates) the negative status records for its location, each remote only transfers to the host negative status records for its location. The host global update function necessarily accesses each negative status record transferred by a remote during a global update session, so that all such records are transferred back to each remote (along with the host location negative status records that were accessed as a result of local host operation.

FIG. 9F is a program flow diagram for the host global update function for the negative status file. After receiving and decoding the appropriate intertask request packet (containing the global update request from the remote Event Manager Task), the host Data Manager Task dispatches (508) to the Host Global Update (Negative Status) execution routine 600.

For each negative status record received (602) from a remote location, the host searches (604) its negative status file for a corresponding negative status record for that remote location. If it does not exist, the remote record is copied (607).

If a corresponding host record is retrieved (606), the host NEGATIVE status (Active or Inactive) is replaced (608) with the remote NEGATIVE status from the remote negative status record, and the host BAD Frequency/$Amount is replaced (610) with the remote BAD Frequency/$Amount. The Access Date/Time is then rolled (612) current.

The updated (or copied) host negative status record for the remote location is written (614) to the negative status file, and the negative status file is searched (616) to determine if it contains any NEGATIVE status Active records for that customer for any locations (including the remote negative status record just processed).

If not (i.e., if NEGATIVE status for that customer is Inactive at all locations), the corresponding customer record is retrieved (618) from the customer file. The record is updated by the roll routine (620), and rolled to previous status (622). The updated customer record (with its transfer date updated current) is then written (624) back to the customer file.

The Global Update (Negative Status) routine terminates with stop request sent (626) back to the requesting remote Event Manager Task (see Section 3.5).

Figure 9G:
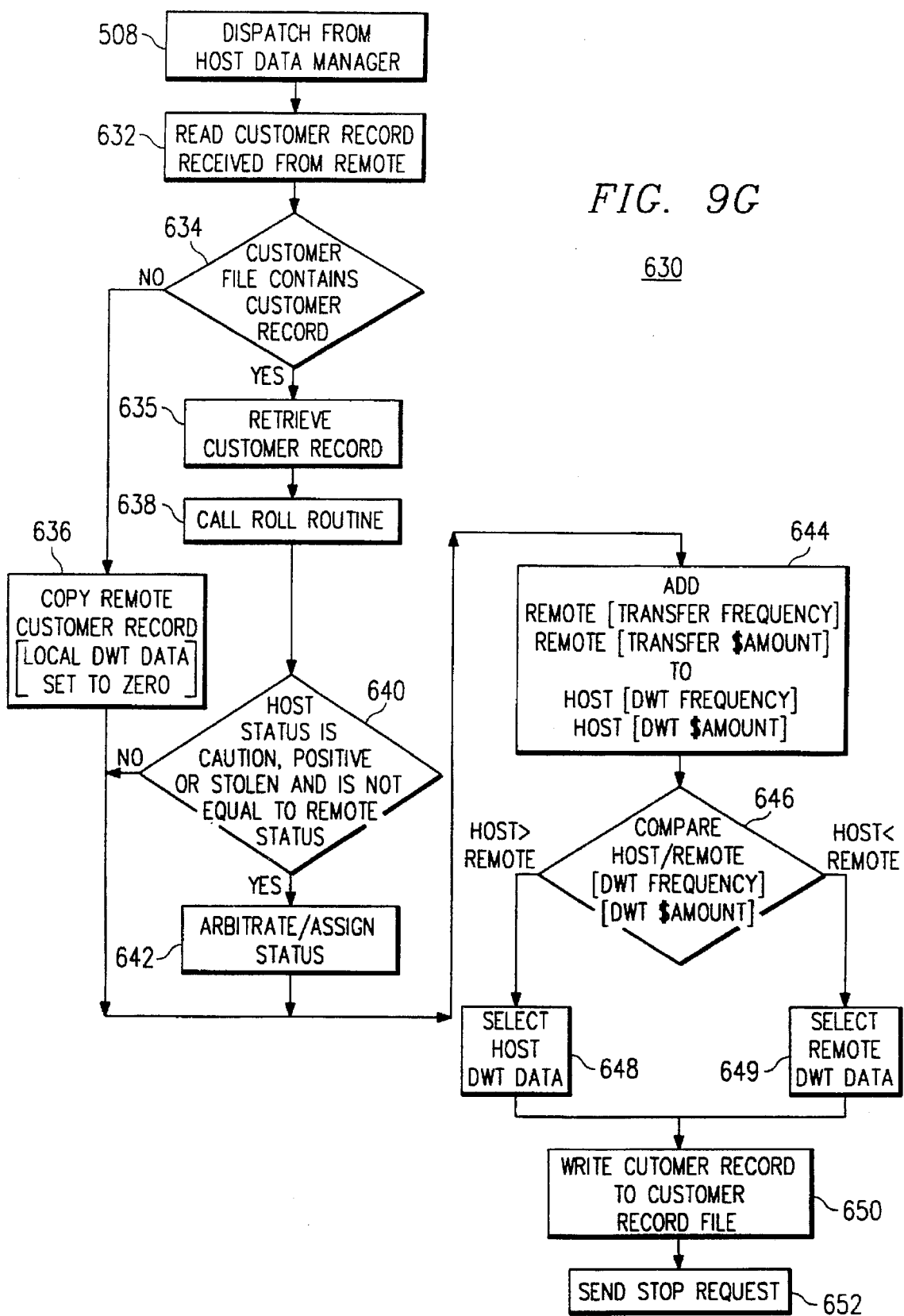

FIG. 9G is a program flow diagram for the host global update function for the customer file. After receiving and decoding the appropriate intertask request packet (containing the global update request from the remote Event Manager Task), the host Data Manager Task dispatches (508) to the Host Global Update (Customer) execution routine 630.

For each customer record received from the remote (632), the host searches (634) its customer file. If a corresponding customer record does not exist, one is created (636) with the local DWT Frequency/$Amount set to zero.

If a corresponding host customer record is retrieved (635), it is updated (638) in accordance with the roll routine in FIG. 9C. If status is CAUTION, POSITIVE or STOLEN, the status for the updated host customer record is compared (640) with the status for the remote customer record. If status is different, the host assigns (642) status in accordance with predetermined arbitration rules, and updates its customer record accordingly. (If either host or remote status is NEGATIVE, global update is accomplished through the Global Update routine for negative status records.)

The host updates DWT Frequency/$Amount in the host customer record by adding (644) to the host DWT Frequency and $Amount the Transfer Frequency and $Amount totals from the remote customer record, and then selecting (646, 648, 649) the greater of the host or remote DWT Frequency/$Amount totals.

Finally, the host customer file is updated by writing (650) the host customer record (with its transfer date updated current) to disk, and a stop request is sent (652) to the remote Event Manager Task.

Once the host has completed updating its negative status file (FIG. 9F) and its customer file (FIG. 9G) for each negative status and customer record transferred by the remote, the remote then requests that the host transfer to the remote the host negative status and selected customer records that have been accessed since the previous transfer. That is, the same criteria that the remote used in selecting records for transfer are used to select host records for transfer back to the remote.

Since for each remote record transferred to the host, the host performs an update operation that changes Access Date/Time, the host-to-remote file transfer will necessarily result in all such updated records being retransmitted back to the remote. In addition, the host will transfer to the remote NEGATIVE status and selected customer records accessed and updated by the host during either (a) local-host verification or update operations, or (b) a host global update operation initiated by another remote.

The remote receives the negative status and customer records transferred from the host, and performs a global update of its customer database. As described in Section 3.5, the remote Event Manager Task requests host records from the host Data Manager Tasks, and then sends them to the remote Data Manager Task with a global update request.

The remote global update function for the negative status file is based on two criteria: (a) for remote-location negative status records, the remote record is assumed to be correct and the remote record is ignored; and (b) for other-location negative status records, the host record is assumed to be correct and it is copied without any update or other access by the remote. After receiving and decoding the appropriate intertask request packet (containing the global update request for the host negative status record from the remote Event Manager Task), the remote Data Manager Task dispatches to the Remote Global Update (Negative Status) execution routine that implements these global update operations.

Figure 9H:
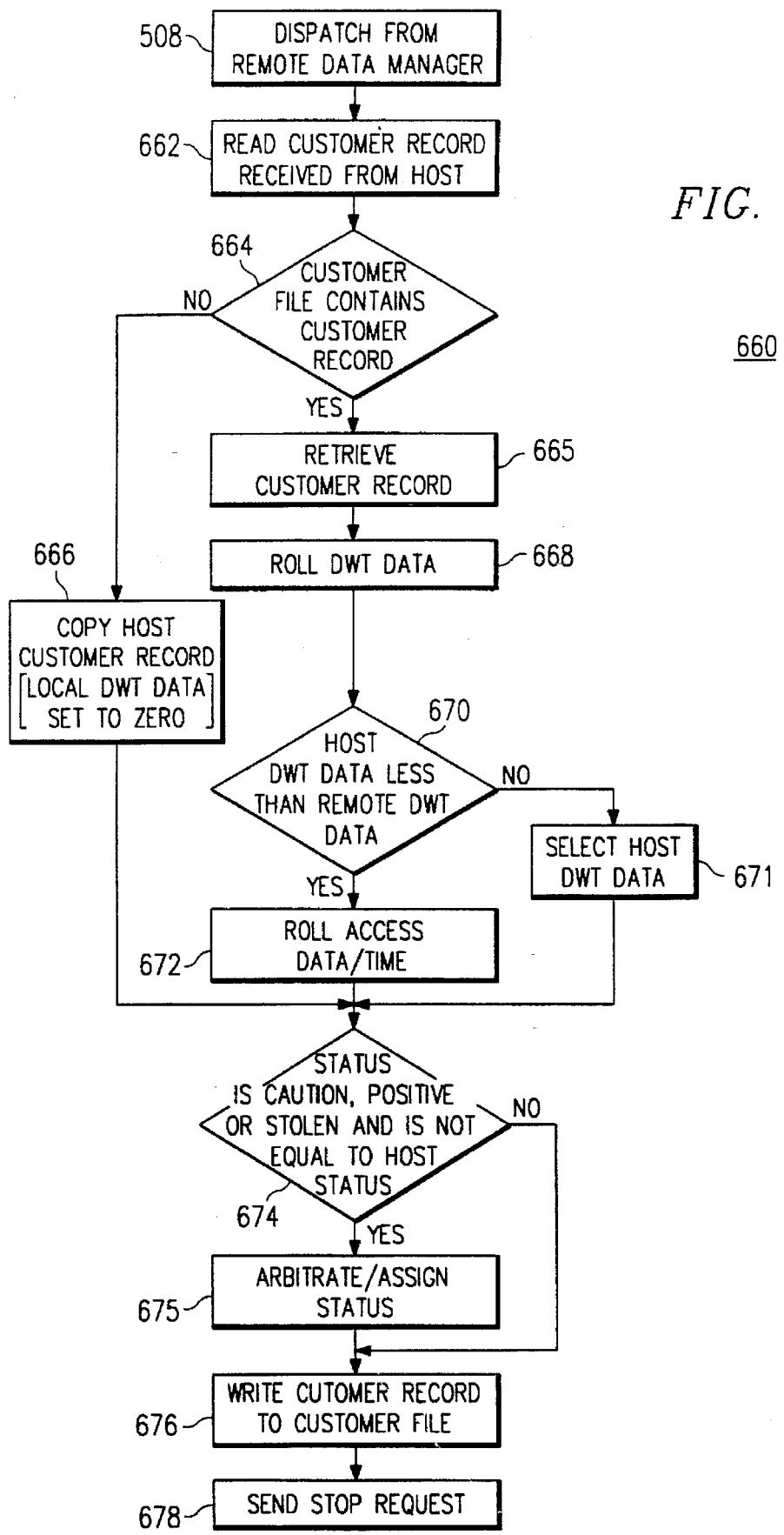

FIG. 9H is a program flow diagram for the remote global update function for the customer file. After receiving and decoding the appropriate intertask request packet (containing the global update request from the remote Event Manager Task), the remote Data Manager Task dispatches (508) to the Remote Global Update (customer) execution routine (660).

For each customer record received (662), the remote determines (664) whether it has a corresponding customer record, and if not, creates (666) one with the local DWT Frequency and $Amount data set to zero. An existing remote customer record is retrieved (665), and DWT Frequency/$Amount rolled (668) current. The remote then compares (670) its global DWT Frequency/$Amount with the corresponding totals from the host customer record, and if the remote totals are greater, rolls (672) the Access Date/Time current. Updating the Access Date/Time for the customer record insures that that record will be transferred back to the host during the next remote/host file transfer session. If the host transactional data is greater, then the Access Date/Time is not changed.

If status is CAUTION, POSITIVE or STOLEN, the status for the updated remote customer record is compared (674) to the host customer record status, and if different, the remote assigns (675) status in accordance with predetermined arbitration rules. (If either host or remote status is NEGATIVE, global update is accomplished through the host global update function for negative status records.)

The updated customer record (with its transfer date updated current) is written (676) to the customer file, and a stop request is sent (678) to the host System Kernal.

The arbitration rules used by the host during global update to assign status (642 in FIG. 9G and 675 in FIG. 9H) for customer records in the case of a conflict between host and remote status are a matter of design choice and routine program implementation. The recommended criteria for specifying arbitration rules are (a) where either the host or the remote indicates POSITIVE and the other indicates CAUTION, the POSITIVE status value is selected; (b) where either the host or the remote indicates STOLEN, the STOLEN status is selected; and (c) NEGATIVE status is not arbitrated.

The database operations associated with purge and backup are also handled by the Data Manager Task. These functions are implemented as event activities by the Event Manager Task. In response to requests from the corresponding event activity routine, the Data Manager Task retrieves the specified records and processes them in accordance with conventional record delete (purge) or copy (backup) operations. Thus, for backup, the Event Manager Task provides a backup key [status/access date/time], and all records accessed since the last backup are copied to a backup file. For purge, a purge routine operates analogously to the roll routine (FIG. 9C) in reading purge limits from the system control file and comparing them against a purge interval defined by the last access date/time, deleting (or copying off-line) those records that meet the predetermined purge criteria.

3.4. Terminal Manager Task. The Terminal Manager Task manages the communication of requests/responses between the transaction terminals and the transaction processor, implementing a token ring local area network. In implementing token ring data communications, the Terminal Manager Task sequentially polls each transaction terminal using the token ring protocol described in Section 1.2.

When request data (such as check ID/$Amount) are entered into a transaction terminal, the transaction terminal responds to its next POLL token by transmitting TXDATA answer packet including the request to the Terminal Manager Task, which writes the request data into the corresponding terminal buffer.

For each request received from a transaction terminal, the Terminal Manager Task spawns a terminal request subtask that:

(a) Builds a System Kernal service request for the request entered into the transaction terminal;

(b) Sends the service request to the responding task through the System Kernal;

(c) Receives response data from the responding task;

(d) Builds the appropriate response from the response data; and (e) Sends the response to the transaction terminal.

The responding task depends upon the request function code entered into the terminal. (See Section 2.2) Most of the request functions are for the Data Manager Tasks because they involve customer database access. However, requests to the other tasks for diagnostic or system information can be made from a transaction terminal.

At system initialization, the Terminal Manager Task: (a) Initializes the 32-port network communications interface (116 in FIG. 1); (b) Allocates TXBUFFER, RXBUFFER and LASTDATA terminal buffers for each of 32 allowable terminals; and (c) Allocates two poll state flags, Poll/Data and Wait, for each of 32 allowable terminals. The TXBUFFER buffer holds TXDATA transmitted by the terminal, while the RXBUFFER buffer holds RXDATA to be sent to the terminal. The LASTDATA buffer contains selected data from the last request transmitted by or the last response received by the terminal (used to hold data that might be used in the next terminal request).

For the preferred embodiment, no attempt is made to deallocate terminal buffers/flags for those communications ports that do not have an active, on-line transaction terminal. This design choice does not require any significant memory allocation for the 32-terminal configuration of the preferred embodiment. Such deallocation procedures are a matter of routine program implementation.

Figure 10A:
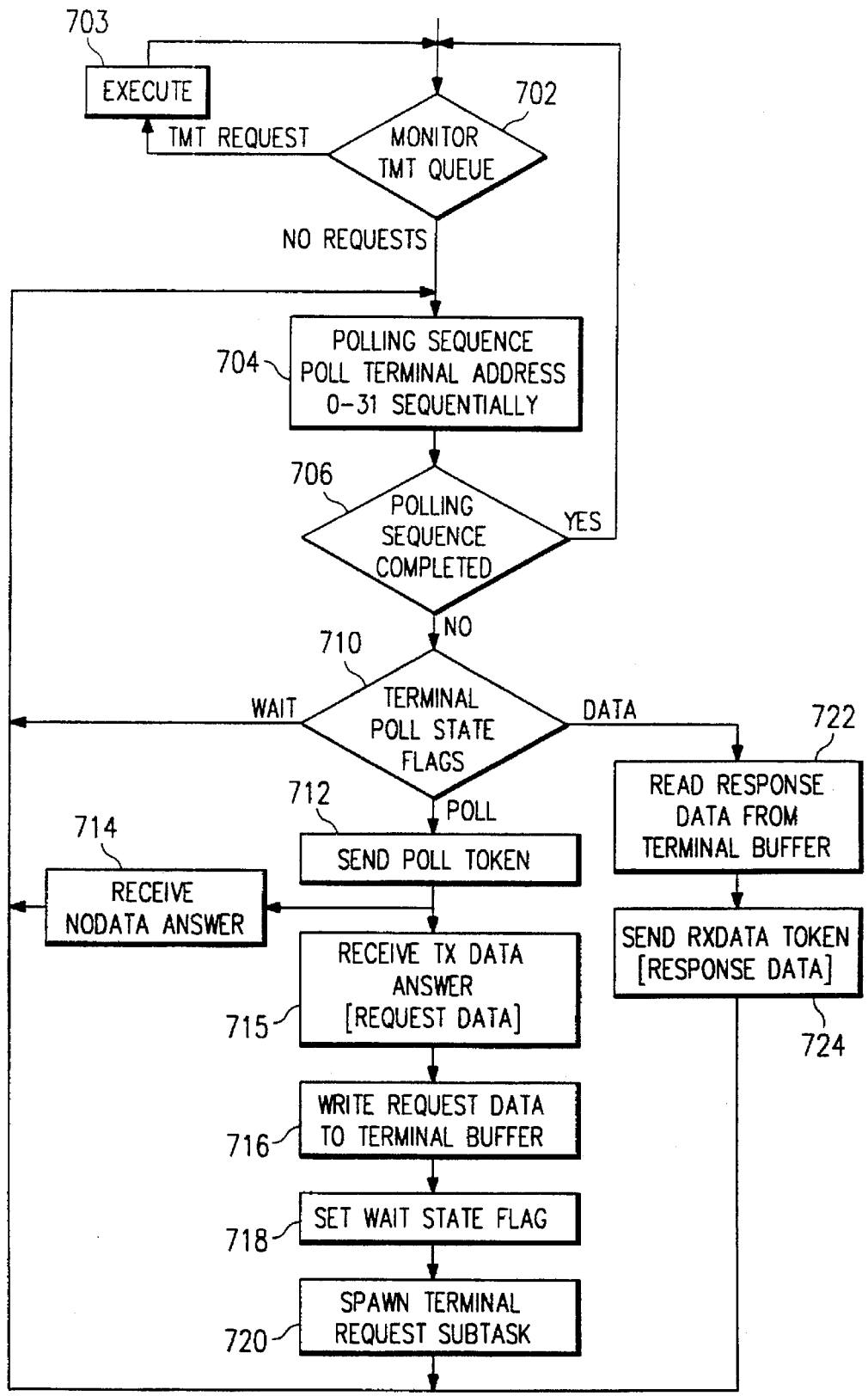
FIGS. 10A and 10B are program flow diagrams of, respectively, the Terminal Manager Task network polling function, and the terminal request subtask.

FIG. 10A is a program flow diagram of the token ring network communication function implemented by the Terminal Manager Task.

The Terminal Manager Task continually monitors (702) its task queue, which is maintained by the System Kernal. Through the System Kernal, system and diagnostic requests can be written into the queue for execution by the Terminal Manager Task. That is, in response to a TMT request (such as a system diagnostic or system information request) written into its queue, the Terminal Manager Task calls (703) a corresponding routine that executes the request.

If no TMT request has been written into the task queue, the Terminal Manager Task begins a token polling sequence (704, 706).

A token polling sequence is accomplished by sequencing through the terminal addresses 0–31. During each polling sequence the Terminal Manager Task polls all 32 ports without regard to whether a port has an active, on-line transaction terminal coupled to it, provided however, that an active terminal in a Wait state (i.e., waiting to receive requested data) is not polled.

The Terminal Manager Task makes no attempt to segregate active and inactive communications ports, or to remove from the polling sequence terminal addresses not assigned to active, on-line transaction terminals. This design choice does not significantly impact network communications for the 32 terminal configuration of the preferred embodiment. An active-terminal-only polling scheme would be a matter of routine program implementation.

Terminal addresses are determined as follows. During each polling sequence, the Terminal Manager Task polls each of the 32 ports—beginning with Port 0, a POLL token (including the corresponding terminal address between 0 and 31) is broadcast and the Task waits until either (a) an answer packet is received, or (b) a time-out period transpires, before sending the next POLL. When a transaction terminal signs on, its internal network communication software causes an [ENTER TERMINAL ID] message to be displayed. The terminal operator is supposed to enter a number between 0 and 31 that is uniquely assigned to that terminal; however, the internal software processes the terminal ID entry using module 31, so that any numeric entry is forced into the 0–31 range.

For each terminal address the Terminal Manager Task determines (710) the polling state of the corresponding transaction terminal—Poll, Wait, or Data.

If the terminal is in the Poll state, the Terminal Manager Task sends (712) a POLL token for that transaction terminal (i.e., a token that includes the corresponding terminal address). The POLL is received by the addressed terminal, and recognized as an invitation to transmit data. The polled terminal transmits either a TXDATA answer (including request data) or a NODATA answer. If a NODATA answer is returned (714), the Terminal Manager Task continues with the polling sequence. If the polled terminal transmitted request data in TXDATA answer (715), the Terminal Manager Task writes (716) the request data into the corresponding terminal buffer, sets (718) the terminal Wait state flag, and spawns (720) a terminal request subtask to execute the request, and then continues the polling sequence.

During execution of the request, while the requesting terminal is in the "Wait" state, the Terminal Manager Task does not poll that terminal, but rather, continues with the polling sequence.

Once a request has been executed and the response data placed in the terminal buffer for the requesting transaction terminal, the request subtask sets the terminal Data state flag. During the next poll sequence, the Terminal Manager Task reads (722) the response from the terminal buffer and sends (724) an RXDATA token that includes the response.

When the token poll sequence is completed (i.e., terminal address 31), the task queue is checked (702) to determine whether any system or diagnostic TMT requests have been written into the queue. If not, a new polling sequence is commenced (704).

When the operator enters the terminal ID, the network software watches for that terminal address—when a POLL with that address is received, the network software waits for a time-out to determine whether another terminal has that address. If not, the network software grabs the next POLL with that address and commences normal network communications.

For the preferred embodiment, the POLL token is one byte (0–7):

| Bit 7 | Token Flag (set if POLL token; otherwise clear) |
|---|---|
| Bits 5–6 | TX-POLL token |
| | RX-RXDATA token |
| Bits 0–4 | Terminal address |

All data communications over the network are in 7 bit ASCII (0–6), so that only the POLL token uses bit 7. The answer packets are also one byte:

| Bit 7 | Not used |
|---|---|
| Bits 0–6 | TXDATA |
| | NODATA |

The TXDATA byte is followed by up to 40 characters of data in 7-bit ASCII (0–6), with a single END of data byte (ASCII carriage return). Finally, the RXDATA token [Token Flag Set/RX/Terminal Address] is followed by up to 40 characters of data, with the next POLL token designating END of data.

Thus, in operation, a transaction terminal watches the network for its POLL token (with its terminal address). When its POLL is received it sends back either a NODATA answer byte, or a TXDATA byte followed by up to 40 characters of data terminated in an END character. If the terminal is waiting for response data, so that it has been placed in a Wait state, it will not receive a POLL token. When response data is available, the Terminal Manager Task will retrieve the data from the terminals' RXBUFFER and transmit it with the next TXDATA token.

This implementation for a token ring network is a matter of design choice. Other implementations are a matter of routine program design. Commercial token ring program packages are available.

To execute a request sent by a transaction terminal during a polling sequence, the terminal request subtask first determines which function is requested, and then dispatches to an appropriate service request routine that:

(a) Builds a service request;

(b) Sends the service request to the responding task (via the System Kernal);

(c) Builds an appropriate response from the response data returned by the responding task; and (d) Writes the response into the appropriate terminal buffer.

In addition, for a verify request, the verify service request routine determines whether any "CALL MANAGER" limits have been exceeded, and if so, causes the "CALL MANAGER" response to be returned to the terminal.

From Section 3.2, a service request is in the following format:

Requesting task ID

Responding task ID

Function code

Address of request data location

Address for response data location

Semaphore flag

The service request is sent to the System Kernal, which builds a corresponding intertask request packet.

The responding task that executes the request depends upon the function code. Of course, most function codes will be executed by the Data Manager Task because they involve accessing in some way the customer database.

After execution of the request, the response data returned by the responding task depends upon the request function code. The Data Manager Task returns updated customer or negative status records in response to verify/query requests and confirmations in response to local status update functions and global update functions.

Exemplary terminal request subtask operation is described in connection with a verify request in which the responding task is the Data Manager Task.

Figure 10B:
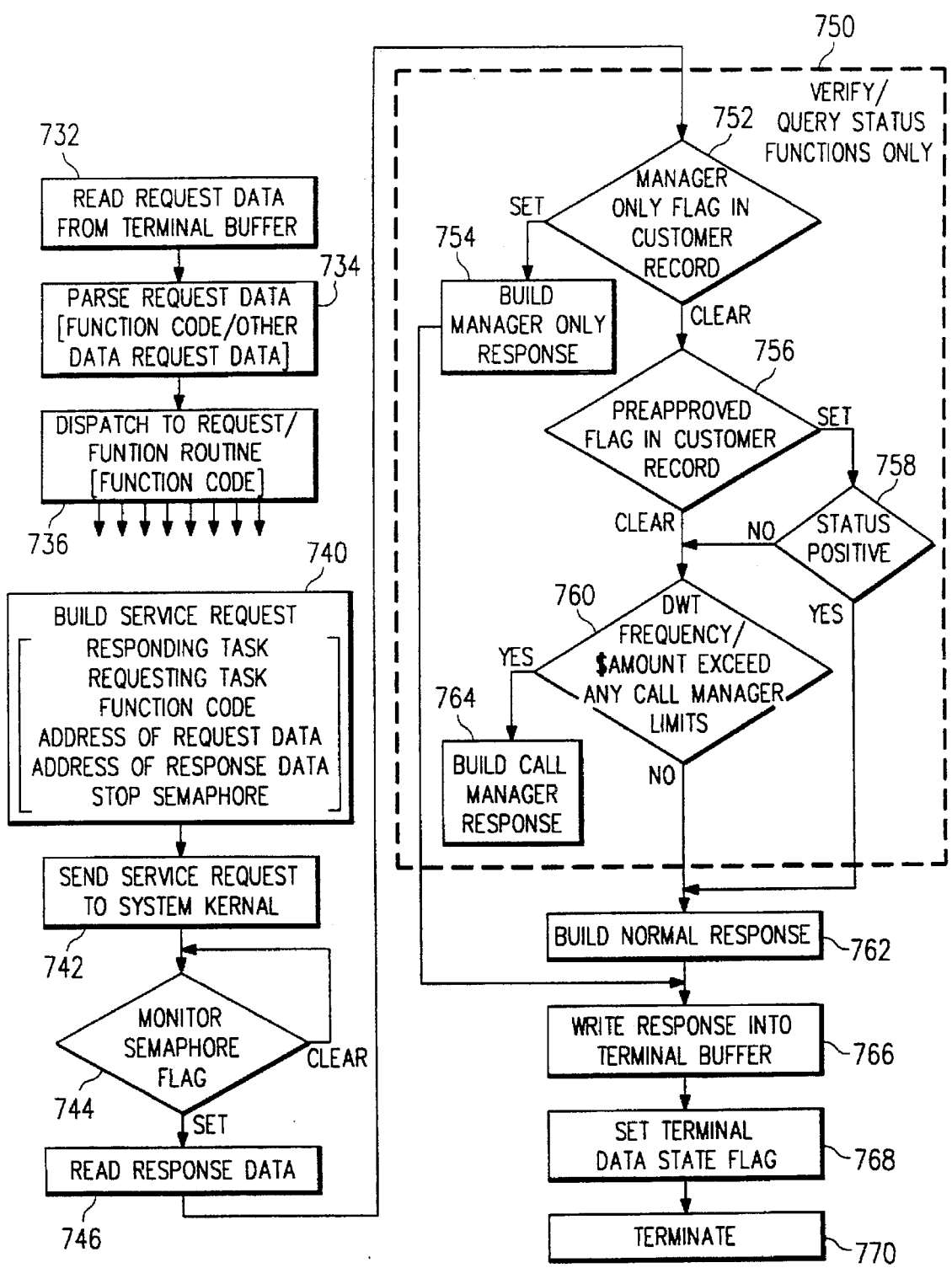

FIG. 10B is a program flow diagram for a terminal request subtask that implements a verification or query status request, to which the response from the Data Manager Task is an updated customer record. The subtask first reads (732) the TXBUFFER terminal buffer for the transaction terminal, parses (734) the request data to identify the function code (verify) and the other request data (check ID and $Amount).

The subtask then dispatches (736) the request to a verify service request routine specified by the verify function code.

The service request subroutine builds (740) an appropriate service request addressed to the Data Manager Task responding task), which is sent (742) to the System Kernal.

The terminal request subtask then suspends execution and monitors (744) the semaphore flag specified in the service request. The semaphore flag is set by the System Kernal in response to a stop request from the Data Manager Task, indicating that the request has been executed and response data (a customer record) written to the response data location specified in the service request.

The terminal request subtask then reads (746) the response data, and builds an appropriate response for the requesting terminal. For the verify (and query status) requests, the corresponding service request routine builds a response from the customer record (response data) only after testing (750) corresponding user flags and CALL MANAGER limits. These user flag and CALL MANAGER operations are not required for other function service requests (such as query negative, local status update or global update).

The first operation in building an appropriate verification response from the customer record returned by the Data Manager Task is to test the MANAGER ONLY flag (752). If that flag is set, the verify service request routine builds (754) a MANAGER ONLY response regardless of customer status, and without testing any CALL MANAGER limits.

If the MANAGER ONLY user flag is clear, the next operation is to test the PREAPPROVED flag (756). If the flag is set, and customer status is POSITIVE (758), a normal (i.e. PREAPPROVED) response is built (762) without regard to any CALL MANAGER limits. If customer status is other than POSITIVE, the PREAPPROVED flag is ignored and CALL MANAGER limits are tested.

After testing the user flags, the next operation in building a response for a verify request is to test the CALL MANAGER limits (760) for the customer's status and DWT data. The DWT Frequency/$Amount CALL MANAGER limits appropriate for the customer's status are read from the system control file and compared with DWT Frequency and $Amount from the customer record. If any CALL MANAGER limit is exceeded, CALL MANAGER RESPONSE is built (764) regardless of status. If no limits are exceeded, the normal response for that status is built (762).

As described in Section 2.3 and 2.10, the CALL MANAGER limits are used to place predetermined transactional limits (DWT Frequency/$Amount) on a check transaction primarily for customers with CAUTION and POSITIVE status. These limits are set as a matter of store policy, and placed in the system control file during system configuration.

For function requests other than verify and query status, the user flag and CALL MANAGER operations (750) are not included in the service request routine, and a normal response is automatically built (762) from the response data read (746) from the specified response data location.

The response—MANAGER ONLY, PREAPPROVED, CALL MANAGER or [Normal]—is written (766) into the appropriate terminal buffer, and when the terminal's RXBUFFER buffer is full, the terminal Data state flag is set (768) to indicate that a response is in the terminal's RXBUFFER buffer and should be sent to the terminal in the next polling sequence. The terminal request subtask then terminates (770).

The basic operation of the terminal request subtask for each request function is as described in connection with FIG. 10B for the verify request, except that the service request routines for request functions other than verify do not implement the user flag or "CALL MANAGER" response functions (750).

3.5. Event Manager Task. The Event Manager Task manages background activities that are executed automatically without operator intervention, maintaining an Event File that includes an Event Table, an Activity Table and associated indices. The Event Table includes event records each specifying an event time, an event interval and associated activity pointers into the Activity Table. The Activity Table includes a list of activity codes.

The basic activities implemented by the Event Manager Task are:

(a) Host/Remote Communications—These activities transfer customer records and negative status records between host and remote systems for global update;

(b) Purge—These activities, one for each status, delete customer records and negative status records that are obsolete based on specified purge limits contained in the system control file; and (c) Backup—These activities are regularly invoked to backup the customer and negative status files.

The host/remote communications and backup activities operate only on those customer records or negative status records that are accessed (i.e., that have their transfer dates updated) after the last corresponding activity was performed. Host/remote communications are implemented in connection with the Modem Manager Task.

The Event Table contains an event record for each event, with each event record including: (a) an event interval specifying the interval between execution of the associated event activities; (b) the next event time, calculated by the event subtask after completing execution of an event/activity based on the event interval and the system clock; (c) up to 10 activity pointers into the Activity Table; (d) active/ inactive flag set or cleared by a start/stop function request (F950 and 951 in Table 4); and (e) diagnostic abort flag that is tested during event/activity execution by the event subtask, and can be used to abort an event/activity.

In its basic operation, the Event Manager Task sequences through the events (event records) in the Event Table, spawning a corresponding event subtask to execute the specified activity.

Event/activities are started and stopped using a transaction terminal to enter a corresponding request (see the function codes 950 and 951 described in Section 2.2 and set forth in Table 4). After entry of a start/stop request at a transaction terminal, the Terminal Manager Task (terminal request subtask) addresses a service request to the Event Manager Task through the System Kernal. The Event Manager Task receives the service request from its task queue, executes the request by correspondingly modifying the event file, and returns an appropriate response to the Terminal Manager Task.

While event frequency for a given activity is a matter of store policy and design choice, typically, host/remote communications and backup will be performed fairly frequently to insure both the regular update of the customer database, and the ability to recover from a system failure without significant loss of data. On the other hand, the purge function is more a matter of system administration designed to control the size of the customer database. Indeed, the purge function can be omitted as an event activity. In that case, the status purge limits contained in the system control file define the reset/CAUTION interval used in the roll routine to roll all statuses back to CAUTION if the specified reset/ CAUTION (i.e., purge) limits are exceeded, as described in connection with FIG. 9B.

The selection and timing of event-driven activities is a matter of design choice. The recommended event-driven activities, and the associated event intervals, are:

| Host/Remote File Transfer | Every 15 minutes |
|---|---|
| System Backup | Every 10 minutes |
| Database Purge | Every 24 hours |

The Event Manager Task sequences through the event file, selecting the specified event-driven activities on a read-next basis. Event times are specified as time intervals starting from a baseline system time 00:00:00:00:00:00 [yymmddhhmmss] for Jan. 1, 1970 (the transaction processor includes a battery assisted hardware clock synchronized to this baseline system time).

When an event time is reached, and the associated activity is completed, the event time is incremented by the event interval, based on the previous event time and not on when the activity was actually completed. For example, if host/ remote file transfers to support global update activities (i.e., transfers of negative status records and selected customer records are to be accomplished every 15 minutes, then each activity is entered into the event file with an interval of 15:00[mmss]. The activity will be entered into the event file, along with its event interval and its initial event time of 15 minutes after system initialization (assumed to be 00:00 [mmss]). The activity will then first be executed at 15:00, and when the activity is completed, the associated event time will be incremented to 30:00.

At initialization, the Event Manager Task opens the Event Table and Activity Table, and clears all semaphore flags. Thereafter, the Event Manager Task sequences through the Event Table, spawning event subtasks at specified event times to execute corresponding activities. While a given event may have several activities associated with it, only one event subtask (and only activity within an event record) is executed at a time.

Figure 11A:
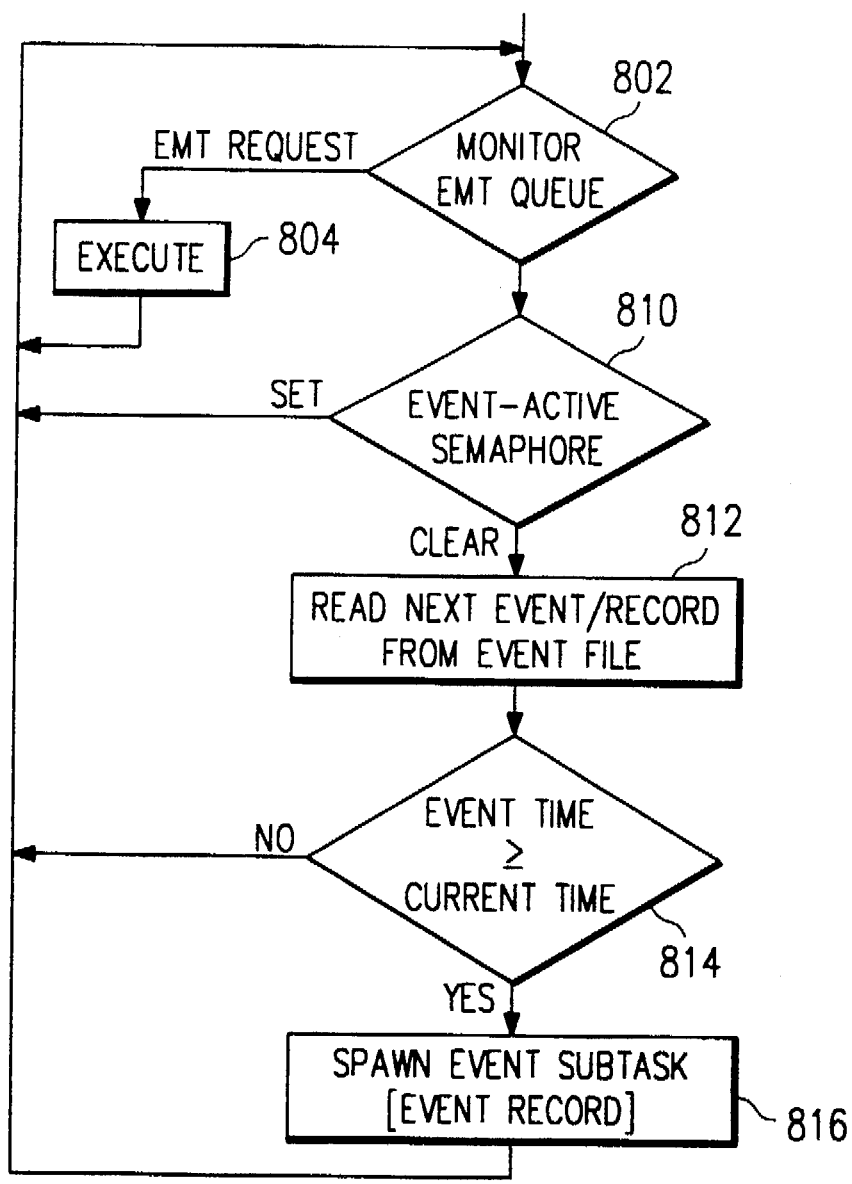
FIGS. 11A and 11B are program flow diagrams of, respectively, the Event Manager Task, and the event subtask.

FIG. 11A is a program flow diagram for the Event Manager Task. The task continually monitors (802) the Event Manager Task queue, to determine if any EMT requests have been received from the System Kernal. These requests may be for diagnostic or system information purposes. If so, the appropriate system routine is executed (804).

If the task queue is empty, the Event Manager Task tests the event-active semaphore (810) to determine whether an event is active. If so (semaphore set), the task checks the task queue (802).

If no event is active (semaphore clear), the Event Manager Task reads (812) the next event record from the Event File, and compares (814) the event time in the event record with the current system time. If the event is greater than or equal to the system time, the Event Manager Task spawns (816) an event subtask to execute the activities associated with the event (sending a subtask request to the System Kernal).

The Event Manager Task then the task reads (812) the next event/activity from the event file.

If the event time for the next event/activity is greater than or equal to the current time (814), the Event Manager Task spawns (816) an Event Subtask to execute the event/activity.

Figure 11B:
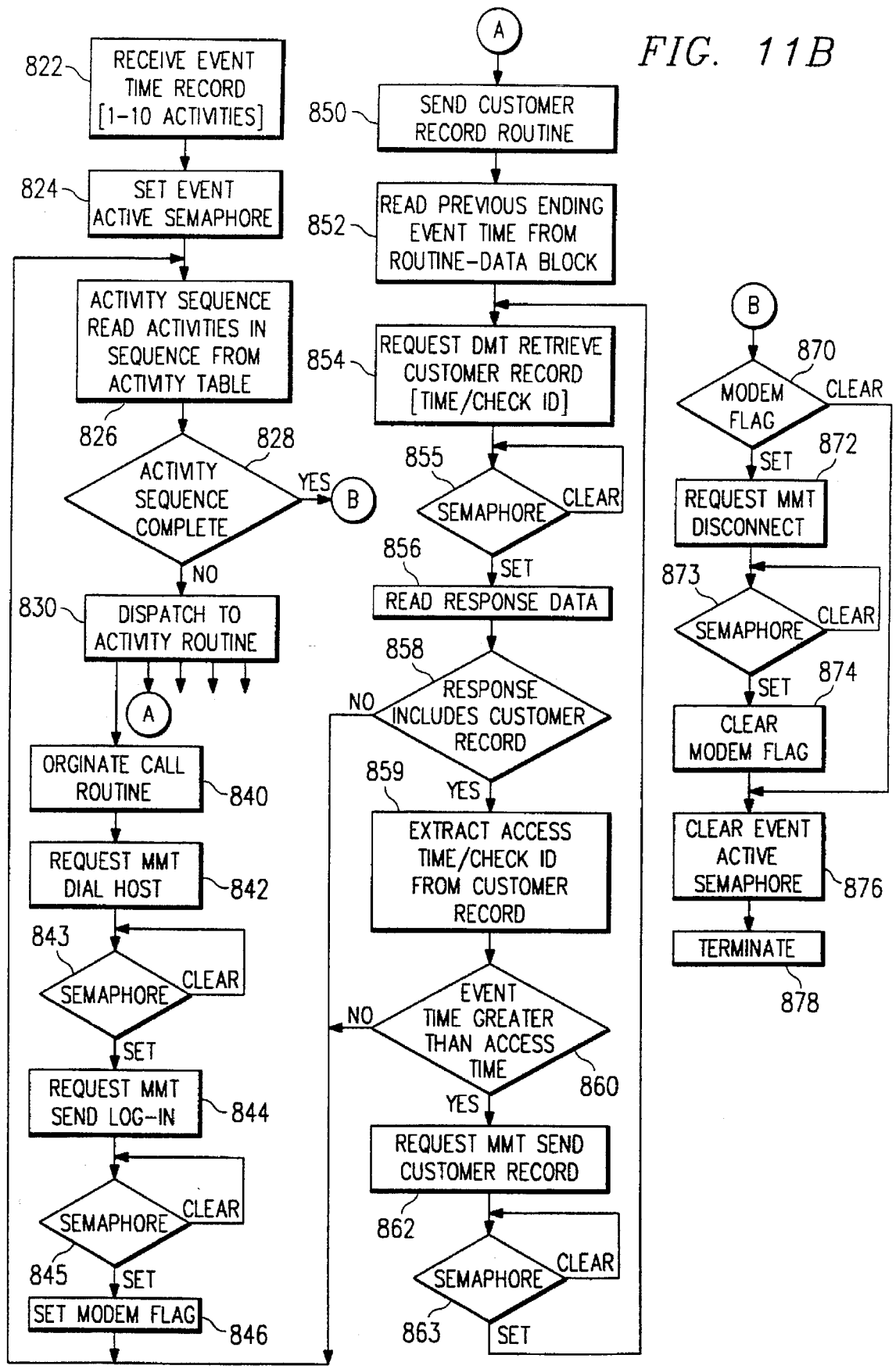

FIG. 11B is a program flow diagram for the event subtask. At the appropriate event time, the Event Manager Task spawns the event subtask, which receives (822) the current event record from the Event Table. The current event record includes a current event time and an activity pointer to each of up to 10 associated activities identified in the Activity Table. The event subtask sequentially executes each activity associated with the current event time.

Event subtask operation will be described in connection with executing at a remote system the activities associated with the global update function. Specifically, the event subtask will be described in connection with sequentially executing the following global update activities:

(a) Originate call;

(b) Send customer records (all selected statuses);

(c) Send negative status records (NEGATIVE and CASH ONLY);

(d) Receive customer records (all selected statuses); and (e) Receive negative status records (NEGATIVE and CASH ONLY).

That is, each of the send/receive activities reads all selected statuses. When the remote event subtask receives the event record containing the event time pointers into the Activity Table, it sets (824) the event-active semaphore (810 in FIG. 11A), preventing the Event Manager Task from spawning another event subtask. The subtask then initiates an activity sequence (826, 828). Using the activity pointer in the Event Table, the subtask sequentially reads (826) activity codes from the Activity Table. The activity codes are read on a read-next basis, with each read operation being tested to determine when the last activity in the sequence is completed (828).

For each activity code read from the Activity Table, the event subtask dispatches (830) to a corresponding activity routine for execution.

Each activity routine includes an activity data control data block containing certain fixed and/or variable data used by the routine in executing the activity. Thus, for the global update event, the originate call routine includes in its activity control data block the phone number for the host (as well as other system numbers that may be called by the remote) and a corresponding log-in ID. The send/receive record routines include in their respective activity control data blocks the previous event time for the activity which defined the end of the previous event interval for that activity.

Thus, the current event interval for a global update (send/receive) activity is defined by the previous event time in the activity routine's control data block, and the current event record. After execution of the activity, the current event time is written into the activity routine's control data block to define the beginning of the next global update event interval. (A similar control data block operation is used for the backup activity.)

A global update event begins at a remote system with an originate call activity that directs the remote Modem Manager Task (MMT) to establish a communications link to the host. This activity is dispatched to an originate call routine (840) for execution.

The originate call routine begins by building and sending to the remote MMT a request (842) to dial the host—the MT request includes a dial function code and the request data location into which the originate call routine writes the host telephone number, together with a specified semaphore flag. The originate call routine waits on a response from the MMT (843), periodically testing the stop semaphore flag. When the specified semaphore flag is set by the MMT, indicating that the host has been dialed and is in an off-hook condition opening a communications line, the originate call routine builds and sends to the remote MMT a request (844) to send a log-in ID to the host MMT, writing the log-in ID into a specified request data location. The originate call routine then waits on the specified stop semaphore flag being set (845). When the specified semaphore flag is set, indicating that the remote MMT has completed log-in to the host system and established an active communications link, the originate call routine terminates by setting (846) a modem flag to indicate that a communications link is active, and then returns (826) to the event subtask for execution of the next activity.

The event subtask reads (826) the code for the next activity in the global update activity sequence—the send customer record activity.

The event subtask dispatches (830) to the corresponding send customer record routine (850). The routine first reads (852) the previous ending event time from its control data block to provide an initial customer record retrieval key to be used by the remote Data Manager Task (DMT) to retrieve a customer record from the customer record file. The retrieval key includes two fields [check ID/transfer date/time]—each is used by the Data Manager Task to sequence through the customer record file (incrementing check ID first and then transfer date/time). The send customer record routine builds and sends to the DMT a request (854) to retrieve by the retrieval key the first customer record meeting the criteria for transfer to the host during the current activity—any customer record that was accessed (updated) during the current event interval at any time after the time specified in the retrieval key (initially, the ending time for the immediately preceding event interval during which customer records were transferred to the host). The routine writes the initial retrieval key (with check ID set to zero) into the specified request data location to provide the DMT with the initial customer record retrieval key for the current event interval. The send customer record routine then waits (855) on the specified stop semaphore flag being set by the DMT.

The DMT receives the initial customer record retrieval request, and dispatches it to a corresponding customer record retrieval routine. This routine reads the initial record retrieval key (including the ending time for the previous event interval which is the beginning time for the current event interval) from the specified request data location, and using this initial key and the index [status/transfer date/check ID], retrieves the first customer record with an access date/time equal to or greater than the beginning event time (if more than one customer record has the same access date/time, then the customer record with the lowest check ID is retrieved). When the DMT retrieval routine has retrieved this first customer record in the current event interval, it provides an appropriate response to the send customer record routine, writing the retrieved customer record into the specified response data location and sending a stop request to the System Kernal.

When the stop semaphore is set (855), the send customer record routine reads the retrieved customer record from the specified response data location, and determines (858) that the DMT has returned a customer record. The routine then extracts (859) the transfer date/time and check ID from the retrieved customer record, and determines (860) that the current event time, which defines the end of the current global update event interval, is greater than the transfer date/time for the retrieved customer record, thereby confirming that the retrieved customer record was accessed during the current event interval.

The send customer record routine then sends a global update service request to the host DMT, along with the just-retrieved remote customer record, through the remote MMT (862). The routine then waits (863) on the specified stop request being sent, along with a response (acknowledgement), by the host DMT through the host MMT and the remote MMT to, respectively, the remote System Kernal and the specified response data location in the data area for the remote event subtask.

The above remote/host intertask communication operation is described in greater detail in Section 3.6 (Modem Manager Task). Essentially, the Modem Manager Task is designed so that remote/host intertask communications is essentially transparent to the requesting and responding tasks. That is, the remote/host requesting task sends a service request with request data and a stop semaphore to its System Kernal addressed to the host/remote responding task. The remote/host MMTs provide an essentially transparent communications link between the remote/host System Kernals to effect the return of the stop semaphore and response data from the host/remote responding task to the remote/host requesting task.

When the send customer record routine detects (863) the specified stop semaphore flag being set, it requests (854) the DMT to retrieve the next customer record in the current global update event interval, writing the transfer date/time and check ID extracted (859) from the just-sent customer record into a request data location to provide a new retrieval key for the DMT.

As with the first customer record retrieved in the current event interval, the DMT dispatches this request to a customer record retrieval routine that reads the new retrieval key from the specified request data location, and using the index [status/transfer date/check ID], searches the customer file by incrementing first check ID and then transfer date/time until the next record is retrieved. The DMT retrieval routine then responds to the customer record retrieval request, writing the retrieved customer record into the specified response data location for the send customer record routine.

This procedure—requesting a customer record using the transfer date/time and check ID for the previous record as the retrieval key, retrieving that customer record by reading the customer file using the retrieval key, sending the retrieved customer record to the host, and requesting the next customer record—continues until either (a) the remote DMT responds to a retrieve customer record request from the send customer record routine by indicating that the customer file contains no other customer records accessed after the just-sent customer record (as detected in step 858), or (b) the send customer record routine determines that the customer record retrieved by the DMT has a transfer date/time after the current event time (which defines the end of the current global update event interval as determined in steps 859, 860). In either case, the send customer routine returns to the event subtask (826), which reads the next activity from the activity table.

After the activity for sending customer records (by selected status) has executed, the next activity specified in the Event Table is for sending negative status records (both NEGATIVE and CASH ONLY status). The corresponding routine in the event subtask for executing the send negative status record activity operates identically to the send customer record routine (850) in retrieving negative status records accessed during the current global update event interval from the negative status file and sending those records to the host.

After negative status records have been sent, the receive customer records and negative status records activities are executed. Because of the essential transparency of the remote/host communications operation using the host/remote MMTs, the receive activity is analogous to the send activity. The remote receive record activity routine requests records from the host DMT. The host DMT responds with globally updated records that are sent by the remote routine to the remote DMT for remote global update.

When the last send/receive activity for the global update function at the current event time has been completed (i.e., the last receive negative status record routine has completed transferring negative status records from the host DMT to the remote DMT for global update), that routine returns to the event subtask, which determines that the current event time contains no more activities to be executed (826) so that the activity sequence is complete (828). The event subtask then checks the modem flag (870) to determine whether any communications link is active. In the present description of an exemplary operation of the event subtask to execute a global update function, the originate call routine (840) connects to the host and sets the event subtask modem flag (846).

Accordingly, at the completion of the activity sequence for the global update function, the event subtask detects that the modem flag is set (870) and requests the MMT (872) to disconnect from the host. The event subtask monitors its semaphore flag (873) until notified by the remote MMT that the communications link to the host has been terminated. When the semaphore flag is set, the event subtask clears (874) the modem flag, and then clears (876) the event active semaphore in the Event Manager Task. Finally, the event subtask (a) calculates the new event time for the event record based on the event interval and writes it into the event record, and (b) writes the current event time into its control data block for access during the next event/activity execution.

If the event subtask had been executing an event time and associated activity sequence in which communications was not necessary, such as backup or purge, the event subtask detects that the modem flag is clear (870). In that case, the event subtask would immediately clear the event active semaphore (876) and terminate (878).

3.6 Modem Manager Task. The Modem Manager Task manages modem communications, primarily to support host/remote file transfer for global update, but also for remote diagnostic purposes. Operation for host/remote file transfer depends in part upon whether the modem manager task is running in the host or remote check transaction processing system—all host/remote file transfers are initiated and controlled by the remote system.

Modem communications through the Modem Manager Task are essentially transparent to the other tasks, functionally operating as an extension of the normal intertask communications using intertask service requests. Thus, the remote Event Manager Task sends service requests to the host Data Manager Task through: the remote System Kernal, the remote Modem Manager Task, the host Modem Management Task and finally the host System Kernal. Similarly, the host Data Manager Task responds with a reply, including response data and a stop request, over the same host/remote communications path.

For remote-to-host file transfers, the remote Event Manager Task first issues a dial host request to the remote Modem Manager Task, which the Modem Manager Task executes by dialing the host Modem Manager Task and detecting an off-hook condition at the host. When the remote Event Manager Task is notified by a stop semaphore that a connection has been made, it requests the MMT to send a Log-In ID to establish an active communications link. The remote Event Manager Task then issues a service request to the host Data Manager Task, which is directed by the remote System Kernal into the Modem Manager Task queue. The Modem Manager Task reads the request and sends it to the host system, where the host Modem Manager Task transfers the request to the host Data Manager Task through the host System Kernal. The host data manager task responds with a reply that includes a stop request—this response is communicated through the host/remote Modem Manager Task link to the remote Event Manager Task.

At system initialization, the Modem Manager Task opens its communications port, and conducts modem start-up diagnostic tests.

Figure 12:
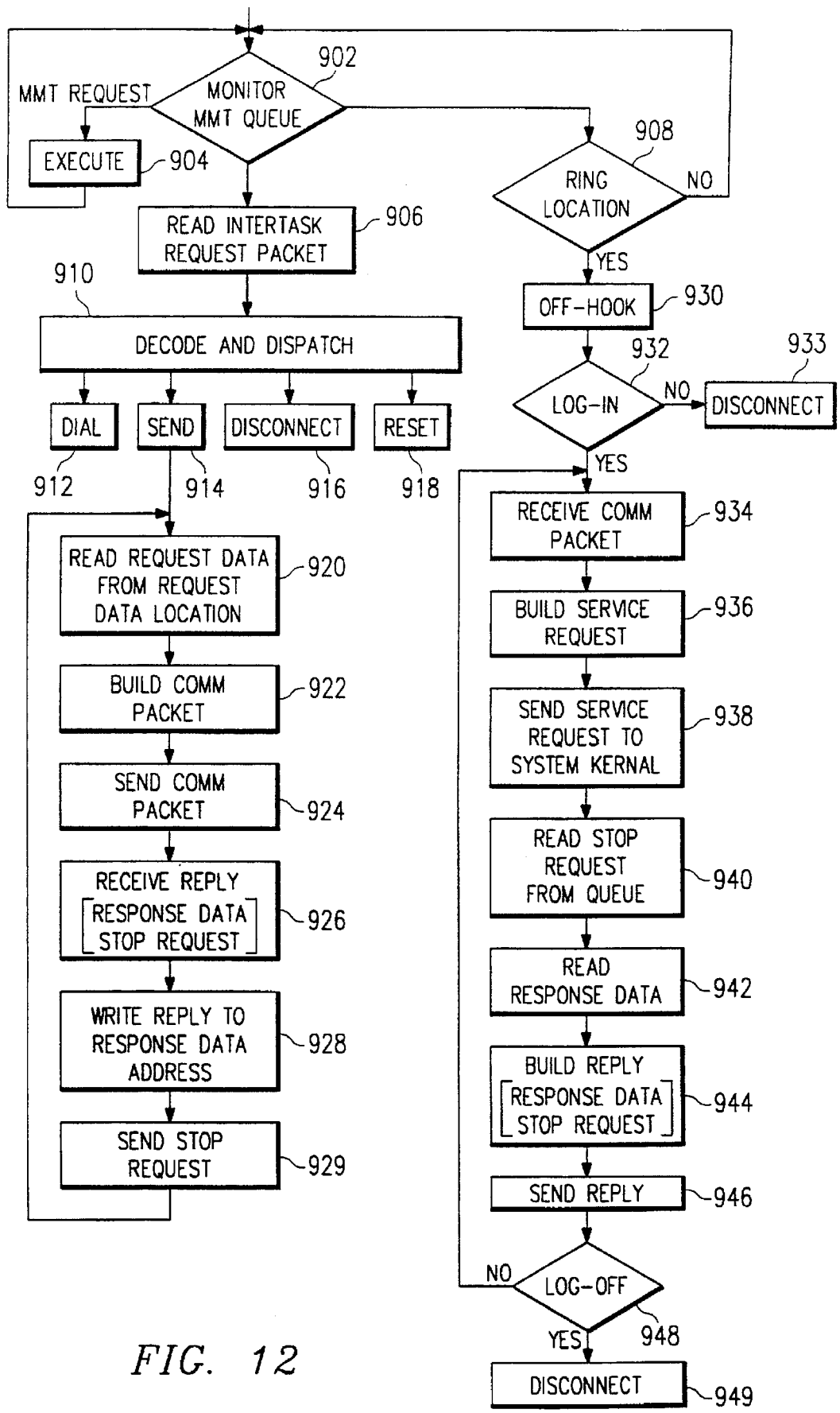
FIG. 12 is a program flow diagram of the Modem Manager Task.

FIG. 12 is a program flow diagram for the Modem Manager Task. The task continually monitor (902) its task queue to detect either (a) intertask request packets written into the queue by the System Kernal, or (b) a ring indication. When an intertask request packet is written into the Modem Manager Task queue, the Task reads (904) the packet, and decodes the function code and dispatches (906) the request to an appropriate modem control routine: Dial, Send, Disconnect and Reset. A communications session will always be initiated with a Connect request directed to the Modem Manager Task, which executes the request by dialing the number specified by the request data (typically the host), and in conjunction with the host Modem Manager Task, establishing a line connection between the two systems.

Typically, when the remote Event Manager Task is advised (with a stop semaphore) by the Modem Manager Task that the host answered the call and a line connection is made, the Event Manager Task sends, via the Modem Manager Task a Log-In ID that establishes an active communications link between the two systems. Once an active communications link is established, the remote/host file transfer procedure for communicating negative status and customer records is as follows.

The remote Event Manager Task sends a request for global update of a record to the host Data Manager Task, writing the record into a specified request data location. The remote System Kernal builds an intertask request packet and routes it to the remote Modem Manager Task. The Modem Manager Task reads (920) the request data from the location specified in the intertask request packet, and builds (922) a corresponding communications packet, including both the request and the request data. The communications packet is sent (924) to the host Modem Manager Task, and the remote Modem Manager Task waits for a reply.

When the Modem Manager Task receives (926) a reply from the host, which includes both response data (such as an acknowledgement) and a stop request, the response data is written (920) to the specified location for response data, and the stop request is sent (929) to the System Kernal, which sets the appropriate semaphore flag.

This communication procedure is continued so long as requests are sent to the Modem Manager Task (920). A remote/host file transfer session is terminated by the remote Event Manager Task sending to the remote Modem Manager Task a disconnect request (916).

The host and remote Modem Manager Tasks cooperate to establish a communications link as follows. A communications session is initiated by a dial request from the remote Event Manager Task is directed to the remote Modem Manager Task, which responds by dialing the host.

A ring indication at the host modem is detected (908) by the host Modem Manager Task, which directs the modem into an off-hook condition (930), establishing a remote/host connection.

The remote Event Manager Task then sends an appropriate log-in identification (932).

File transfer communications are commenced when the host Modem Manager Task receives (934) a communications packet from the remote Modem Manager Task. The host Modem Manager Task builds (936) a corresponding service request that is sent (938) to the host System Kernal.

The service request is directed to the designated responding task, such as the host Data Manager Task, which executes the request and provides both response data and a stop request. The host Modem Manager Task reads (940) the stop request from its queue, and reads (942) the response data from the specified location.

The host Modem Manager Task then builds (944) an appropriate reply packet (including the response data and the "stop" request), and sends (946) the reply to the host Modem Manager Task. The next communication to the host Modem Manager Task will either be a Disconnect instruction (948) or another communications packet.

The Modem Manager Task implements remote/host communications functions in a manner that is essentially transparent to the other tasks and the System Kernal. That is, intertask communications between a remote task and a host task are accomplished in a manner identical to intertask communications between tasks running in the same check transaction processing system, except that both the remote and the host System Kernal are involved in the intertask communication, as are the remote and host Modem Manager Tasks. However, the communications function provided by the remote and host Modem Manager Tasks is essentially transparent to the other tasks running in either the remote or the host. For example, the remote event subtask sends requests in the form of service requests to the host Data Manager Task just as it would send requests to the remote Data Manager Task. Specifically, the remote event subtask builds a request to the host DMT, and sends the service request to the remote System Kernal. The remote System Kernal builds a inner task request packet and places it in the remote MMT task queue. The remote MMT task reads the intertask request packet and builds a communications packet for the request to the host DMT (including function code, request data and stop semaphore flag). The remote MMT transmits the communications packet to the host MMT, which builds a corresponding service request for the host System Kernal. The host System Kernal builds an intertask request packet that is placed in the host DMT task queue. The host DMT retrieves the intertask request packet, which constitutes a request from the remote event subtask, and executes it in the same manner that it would a request from the host event subtask, writing response data into the specified response data location and sending a stop request to the host System Kernal. The host System Kernal, recognizing the stop request as being directed to the remote event subtask, builds an intertask packet with both the response data and the stop request and writes into the remote MMT task queue.

The remote MMT reads the intertask request packet, builds a communications packet and sends it to the remote MMT. The remote MMT writes the response data into a specified location in the data area for the Event Manager Task, and sends the stop request to the remote System Kernal. The remote System Kernal sets the specified stop semaphore, notifying the remote event subtask that response data from the host DMT is available, completing the request/ response cycle.

4.0 Alternative Embodiments

While the check transaction processing system has been described in connection with a preferred embodiment, other embodiments within the spirit and scope of the invention as defined by the following claims will be apparent to those skilled in the art.

For example, in the case of multiple-store systems, the preferred embodiment includes separate, essentially autonomous check transaction processing systems at each store site, thereby permitting each store to establish and maintain an essentially local customer database, and limiting off-site data communications activities to remote/host file transfers for global update. However, the local customer database (and associated disk system) need not be located at the store site, but may be remote from the stores' transaction terminal network (such as by locating it in a central office) so long as: (a) transaction terminal response time is not adversely affected and, (b) the essentially local character of the customer database for each is maintained.

The preferred embodiment's implementation of a multi-tasking system using a System Kernal for task-switching and intertask communications, can be readily adapted to operate under a commercial, multi-tasking operating system. These operating systems provide the task switching and intertask message communications functions performed by the System Kernal. Adapting the CTPS multi-tasking program to a commercially available multi-tasking operating system is well within the programming capabilities of those skilled in the art. Each program task would be modified in a conventional manner to accommodate the specific message communication function implemented by the multi-tasking operating system.

5.0. Targeted Marketing Functions 5.1. Automatic Building Of A Database For A Retail Store Marketing Program. Copending patent application Ser. No. 07/826,255 discloses manually inputting customer information, such as a customer's checking account number, into a database for various purposes. However, previous techniques of building a database from checks required a store employee to physically review the name and address preprinted on each check and type in certain parts of that name and address to try to determine if the name matched a name and address previously stored in the database. For example, after typing in the last name Jones, it would be discovered that there are multiplicity of Jones previously stored in the database. The name Jones would then have to be refined by typing in the names or initials which again might produce a multiplicity of matches. The information could then be further refined by imputing the street address to match along with the full name and initials.

If a grocery store for example, has a volume of several thousand check customers per day, this manual database building technique would mean a substantial amount of labor and time required to manually key in the name and address information to find out if, in fact, that record was already in the database and was complete. If the database was incomplete, the new information would have to be manually loaded into the database.

The present invention provides a method which may be accomplished utilizing the automatic check reader 119 in order to automatically build a database for use in a retail store marketing program. With use with the system, a customer's check is quickly scanned by the check reader 119 of the invention at the point-of-sale, or at another suitable location within the store. Due to the unique nature of the reader 119, all checks from all banks can be read and the customer identification number can be detected in any MICR location. Moreover, changes in bank transit codes and other identification changes can be automatically detected by the system so that the customer may be tracked, as previously described. The detected unique customer identification code is then transmitted to the host computer 110 which stores a previously stored database of unique customer identification codes. The detected unique customer identification code is then compared against the stored database. The system detects the occurrence of a match between information in the stored database and the detected unique customer identification code. When a match occurs, a determination is made if all necessary predetermined identification criteria related to the detected unique customer identification is in the stored database. Specifically, a determination is made if the full address and the telephone number of the detected identification code was previously stored in the database.

If the predetermined customer identification data is found in the stored database, a signal is transmitted from the host processor 110 to the POS terminal 120 to provide a display that the customer record is complete and that no further data is required, or in the alternative a signal may be transmitted in only those instances when additional information is required to complete the database criteria. If an indication is provided that the predetermined identification criteria is not contained in the database, such as lack of address information or the like, a signal is generated to the POS terminal 120 to indicate that insufficient identification criteria exists. The store personnel may then input the required additional identification criteria into the database. The additional identification criteria is then entered into the database of the host processor 110 for storage in conjunction with the unique customer identification code. This entering of additional identification criteria will normally be done "after hours" by setting aside the check in question and entering the data in a "back room" in the store. The system also generates information about the date and amount of the transaction, which is also stored in the database.

Thus, the present system may continuously build an up-to-date database which contains relevant information about the frequency of the customer's transactions, the amount of the transaction, along with the current address and information. As will be subsequently described, this database may be used for various types of targeted marketing in order to enhance the retail store's marketing.

Figure 13A:
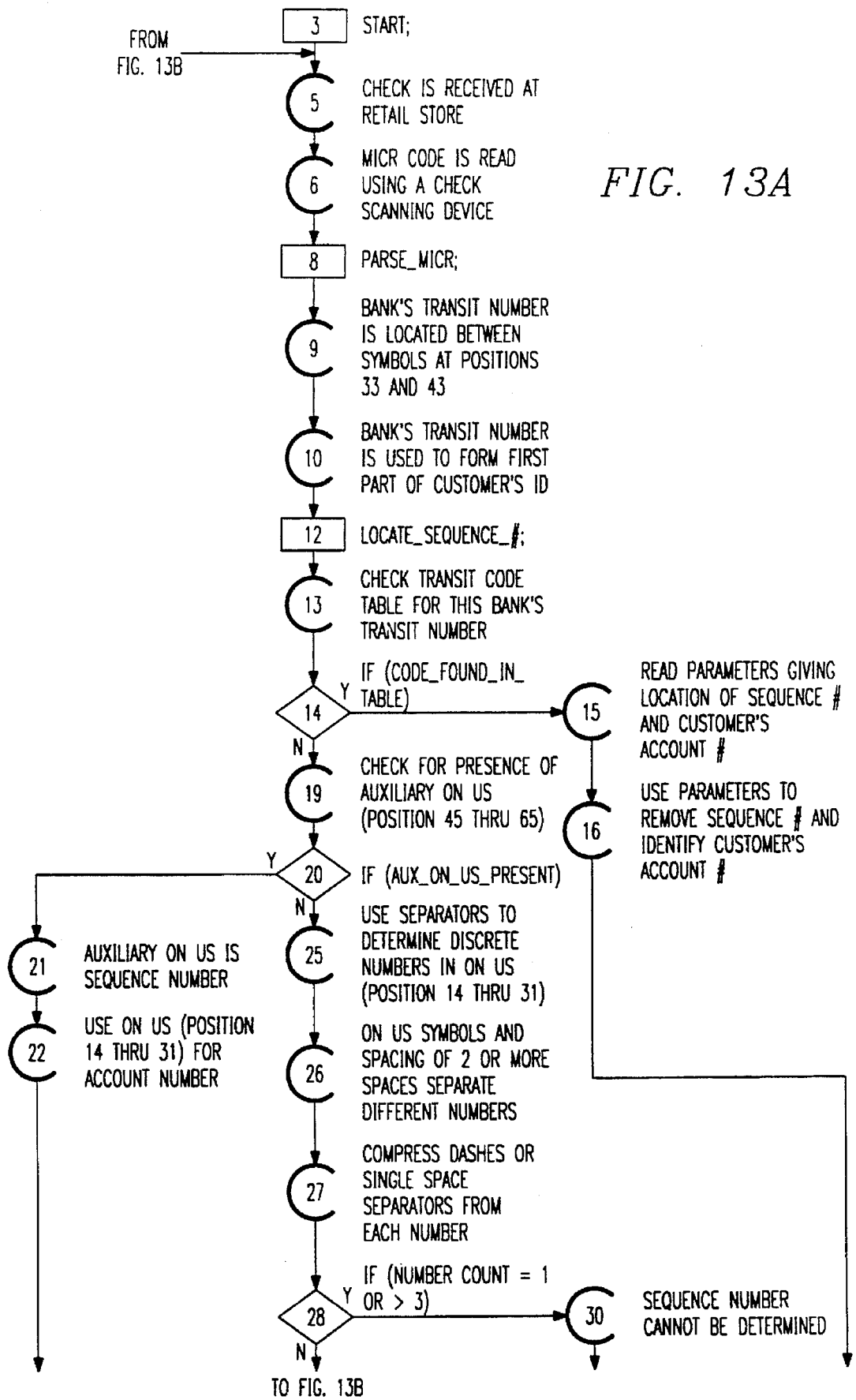
FIGS. 13A and B are a program flow diagram of the Build-Check-Database subroutine used to build a database.
Figure 13B:
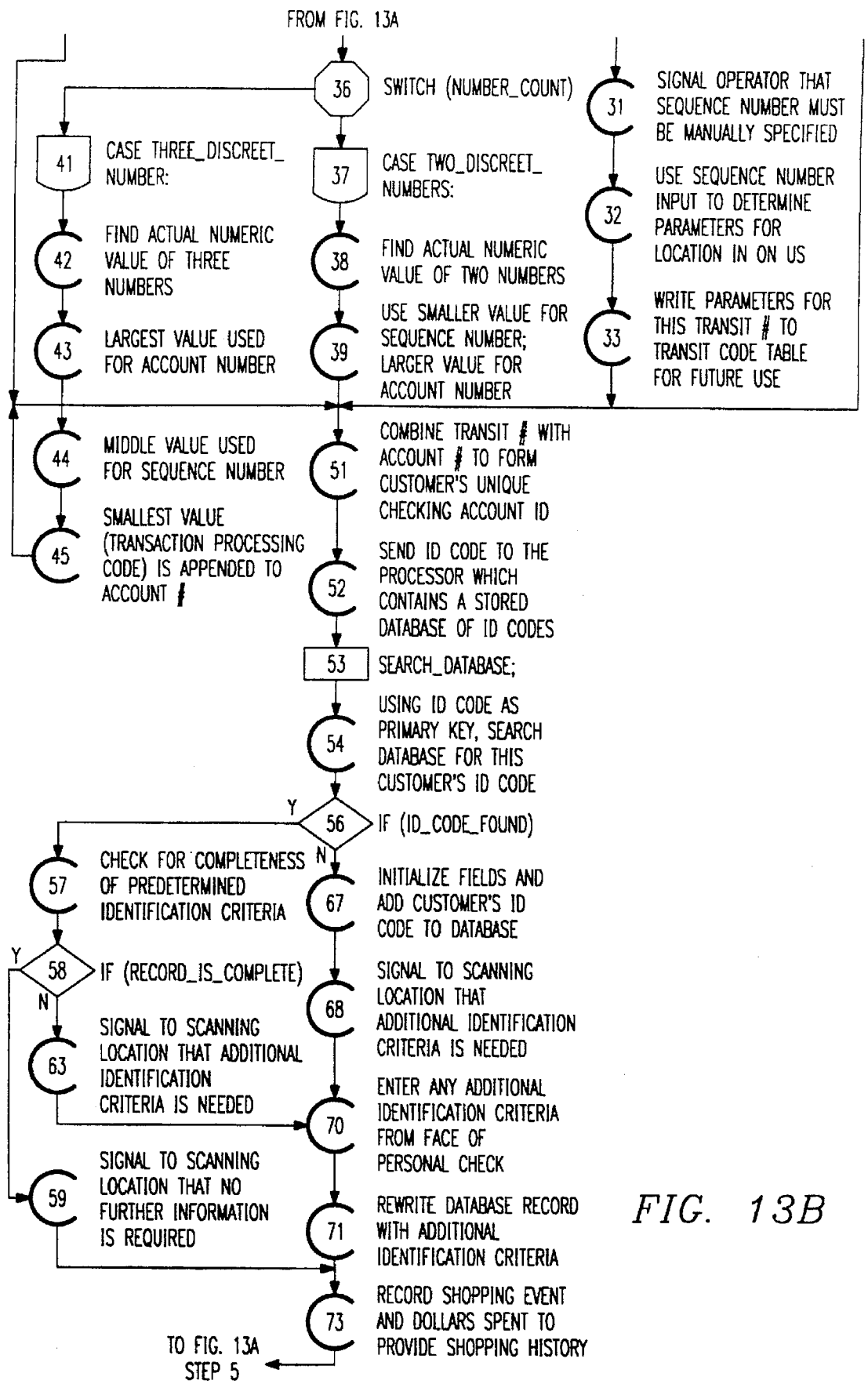

FIGS. 13A and B describe this aspect of the present invention, which is accomplished in conjunction with the present check reader 119 which can detect a customer account number in the MICR check code, regardless of location therein, as previously noted. An explanation of the features of FIGS. 13A and B are as follows:

| Step | Description |
|---|---|
| 3 | Beginning a process being flowed. |
| 5 | Check is taken for tendering purchase at retail store. |
| 6 | Scanning device is used to read the MICR code from the bottom of the check. |
| 8 | MICR code must now be parsed for meaningful data. ANSI standards specify the following field locations within MICR band:<br>Amount field   1–12<br>On Us   14–31<br>Transit   33–43<br>Auxiliary On Us   45–64 |
| 9–10 | Use transit field for the first part of the customer's ID number. |
| 12 | The check's sequence number (which matches the number on the top right hand corner of the check) must be located in order to determine the customer's bank checking account number. |
| 13–16 | A variable length, dynamic TRANSIT CODE TABLE is maintained on disk for checks that cannot be successfully parsed. The index key for this table is the bank's transit number. Included for each table entry are the beginning and ending positions of the sequence number within the MICR band. The system will prompt the operator for the sequence number if it cannot determine its location within the On Us field, and then add the entry to the TRANSIT CODE TABLE. The modifications to the TRANSIT CODE TABLE and/or the TABLE may be maintained and downloaded from another computer. |
| 20–22 | Data in the Auxiliary On Us field, otherwise indicated in the TRANSIT CODE TABLE, is the check sequence number. This would indicate that all data in the On Us field make up the customer's bank account number. |
| 25–27 | Parse On Us field. Use any data within positions 13 through 32 as the On Us field. Discrete numbers are usually divided with 2 or more spaces or the ANSI On Us character. Embedded single spaces and the ANSI MICR dash are removed from within said discrete numbers. |
| 28 | Test for number of discrete numbers parsed from the On Us field. |
| 30–33 | If one or more than three discrete numbers are located in the On Us field, the sequence number is either not present or is embedded in such a way that its location cannot be determined. The operator enters the sequence number including any leading zeros. The system can then determine the relative position of the sequence number in the On Us field and stores this as an additional entry to the TRANSIT CODE TABLE. |
| 37–39 | If two discrete numbers are located in the On Us field, unless otherwise indicated in the TRANSIT CODE TABLE, the number with the lesser value is the check sequence number, and the number with the greater value is the customer's checking account number. |
| 41–45 | If three discrete numbers are located in the On Us field, unless otherwise indicated in the TRANSIT CODE TABLE, the number with the greatest value is the customer's checking account number. The smallest value in the Transaction Processing Code and is |

| Step | Description |
|---|---|
| | appended to the end of the checking account number. The middle value is the check sequence number. |
| 51 | Once the bank's transit number and customer's checking account number are parsed from the MICR band, they are extracted and combined (transit number followed by account number) to form the customer's unique checking account ID. |
| 52–54 | This ID is used as the primary key for a customer database on disk indexed by checking account ID. In this database building process, the key is passed to the processor and the database is searched by checking account ID key. |
| 57–63 | If a record exists in the database for the customer with this checking account ID, the completeness of predetermined identification criteria is checked and the result is signaled back to the operator. |
| 67–68 | If no record exists, one is created for this checking account ID and the operator is signaled the record is incomplete of predetermined identification criteria. |
| 70–71 | If signaled to do so, operator enters additional information from off of the face of the check. The updated record is rewritten in the database. |
| 73 | Shopping event and dollars spent is recorded in order to build a shopping history for each customer's record. |

5.2. Targeted Marketing Program. It has been previously known to utilize marketing programs wherein users of a retail store's services are targeted to attempt to induce the customers to make additional purchases from the retail store. What has not before been possible, however, is to allow a retail store owner to target only non-customers. If such were possible, store owners would not waste mailing and marketing expenses on people in their targeted geographic area who had been previous customers. In other words, the retailer would be able to use his marketing dollars to attempt to entice non-customers or infrequent customers to visit the store.

Figure 14A:
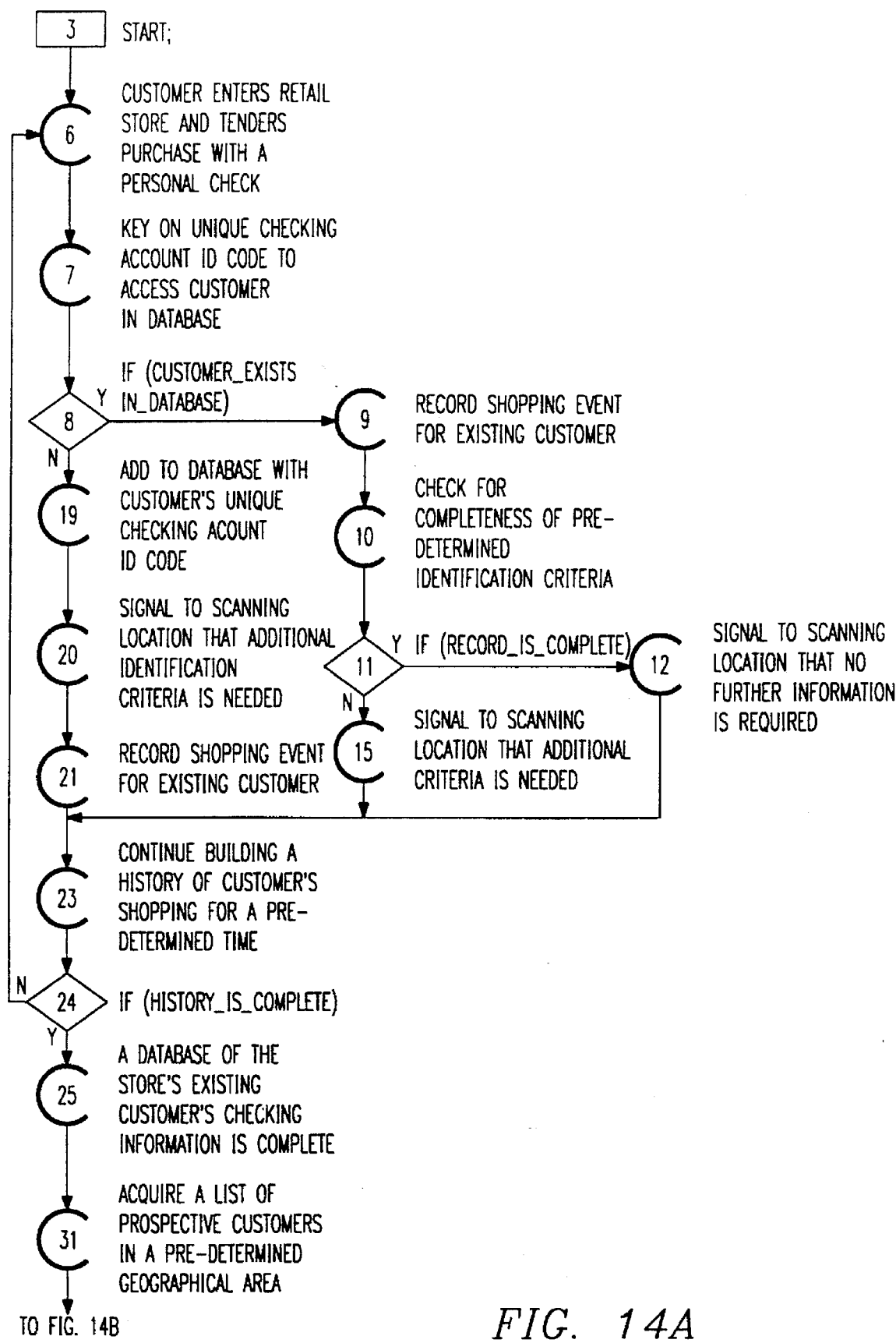
FIGS. 14A and B are a program flow diagram of a non-customer database building technique.
Figure 14B:
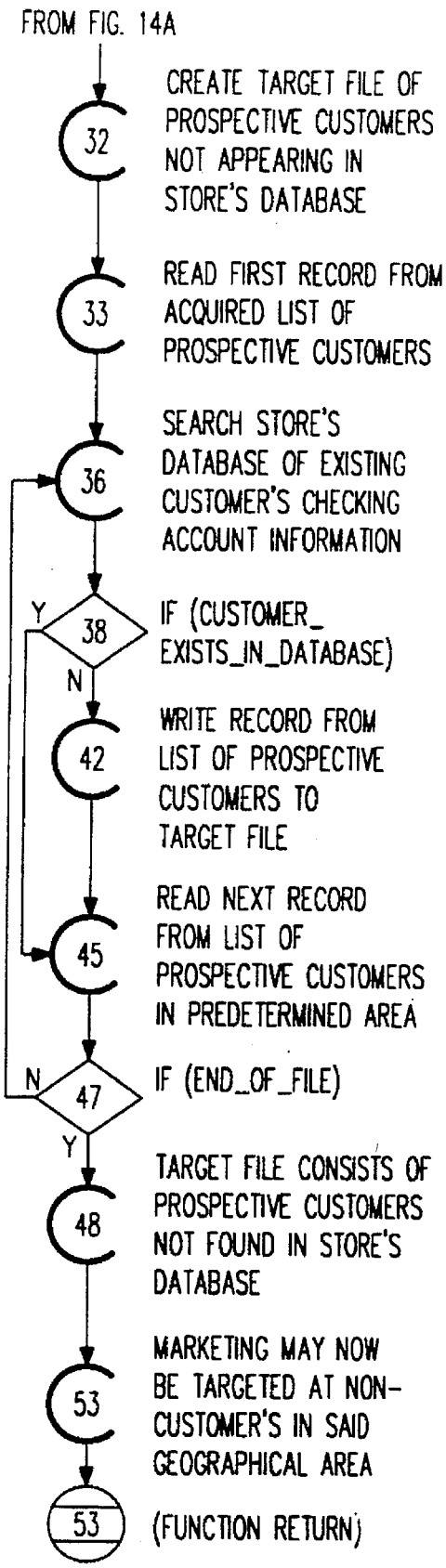

FIGS. 14A and B illustrate a software program subroutine operable to be performed in the host processor 110 in order to purge existing customers from a database. In operation, the system of the present invention is utilized so such that the check reader 119 automatically scans a customer's check and inputs the customer's unique identification number based upon the customer's checking account number into the system. The specific steps of the routine of FIGS. 14A and B are described in detail as follows:

| Step | Description |
|---|---|
| 3 | Beginning of process being flowed. |
| 6 | Check is taken for tendering purchase at retail store. |
| 7 | Once the bank's transit number and customer's checking account number are parsed and extracted from the MICR band, they are combined (transit number followed by account number) to form the customer's unique checking account ID. This ID is used as the primary key for a customer database on disk indexed by checking account ID. |
| 8–15 | If a record exists in the database for the customer with this checking account ID, the completeness of predetermined identi- |

| Step | Description |
|---|---|
| | fication criteria is checked and the result is signaled back to the operator. Shopping event and dollars spent are recorded in order to build a shopping history for each customer's record. |
| 19–20 | If no record exists, one is created for this checking account ID and the operator is signaled the record is incomplete of predetermined identification criteria. |
| 23–25 | Shopping event and dollars spent are recorded over a period of time sufficient in length to get a good representation of the store's customer base. |
| 31 | A file containing a complete list of residents in a predetermined geographic area is obtained from a third party. |
| 32 | Create an empty TARGET FILE for writing records of prospective customers not appearing in store's database. |
| 33 | Read FIRST record from the file containing a complete list of residents in a predetermined geographic area. |
| 36 | Search in the store's database for to determine if this household is present in the store's database. |
| 38–42 | If this household is not contained in the store's database, write this record said TARGET FILE of prospective customers not appearing in the store's database. |
| 45–47 | Read the NEXT record from said list of prospective customers in a predetermined geographic area. If END OF FILE marker is found then proceed to step 48, otherwise LOOP back up to step 36. |
| 48 | Said TARGET FILE now contains a list of prospective customers from a predetermined geographic area that were NOT contained in the store's active list of customers. |
| 53 | Marketing may now be targeted toward this list of non-customers, such as mailing of inducement coupons or advertising. |

In summary, it may be seen that the technique of FIGS. 14A and B provides a method for retail store marketing which begins with the stored database of existing customers of the retail store which has been accumulated in the manner previously described. The database includes each customer's checking account identification number for use as a unique customer identification code, along with additional customer identification data such as home address, telephone number and the like. Each time a retail customer enters the retail store and makes a purchase, the unique customer identification code of the customer is detected by the present system. Comparison is made of each entered unique customer identification code with the stored database. A list of prospective customers of the retail store in a predetermined geographical area is obtained through conventional sources and is stored in the host processor 110. Comparison is made of the stored database with the list of prospective customers. All data is eliminated from the list of prospective customers which relates to information contained in the stored database, such that a non-customer database is produced which contains data relating only to prospective customers who do not appear on the stored database.

The present system generates a non-customer database which would allow the mailing of advertising material in a geographic area to customers who have not previously shopped, or who have infrequently shopped at the retail store.

5.3. Infrequent Shopper Database And Marketing Technique. Competition among retail stores has dramatically increased such that targeted marketing is becoming increasingly important. Historically, such retail stores such as grocery stores have relied upon a loyal base of shoppers who have shopped at that particular establishment over a long period of time. However, with increased competition, it has now been determined that many shoppers frequent many different stores, particularly grocery stores, based upon coupons or price differentials at the time.

For example, Table 5 attached hereto illustrates customer shopping frequency data which was accumulated by the present system at an actual grocery store over an eight week period in 1991. Surprisingly, it was found in this particular store that 55% of the store's customers during this period only visited the grocery store one time. Only a few percentage points of the customers visited the store over seven times during that period. Specifically, for a total number of almost 30,000 customers over the eight week period, 8,794 customers only visited the store one time, while 2,776 customers visited the store only twice. Over 20% of the store's revenue during the period was based upon a single visit by 8,794 customers.

Table 6 illustrates an infrequent customer analysis of a different grocery store over an eight week period. This table illustrates that 24.3% of the total customer base, or 5,581 customers, averaged visiting the grocery store only 1.08 times during the eight week period.

This shopping data, which was developed using the present invention, has come as a surprise to grocery store owners. Many owners did not previously understand the large percentage of their business which was coming from infrequent shoppers. A need has thus arisen for a marketing technique to target these infrequent shoppers to encourage them to visit the grocery store more often. It will be understood that many families visit a grocery store approximately one time per week, and thus a visit of only once every eight weeks means that the store is being visited by many infrequent shoppers who are shopping at different stores. It could substantially enhance the store's revenues if these infrequent shoppers could be induced to shop more often at a particular store.

Figure 15A:
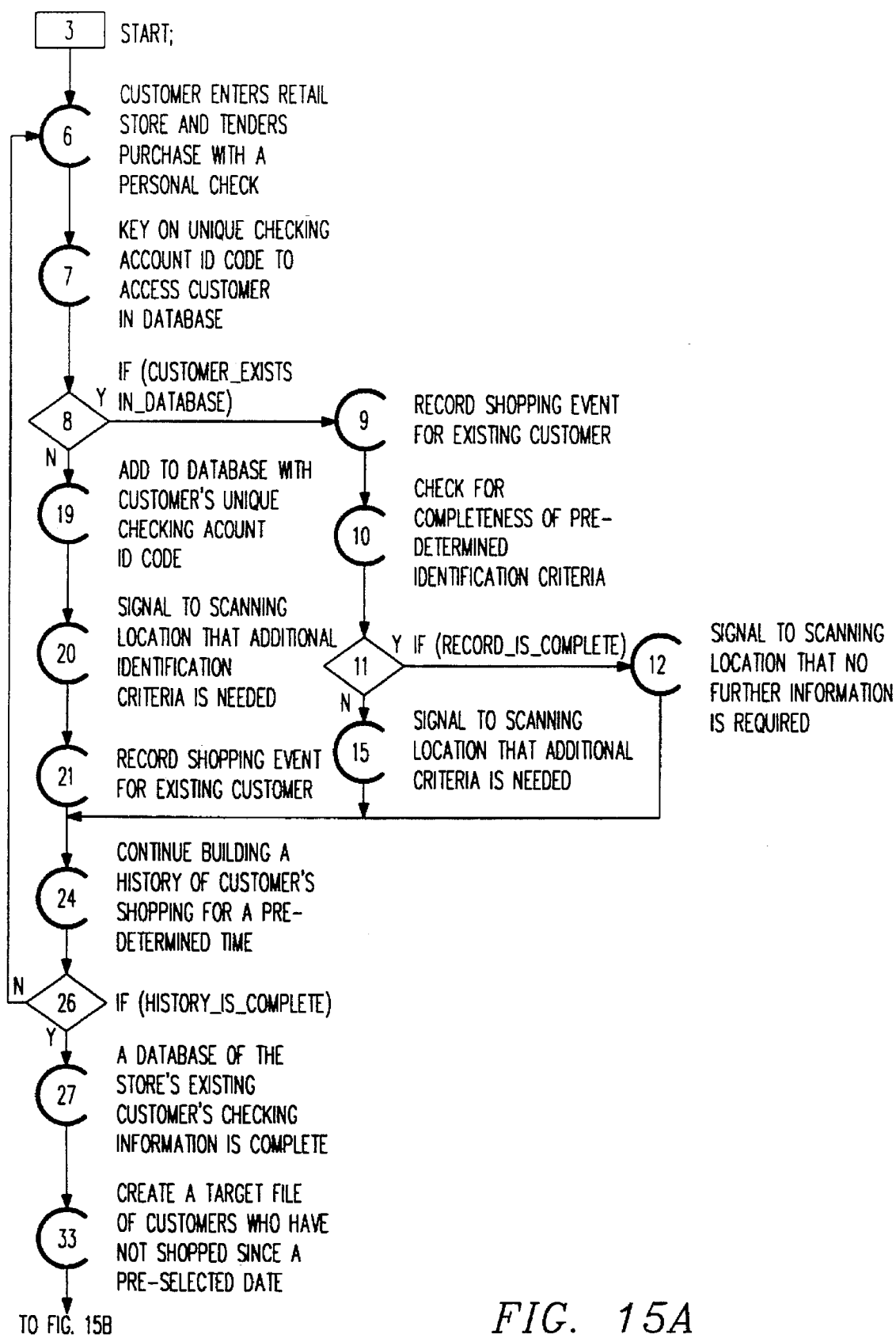
FIGS. 15A and B are a program flow diagram of a last shopping date database building technique.
Figure 15B:
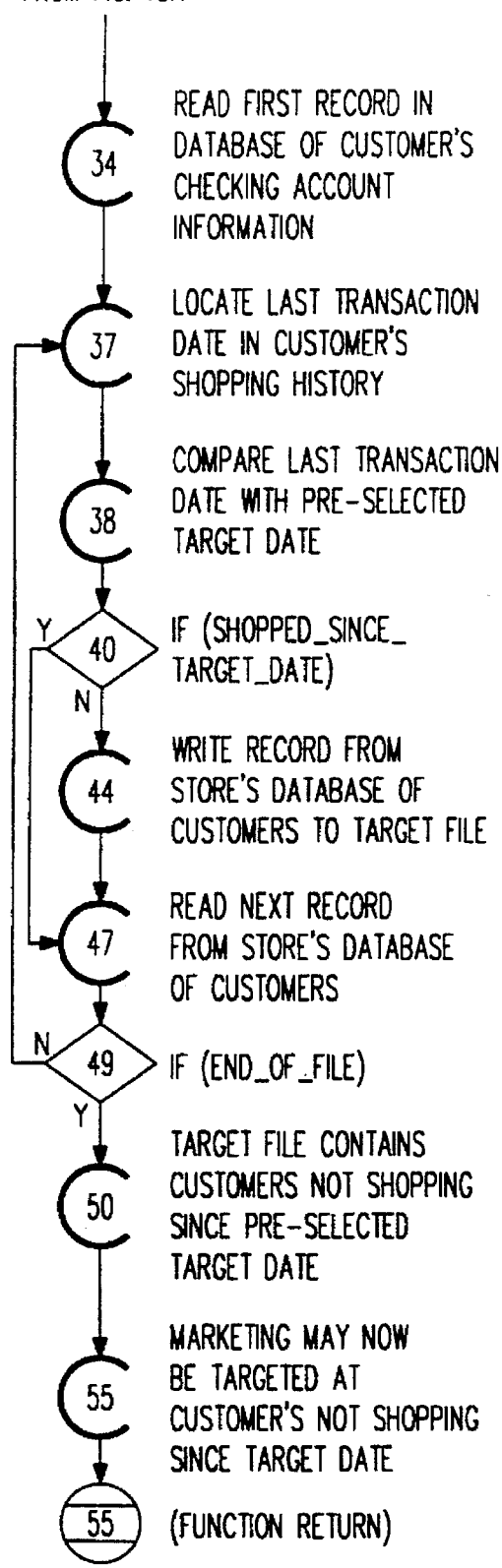

FIGS. 15A and B illustrate a marketing program which uses the system of the present invention to detect infrequent customers such that marketing may be directed at those infrequent customers. Specifically, the techniques shown in FIGS. 15A and B identify customers who have not shopped since a predefined target date, such as thirty days. After developing this list of infrequent shoppers, the store can then mail out direct mail enticements to the customer, such as providing them with coupons and the like if they shop at that particular store.

A description of the routine as shown in FIGS. 15A and B is described in more detail as follows:

| Step | Description |
|---|---|
| 3 | Beginning of process being flowed. |
| 6 | Check is taken for tendering purchase at retail store. |
| 7 | Once the bank's transit number and customer's checking account number are parsed from the MICR band, they are combined (transit number followed by account number) to form the customer's unique checking account ID. This ID is used as the primary key for a customer database on disk indexed by checking account ID. |
| 8–15 | If a record exists in the database for the customer with this checking account ID, the completeness of predetermined identification criteria is checked out and the result is signaled back to the operator. Shopping event and dollars spent are recorded in order to build a shopping history for each customer's record. |
| 19–20 | If no record exists, one is created for this checking account ID and the operator is signaled the record is incomplete of predetermined identification criteria. |
| 21–27 | Shopping event and dollars spent are recorded over a period of time sufficient in length to get a good representation of the store's customer base. |
| 33 | Create an empty TARGET FILE for writing records of customer's who have not shopped this store since a preselected shopping date. |
| 34 | Read FIRST record from the store's database of customer's check information and related shopping history. |
| 37–38 | Locate customer's LAST SHOPPING DATE from customer's shopping history and compare with said preselected shopping date. |
| 40–44 | If this customer's LAST SHOPPING DATE is prior to said preselected shopping date, write this record to said TARGET FILE of customer's who have not shopped this store since a preselected shopping date. |
| 47–49 | Read the NEXT record from said store's database of customer's check information and related shopping history. If END OF FILE marker is found then proceed to step 50, otherwise LOOP back up to step 37. |
| 50 | Said TARGET FILE now contains a list of the store's customers who have not shopped this store since a preselected shopping date, and may be used for targeted marketing such as mailings. |

It may thus be seen that the program of FIGS. 15A and B provides an efficient technique of building a customer database and mailing list using checks from a variety of different banks. In operation, a customer's checking account identification number is detected by the check reader 119 for use as a unique customer identification code. As previously disclosed, a unique aspect of this invention is that the present check reader can determine checking account identification numbers even if the proper spacing and symbology is not utilized. The system can also detect changes in bank transit numbers. The checking account identification number is entered into processor 110 which contain a database that maintains customer records including the customer's name and address, the checking account identification number, and customer shopping habits and transactional data over a preselected time interval. The checking account identification number is compared with the database. A response is generated by the processor 110 to signal the presence of the customer's checking account identification number or the failure to locate the customer's checking account identification number. A new record is then created in the database for that customer's checking account identification number in response to a processor 110 response indicating the failure to locate, so that the customer's name and address is entered into the record along with a shopping incidence and shopping data being recorded in the database concurrently. A list of customers is then generated in the database whose last transaction date is prior to a preselected interval of inactivity so that grouping or subgrouping of customers is available for marketing efforts.

Alternatively, the system may use dollar amounts to determine an "infrequent shopper". If the system determines that the cumulative dollars spent at the store by a specified customer is equal to or less than a predetermined dollar level within a predetermined time interval, the specified customer is designated as an "infrequent shopper".

As another alternative, the database is maintained with the shopping history for each unique check identification. Each time the system detects a check with a unique check identification number, it is checked against the database. If the last date shopped is prior to a preselected date, a signal is generated and transmitted to the POS. The check is then marked or set aside to be used to create a mailing list. Alternatively, the signal may be used to prompt the store clerk to disburse incentive coupons at the POS.

Figure 16A:
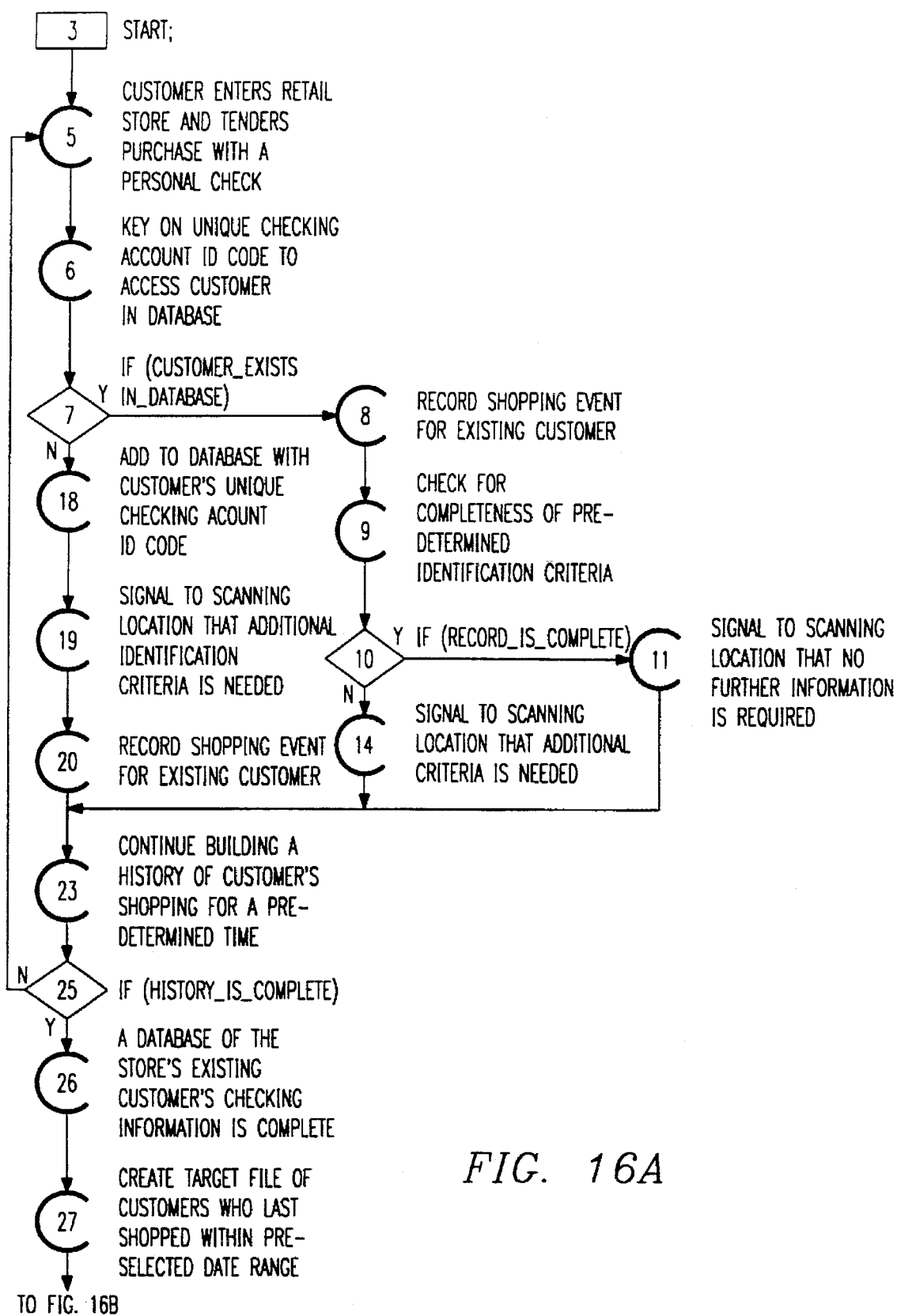
FIGS. 16A and B are a program flow diagram of a range of last shopping date database building technique.
Figure 16B:
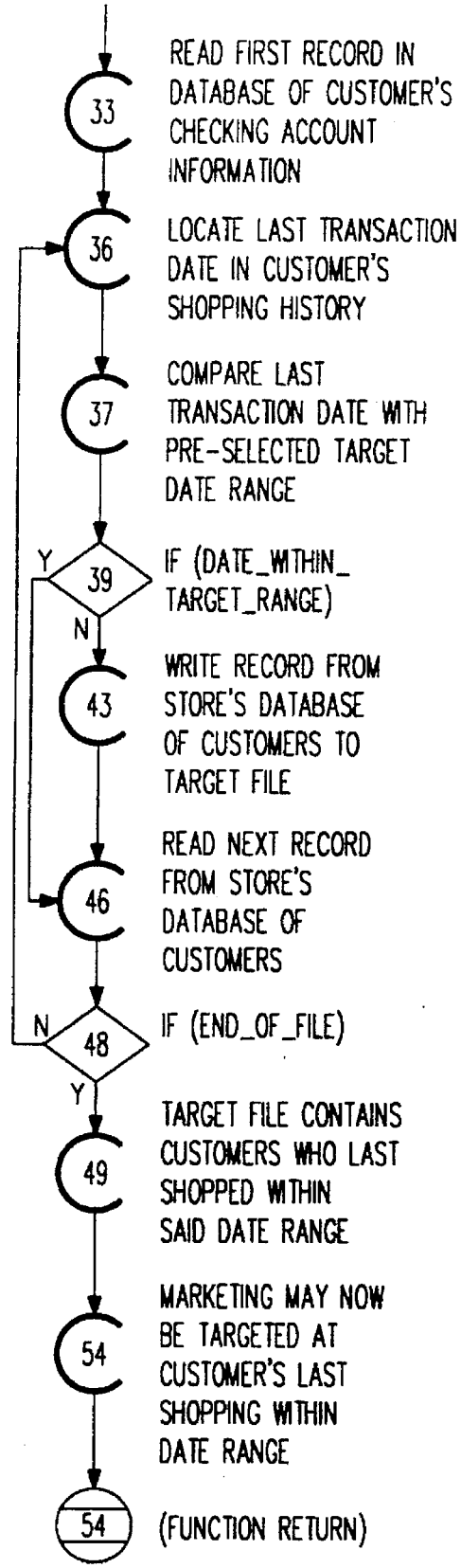

5.4. Marketing Based On Range Of Last Shopping Dates. As noted above, it would be advantageous to be able to selectively market to infrequent shoppers. FIGS. 15A and B illustrated a database building technique to obtain a list of infrequent shoppers based upon their last shopping date. FIGS. 16A and B illustrate a database building technique to provide a list of a store's customers whose last shopping date falls within a preselected shopping date range. For example, it would be possible using the techniques shown in FIGS. 16A and B to provide a list of customers whose last shopping date falls within a period of 30 to 60 days prior.

In accordance with the techniques shown in FIGS. 16A and B, a customer's checking account identification number is entered as a unique customer identification code by the check reader 119. Host processor 110 is programmed to store a database which includes a plurality of unique customer identification codes and check cashing history of prior customers of the retail establishment, including date of check transactions. The processor then compares each newly entered unique customer identification code against the stored database. A signal is generated to indicate the presence of a complete customer information record or of an incomplete customer information record as a result of the comparison. A second database is then generated which lists customers whose last unique customer identification code entry date falls within a preselected date range. A promotion may then be selectively offered by the retail establishment to customers within the second database. For example, coupons or other enticements may be mailed directly to the customers on the second database, or distributed at the POS.

FIGS. 16A and B are described in detail as follows:

| Step | Description |
|---|---|
| 3 | Beginning of process being flowed. |
| 5 | Check is taken for tendering purchase at retail store. |
| 6 | Once the bank's transit number and customer's checking account number are parsed from the MICR band, they are combined (transit number followed by account number) to form the customer's unique checking account ID. This ID is used as the primary key for a customer database on disk indexed by checking account ID. |
| 7–14 | If a record exists in the database for the customer with this checking account ID, the completeness of predetermined identification criteria is checked and the result is signaled back to the operator. Shopping event and dollars spent are recorded in order to build a shopping history for each customer's record. |
| 18–19 | If no record exists, one is created for this checking account ID and the operator is signaled the record is incomplete of predetermined identification criteria. |
| 23–26 | Shopping event and dollars spent are recorded over a period of time sufficient in length to get a good representation of the store's customer base. |
| 27 | Create an empty TARGET FILE for writing records of customer's who last shopped this store within a preselected shopping date range. |
| 33 | Read FIRST record from the store's database of customer's check information and related shopping history. |
| 36–37 | Locate customer's LAST SHOPPING DATE from customer's shopping history and compare with said preselected shopping date range. |
| 39–43 | If this customer's LAST SHOPPING DATE falls within the range of said preselected shopping date range, write this record to said TARGET FILE of customer's who have last shopped this store within a preselected shopping date range. |
| 46–48 | Read the NEXT record from said store's database of customer's check information and related shopping history. If END OF FILE marker is found then proceed to step 49, otherwise LOOP back up to step 36. |
| 49 | Said TARGET FILE now contains a list of the store's customers whose LAST SHOPPING DATE falls with a preselected shopping date range. |

In addition to the above, the selection criteria for an "infrequent shopper" may also include a required minimum dollar amount in a preselected time range.

Figure 17A:
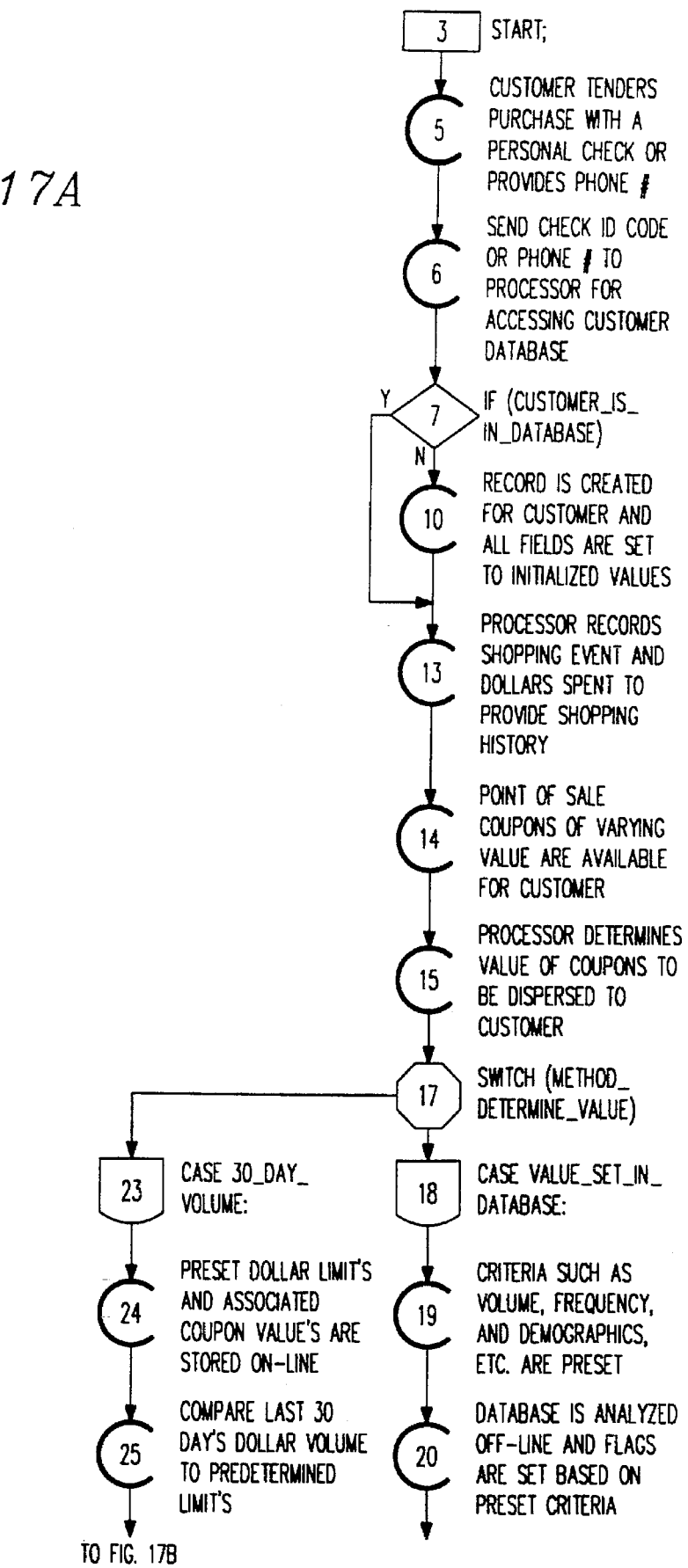
FIGS. 17A and B are a program flow diagram of a technique for distributing point-of-sale coupons based upon predetermined shopper criteria.
Figure 17B:
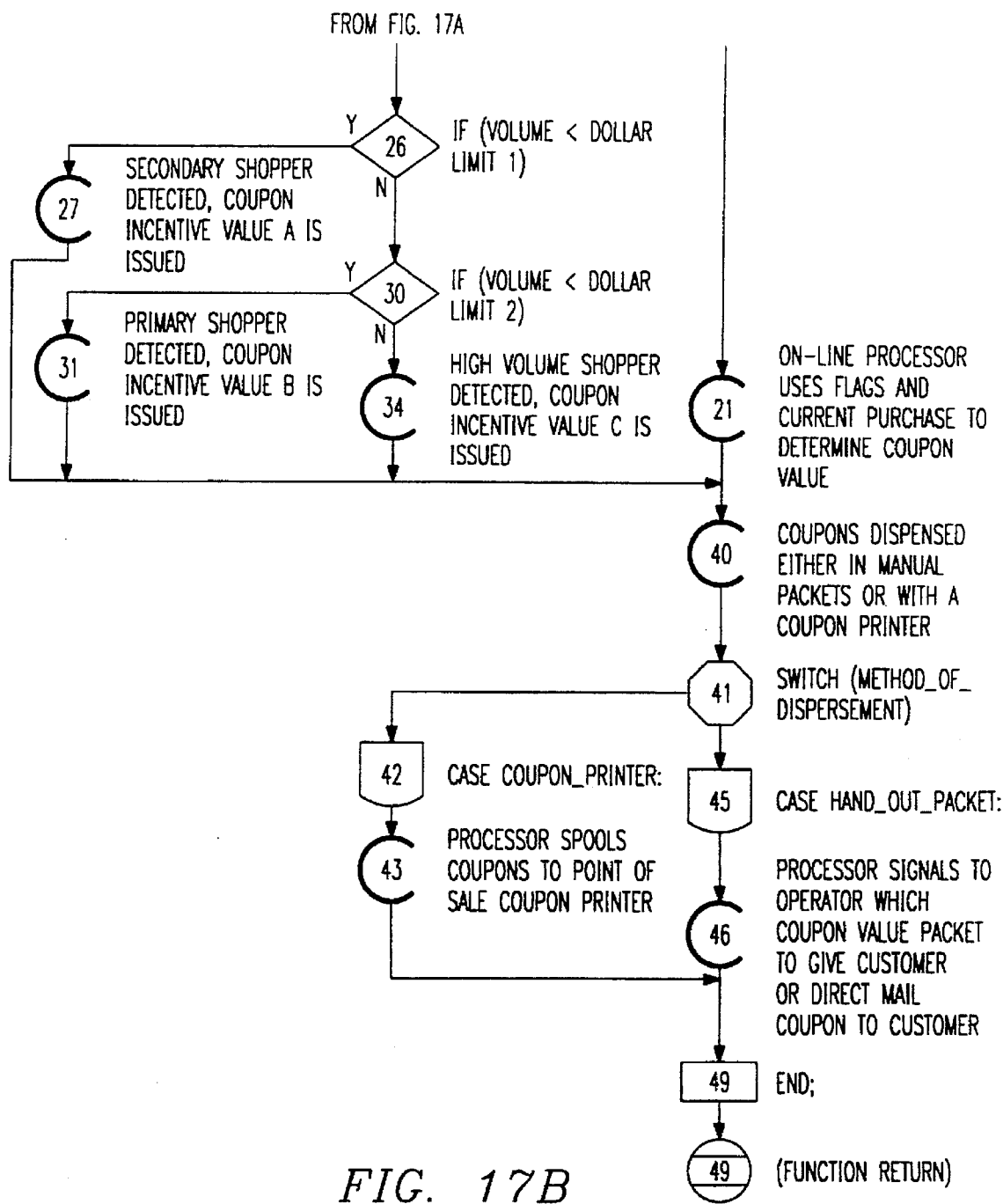

5.5. Dissemination Of Point-Of-Sale Coupons And Direct Mail Coupons Based Upon Shopping History. FIGS. 17A and B illustrate a program flow chart of a marketing technique utilizing the present invention, wherein coupons may be distributed to customers based upon the frequency of shopping, dollar volume or other criteria based upon the shopping habits of the customer. As previously noted, retail establishments such as grocery stores, using the present invention, can now determine the importance of inducing infrequent shoppers to shop and also the maintenance of existing customers. The technique shown in FIGS. 17A and B enables the stores to issue coupons and other inducements to customers based upon the shopping habits of the customer. For example, the technique shown in FIGS. 17A and B enables the store to reward a high volume shopper in order to hold on to especially good shoppers. Alternatively, the store can award a lesser incentive package to good shoppers in order to maintain a consistency such that each shopper receives a coupon package. Importantly, the technique enables a high incentive coupon pack to be delivered to a customer who is a secondary shopper or who is an infrequent shopper, in order to make them a primary shopper.

A detailed description of the operation of the technique illustrated by FIGS. 17A and B utilizing the present invention is as follows:

| Step | Description |
|---|---|
| 3 | Beginning of process being flowed. |
| 5 | Check is taken for tendering purchase at retail store. |
| 6 | Once the bank's transit number and customer's checking account number are parsed from the MICR band, they are combined (transit number followed by account number) to form the customer's unique checking account ID. This ID is used as a primary key for a customer database on disk indexed by checking account ID. |
| 10 | If no records exists, one is created for this checking account ID and the operator is signaled the record is incomplete of predetermined identification criteria. |
| 13 | If a record exists in the database for the customer with this checking account ID, the completeness of predetermined identification criteria is checked and the result is signaled back to the operator. Shopping event and dollars spent are recorded in order to build a shopping history for each customer's record. |
| 14–15 | The store has on hand coupons to be handed out at the point-of-sale. These coupons may be arranged into varying value packages. We will assume 3 different coupon packs for point-of-sale dispersement:<br>Coupon VALUE A: For customer who has been determined to be a SECONDARY shopper. This would be incentive to make them become a PRIMARY shopper.<br>Coupon VALUE B: For customer who has been determined to be a PRIMARY shopper. This would be a lessor incentive package to primarily maintain a consistency whereby everyone receives a package.<br>Coupon VALUE C: For customer who has been determined to be a HIGH VOLUME shopper. This incentive would be used as a means to hold on to especially good shoppers. |
| 17 | There are two methods for determining the coupon package to be dispersed at the point-of-sale. Steps 18–21 deal with preselected criteria analyzed OFF-LINE and downloaded to the front end computer. Steps 23–34 deal with ON-LINE determination based on prior 30 days shopping VS two preselected dollar LIMITS (LIMIT 1 and LIMIT 2). |
| 18 | OFF-LINE ANALYSIS: |
| 19 | Preselected criteria such as shopping volume, frequency, demographics, etc. along with how they relate to the Coupon offerings are set for OFF-LINE analysis. |
| 20 | Each record is analyzed against said preselected criteria and corresponding Coupon VALUEs are selected and flagged. Said Coupon VALUE information is then downloaded to the ON-LINE processor. |
| 21 | On the customer's next visit, ON-LINE processor uses said downloaded Coupon VALUE information to flag to clerk which point-of-sale Coupon VALUE package to disperse to the customer. Proceed to step 40 for METHOD OF DISPERSEMENT. |

-continued

| Step | Description |
|---|---|
| 23 | ON LINE 30 DAY ANALYSIS: |
| 24 | Two dollar limits are preselected, ie:<br>LIMIT 1 = 100.00<br>LIMIT 2 = 350.00 |
| 25 | Prior dollars spent for the previous 30 days are calculated and compared with said preselected dollar limits. |
| 26–27 | If prior dollars spent for previous 30 days is LESS THAN LIMIT 1, customer is considered a SECONDARY shopper; Coupon VALUE A is dispersed to customer. Proceed to step 40 for METHOD OF DISPERSEMENT. |
| 30–31 | If prior dollars spent for previous 30 days is GREATER THAN LIMIT 1, but LESS THAN LIMIT 2, customer is considered a PRIMARY shopper; Coupon VALUE B is dispersed to customer. Proceed to step 40 for METHOD OF DISPERSEMENT. |
| 34 | If prior dollars spent for previous 30 days is GREATER THAN LIMIT 2, customer is considered a HIGH VOLUME shopper; Coupon VALUE C is dispersed to customer. |
| 40–46 | Coupons are dispersed either with clerk manually handing indicated packet to customer or by ON-LINE processor spooling selected Coupon VALUE to a point-of-sale coupon printer, or by having the clerk mark the check with a code so that coupons may be subsequently distributed to the customer by direct mail. |

Many of the prior art marketing techniques require the mailing of coupons to customers after the targeted database has been developed. With the techniques shown in FIGS. 17A and B, coupon rewards and other incentives may be made at the time of the point-of-sale. The invention contemplates at least three different ways of accomplishing a coupon reward at the point-of-sale. One is to utilize display 124 (FIG. 2A) which displays information to the store employee to indicate what type of coupon or other incentive reward is to be dispensed, and the employee hands the coupons to the customer, or in the alternative the clerk/operator may mark or set aside the check for use as a source of a mailing list for distribution of incentives. As an example, as previously noted, let us assume that three coupon packs A, B and C have been developed, based upon the desire to provide different incentive rewards for a secondary shopper, a primary shopper and high volume shopper. Three stacks of these coupon packs are placed readily available to the store employee. When a shopper comes in and presents a check, the check is scanned through the check reader 119 and the host processor 110 utilizes the technique of FIGS. 16A and B to generate an indication of whether or not the shopper is a secondary, primary or high volume shopper. The display 124 then generates a display that says "This shopper is a primary shopper. Please give this shopper coupon pack B." The store employee would then hand the customer a coupon pack B. As other customers come through that are different types of shoppers, different coupons are provided to them. In this way, the present invention enables the store to discriminate between various types of customers in order to induce the infrequent shopper to come back, while maintaining the goodwill of good shoppers A third technique of distributing coupons utilizes a system to actually print, at the point-of-sale, coupons bearing the desired information based upon selected criteria. Commercially available printers may be used for generating coupons at a point-of-sale, such as disclosed in U.S. Pat. No. 4,723, 212 issued on Feb. 2, 1988 and entitled Method and Apparatus for Dispensing Discount Coupons or as further disclosed in U.S. Pat. No. 4,910,672 issued Mar. 20, 1990 and entitled Method and Apparatus for Dispensing Discount Coupons. As disclosed in the two aforesaid patents, systems may be provided to generate coupons at the point-of-sale based upon the type of product purchase. In the disclosures of the above-captioned two patents, a coupon relating to a particular type of a product is generated based upon a bar code reader determining that a triggering or competing product has just been purchased by the consumer. The same coupon dispensing apparatus described in the two aforesaid patents may be utilized to print the coupons as described in FIGS. 16A and B, but based upon the criteria and the operation of the present invention.

The present invention looks at the history of the shopper in question and induces the shopper to return based upon preselected criteria such as has the customer purchased above a certain amount of dollars, has the customer purchased between certain amounts of dollars or less than a certain amount of dollars, or has the customer purchased over a certain amount of merchandise over a period of time, or has the customer not been at the store to shop within a predetermined time interval. The present system provides a more efficient distribution of point-of-sale coupons, as an alternative to the circuitous and expensive route of mailing coupons.

5.6. Dissemination Of Point-Of-Sale Coupons And Direct Mail Coupons Based Upon Scanned Data.

Figure 18A:
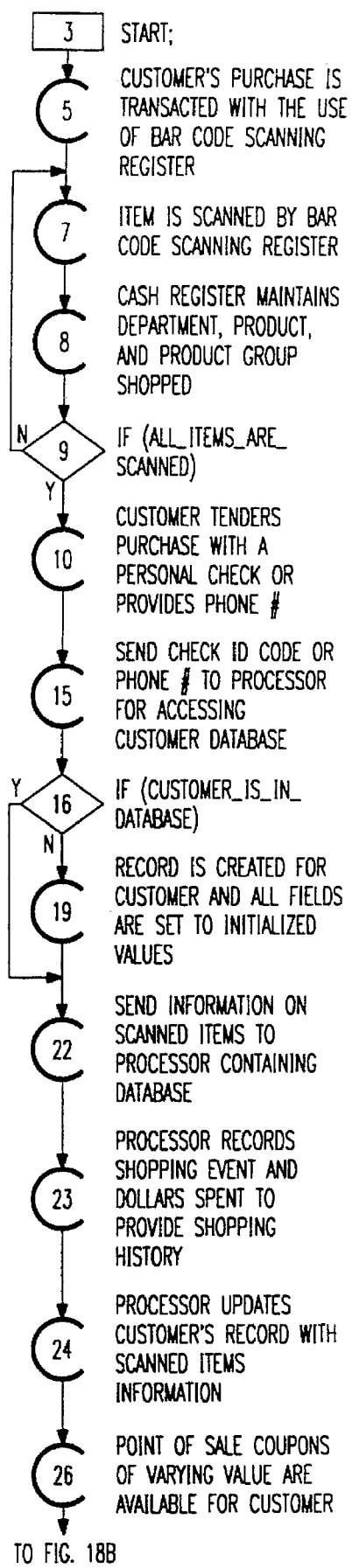
FIGS. 18A, B, and C are a program flow diagram for distributing point-of-sale coupons based upon the shopping habits of the customer in various departments of the retail store.
Figure 18B:
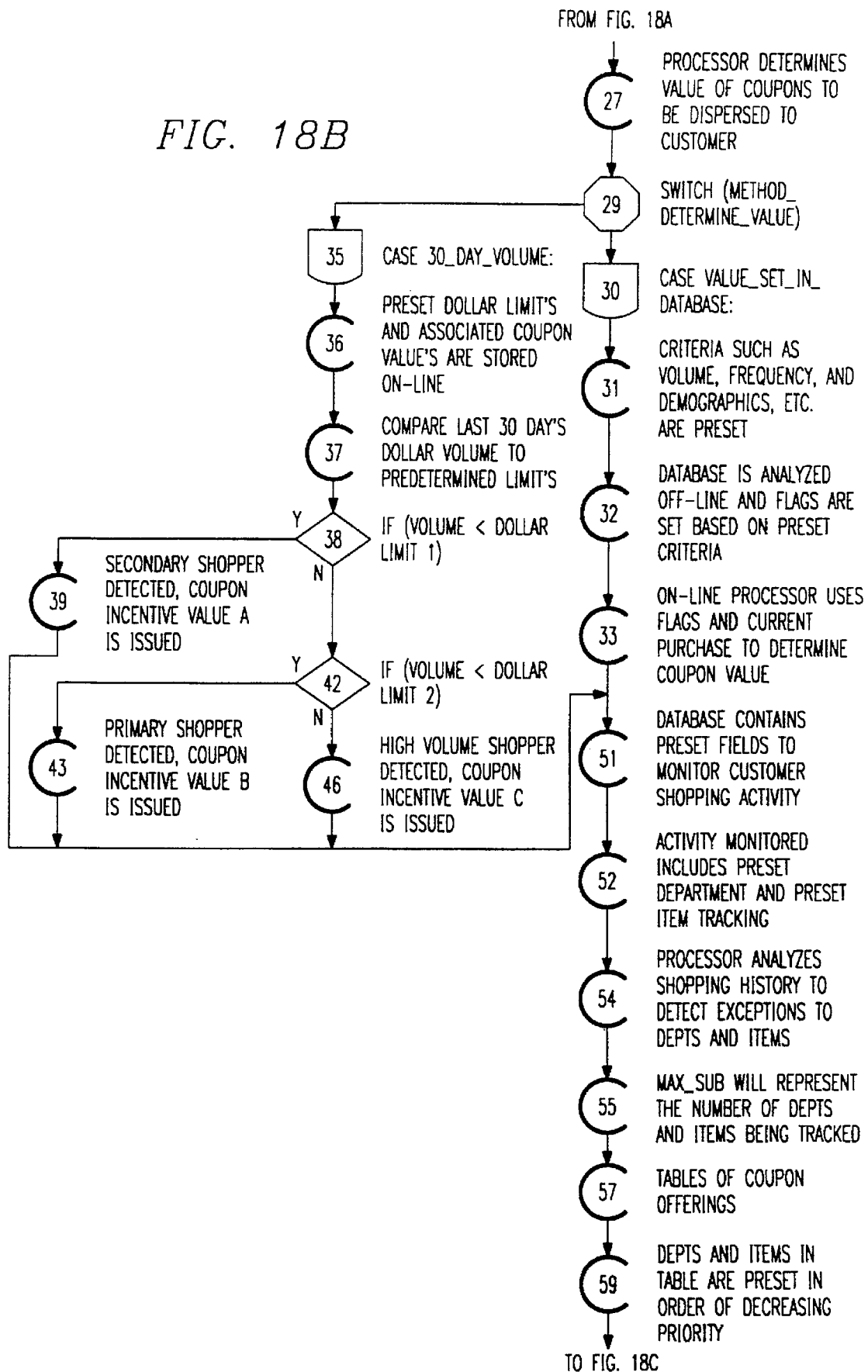

FIGS. 18A, B, and C illustrate a technique for generating coupons based upon the particular transaction currently being accomplished by the customer. The technique of FIGS. 18A, B, and C detect the particular store departments in which the products being purchased are located. This system requires the use of the bar code scanner to detect which products are being purchased, and which departments are being shopped by the customer. For example, the technique shown in FIGS. 18A, B, and C detects whether or not items have been purchased from the meat department, dairy department or. deli. Based upon data stored within the computer, the decision is then made as to whether to award a coupon and what type of coupon to award. For example, if the data illustrates that over a period of time a shopper shows a consistent failure to shop at the delicatessen, then when the customer's check identification is scanned into the check reader 119, the processor 110 pulls up the customer's history and generates a coupon to induce the customer to shop at the delicatessen the next time the customer shops. This inducing can be done by providing the customer with a very high value coupon used only for deli shopping.

Similarly, the stored data in processor 110 may contain information regarding particular product groups. If it is determined that the customer is a frequent shopper but does not purchase coffee, the data may determine that a coupon providing a large discount on coffee would be suitable to give to the customer. Alternatively, the system might determine that the customer had no history of buying a specific brand of coffee, and incentive coupons can be distributed for that brand of coffee. To provide this information, information regarding the particular product and the department of the product is generated by the bar code reader 123a, or through entry through the cash register, and transmitted to the host processor 110. The host processor 110 then identifies each particular product being purchased, compares it against the stored data tables and generates an indication of the type of coupon to be given to the customer. As previously noted, this indication from the host processor 110 may comprise a signal transmitted on the display 124 or the signal may be utilized to generate the actual printing of a coupon using the system similar to that shown in U.S. Pat. Nos. 4,723,212 and 4,910,672.

The present invention differs from the systems disclosed in the above-identified patents because, among other things, the present system generates coupons based upon the lack of purchase of a particular item by comparing against stored history for unique customer IDs, rather than because of the purchase of a particular item.

A more detailed description of the technique of FIGS. 18A, B, and C is as follows:

| Step | Description |
|---|---|
| 3 | Beginning of process being flowed. |
| 5–9 | Customer's purchase is transacted using bar code scanning cash register. As each item is scanned, said cash register maintains a record of preselected criteria for each item such a product, product group, department, etc. for the customer's purchase. |
| 10 | Check is taken for tendering purchase at retail store. |
| 15–16 | Once the bank's transit number and customer's checking account number are parsed from the MICR band, they are combined (transit number followed by account number) to form the customer's unique checking account ID. This ID is used as the primary key for a customer database on disk indexed by checking account ID. |
| 19 | If no record exists, one is created for this checking account ID and the operator is signaled the record is incomplete and predetermined identification criteria. |
| 22 | Send scanned data of said preselected criteria to the ON-LINE front end processor. |
| 23 | If a record exists in the database for the customer with this checking account ID, the completeness of predetermined identification criteria is checked and the result is signaled back to the operator. Shopping event and dollars spent are recorded in order to build a shopping history for each customer's record. |
| 24 | Processor updates customer's record with the said scanned information of preselected criteria. |
| 26–27 | The store has on hand coupons to be handed out at the point-of-sale. These coupons may be arranged into varying packages. We will assume 3 different coupon packs for point-of-sale dispersement: <br> Coupon VALUE A: For customer who has been determined to be a SECONDARY shopper. This would be incentive to make them become a PRIMARY shopper. <br> Coupon VALUE B: For customer who has been determined to be a PRIMARY shopper. This would be a lessor incentive package to primarily maintain a consistency whereby everyone receives a package. <br> Coupon VALUE C: For customer who has been determined to be a HIGH VOLUME shopper. This incentive would be used as a means to hold on to especially good shoppers. |
| 29 | There are two methods for determining the coupon package to be dispersed at the point-of-sale. Steps 30–33 deals with preselected criteria analyzed OFF-LINE and downloaded to the font end computer. Steps 35–46 deals with ON-LINE determination based on prior 30 days shopping VS two preselected dollar LIMITS (LIMIT 1 and LIMIT 2). |
| 30 | OFF-LINE ANALYSIS: |
| 31 | Preselected criteria such as shopping volume, frequency, demographics, etc. along with how they relate to the Coupon offerings are set for OFF-LINE analysis. |
| 32 | Each record is analyzed against said preselected criteria and corresponding Coupon VALUEs are selected and flagged. Said Coupon VALUE information is then downloaded to the ON-LINE processor. |
| 33 | On the customer's next visit, ON-LINE processor uses said downloaded Coupon VALUE information to flag to clerk which point-of-sale Coupon VALUE package to disperse to the customer. Proceed to step 40 for METHOD OF DISPERSEMENT. |
| 35 | ON-LINE 30 DAY ANALYSIS: |
| 36 | Two dollar limits are preselected, ie: <br> LIMIT 1 = 100.00 <br> LIMIT 2 = 350.00 |
| 37 | Prior dollars spent for the previous 30 days are calculated and compared with said preselected dollar limits. |
| 38–39 | If prior dollars spent for previous 30 days is LESS THAN LIMIT 1, customer is considered a SECONDARY shopper; Coupon VALUE A is dispersed to customer. Proceed to step 51 to determine WHICH coupons to disperse. |
| 42–43 | If prior dollars spent for previous 30 days is GREATER THAN LIMIT 1, but LESS THAN LIMIT 2, customer is considered a PRIMARY shopper; Coupon VALUE B is dispersed to customer. Proceed to step 51 to determine WHICH coupons to disperse. |
| 46 | If prior dollars spent for previous 30 days is GREATER THAN LIMIT 2, customer is considered a HIGH VOLUME shopper; Coupon VALUE C is dispersed to customer. |
| 51–52 | Customer's database record contains fields to monitor preselected shopping activities such as purchase of particular products, product groups, departments, etc. |
| 54 | Processor has determined what VALUE of coupons to be dispersed, now said database fields monitoring preselected shopping activities are used to determine which coupons in particular to disperse based upon exception to previous shopping activity. |
| 55 | MAX-SUB represents the number of said preselected items (products, product groups, departments, etc.) being maintained and monitored for shopping activity. |
| 56 | TABLES represent a table of coupons that represent incentives for each said preselected item (products, product groups, departments, etc.). TABLES are arranged in order of decreasing priority. |
| 61–70 | Step through each said-preselected item in decreasing priority and check for an exception in shopping activity. If the customer has not shopped this preselected item, this particular Coupon is chosen for dispersement. This process continues through said preselected items until the total value of Coupons chosen for dispersement meets or exceeds said VALUE as determined in steps 29–46. |
| 74–78 | If after stepping through said preselected items and the value of dispersement does not meet or exceed said VALUE as determined in steps 29–46, an alternate table of general incentive coupons in order of decreasing priority is stepped through until said VALUE is met or exceeded. |
| 83–88 | Coupons are dispersed either with ON-LINE processor spooling selected Coupons to a point-of-sale coupon printer or via Direct Mail. |

5.7 Second Alternate Embodiment of Payment Processing and Point-of-Sale Marketing System.

The previously described check verification system of FIGS. 1 through 18A–C has been found useful for verifying checks and providing targeted marketing as described herein. The second alternate embodiment to be hereinafter described provides similar functions, but enables the use of account numbers from a variety of financial payment or transaction instruments such as checks, credit cards and debit cards to be utilized as a customer identification number. Smart cards and marketing cards may also be utilized for the cash customer. This substantially enhances the breadth of uses of the present system and enables the retail store to track all customers whether or not they pay by check or not. The present system may thus be usable with checks, credit cards, debit cards, electronic checks (such as paperless check ACH), electronic benefits transfer such as food stamps, cards and the like, as well as proprietary merchant issued marketing cards for charging, check cashing identification or for marketing purposes which may or may not be magnetically encoded or bar encoded, as well as a smart card containing nonvolatile memory. Of course, as previously noted, such proprietary merchant issued marketing cards have not been found to work well in practice for targeted marketing, but the present system may be used to accept their customer identification codes in order to enhance the universality of the present system.

The present system provides automatically printed coupons at the point-of-sale, or alternatively, later mailed coupons, which are particularly targeted to a customer based upon his prior shopping history. Alternatively, an output might be provided to a smart card by encoding the smart card with incentives for the next visit. Alternatively, an electronic incentive could be stored in the processor for use in conjunction with the user's identification such that credit can be automatically given at the subsequent purchase times.

The system shown in FIGS. 1 through 18A–C has described the generation of coupons for infrequent shopper incentives. The present system shown in FIGS. 19 through 45A–B provides techniques in order to distinguish between degrees of absenteeism, such as zero visits in a certain time period as compared to multiple visits to the store in a certain time period. Other distinctions may be made by the present system in differentiating between dollar ranges spent by a customer such that coupons may be generated per visit based upon the degree of absenteeism and the shopping price range. The present system may also be used to lay out future coupons such that incentives are decreased or increased in order to maintain certain required levels of spending. The subsequent performance of a customer is tracked by the present system to determine which coupons are redeemed or not by the customer, or to determine the customer's response to the incentive. The marketing program of incentives may then be changed by the system based upon that customer's subsequent performance. Thus, performance may be tracked by the present system at a product level, a department level or a store level.

The present system also enables the tracking of customer buying to determine how they spend. Thus, the present system may be used to obtain an average which may be weighted in order to provide a base dollar spent per visit or per week on a particular product, in a particular store department, or in a particular store. This base may then be looked at by the present system and incremental increases may be added in order to provide a target for expected behavior. The system may then generate coupons or issue incentives to induce that higher level of performance by the customer. The performance of a customer is tracked and incentives are modified based upon the criteria of performance such that incentives are added or subtracted.

Further, the present system enables the tracking of products purchased by a customer. If a customer continuously buys a certain type of product, such as a certain type of coffee or a particular size of a brand of wieners, the system will track those purchases so that coupons can be printed out at the point-of-sale which relate to products which the customer has previously indicated a tendency to buy. It has been found that by storing a shopper's prior history and by generating coupons for particular products which he desires to buy, such coupons provide an increased inducement to shop more frequently or to spend more money in the store. Alternatively, it prevents the issuance of coupons which the customer has no interest in obtaining the product covered by the coupon, which does not enhance the value of the incentive.

The system can also predict a customer's next due date to purchase a type of product. If a customer begins a pattern of buying a certain type of diapers, but the customer is an infrequent shopper or sub-par spender, this system may induce that customer to shop more often or to spend more by issuing an incentive to the customer to purchase diapers at the time which the customer's history has indicated that the customer buys diapers. By tracking the purchase cycle of various products, the system can anticipate the next purchase date in order to issue incentives prior to that anticipated purchase date, or issue other incentives if the next purchase date passes and no purchase is made. The system also can provide inducement coupons that can be combined. For example, coupons may be generated for a detergent for customers who buy diapers. If a customer continuously buys coffee, a coupon can be generated by the system to provide an incentive on coffee filters. If a customer tends to buy spaghetti sauce at a particular time, the system can generate a coupon to provide a coupon on spaghetti. The system thus uses a prior shopping history of the customer in order to provide the type of coupon most likely to provide an incentive.

The system also enables the tracking of "bargain hunter" customers. Retail stores traditionally stock depending upon the size and amount of floor space. In grocery stores, between 30,000 and 60,000 items may be stocked at any point in time. Several hundreds of these items may be involved in some type of promotion by the manufacturer or distributors of the product, or the store. The present system stores a shopping history or spending history of the customer to identify whether or not the customer is a "bargain hunter" and to what degree the customer is price sensitive.

For example, the system might be loaded with one hundred different generic food items in the grocery store as leading indicators. For example, cola might be a leading indicator. Using these generic food items, the system can store the absolute number of generics purchased by a particular customer or the ratio of generics to non-generics, or alternatively the proportion of generic expenditures to total expenditures. This information enables the system to arrive at a picture of how price driven a particular customer is or how price motivated the customer is. This information is then used to determine how to best incent the customer.

Another aspect of the system is the detecting and storing of the amount of redemption of coupons by a customer. Customers who are obsessed with savings will clip more such coupons and redeem more coupons. By storing the number of deeply discounted items to set up a leading indicator of discounted items, customers who redeem such deeply discounted items may be detected to identify a "bargain shopper", such that incentives may be generated at the point-of-sale in order to enable that customer to be incented. The electronic cash register detects such coupons by scanning and that information is monitored by the present system so that the coupon cashing history of a customer may be stored and maintained.

This technique for targeting customers who are price sensitive enables a retailer to better use the sales promotions provided to him. If a store owner has the opportunity to give a substantial cost reduction on a product, he may send out a large number of the coupons by direct mail and hope that very few of the coupons are returned, since people who buy their soap at full list price would tend to average the store's gross profit upward. Alternatively, the retailer could advertise the price reduction in a newspaper. However, with the use of the present system, coupons may be intelligently printed out at the point-of-sale based upon an index of pricing and spending that the customer has accumulated in order to provide those coupons only to price sensitive customers. For example, if $1 is being provided by the manufacturer as a promotional discount to the retailer on a box of soap, a very price sensitive customer may be given the full $1 rebate, as the system determines that these shoppers need the maximum inducement since that is what drives their purchases. However, when a customer has shown not to be price sensitive and coupon driven, that customer might be provided with only a 50¢ discount on the box of soap, thus enabling the retailer to maintain the other 50¢ as a gross profit. This will not affect the purchases by many customers who are not price sensitive.

Another aspect of the present invention is the generation of a random or lottery coupon. The system may be programmed to reward random customers with a particular reward. For example, every repeat customer might receive a coupon for a free turkey or six-pack of drinks by the coupon printer. Alternatively, the generation of such gifts could be randomly generated in order to provide more of a lottery atmosphere to the awards. Different types of shoppers, as determined by their shopping history, might be provided with different random prizes. Alternatively, a "grab bag" coupon may be issued which covers a group of incentives, which may be accessed in a random fashion as will be subsequently described.

The system may also be used to generate installment coupons, such that the customer does not get the ultimate prize but points toward a prize. For example, each shopping trip might result in five points given toward a prize, such that when the customer accumulates all twenty-five points he may obtain a free turkey or other food item.

As previously noted, the present system normally uses ID numbers obtained from financial instruments such as checks, rather than relying solely on store produced shopping cards. Such store produced cards have been found to have substantial barriers to their use. First of all, there is an overriding negative psychological impact in that there is an implied presumption that the customer does not have sufficient worth to tender currency for a transaction, if it is a requirement of the merchant that the customer belong to the "club". Such a requirement may imply to the customer that his money is not good enough for the store; that is a strong psychological barrier to participation. It may also be an affront to customers when a visible system like prior card-based systems are employed that require the customer participate in the program in order to shop.

In addition, it provides a barrier to physical participation because building a database with a card based system is a two step process, as opposed to a one step process when one employs customer ID based on transactionism. First of all, the customer has to sign up at the store because the name and address have to be recorded and usually merchants ask for additional demographic data. There are a large number of customers who regard that as an invasion of privacy and so are very reluctant to provide that sort of personalized information. Whereas on the transparent system of the present invention using ID's issued by a financial institution, there is no perceived invasion of privacy. Additionally, there is a barrier to participation by merchant cards caused by the need to constantly carry and constantly produce that ID at the point-of-sale. It has been the experience of most retailers that with respect to store cards, if customers can be induced to sign up at all, in very short order there is an enormous attrition because people lose them or they simply lose patience with the system with the slow-down at the point-of-sale. Over a period of time, the attrition rate for such merchant cards means that there is a continued drive and cost associated with that drive to resolicit people with the signup. Failure to get participation means that the data is less valid and that the participation from the standpoint of marketing intricacy is dramatically reduced. So, the stores wind up having a small customer base that is contingent upon voluntary active participation of customers on the one hand, versus near universal participation using the present system because it is invisible or transparent to the customer.

FIGS. 19 through 45A–B illustrate various apparatus and program flow diagrams of a system which not only performs automatic payment processing of a customer's payment at the POS but also generates automatic targeted marketing to the customer at the POS, in dependance upon the customer's prior shopping history.

FIG. 19 illustrates a block diagram of a typical embodiment of such a system in a retail store. At each POS exit from the store, there is provided a conventional Electronic Cash Register system ("ECR") 962A–E, which comprises an electronic cash register, a receipt printer and a UPC bar code scanner as will be subsequently described in greater detail in FIG. 20. In the same location at each POS exit at a retail store, there is found the AP/M and its associated peripherals which are designated generally by the numerals 963A–E.

The outputs of each of the ECRs 962A–E are applied through wires or other transmission link to a conventional ECR controller, which operates to provide conventional automatic cash register functions as are well known. Examples of such ECRs and ECR controllers are those manufactured and sold by IBM Corporation under the Model No. 4680ECR. Other conventional ECRs are manufactured and sold by NCR and other companies. The ECR controller is linked to the CVC master controller 965 by an integration link so that transaction data is input to the controller 965. It should also be noted that the present invention could be implemented solely within an ECR based system with suitable peripherals.

The present system also couples to the conventional ECR network through a passive listening device 964 which may, for example, comprise the passive listening device manufactured and sold by Scanning Management Incorporated. As is known, the passive listening device 964 allows data routed to and from the ECR controller to be detected and utilized, without affecting the operation of the ECR system. The output of the passive listening device 964 is indicative of the UPC data and is applied to the CVC master controller 965 which may comprise, for example, a conventional 486PC processor and associated memory or other similar equivalent types of processors. A CVC slave controller is illustrated as running in redundant tandem with the CVC controller 965 to provide redundancy in case of a malfunction or the like. The outputs of the CVC controller 965 are applied to each of the AP/M terminals and associated peripherals 963A–E as illustrated.

Alternatively, direct data transfer could be provided from each individual ECR to each individual AP/M terminal. Also, the function of controller 965 may be integrated into the ECR controller.

Also referring to FIG. 19, the system illustrated is a system for one store. It will be appreciated that similar systems for multiple stores may be networked together such that information may be transferred between each store to provide marketing at different stores in different areas. Thus, the CVC controller 965 is connected via a dial-out telephone linked to other remote master controllers at other stores, which are in turn connected to various ECRs and AP/Ms at that store. In this way, not only can credit verification be accomplished between stores, but integrated credit and marketing techniques can be used to service individual customers at different stores and maintain a comprehensive listing of a customer's shopping history at multiple stores.

In operation of the system shown in FIG. 19, as customers purchase products at each point-of-sale exit, the products are identified by the UPC bar code scanner, and information regarding the products and their costs are applied to the ECR controller in the known manner. This information is also received from the passive listening device 964 and is detected and stored by the CVC controller 965. When the customer pays for the purchases at the point-of-sale (POS), the customer may do so in a variety of forms of payment, including without limitation cash, check, credit card, debit card, smart card, ACH (automatic clearing house), electronic benefit system (EBS), or other types of financial instruments. Such forms of payment which bear unique account numbers shall hereinafter be termed financial instruments or transaction instruments.

The advantage of using the account numbers on financial or transaction instruments is that the account numbers are preissued by companies other than the retail store, thus saving the store from the difficulty and expenses of issuing cards or identification numbers. Furthermore, all customers except those paying cash will have such preissued numbers. Further, the identification numbers can be automatically read during the payment cycle, thus saving time and facilitating targeted marketing during the sales procedure. Each of the present AP/M terminals 963A–E and their associated readers can detect the identity of the customer by means of the account or identification code associated with the customer, such as by the checking account number as previously discussed with respect to the first embodiment of this invention. Alternatively, a customer's account or identification number may comprise the credit card number associated with a credit card, a smart card number, a debit card number or the like. Alternatively, a shopping card number or the like, can be automatically read by one of the readers or can be manually input by the clerk at the AP/M keypad.

Data relating to the customer's unique identification code is applied from the individual AP/M 963A–E to the CVC controller 965, where it is associated with a database storage of the particular customer's past shopping history. The identification code is also used to provide credit verification. For checks, the verification procedure previously described in this application may be provided. In the case of credit cards, or the like, the credit card number may be checked against a periodically refreshed database in the controller 965, or the credit card number may be checked against a remote database in the known manner.

In dependence upon the credit check and the shopping history, as previously defined in this application and as will be subsequently described in greater detail with respect to this embodiment, the CVC controller 965 generates signals which are applied through the AP/M terminal to provide credit verification on the AP/M display and also to cause a high-speed printer at each point-of-sale location to print out a series of inducement coupons particularly designed to target that particular customer based upon the customer's prior shopping history. Alternatively, as will be subsequently described, electronic inducements may also be provided in lieu of the printed coupons, such as by the way of automatic discount of the customer's bill or by automatic discount of a future bill.

As will be described in greater detail, the present system thus enables a store to provide credit verification as well as to maintain accurate information regarding the shopping habits of its individual customers and to target marketing to those customers based upon the customer's individual shopping history. The present technique thus allows the targeting and incentive marketing of infrequent shoppers, as previously described and as will be described in subsequent detail.

Figure 20:
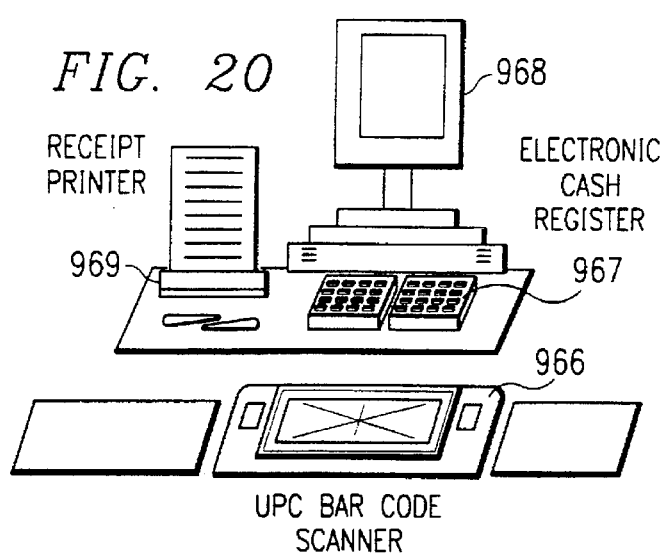
FIG. 20 shows in greater detail the elements of a conventional electronic cash register ("ECR") system for use with the system shown in FIG. 19.

FIG. 20 shows in greater detail a typical ECR point-of-sale system which includes a UPC bar code scanner 966 which automatically scans the UPC affixed to each product purchased at the point-of-sale. This scanner is conventional and generates electronic signals indicative of the UPC such that the identity of the particular product, the department from which the product was sold and the price of the product can be associated therewith and stored by the ECR controller. The system further includes an electronic cash register of the type previously disclosed which includes one or more key pads 967 to enable the entry of items and other information by the clerk and to facilitate the processing of the customer's purchases. The electronic cash register also includes a display 968 which provides information regarding the price and description of the products being read by the UPC bar code scanner 966 to provide other desired information to the customer. In addition, the ECR includes a receipt printer 969 which generates a written receipt provided to the customer to indicate the amount of his purchases.

Figure 21:
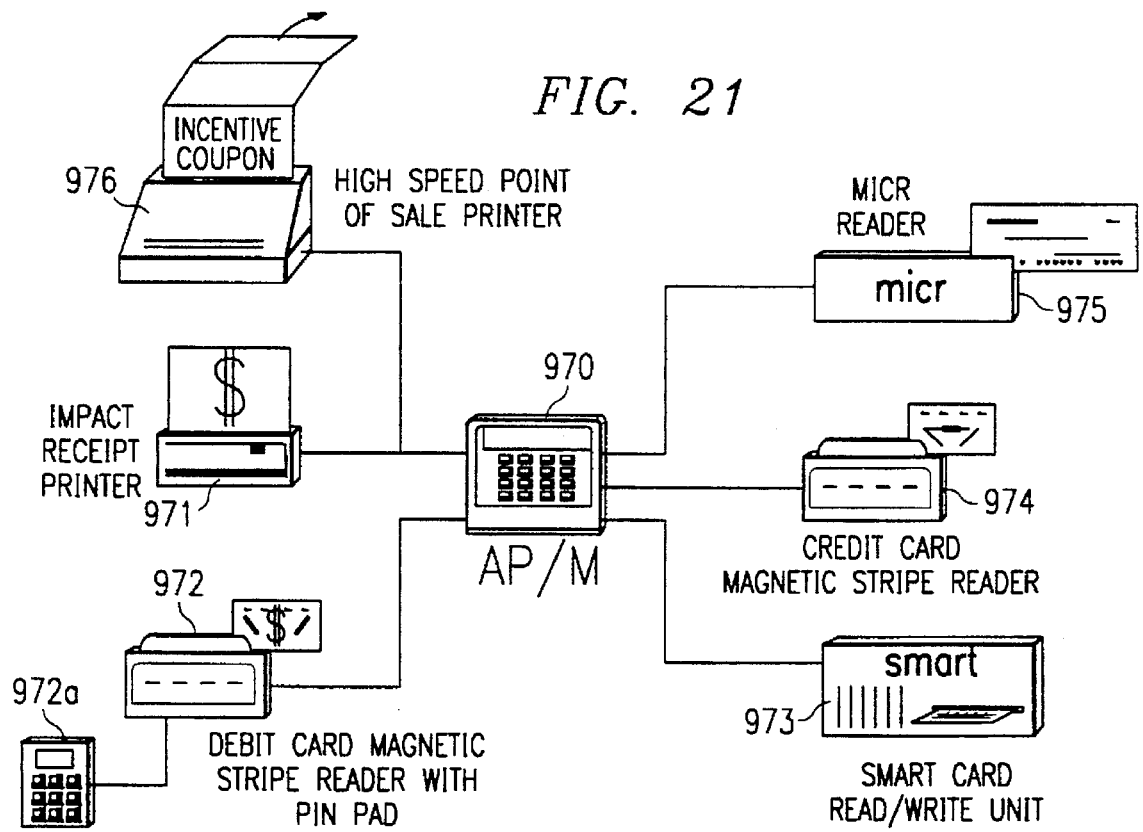
FIG. 21 is a block diagram of the All Payments/Marketing ("AP/M") system of the invention, including peripheral financial instrument reading devices and a coupon printer in accordance with the invention.

FIG. 21 illustrates in greater detail the elements of a typical AP/M terminal and its associated peripherals as shown in FIG. 19. Details of the AP/M terminal 970 will be provided in greater schematic in FIG. 39 hereinafter described. As previously indicated, a plurality of financial instrument readers are coupled to the AP/M 970, including an impact receipt printer 971, a debit card magnetic stripe reader with a PIN pad 972, a smart card reader 973, a credit card magnetic stripe 974 and a MICR code check reader 975 as previously described in FIG. 2B. It should be understood that the system shown in FIG. 21 is intended to include all possible types of automatic reading of financial instruments, but also that it is not necessary in some embodiments to have all of the peripherals. For example, certain retail stores may find that the majority of their purchases are by cash or by check; thus, the remainder of the readers might be omitted. Alternatively, if a retail store determines that a majority of its payments are made through cash and a credit card, the check reader 975 and other readers might be omitted or added as needed.

Also coupled to the AP/M 970 is a high-speed point-of-sale coupon printer 976 which may comprise, for example, a conventional thermal coupon printer such as sold by Epson Corporation (model #T80 printer). The AP/M 970 also includes a visual display, such as a LCD display or the like. The display generates prompts to the clerk to assist in operation of the system, as well as providing credit verification and other functions. The keypad on the AP/M 970 enables the clerk to input customer identification data and the like into the system.

In operation of the system shown in FIG. 21, if the customer desires to make payment by a debit card, the debit card is swiped through the reader 972 and the magnetic stripe on the debit card is automatically read by the reader. Many debit/credit cards contain a bank ID number and a customer account number, which can be combined to form a unique customer ID number. A PIN pad 972-A is associated with reader 972 in order to enable the customer's PIN number to be entered by the customer, if necessary or desired. Although, the PIN pad 972-A is shown with its data path going through the reader 972, in many instances, the PIN pad 972-A output would go directly to the AP/M 970. When a debit card is read, information regarding the purchase is applied through the AP/M 970 and the CVC controller 965 in order to debit the necessary dollar amount from the bank account indicated on the debit card, to provide verification authorization regarding the debit card and to use the account number information on the card to identify the customer to provide the marketing techniques of the present invention.

For example, if a debit card is swiped through the debit card reader 972, the CVC controller 965 would indicate on the display of the AP/M 970 that sufficient funds are available in the account indicated on the debit card. In operation, the CVC controller 965 would operate through a conventional dial-up credit verification system to obtain the credit verification and debit card information for authorizing the debit card transaction. Information regarding the unique customer identification and the transaction would then be stored in the database of the CVC controller 965 such that the targeted marketing of the system could be accomplished by printing desired coupons at the printer 976. As will be described, different coupons are printed in response to the prior shopping history of the customer in order to induce customers using different techniques based upon their prior shopping history. At this time, the impact receipt printer 971 would then generate a receipt or other indication of the purchase. In some instances, the receipt printer 971 will not be necessary due to the presence of the printer 969 shown in FIG. 20, which can be used to print the coupons and the receipts.

If the customer provides a smart card for payment of the purchases just made, the smart card would be swiped through the smart card reader 973 and the particular account code associated with the smart card would be detected by the CVC controller 965 and compared against the database. If the system detects the account code and the customer is a recognized customer, then the purchases of the customer are stored in the CVC controller database and, in dependence upon the customer's prior shopping history, coupons are generated by the printer 976 in order to induce that customer. The customer presenting the smart card might make the payment in cash or by debit card, credit card or check and those transactions would be processed as hereafter described.

If a credit card is used for payment at the POS, the credit card is swiped through the reader 974 and the credit card number is used by the CVC controller to identify the customer for accessing the customer's database. The clerk at the point-of-sale would then enter in the transaction volume through the keyboard of the AP/M 970. The CVC controller 965 would provide credit authorization by use of a conventional dollar verification technique and would provide an identification of the verification of the credit card via the display in the AP/M 970. The amount of purchase information and the items purchased would be received by the CVC controller 965 from the ECR system through the passive listening device 964.

As further shown in FIG. 21, if the customer desires to pay by check, the check is swiped through the MICR reader 975 and the MICR code is read and detected as previously described in prior figures and descriptions. The check can then be authorized by the display on the AP/M terminal 970 and the MICR code banking account number is used to identify the individual customer to enable the providing of unique marketing incentives by printing out unique coupons at the printer 976.

Although various types of payment instruments and identification instruments have been illustrated for use with the AP/M in FIG. 21, it will be appreciated that other types of payment instruments bearing unique identification numbers are envisioned for use with the present system, both to provide payment identification for verification but also to provide unique identification of customers for the marketing techniques of the present invention.

FIGS. 22–38 comprise program flow diagrams illustrating the operation of the system shown in FIGS. 19–21 to perform a wide variety of targeted marketing functions, as well as credit verification.

Figure 22:
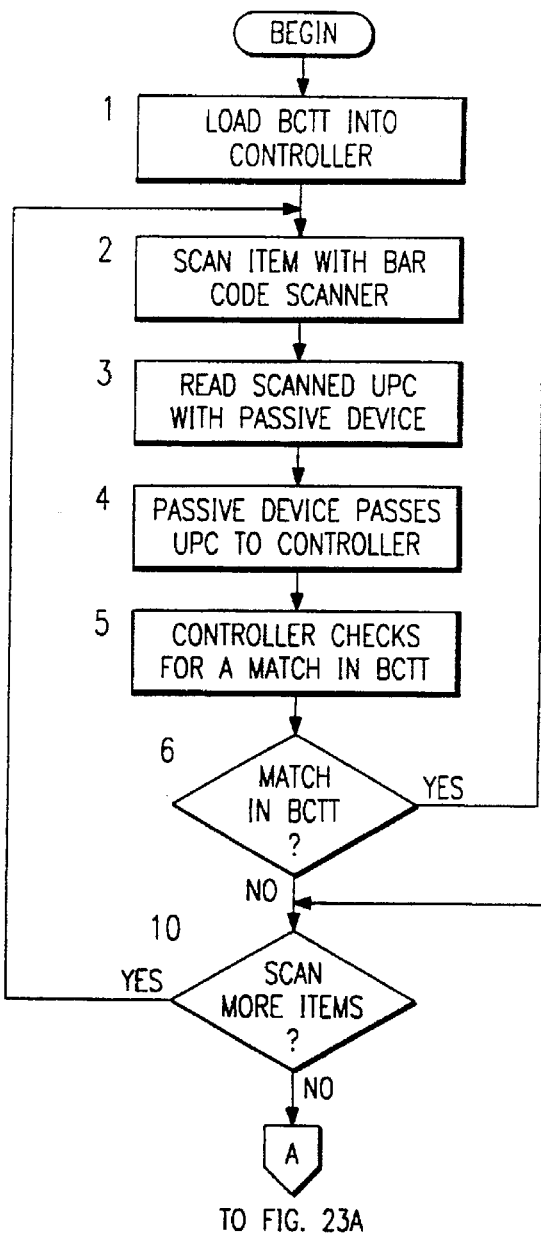
FIG. 22 is a program flow diagram of the first portion of the payment processing and point-of-sale ("POS") marketing technique used in conjunction with the system in FIG. 19.

FIG. 22 illustrates a series of steps to scan the individual products purchased by a customer in order to provide such information to the ECR controller and to the CVC master controller 965. The steps include:

| Step | Description |
| --- | --- |
| 1 | Load Bar Code Tracking Table ("BCTT") into CVC Master Controller 965. This is a table of Universal Product Codes (UPCs) from selected products and coupons. This table signals the processor to store the purchase of these products for individual accounts. In addition, this table stores information about the product to be used for marketing purposes such as: Incentive level from 1 to 10 prioritizing store's inclination to use product as an incentive. A profile level from 1 to 10 that would be used to indicate the economical level of the product or coupon redemption. These levels are used to build an economic profile on an account based on historical purchases. Product complements. These complements provide references to other products in the table that could be used with this product. Retail cost of product |
| 2 | Clerk scans product with UPC Bar Code scanner 966 connected to ECR network. |
| 3 | As the UPC is sent to the ECR Controller, a passive listening device 964 detects the product UPC code and the ECR from which it was sent. |
| 4 | The passive listening device 964 sends UPC code and source ECR to the CVC controller 965. |
| 5 | Controller 965 checks for UPC in the BCTT. |
| 6 | If UPC is in the BCTT: |
| 7 | If UPC is a redeemed NOW coupon which was dispensed to the customer on a previous visit. |
| 8 | Controller 965 updates coupon database to reflect redemption of coupon. |
| 9 | Controller 965 has a holding workspace for each ECR where any products scanned that contain matches in the BCTT may be written and held until the Customer's account number is entered. Write this UPC to the holding workspace for this ECR. |
| 10 | If there are more items to scan, GOTO 2. |

Figure 23A:
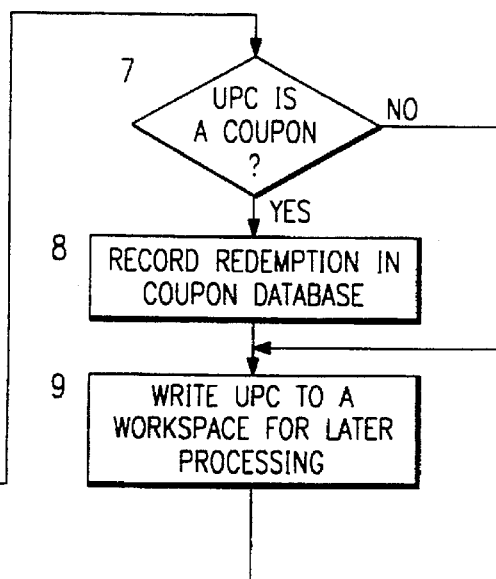
FIGS. 23A, B, and C are a program flow diagram of the various techniques for verifying and accepting payments from the various readers shown in FIG. 21.
Figure 23C:
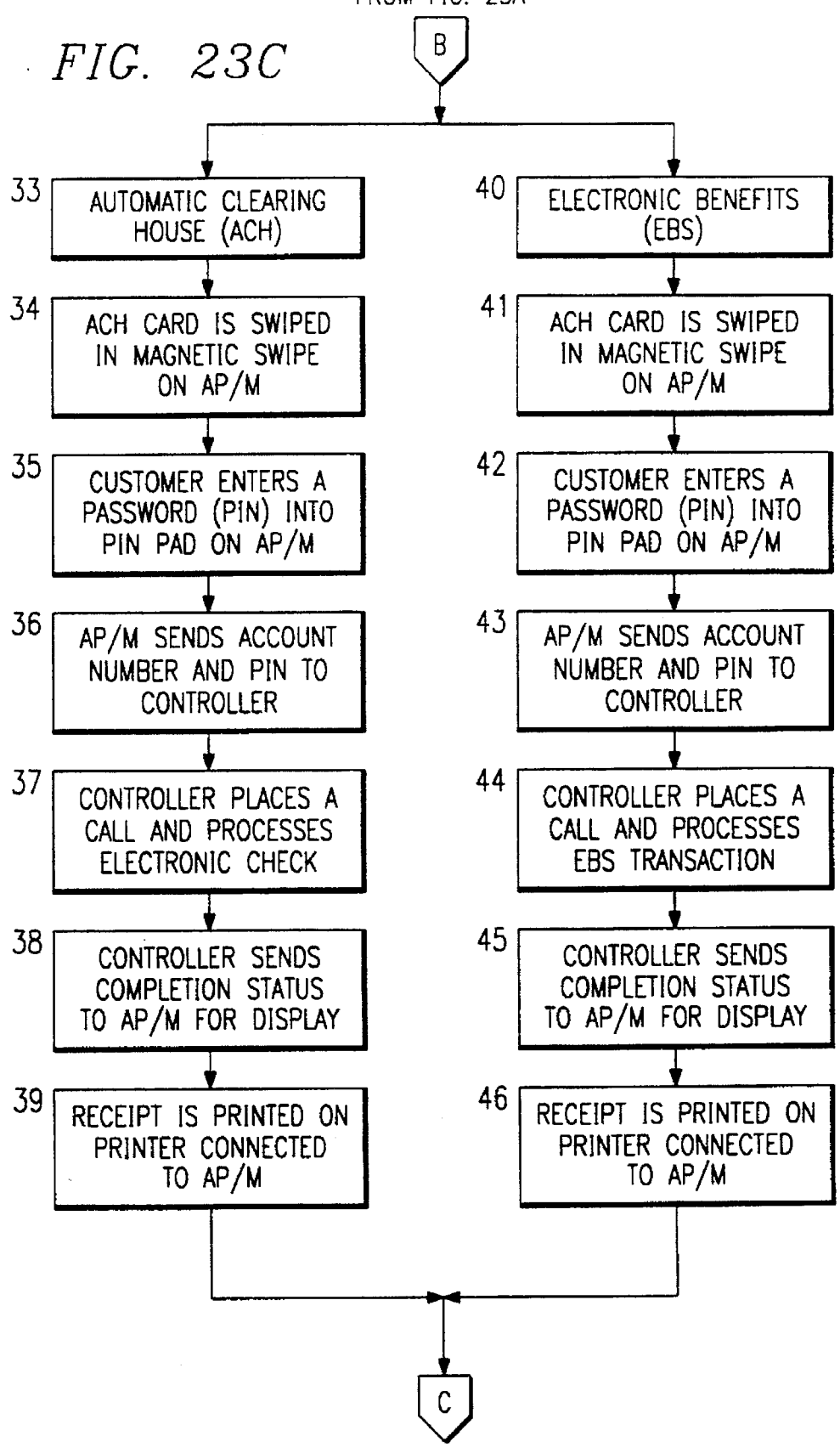

FIGS. 23A, B, and C illustrate the various operations of the system for accepting payments with different types instruments by use of the various readers of FIG. 21.

| Step | Description |
| --- | --- |
| 11 | ECR 962 now sends the total for this purchase to the AP/M. If the AP/M 963 and ECR are not integrated, the clerk enters the total by hand. |
| 12 | AP/M 963 sends this total to the CVC controller 965. |
| 13 | Choose a method for paying. |
| 14 | If paying with a personal check: |
| 15 | Clerk runs check through the MICR reader which sends the MICR code to the AP/M. |
| 16 | AP/M sends MICR code to the controller 965. |
| 17 | Controller parses the MICR removing the sequence number to form an account number. |
| 18 | Controller verifies the check's account number against stored positive and negative databases. |
| 19 | Controller sends verification back to the AP/M 963 for display to the clerk. |
| 20 | If paying with a credit card: |
| 21 | The credit card is swiped in the magnetic card swipe which reads the account number and sends it to the AP/M 963. |
| 22 | AP/M 963 sends the account number to the controller 965. |
| 23 | Controller 965 initiates a phone call via modem to a payments processing switch. The credit card account number and amount to tender are sent for verification. |
| 24 | Controller 965 sends result verification to the AP/M 963 for display to the clerk. |
| 25 | A receipt is printed out on the receipt printer, ECR printer, or coupon printer 976. |
| 26 | If paying with a debit card: |
| 27 | Debit card is swiped in a magnetic card swipe which reads the account number and sends to the AP/M 963. |
| 28 | A message is sent to the PIN pad for the customer to enter their PIN number. Customer enters PIN and it is sent to AP/M 963. |
| 29 | AP/M 963 sends account number and PIN to controller. |
| 30 | Controller 965 initiates phone call via modem to a payments processing switch. The customer's debit card bank number, PIN, amount, and store's bank account number for transfer of funds are sent to the switch for processing. |

| Step | Description |
|---|---|
| 31 | Controller 965 sends the completion status to the AP/M for display to clerk. |
| 32 | Receipt is printed on receipt printer, ECR printer, or coupon printer 976. |
| 33 | If paying with an Automatic Clearing House (ACH or electronic check) card. |
| 34 | ACH card is swiped in a magnetic card swipe which reads the account number and sends to the AP/M 963. |
| 35 | A message is sent to the PIN pad for the customer to enter their PIN number. Customer enters PIN and it is sent to AP/M. |
| 36 | AP/M sends account number and PIN to controller. |
| 37 | Controller initiates phone call via modem to a payments processing switch. The customer's ACH card bank number, customer bank account number, PIN, amount, and store's bank account number for transfer of funds are sent to the switch for processing. |
| 38 | Controller sends the completion status to the AP/M for display to clerk. |
| 39 | Receipt is printed on receipt printer, ECR printer, or coupon printer. |
| 40 | If paying with an Electronic Benefits (EBS or electronic food stamps) Card: |
| 41 | EBS card is swiped in a magnetic card swipe which reads the account number and sends to the AP/M 963. |
| 42 | A message is sent to the PIN pad for the customer to enter their PIN number. Customer enters PIN and it is sent to AP/M. |
| 43 | AP/M 963 sends account number and PIN to controller. |
| 44 | Controller initiates phone call via modem to a payments processing switch. The customer's EBS card account number, PIN, and amount are sent to the switch for processing. |
| 45 | Controller sends the completion status to the AP/M for display to clerk. |
| 46 | Receipt is printed on receipt printer, ECR printer, or coupon printer 976. |

Figure 24:
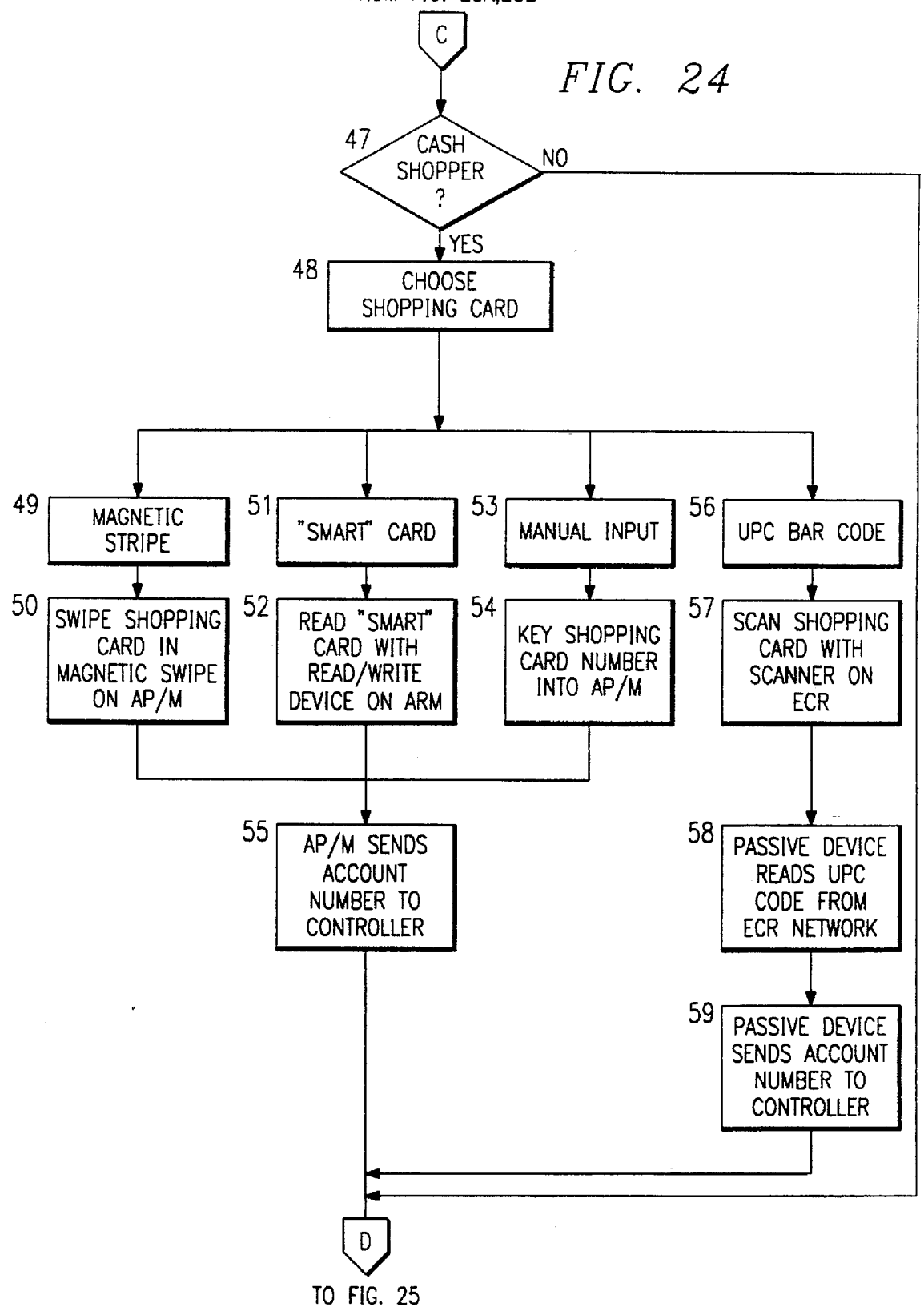
FIG. 24 is a program flow diagram of the acceptance of shopping cards by the present system.

FIG. 24 is a flow chart of the taking of a shopping card which has been previously distributed by the retail store to the customers. Usually these types of cards are presented only after obtaining substantial financial and other history of the customer which may then input into the database of the CVR controller 965. In this system, such cards are a useful adjunct in that they may continue in use so that cash paying shoppers are not otherwise excluded from participation in marketing promotions distributed by this system. Each of the cards is provided with a unique number which is used to identify the customers in place of the customer checking account, bank account number or credit card number or the like. This flow chart illustrates the reading of the various types of shopping cards, including magnetic stripe and/or smart cards. Alternatively, the system provides for manual input of the customer identification numbers through the key pad on the AP/M and also envisions the use of a shopping card which may be scanned by the UPC code scanner.

| Step | Description |
|---|---|
| 47 | If customer is paying with cash: |
| 48 | Choose a shopping card: |
| 49 | If shopping card has a magnetic stripe: |
| 50 | Swipe shopping card in magnetic card swipe which reads the account number and sends it to the AP/M. |
| 51 | If shopping card is a "Smart" card. |
| 52 | "Smart" card contains a computer chip that can be read and written to. Slide "Smart" card into read/write device which reads the information on the card and sends it to the AP/M. |
| 53 | If shopping card is not machine readable: |
| 54 | Clerk keys card number into AP/M |
| 55 | AP/M sends shopping card account number to controller. GOTO 60. |
| 56 | If shopping card has a UPC Bar Code: |
| 57 | Scan UPC on ECR's scanner. |
| 58 | Passive device reads UPC code and source ECR from ECR network. |
| 59 | UPC code and source ECR's register number are sent to the controller. |

Figure 25:
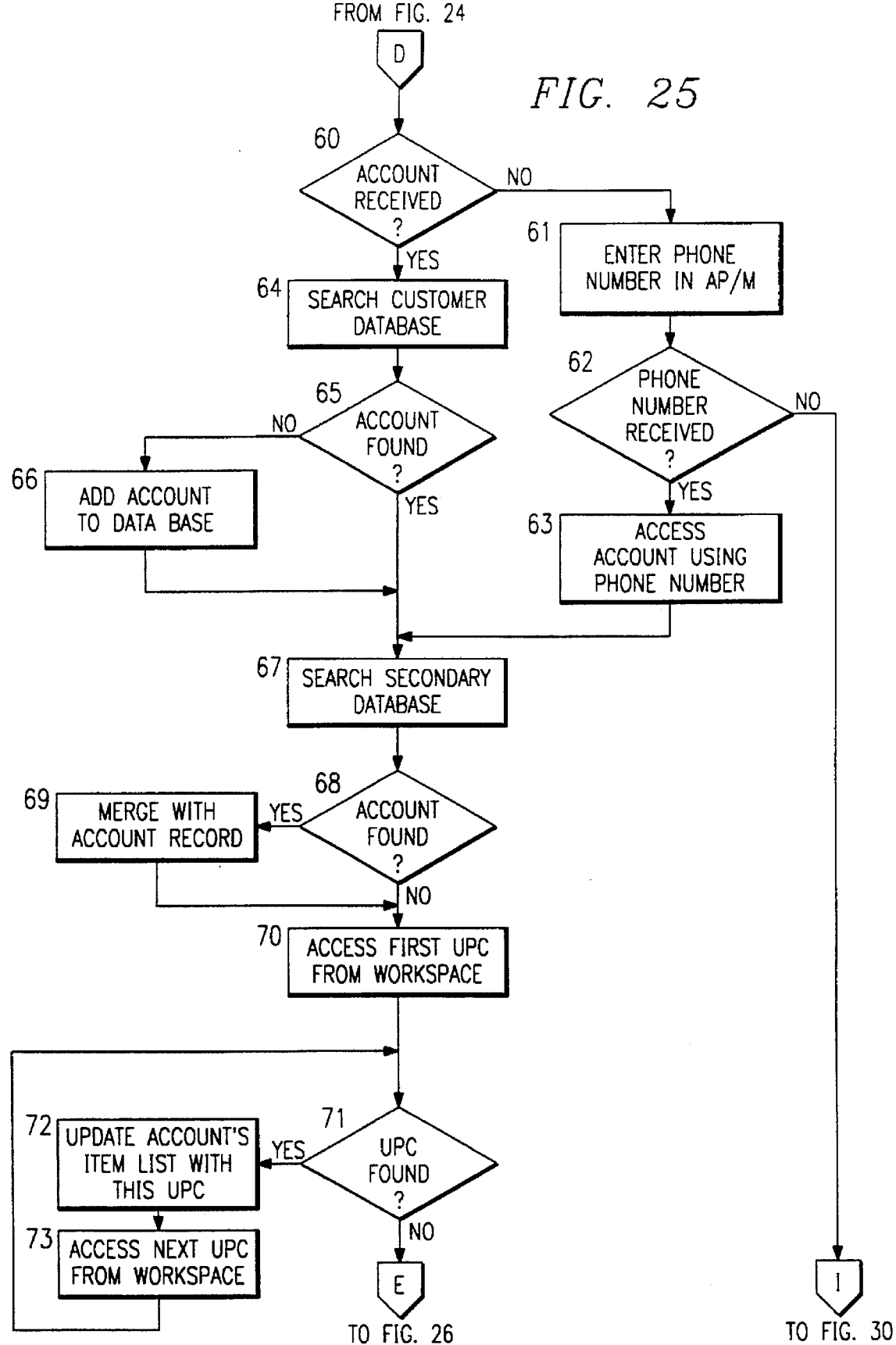
FIG. 25 is a program flow diagram illustrating the storage and access of account records by the present system.

FIG. 25 illustrates the storage and access of account records for a network of the marketing systems and illustrates accessing the customer's account in the primary database of the CVC controller 965, as well accessing of data in the secondary database. The first database includes the customer's actual visits to the particular store. The secondary database comprises visits by the customer to the other stores interconnected with the system as shown in FIG. 19. As previously described in FIG. 19, each store may be connected via a dial-out telephone line with other remotely located CVC master controllers at other stores. The flow chart of FIG. 25 illustrates how data may be shared between the stores in order to both verify payments by customers, but also to provide target marketing of customers in a group of stores. The steps include:

| Step | Description |
|---|---|
| 60 | If no account number from payment medium or shopping card: |
| 61 | Clerk obtains customer's phone number. |
| 62 | If no phone number obtained, GOTO 122 |
| 63 | Clerk enters phone number into AP/M which is sent to the controller. Controller builds a CASH account key based on phone number and accesses this record. GOTO 67. |
| 64 | A customer database resides on the mass storage device of the CVC controller. This database is keyed on an account number and contains shopping history based on past visits to the store. Controller searches customer database for account's record. |
| 65 | If account is not found: |
| 66 | Account is added to customer database. |
| 67 | A secondary database resides on the mass storage device of the CVC controller. This database contains shopping history based on visits to OTHER stores within a network of grocery stores. This prevents stores in a network from incenting customers from each other. Controller searches secondary database for account's record. |
| 68 | If account has record(s) in secondary database: |
| 69 | History from customer database and secondary database are merged. |
| 70 | While products were scanned for this customer account, a holding workspace was built to hold any matches from products scanned in the BCTT as described in steps 1–10. Access first item from this holding workspace. |
| 71 | If an item is accessed from the holding workspace: |

| Step | Description |
|---|---|
| 72 | The controller maintains for each account number a list of items (ITEM LIST) that the customer has purchased from the BCTT. This ITEM LIST retains information such as: Total purchases Last purchase information including date and quantity. A running purchase frequency reflecting the average days between each purchase. Update ITEM LIST to reflect this purchase. |
| 73 | Access next item from holding workspace. GOTO 71. |

Figure 26:
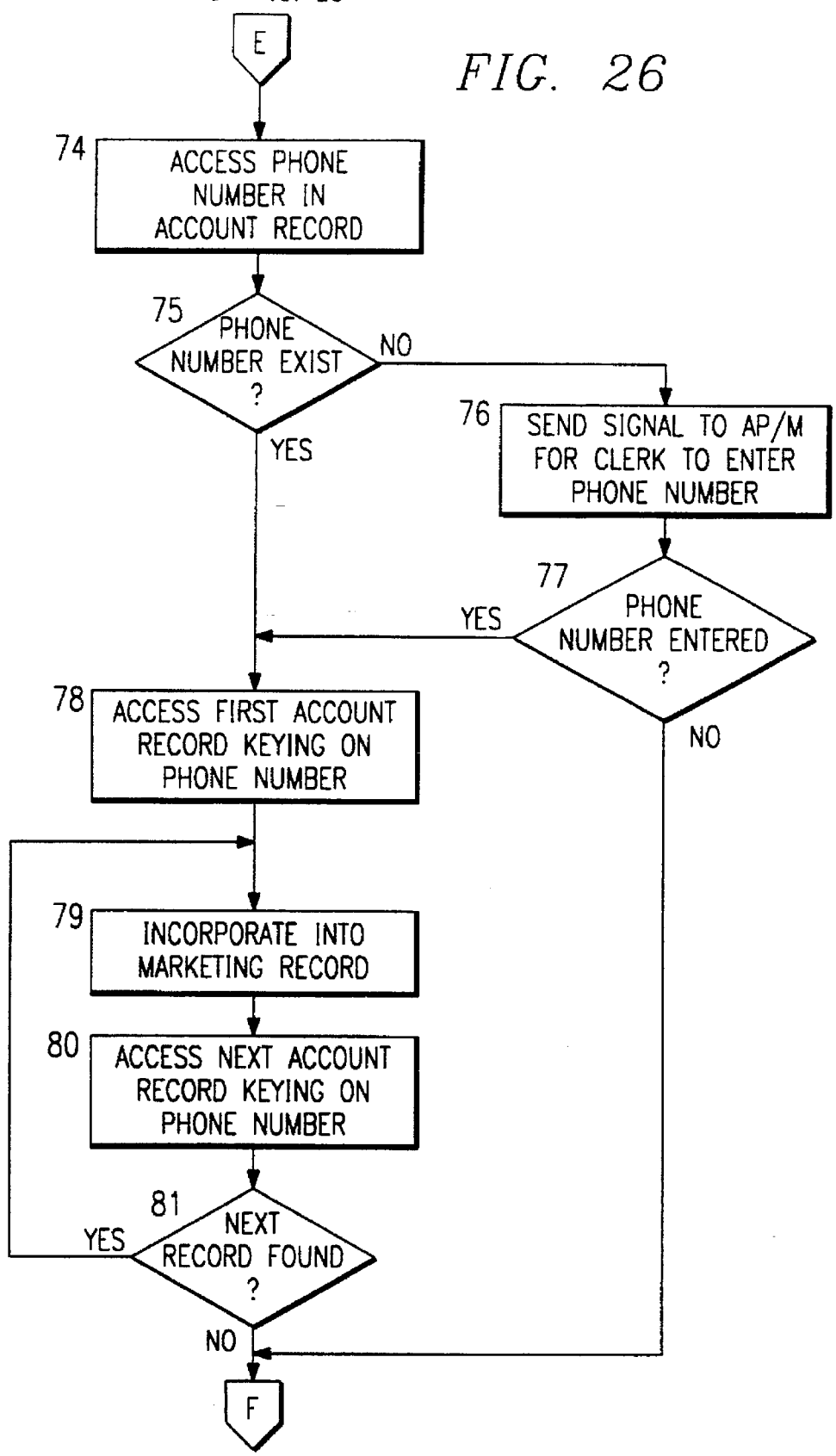
FIG. 26 is a program flow diagram illustrating the building of a marketing record based upon multiple accounts in a single household.

FIG. 26 illustrates the building of a marketing record based upon multiple accounts in a single household. As is known, often a wife and a husband will have individual checking accounts and those checking accounts will be detected and indicate individual shoppers. However, it has been found advantageous to be able to coordinate all the shoppers in a household so that target marketing can be directed toward a household rather than to individual people living within that household. The steps include:

| Step | Description |
|---|---|
| 74 | Any number of accounts may be combined for a single household if a link exists. A telephone number is often on personal checks, may be required on credit and debit card transactions, or may be volunteered by the customer. The phone number is used in this process to provide a link. Check account's customer record for a phone number. |
| 75 | If no phone number: |
| 76 | Send message to AP/M for clerk to obtain phone number and enter into the system. |
| 77 | If phone number is NOT obtained, other accounts from customer's household cannot be merged. GOTO 82. |
| 78 | A phone number has been used to build a secondary key index so that all records with the same phone number may be accessed very quickly. These records will be combined to form a single marketing record. Build this secondary key and access first record. |
| 79 | Merge history from this record into marketing record. |
| 80 | Access the next record keying on phone number. |
| 81 | If next record exists, GOTO 79. |

Figure 27:
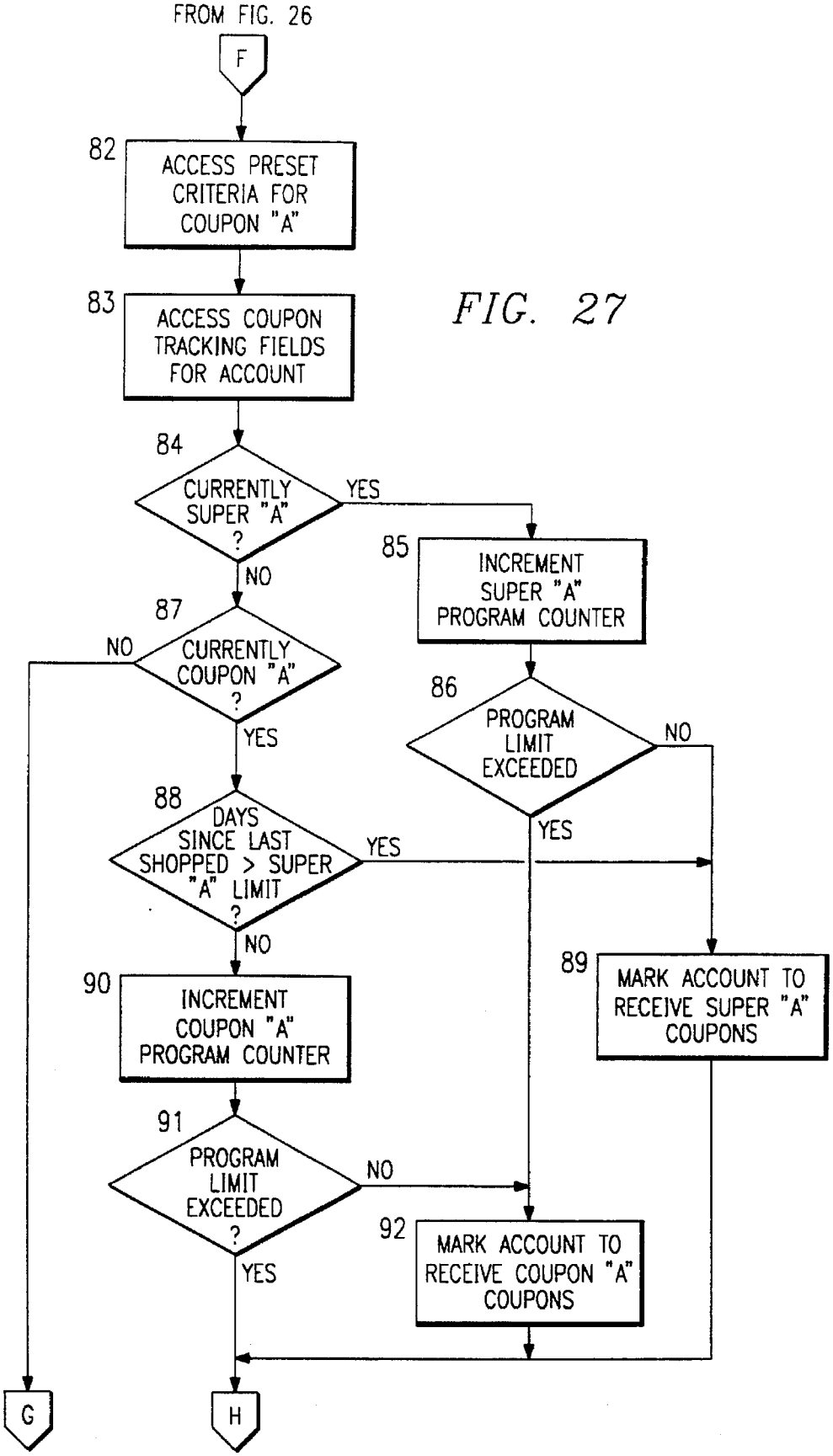
FIGS. 27 and 28 are program flow diagrams illustrating a method of tracking infrequent shoppers who are to receive a Coupon "A"

FIG. 27 illustrates the method of tracking infrequent shoppers such that a Coupon "A" may be generated by the high-speed point-of-sale printer 976. Coupon "A", as will be subsequently described, is defined as "coupons to incent what has been determined to be an infrequent shopper, that is a shopper who fails to meet predetermined shopping criteria". For example, criteria may be set of a predetermined number of shopping visits in a predetermined time. If the customer fails to meet the required number of shopping visits, he/she is determined to be an infrequent shopper and Coupon "A" may be used to incent that shopper. As will be subsequently described, Coupon "A" provides greater coupon incentives than are provided to customers who are more frequent shoppers. Although an infrequent shopper has been herein described as a customer failing to meet previous shopping criteria, the infrequent shopper may also be defined as a customer meeting predetermined infrequent shopping criteria, that is by not having visited a store in a predetermined time in a predetermined time interval. The flow chart in FIG. 27 also illustrates the generation of Super "A" Coupons to an infrequent shopper who has been previously targeted for marketing but has failed to respond. The steps include:

| Step | Description |
|---|---|
| 82 | Coupon "A" (for Absence) is used by the system to identify shoppers that are determined to be infrequent. Each store tailors and stores a definition of the infrequent shopper and a program to incent them which is stored on-line as follows: The method of determining infrequent shopper: 1. Based on dollars spent in the prior specified number of days. or, 2. An attendance record based on weekly attendance in the prior specified number of weeks. The level of incentive for infrequent shopper: 1. Multiple levels based on average amount of purchases. For example, an infrequent shopper with an average purchase of $137 would be incented more than an infrequent shopper with an average purchase of $23. or, 2. Multiple levels based on the number of weeks attended in the prior specified number of weeks. For example, an infrequent shopper that recorded an attendance in 0 of the prior 8 weeks could be incented more than an infrequent shopper that recorded an attendance in 3 of the prior 8 weeks. Coupons to be used for incenting the infrequent shopper. Once a customer is identified as an infrequent shopper, the customer record is updated with a Coupon "A" status and level. For example, the customer above attending 0 weeks in the last 8 weeks may be identified as an "A1" while the customer attending 3 weeks in the last 8 weeks may be identified as an "A4". Logically, the "A1" series of coupons stored would be of higher incenting value than "A4" series. Each Coupon "A" level of coupons is stored in a series based on 1 to 32 shopping trips. For example, the first trip that the "A1" level of infrequent shopper is identified may produce 8 coupons at a value of $35.00. Subsequent trips #2, #3, and #4 may produce 6 coupons valued at $25.00. Subsequent trips #5 thru #10 may produce 4 coupons valued at $20.00, etc. Criteria for Super "A" for customers not responding to the Coupon "A" program. This criteria is based on a number of |

| Step | Description |
|---|---|
| | days since the last incentives were given to the customer. For example, the level "A1" infrequent shopper above is given the 8 coupons valued at $35.00 and does not come back until 8 weeks later. If the criteria for Super "A" is 30 days, this infrequent shopper is now branded Super "A" level 1 ("SA1") and will receive heavier incentives. Super "A" coupons are stored in the same level and series method as described for Coupon "A". Upon completion of a Super "A" program, the infrequent shopper falls back into the Coupon "A" program where they became a Super "A". |
| 83 | Each account record holds fields for tracking coupon programs. These fields include: Coupon type ("A1", "A2", etc.) Number of trips for this customer while in the coupon program. Super type ("SA1", "SA2, blank if none) Number of trips for this customer while in the "super" program. |
| 84 | If customer is currently in a Super "A" program: |
| 85 | Increment the field for number of trips in Super "A". |
| 86 | If Super "A" program is complete, customer falls back into Coupon "A" program where they left off. GOTO 92. If Super "A" program is NOT complete, GOTO 89. |
| 87 | If customer is NOT currently in a Coupon "A" program, GOTO 93. |
| 88 | If number of days since last visit exceeds preset criteria for determining Super "A" GOTO 89. Otherwise, GOTO 90. |
| 89 | Mark account to receive Super "A" coupons. This information will be used later when building a list of coupons to be spooled to the customer. GOTO 106. |
| 90 | Increment the field for number of trips as Coupon "A". |
| 91 | If Coupon "A" program is complete, GOTO 106. |
| 92 | Mark account to receive Coupon "A" coupons. This information will be used later when building a list of coupons to be spooled to the customer. GOTO 106. |

Figure 28:
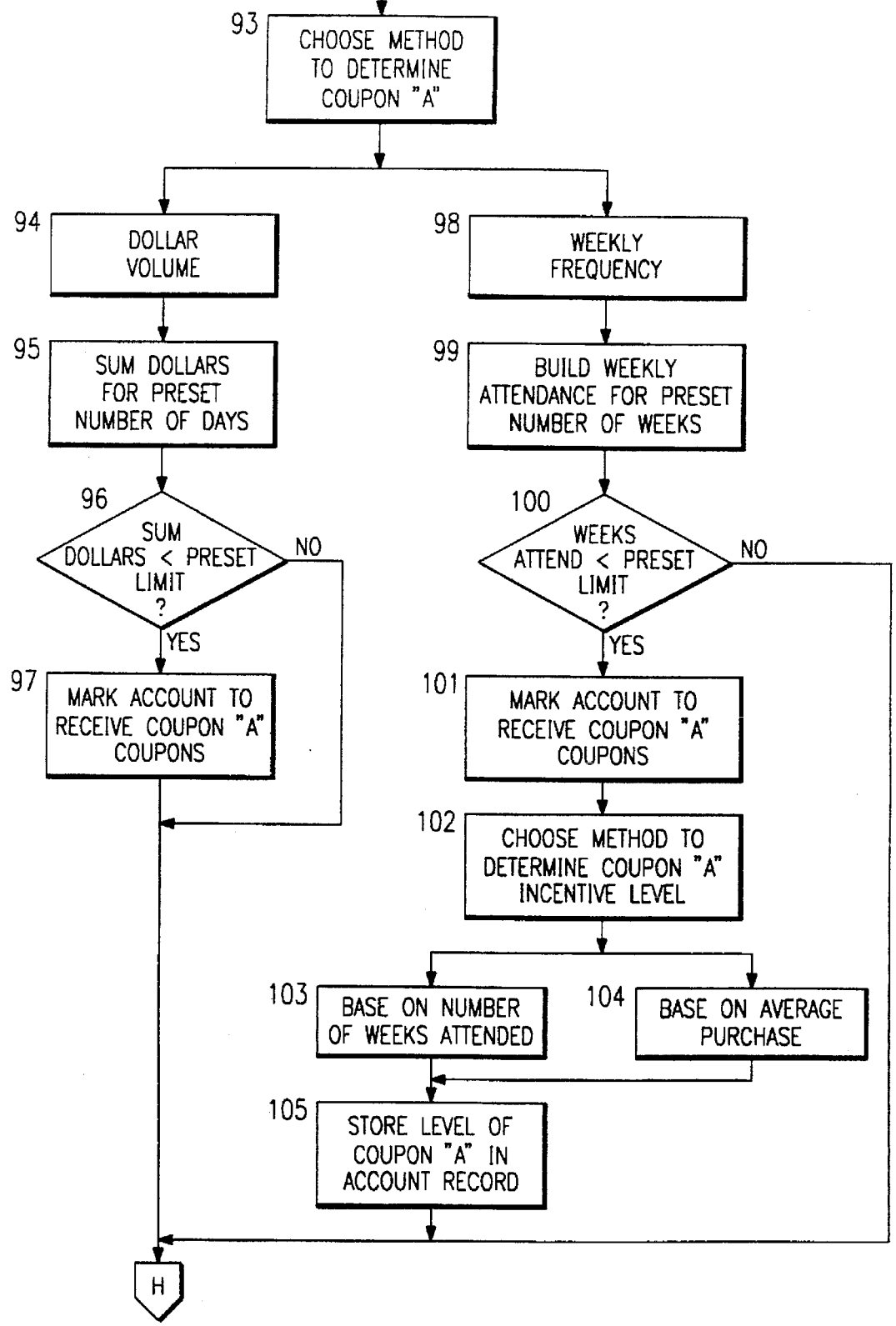

FIG. 28 illustrates the detecting techniques used to identify an infrequent shopper for placing that customer on an infrequent incentive program such that Coupon "A"s are generated. The steps include:

| Step | Description |
|---|---|
| 93 | Choose the method to determine infrequent shopper. |
| 94 | If method is based on dollar volume: |
| 95 | Sum dollars spent in prior specified number of days. |
| 96 | If dollars spent is less than preset value, |
| 97 | Initialize fields for tracking coupon programs to zeros and mark account as Coupon "A". GOTO 102. Otherwise GOTO 106. |
| 98 | If method is based on weekly frequency: |
| 99 | Build a weekly attendance record in the last preset number of weeks based on one or more visits during each prior 1 week span. For example, if in the last 8 weeks this shopper had 3 trips, but they were all in the same week, this customer's attendance record would reflect 1 week's attendance in the last 8 weeks. |
| 100 | If the number of weeks attending does not fall below the preset criteria, GOTO 106. |
| 101 | Initialize fields for tracking coupon programs to zeros and mark account as Coupon "A". |
| 102 | Determine the incentive level to be stored with this Coupon "A" infrequent shopper. |
| 103 | If the method to determine incentive level is based on the number of weekly attendances: Access preset criteria for assigning an incentive level based on attendance. For example, the criteria may assign level 1 for 0 weeks attended in the prior 8 weeks, level 2 for 1 weeks attended in the prior 8 weeks, level 3 for 2 weeks attended in the prior 8 weeks, etc. |
| 104 | If the method to determine incentive level is based on the average dollars spent per shopping visit: Access preset criteria for assigning an incentive level based on average expenditures. For example, criteria may assign level 1 for an account with an average purchase of $100 or more, level 2 for an average purchase between $75 and $100, level 3 for an average purchase between $50 and $75, etc. |
| 105 | Store this level of Coupon "A" in the account record. |

Figure 29:
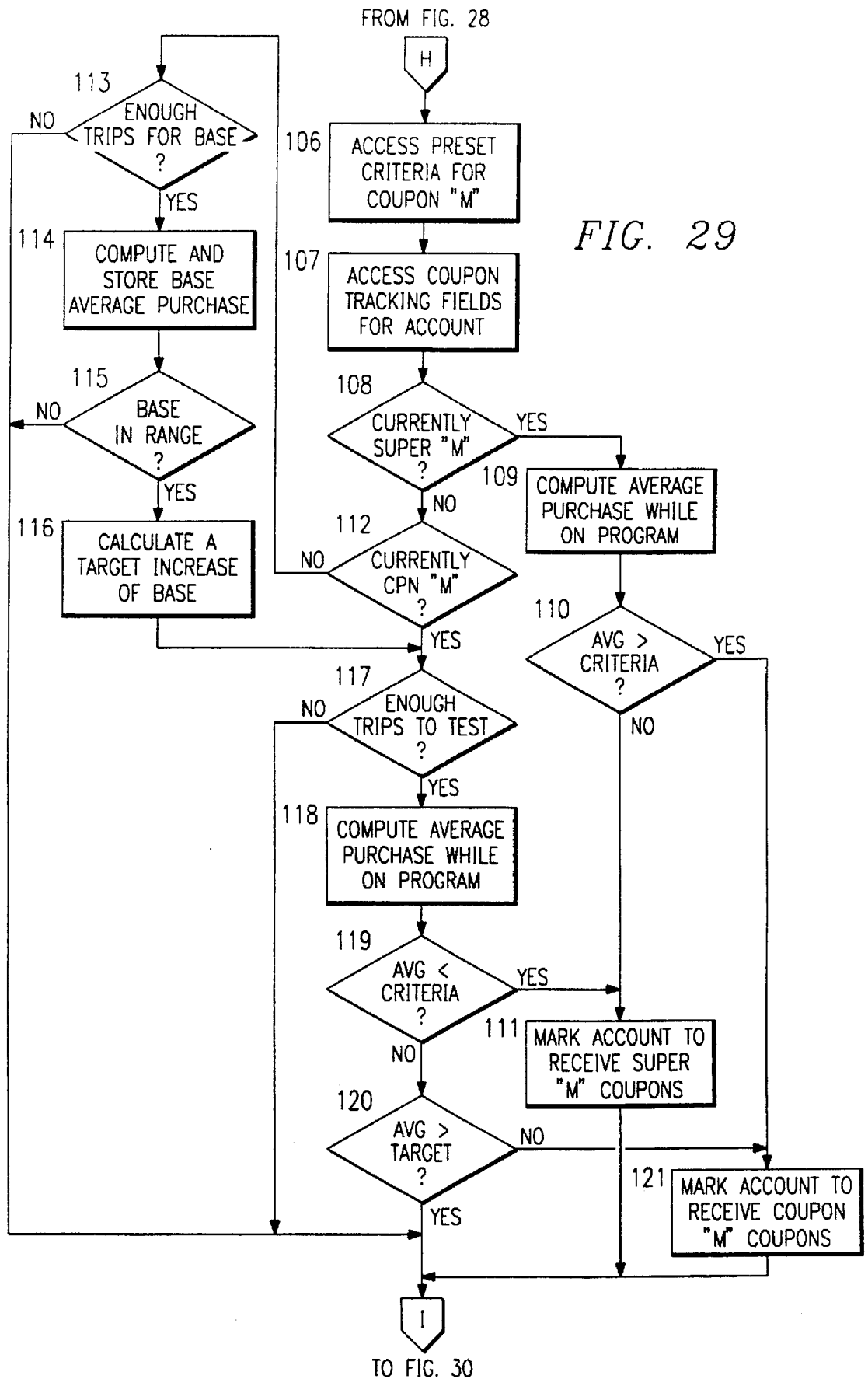
FIG. 29 is a program flow diagram illustrating a method of increasing a customer's average purchase by providing the customer with a Coupon "M"

FIG. 29 illustrates a method for increasing a customer's average purchases, based upon the database built and maintained by the CVC controller 965. As will be subsequently described, this technique illustrates a progressive generation of coupons in order to incent customers to increase the amount of their purchases.

| Step | Description |
|---|---|
| 106 | Coupon "M" (for Maximize) is used by the system to track average expenditures and maintain a program for increasing customers' average purchases. Each store tailors criteria for increasing average purchases which are stored on-line as follows: Minimum number of trips to qualify for Coupon "M" program. This ensures that an account's history has matured so that a more accurate average may be obtained. Maximum dollar average to qualify for Coupon "M" program. |

| Step | Description |
|---|---|
| | This provides a ceiling to prevent attempts to increase average purchases that are considered sufficiently high. For example, if a customer has an average purchase of $125, it may not be reasonable to spool coupons incenting them to spend $135. Percentage to attempt increase in average purchase. Criteria for Super "M". This criteria is based on the failure to increase average purchases by a preset percentage of target increase. Number of trips before testing for Super "M" Coupons to be used for incenting the customer to increase spending. These coupons are tailored to the amount of the customer's target value (base average plus percentage increase). Each coupon contains a minimum target value in order to trigger spooling. For example, Customer A has an average base of $40. Assume a target increase of 10% to make a target of $44 rounded to $45. The first Coupon "M" incentive holds a minimum target value of $50. This coupon is NOT spooled. The second Coupon "M" incentive holds a minimum target value of $45. The third Coupon "M" incentive holds a minimum target value of $30. This coupon IS spooled as well with a minimum purchase qualifier of $45. And so on for the rest of the Coupon "M" incentives all spooled with a minimum purchase qualifier of $45. Customer B has a target value of $35. For this customer, the first and second Coupon "M" incentives are not spooled because this target value does not meet the minimum. The third incentive with a $30 minimum target value IS spooled with a minimum purchase qualifier of $35. And so on with the rest of the Coupon "M" incentives as is done for Customer A, except now the minimum purchase qualifier will be $35. |
| 107 | As is done with Coupon "A", each account record holds fields for tracking coupon programs for Coupon "M". These fields include: Coupon "M" base. The base average arrived at when the program was initiated. Number of trips on Coupon "M" program. Super "M" flag to indicate account is in Super "M" program. Number of trips on Super "M" program. |
| 108 | If account is currently on a Super "M" program: |
| 109 | Calculate average purchase amount of purchases since beginning Super "M". |
| 110 | If average while on Super "M" exceeds preset criteria for percentage of increase of base, GOTO 121. |

| Step | Description |
|---|---|
| 111 | Mark account to receive Super "M" coupons. Increment Super "M" counter. GOTO 122. |
| 112 | If account is not currently in a Coupon "M" program: |
| 113 | If the number of trips does not meet the minimum trips specified to qualify for Coupon "M", GOTO 122. |
| 114 | Calculate a base average purchase amount for this account. Initialize fields for Coupon "M" in account's record to zeros and store base average. |
| 115 | If base average is greater than preset ceiling criteria, GOTO 122. |
| 116 | Calculate a target value by adding preset percentage increase of base to the base value. |
| 117 | Increment Coupon "M" program trip counter. If number of trips in Coupon "M" program is greater than or equal to preset criteria determining number of trips before testing results: |
| 118 | Calculate average purchases while on Coupon "M" program. |
| 119 | If average is less than preset criteria percentage increase for Super "M". GOTO 111 |
| 120 | If average is greater than target value, objective has been achieved. GOTO 122 |
| 121 | Mark account to receive Coupon "M" Coupons. EXAMPLE: Customer makes a purchase. History shows this customer has made 11 purchases including this purchase. The preset criteria for minimum trips required to qualify for Coupon "M" is set to 10, so this customer now qualifies. Assume the average of these 11 purchases is $25. This is stored in the record as the base. The preset criteria for maximum base ceiling for Coupon "M" for this example is $50. This means any account with an average purchase of $50 or more does not qualify for Coupon "M". This account's average is less than $50 so the Coupon "M" tracking counters are set to zero and the program begins. Assume the preset percentage increase is 20%. A target is arrived at by adding 20% of the base to the base -- in this case $25 + $5 or a $30 target. Coupons are spooled with a minimum purchase qualifier of $30 as described previously. Assume the preset value for number of trips before testing results is 5, then on the fifth trip an average is calculated for the trips since beginning Coupon "M", or in this case the last 5 trips. If in this example these last 5 trips averaged $35, the Coupon "M" program would be complete. If the average was still $25, and preset criteria to determine Super "M" specified that more than 50% of target increase should be achieved (in this case $27.50), then this account falls into Super "M". |

Figure 30:
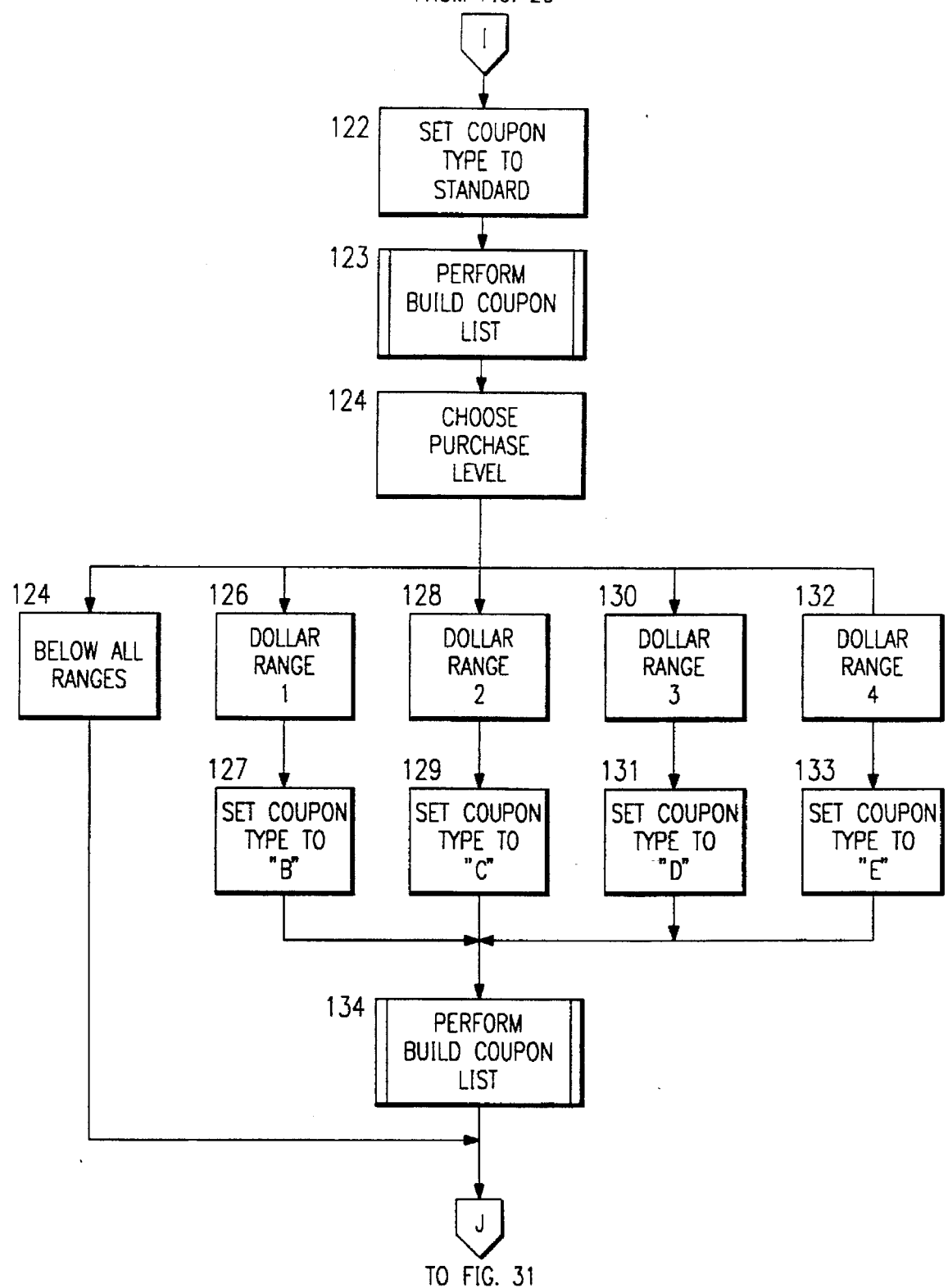
FIGS. 30 and 31 are program flow diagrams illustrating the method of building a coupon list for a POS disbursement of coupons.

FIG. 30 illustrates a flow chart for the building of a coupon list to determine the types of coupons to be printed for disbursal in dependence upon various criteria, such as dollar ranges of prior shopping and other aspects of prior shopping history.

| Step | Description |
|---|---|
| 122 | Build a list of Coupons to be spooled to the customer. Coupons are stored and accessed based on type:<br>Standard - these are coupons that everyone gets regardless of shopping history, special coupon programs, dollar range, etc. These are usually the weekly specials found in the store's other advertisement, coupons from other merchants, and "billboard" coupons that simply inform. This standard series ensures that EVERYONE receives something.<br>Coupon "A" and Super "A" - these are coupons for infrequent shoppers as previously discussed.<br>Coupon "B" thru Coupon "E" - these are coupon classes based on preset spending ranges.<br>Coupon "M" and Super "M" - these are coupons designed to increase average purchase amounts.<br>First in the customer's coupon list will be the standard series run. Set COUPON-TYPE to STANDARD. |
| 123 | PERFORM BUILD-COUPON-LIST (148-163B) and RETURN AT 124. |
| 124 | Now a more targeted set of coupons will be added to the list based on spending levels. These levels are determined from purchase history vs preset dollar ranges. These coupon types are Coupon "B" thru Coupon "E".<br>For example, ranges could be set up as follows:<br>First Range   $25-$50   Coupon "B"<br>Second Range  $51-$75   Coupon "C"<br>Third Range   $76-$100  Coupon "D"<br>Fourth Range  $101+     Coupon "E" |
| 125 | If spending level falls below all preset dollar ranges, GOTO 135. |
| 126 | If spending level falls within the first range: |
| 127 | Set COUPON-TYPE to COUPON-B. GOTO 134. |
| 128 | If spending level falls within the second range: |
| 129 | Set COUPON-TYPE to COUPON-C. GOTO 134. |
| 130 | If spending level falls within the third range: |
| 131 | Set COUPON-TYPE to COUPON-D. GOTO 134. |
| 132 | If spending level falls within the fourth range: |
| 133 | Set COUPON-TYPE to COUPON-E. GOTO 134. |
| 134 | PERFORM BUILD-COUPON-LIST (148-163B) and RETURN at 135. |

Figure 31:
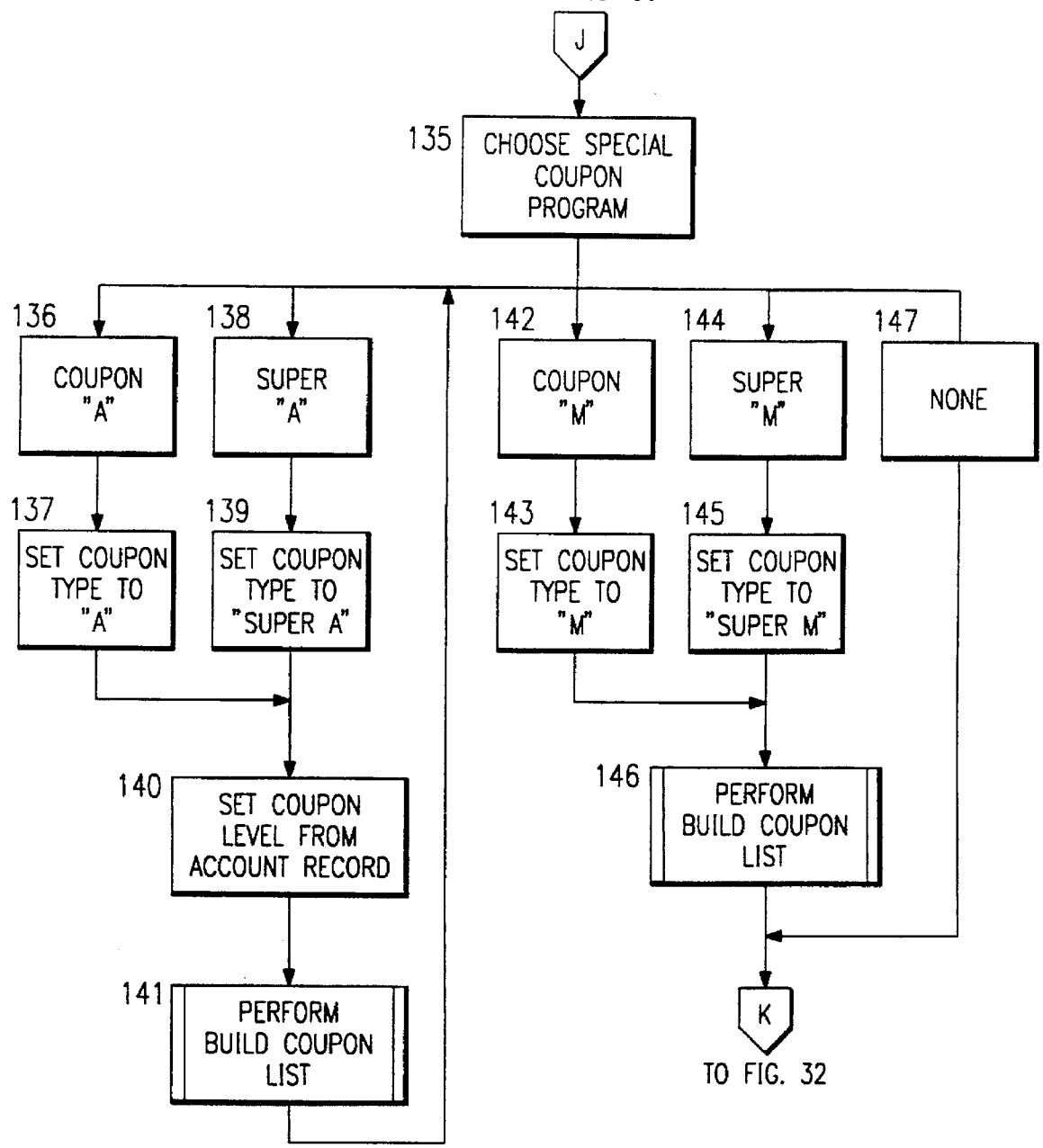

FIG. 31 illustrates the building of additional coupon lists to allow the distribution of various coupons such as Coupon "A", Super "A", Coupon "M", Super "M" and the like:

| Step | Description |
|---|---|
| 135 | Check for enrollment in a special coupon program such as "A" or "M". |
| 136 | If account marked for Coupon "A" |
| 137 | Set COUPON-TYPE to COUPON-A. GOTO 140. |
| 138 | If account marked for Super "A" |
| 139 | Set COUPON-TYPE to SUPER-A. |
| 140 | Set COUPON-LEVEL to coupon level stored in account record as determined in steps 98-105. |
| 141 | PERFORM BUILD-COUPON-LIST (148-163B) and RETURN AT 142. |
| 142 | If account marked for Coupon "M" |
| 143 | Set COUPON-TYPE to COUPON-M. GOTO 146. |
| 144 | If account market for Super "M" |
| 145 | Set COUPON-TYPE to SUPER-M. |
| 146 | PERFORM BUILD-COUPON-LIST (148-163B) and RETURN AT 164. |
| 147 | No special coupon program for this account. GOTO 164. |

Figure 32:
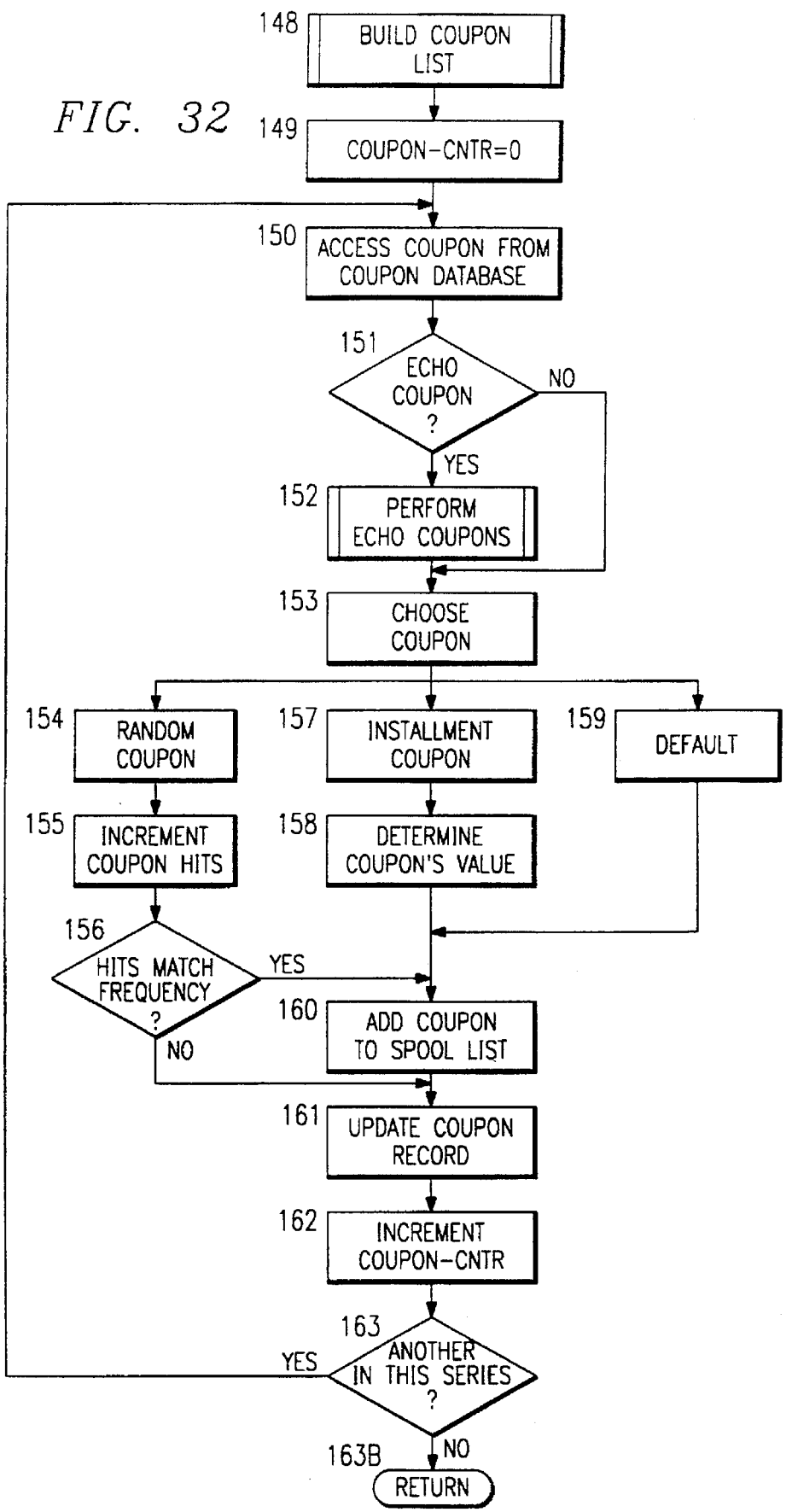
FIG. 32 is a program flow diagram of a subroutine for coupon disbursements, providing the perform build coupon list in the flow diagram of FIG. 30.

FIG. 32 illustrates a subroutine termed coupon series for use in the subroutines shown in FIG. 30 and 31. This subroutine provides for accessing of types of coupons determined by the previous program routines:

| Step | Description |
|---|---|
| 148 | SUBROUTINE BUILD-COUPON-LIST. This routine is passed the COUPON-TYPE and COUPON-LEVEL (if applicable) and adds coupons to be spooled to a COUPON LIST. |
| 149 | One or more coupons may be stored for each COUPON-TYPE. COUPON-CNTR is used to sequentially access each coupon for COUPON-TYPE. SET COUPON-CNTR to 0. |
| 150 | Coupons are stored as follows:<br>COUPON-TYPE - type of coupon<br>COUPON-LEVEL - level of this particular type of coupon<br>COUPON-CNTR - sequential counter for accessing coupons<br>NUMBER-ISSUED - counter for number of coupons issued<br>NUMBER-REDEEMED - counter for number redeemed<br>ECHO-FLAG - flags if this is an ECHO COUPON<br>ECHO-VALUE - determines value of ECHO COUPON<br>HIT-CNTR - used with RANDOM COUPONS<br>RND-SEED - used to determine random frequency<br>COUPON-DATA - text and variables used to make the coupon<br>Using COUPON-TYPE, COUPON-LEVEL, and COUPON-CNTR build a key to access the coupon from the coupon database |
| 151 | If the ECHO-FLAG is set for this record in the coupon database, it means that an ECHO COUPON is to be added to the COUPON LIST.<br>An ECHO coupon is a variable coupon that is determined based on the customer's list of items that have been purchased that contained matches in the BCTT as described in 1-10 and 70-73. An Echo coupon simply attempts to provide the customer with a coupon for an item that the customer has shown a propensity to purchase. For example, a customer has recently purchased disposable diapers. Based on this information, we can determine that the way to incent this customer is with disposable diapers and/or with complements to this product such as baby wipes, baby food, etc. |

| Step | Description |
|---|---|
| | If the ECHO-FLAG is set for this coupon record: |
| 152 | PERFORM ECHO-COUPONS (200–211) and RETURN AT 153. |
| 153 | Two varieties of coupons available are random coupons and installment coupons. |
| 154 | Random coupons are produced at a set frequency as determined for each random coupon. For example, a FREE TURKEY coupon can be set to come out every 50th time that the coupon record is accessed for spooling. If, for example, this coupon is defined for Coupon "E", then every 50th customer that qualifies as a Coupon "E" would receive a coupon for a FREE TURKEY. |
| 162 | Increment COUPON-CNTR. |
| 163 | If another Coupon for this COUPON-TYPE exists, loop back through to add it to the list. GOTO 150. |
| 163B | RETURN TO CALLING ROUTINE |

Figure 33:
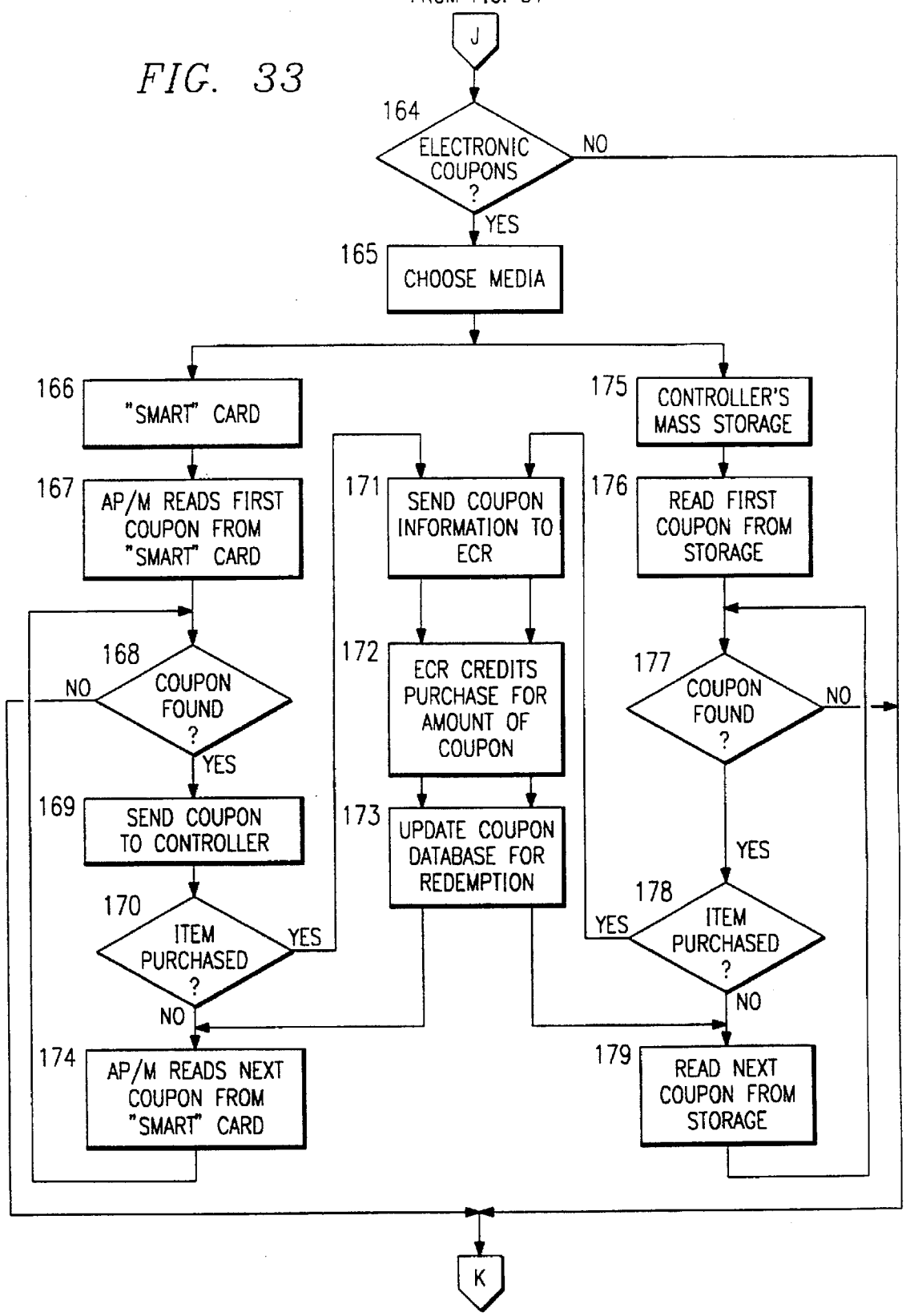
FIG. 33 is a program flow diagram of a method for disbursing electronic point-of-sale incentives previously stored on a smart card or controller's mass storage device.

FIG. 33 illustrates a flow chart for the redemption of coupons electronically. For example, rather than printing out coupons at the printer 976, discounts may be electronically generated and developed by the CVC controller 965. For example, credits for prior purchases may be developed and stored by the CVC controller 965 and applied at subsequent point-of-sale transactions as exemplified by the flow chart of FIG. 33:

| Step | Description |
|---|---|
| 164 | Point-of-sale incentives may be spooled or stored electronically. If incentives NOT previously stored electronically, GOTO 180. |
| 165 | Electronic coupons were previously stored and will now be redeemed. Choose media for previous storage of electronic coupons. |
| 166 | If coupons stored on a "SMART" Card: |
| 167 | AP/M accesses first coupon from "SMART" card using "SMART" card read/write device |
| 168 | If no more coupons, GOTO 180. |
| 169 | AP/M sends coupon to CVC controller. |
| 170 | CVC controller checks coupon against items purchased. If item was purchased: |
| 171 | Coupon information is sent to ECR Controller. |
| 172 | ECR Controller credits customer's purchase amount for value of coupon. |
| 173 | CVC Controller updates coupon database to reflect redemption. |
| 174 | AP/M access next coupon from "SMART" card. GOTO 168. |
| 175 | If coupons stored on mass storage device in CVC controller: |
| 176 | CVC Controller accesses first coupon from storage. |
| 177 | If no more coupons, GOTO 180. |
| 178 | CVC Controller checks coupon against items purchased. If item was purchased: EXECUTE steps 171–173, THEN PROCEED WITH 179. |
| 179 | Read next coupon from CVC Controller's mass storage. GOTO 177. |

Figure 34:
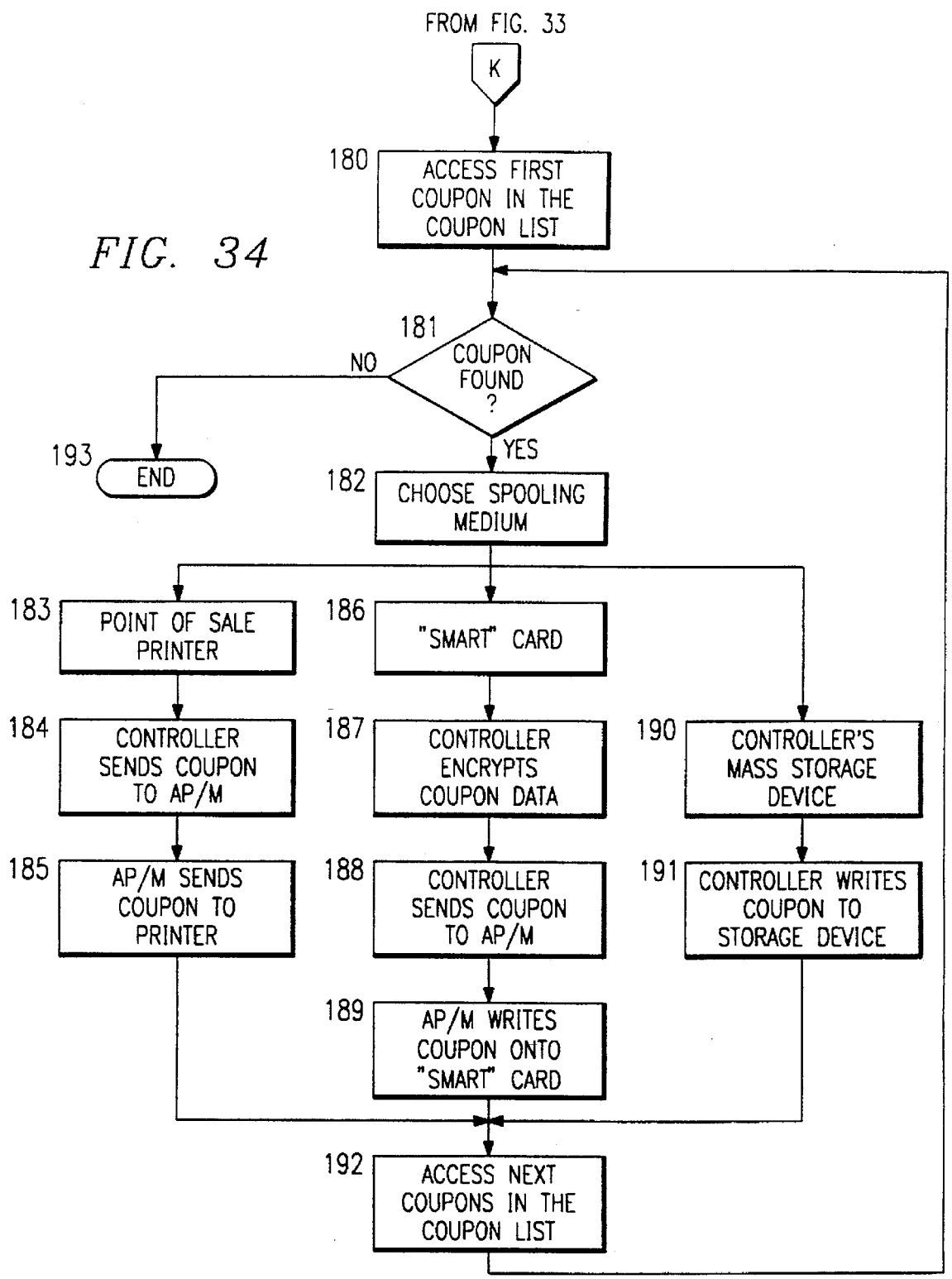
FIG. 34 is a program flow diagram illustrating the disbursement of point-of-sale incentives for future shopping visits by the customer.

FIG. 34 is a flow chart of the disbursement of point-of-sale incentives either by the printing out of a coupon or by storage of electronic funds on a smart card or by a mass storage device at the controller 965:

| Step | Description |
|---|---|
| 180 | A coupon list was built as described in steps 122–163B and will now be spooled. |
| 181 | If end of coupon list, GOTO 193. |
| 182 | Choose medium for dispensing coupons. |
| 183 | If spooling medium is POS printer: |
| 184 | CVC Controller sends coupon to AP/M |
| 185 | AP/M sends coupon to printer. GOTO 192. |
| 186 | If spooling medium is electronic coupon on a "SMART" card: |
| 187 | Controller encrypts the coupon identification data. Encryption will prevent fraudulent coupons from being written to the card. This method optionally allows customer with "SMART" card to redeem coupons at any store from within a network. |
| 188 | Controller sends encrypted data to AP/M. |
| 189 | AP/M writes coupon to "SMART" card with read/write device. Coupon description is sent to ECR for display on purchase receipt tape. GOTO 192. |
| 190 | If spooling medium is electronic coupon on CVC controller's mass storage device: |
| 191 | CVC Controller writes coupon to an electronic coupon file with a primary key based on account number. Coupon description is sent to ECR for display on purchase receipt tape. |
| 192 | Access next coupon from the coupon list. GOTO 181. |
| 193 | END |

Figure 35:
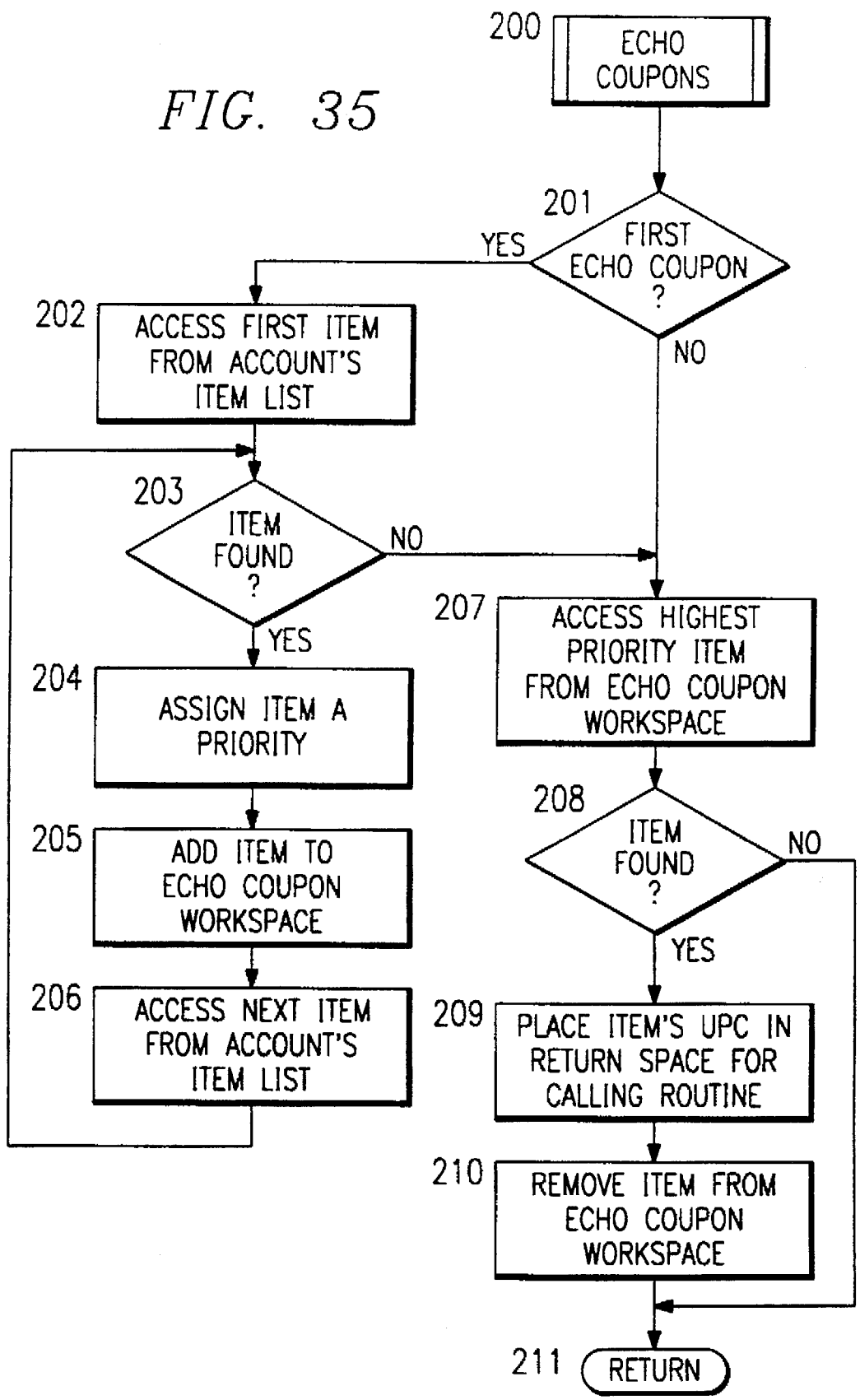
FIG. 35 is a program flow diagram of a subroutine for the echo coupon procedure shown in FIG. 32.

FIG. 35 is a flow chart of a subroutine for generation of an Echo Coupon. Echo Coupons are utilized for promotions that utilize items an individual customer has historically purchased. To induce a particular customer to meet a shopping criteria, such as more frequent visits, it is preferable to use specific products that the customer has previously preferred, such as certain type of meat or a particular product. In other words, if a customer has shown a proclivity to purchase a certain type of product, Echo Coupons are generated in order to ensure that the customer will wish to use a coupon since they are directed to his/her favorite product. This promotion is scaled by the store to vary in numbers of items promoted and are discounted on each item to the customer:

| Step | Description |
|---|---|
| 200 | PROCESS ECHO-COUPONS. |
| 201 | If this is the first ECHO COUPON for this account: A "ECHO COUPON LIST" will be built for this account based on items historically purchased and contained in this account's ITEM LIST described in 1–10 and 70–73. Items are prioritized based on values located in the BCTT. These values include the store's perception of the item's incentive value and the timing based on historical purchases of the item. For Example, a customer has previously bought disposable diapers. The store has rated the incentive |

| Step | Description |
|---|---|
| | value of disposable diapers as a 10 (on scale of 1 to 10), this customer buys disposable diapers every two weeks, and last bought disposable diapers 10 days ago. This item would hold a very high priority and would probably be first in line for incenting this customer. On the other hand, this customer just bought 2 boxes of cereal that is on promotion. Due to the cereal being on promotion, the store may rate the incentive value at a fairly high 9, but since the customer just purchased 2 boxes of the cereal, and historically had not purchased it before, this item would hold a low priority. Alternatively, two boxes of cereal might be considered sufficient inventory for now and not a timely inducement. |
| 202 | Access first item from account's ITEM LIST. |
| 203 | If end of ITEM LIST, GOTO 207 |
| 204 | Assign item a priority. |
| 205 | Add item to ECHO COUPON LIST. |
| 206 | Access next item from account's ITEM LIST. GOTO 203 |
| 207 | Access highest priority item from ECHO COUPON LIST. |
| 208 | If end of ECHO COUPON LIST, no more echo coupons left. GOTO 211. |
| 209 | This item will be passed back to the calling routine. Place item's UPC code in the parameter space for passing values back to the calling routine. |
| 210 | Remove item from ECHO COUPON LIST so it will not be available for choosing the next time through. |
| 211 | RETURN TO CALLING PROGRAM. |

Figure 36:
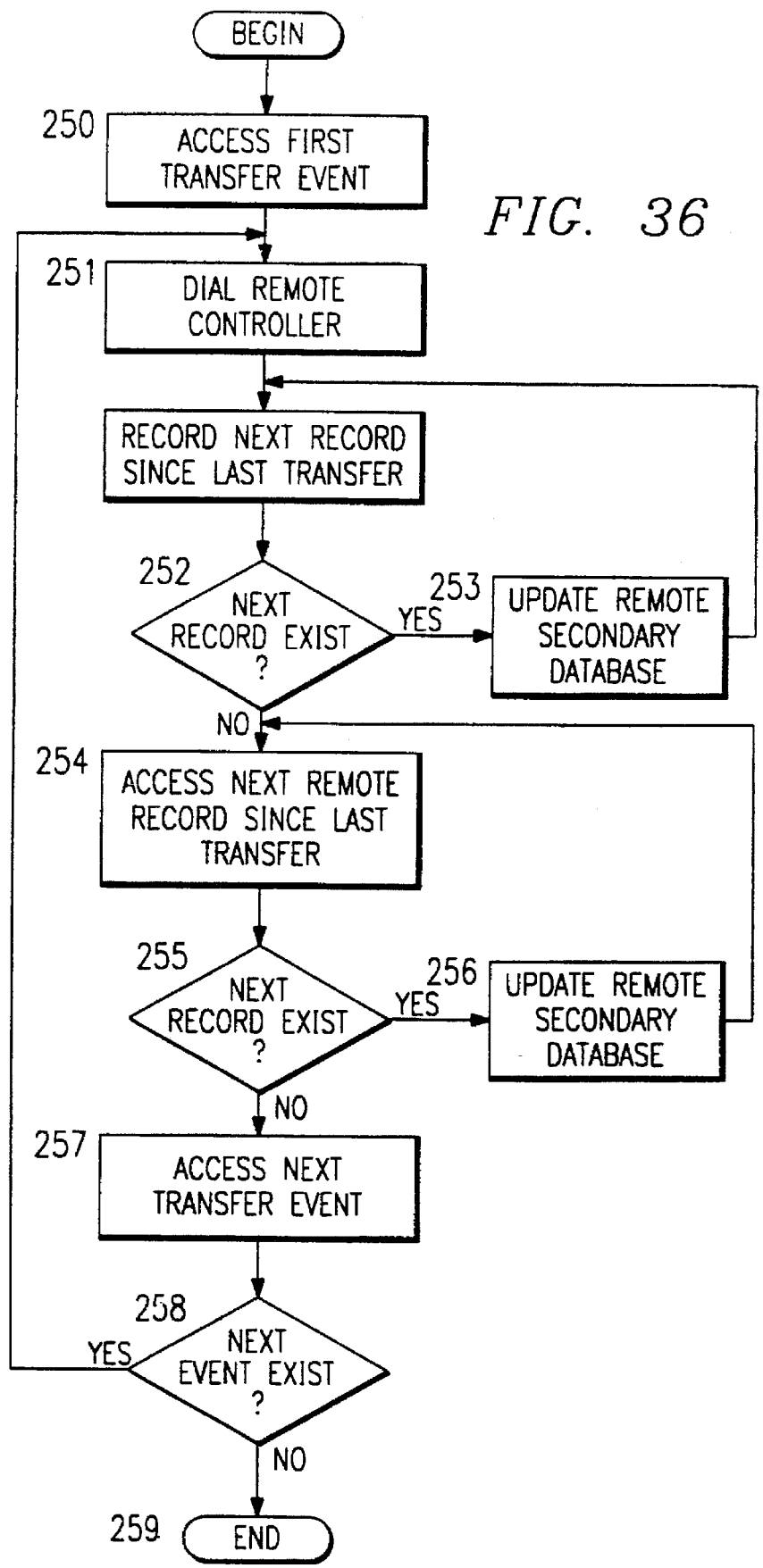
FIG. 36 is a program flow diagram of the transfer of marketing data from a store's CVC controller via a dial-out telephone line to a remote master controller at another store.

FIG. 36 illustrates the transmission of data from the CVC controller 965 of a particular store through a dial-out telephone link to a remote master controller at another store. In this way, the individual stores within a chain can share marketing and transaction information to allow incentive marketing to be provided to an individual customer at different stores in a coordinated basis. Credit verification data can also be transferred between stores. The routine is as follows:

| Step | Description |
|---|---|
| 250 | An event manager executes within the CVC Marketing Systems software so that recurring events may be scheduled. For this process, an event would be scheduled for the CVC Controller at the hub store (Hub CVC Controller) to dial out every hour to CVC Controllers at remote stores (Remote CVC Controllers) for the interchange of that previous hour's shopping data. Access the first event for transfer of marketing data. |
| 251 | Hub CVC Controller dials out to and makes connection with the Remote CVC Controller. |
| 252 | Hub CVC Controller accesses in chronological sequence the next marketing transaction record after the last record sent to this Remote CVC Controller. |
| 253 | If a next record does not exist, GOTO 255. |
| 254 | Marketing transaction record is sent from Hub CVC Controller to Remote CVC Controller for update of Remote CVC Controller's SECONDARY DATABASE. GOTO 252. |
| 255 | Hub CVC Controller sends request to Remote CVC Controller for Remote's next transaction record in chronological sequence after the last transaction record sent to Hub. |
| 256 | If a next record does not exist, GOTO 258 |
| 257 | Remote CVC Controller sends marketing transaction record back to Hub CVC Controller for update to Hub's SECONDARY DATABASE GOTO 255. |
| 258 | Hub CVC Controller disconnects from Remote and looks for the next event for calling the next Remote in the network of CVC Controllers. |
| 259 | If a next event exists, GOTO 251. |
| 260 | Transfer of marketing data is complete. |

Figure 37:
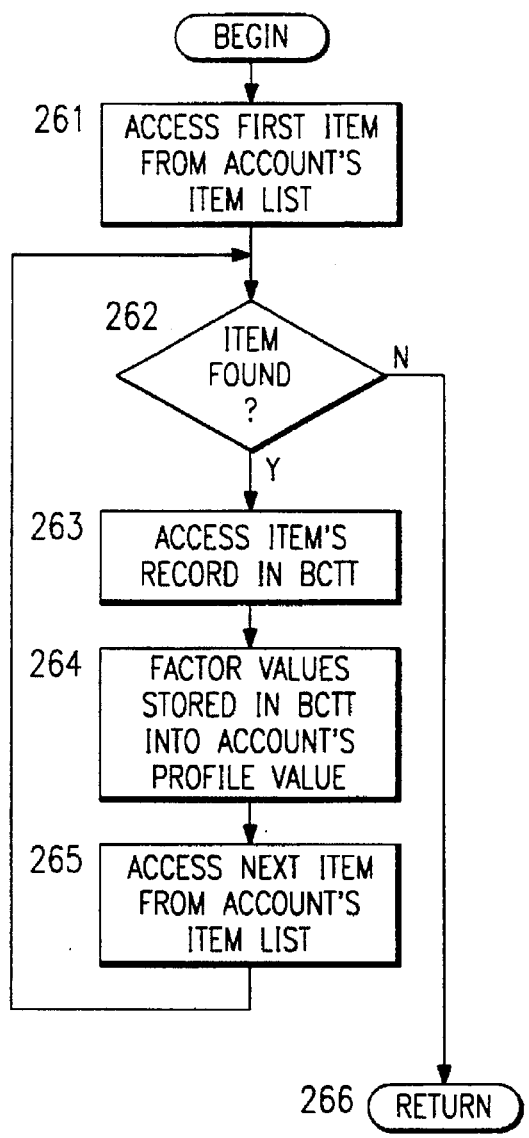
FIG. 37 is a program flow diagram of the building of a profile value indicating what products a customer bought.

FIG. 37 is a program flow diagram illustrating the building of a profile value which is based upon items purchased by a customer. This profile value is then used by the system, as will be described with respect to FIG. 38, in order to determine how valuable a particular coupon will be for a particular customer. The process of FIG. 37 is as follows:

| Step | Description |
|---|---|
| 261 | This procedure is executed on account's ITEM LIST as discussed in steps 1–10 and 70–73 previously described. Access first item from ITEM LIST. |
| 262 | If no items left in ITEM LIST, GOTO 266. |
| 263 | Access item in stored table BCTT. |
| 264 | Factor profile level in BCTT into level held for this account. |
| 265 | Access next item from ITEM LIST. |
| 266 | End of Process. Example: The BCTT contains a number of generic brands and coupon UPC's with a profile value indicative of the "bargain hunter" value of the product or coupon. Assume Customer A purchases a large number of generic items and redeems many coupons, this customer on a scale of 1 to 10 may have a profile value of 9. On the other hand, Customer B purchases many items that either have no match in the BCTT, or items in the BCTT that indicate that price is little or no object for this consumer. Customer B may have a profile value of 1. |

Figure 38:
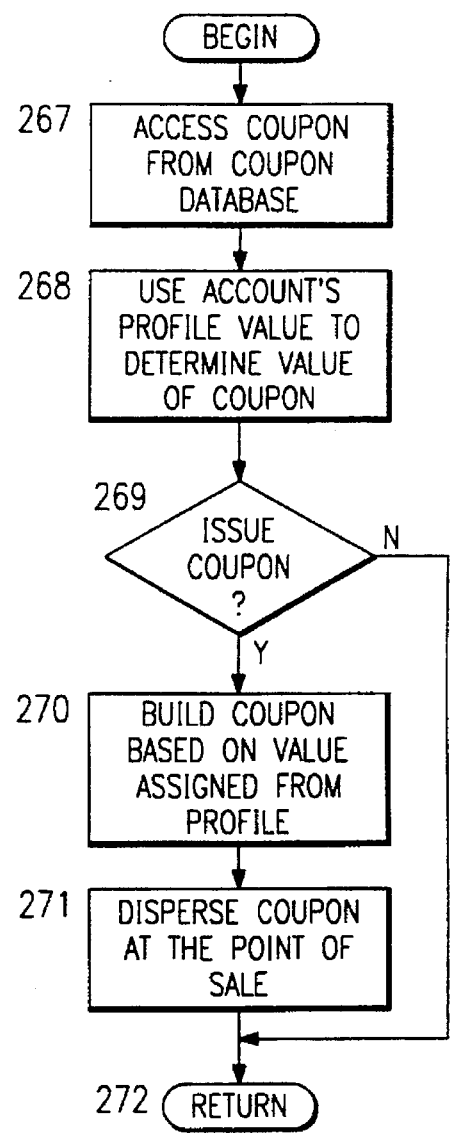
FIG. 38 is a program flow diagram illustrating use of the profile value to denote how valuable a coupon will be for the customer of FIG. 37.

FIG. 38 is a program flow diagram illustrating the use of the profile value determined in FIG. 37 in order to determine how valuable a coupon will be for a particular customer. The process begins with the following:

| Step | Description |
|---|---|
| 267 | Access the target coupon from the Coupon Database. |
| 268 | This Coupon has a variable value associated with it. Match this account's profile value with the range of values to determine the value of the coupon. |
| 269 | If value is not greater than 0, GOTO 272. |
| 270 | Build coupon based on value. |
| 271 | Pass coupon back to calling procedure so it may be added to the coupon list for dispersement. |
| 272 | End of Process.<br>These profile values may now be used as an indication of how much value to assign to individual coupons. The assumption being that customers with a high profile value require greater incentive than those with lower value.<br>Example: Assume a manufacturer is promoting a particular product and is selling the product to the store at $1.00 off the regular cost. Using profiles, the store can regulate the amount off for each customer based on their profile value. Assume both customers in the previous example are to receive this promotion at the point-of-sale. Customer A has demonstrated that he/she only buys cut-rate products at the lowest price (profile value of 9). If the value of the coupon is set up on a straight line relation to profile, then this customer would receive a coupon offering 90¢ off. In contrast, Customer B has demonstrated little sensitivity to price (profile of 1) and therefore needs less incentive to buy this product. He/she receives a coupon for 10¢ off. |

Figure 39:
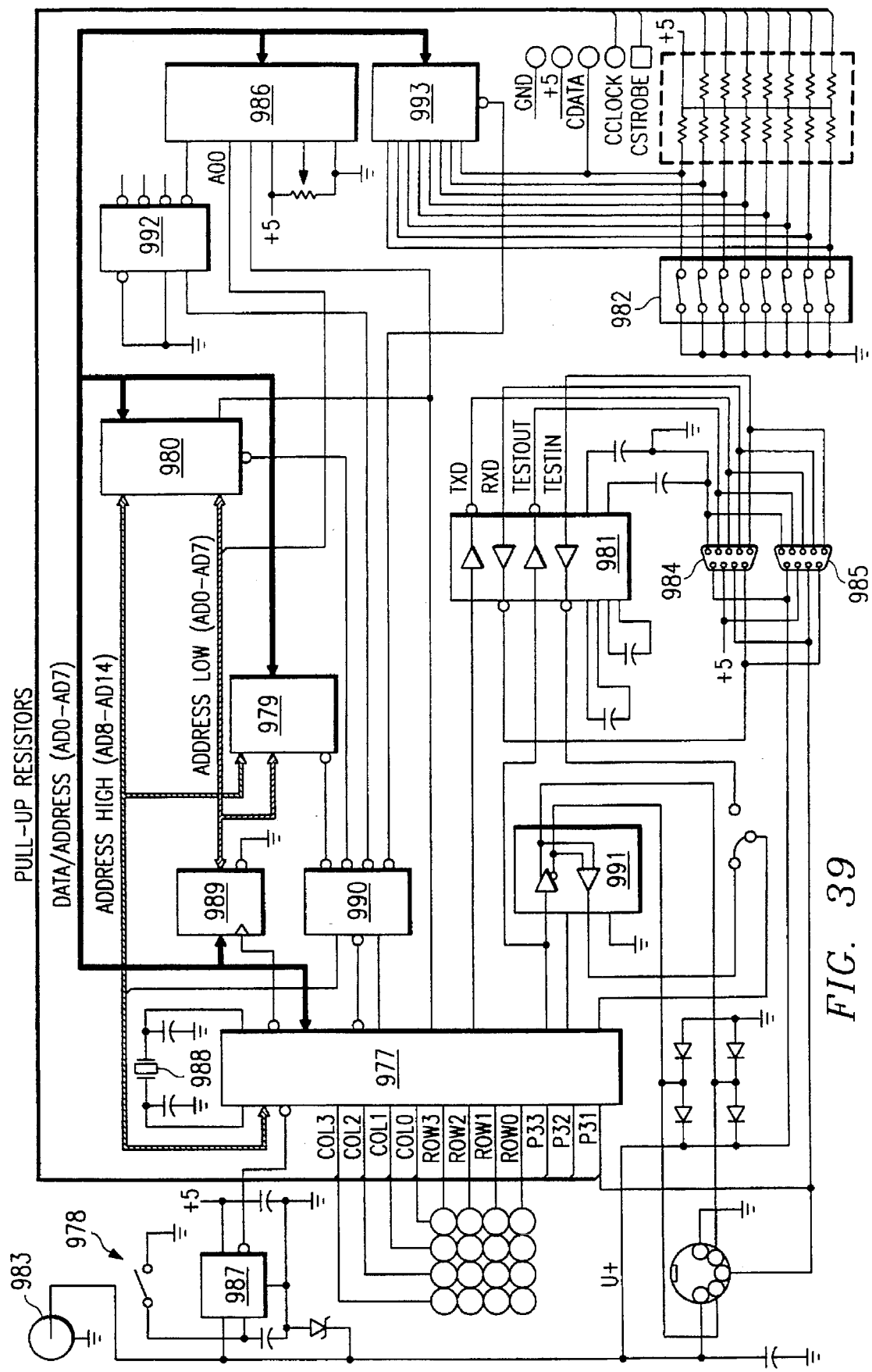
FIG. 39 is a schematic electronic diagram of the AP/M terminal of FIG. 21.

FIG. 39 is a schematic diagram of the AP/M terminal of FIG. 21. The terminal includes a 32K static RAM memory chip 977 which provides a temporary residence for information during the processing of an individual entry procedure through the keyboard of the terminal. Switch 978 is a plunger-type spring return SPST switch which permits the re-initialization of the terminal in case of momentary interruption of electricl power.

The terminal further includes an EPROM 979 and a RAM 980. A TTL→RS232 communications conversion amplifier chip 981 permits the use of either TTL or RS232 signals, to permit a wide variety of commercially available peripherals, printers, check readers and the like.

An 8-position DIP switch 982 permits each AP/M terminal in a store-wide system to be uniquely identified with an electrical address. Power jack 983 provides a connection for external DC power to operate the terminal. D-subminiature 9 contact connectors 984 and 985 provide multiple purpose input/output ports, any one of which may be connected to a high speed thermal POS printer, an impact receipt printer, a debit card magnetic stripe reader, a PIN entry keypad, a smart card read/write unit, a credit card magnetic stripe reader and a MICR reader. Display for the terminal is provided by the LCD 986. A nineteen key pad is provided to allow data to be manually input.

A listing of the chip identification and model number for a specific embodiment of the schematic of FIG. 39 is herein set forth:

| DRAWING # | MFG. P/N | MANUFACTURER |
|---|---|---|
| 983 | RAPC712 | Switchcraft |
| 986 | DMC16207 | Optrex |
| 978 | TP11SH8ABE | Switchcraft |
| 979 | 27C64-2015J | Microchip |
| 977 | Z86C9320PSC | Zilog |
| 980 | SRM20256LC12 | S-MOS |
| 989 | TC74HC374AP | Toshiba |
| 990 | TC74HC139AP | Toshiba |
| 991 | SN75176BP | Texas Instruments |
| 981 | MAX232 | Maxim |
| 987 | LM2925T | Bourns |
| 988 | MP9.8304MHZ | M-Tron |

Addresses for the manufacturer set forth above are as follows:

Bourns, 1200 Columbia Ave., Riverside, Calif. 92507 (714) 781–5050

M-Tron, 100 Douglas, Yankton, S.D. 57078 (605) 665–9321

Maxim, 120 San Gabriel Dr., Sunnyvale, Calif. 94086 (408) 737–7600

Microchip, 2355 West Chandler Blvd., Chandler, Ariz. 85224 (602) 963–7373

Optrex, div Asahi Glass, 44160 Plymouth Oaks Dr., Plymouth, Mich. 48170 (313) 416–8500

S-Mos, 2460 N 1st, San Jose, Calif. 95131 (408) 922–0200

Switchcraft, div Raytheon, 5555 N. Elston, Chicago, Ill. (312) 792–2700

Texas Instruments, 13510 N. Central Expressway, Dallas, Tex. 75243 (214) 995–2011

Toshiba, 1220 Midas Wy, Sunnyvale, Calif. 94088 (408) 739–0560

Zilog, 210 E. Hascienda Ave., Campbell, Calif. 95008 (408) 370–8000

Figure 40:
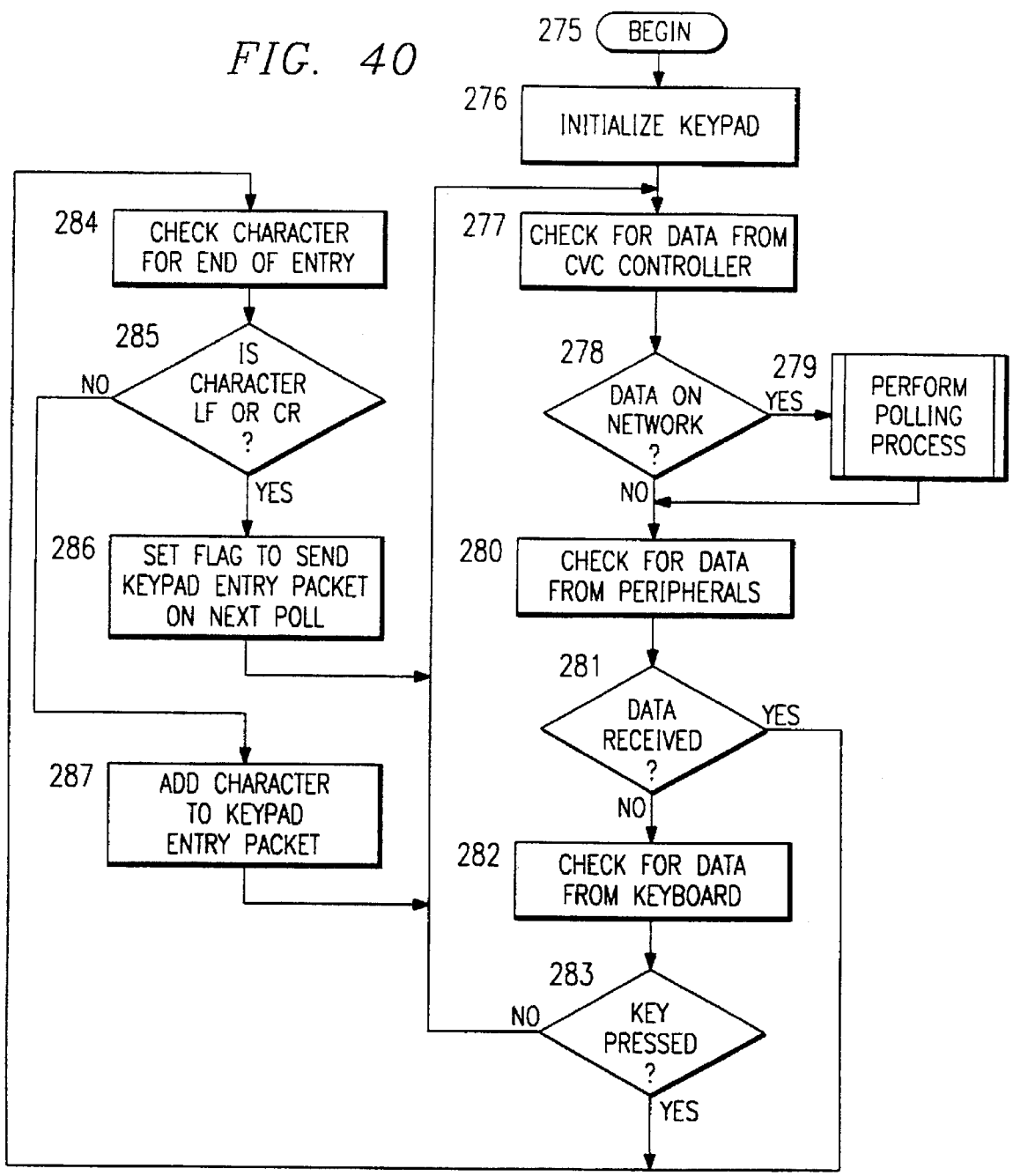
FIG. 40 is a program flow diagram of the operation of the AP/M terminal of FIGS. 21 and 39.

FIG. 40 is a flow diagram which illustrates the operation of the AP/M terminal of FIG. 39. Referring to FIG. 40, at step:

| Step | Description |
|---|---|
| 275 | The CVC AP/M terminal is powered up and boots into the AP/M program. |
| 276 | Initialize AP/M terminal. The AP/M address dip switches are read to determine this AP/M's unique address. Through-out the initialization process the network is monitored to ensure that no other AP/M is using this AP/M's address. If another AP/M is using the address, control will jump to an infinite loop displaying that this AP/M's address is already being used.<br>The CVC Marketing Systems title is displayed on the AP/M and the printer if attached. Then a message concerning issued patent protection and patents pending is displayed and printed as well. |
| 277 | Enter ID is prompted on the terminal screen to let the clerk know it is ready to accept input. The following steps are repeated as an infinite loop.<br>The AP/M terminal resides on a network in a STAR topology using a |

| Step | Description |
|---|---|
| | single twisted pair balanced RS485 communications standard. The hub of the star is the CVC Controller which acts as the master. Communications is executed in a broadcast form with a token passing protocol to determine which AP/M is being addressed. In other words, if there are 3 AP/M's on the network, the Controller "polls" each AP/M one at a time in order to coordinate their activities. When an AP/M receives a poll token with its address, it responds with either an '%' which means "I'm here, but I don't need anything", or an '&' followed by data for the Controller. The AP/M may also receive a data token followed by data for display on its screen or for sending to the printer. First the AP/M checks for data from the RS485 network line. |
| 278 | If data is detected on the network: |
| 279 | PERFORM the Polling Process (steps 288–307) and RETURN at step 280. |
| 280 | Peripherals such as a check reader, coupon printer, card swipe, etc. are cabled to the AP/M terminal. These peripherals use an RS232 communications standard. The AP/M checks for data coming in from the RS232 port. |
| 281 | If data is detected, then GOTO 284. |
| 282 | Data is entered from the clerk into the AP/M via a 19-key keypad on the AP/M. The AP/M checks for data coming from its keypad. |
| 283 | If NO key has been pressed, then GOTO 277. |
| 284 | Data from the AP/M's keypad is terminated with a Carriage Return (CR). Data from peripherals may be terminated with a Carriage Return (CR) or a Line Feed (LF). Check now for an end of data character. |
| 285 | If character is NOT a LF or CR, then GOTO 287. |
| 286 | End of data has been detected. Set a SEND DATA FLAG indicating that data is to be sent to the CVC Controller the next time the AP/M is polled. GOTO 277. |
| 287 | This character will be added to the KEYPAD ENTRY PACKET which is a holding buffer to hold data awaiting a termination character. The AP/M maintains separate holding buffers for its keypad's entry and for data coming in from the RS232 port. GOTO 277. |

FIG. 41 illustrates a flow diagram for the polling process subroutine. The steps include:

| Step | Description |
|---|---|
| 288 | POLLING PROCESS SUBROUTINE. When a character is read off of the RS485 network, it is analyzed to determine if it is intended for this AP/M. The following summarizes the polling characters and their functions. Assume this is an AP/M at address = 1. Polling Character (Binary) Polling character's function 100aaaaa (0 × 80 | pad # (bit wise boolean)) This is a poll character from the host requesting data from a specific AP/M addressed by the binary address 'aaaaa'. If the addressed AP/M has no data, it will reply with a '%'. Data sent from the AP/M will be preceded with an '&'. In the case of an error in the previous command from the host, the poll is answered with an '*'. This AP/M's poll token is 10000001 (binary). 101aaaaa (0 × A0 | pad # (bit wise boolean)) This character precedes a string of data to be displayed on the addressed AP/M's display. This AP/M's display data token is 10100001 (binary). 110aaaaa (0 × C0 | pad # (bit wise boolean); followed by 0 × 55 (01010101 binary)) These two characters precede a string of data to be sent out of the addressed AP/M's printer port. The second character (0 × 55) is used to ensure that the preceding token was not arbitrary garbage. The character string may contain the following special function characters: NULL (0): Indicates that the following character should have the MSB set. SOH (1): Indicates that the following character is to be passed to the printer if it is a NULL or SOH. If the following character is 2 thru 15, then the contents of special buffer addressed logical 1 thru 14 respectively will be printed. If for some reason the AP/M has no data in the specified buffer, the next poll request will be answered with an '*'. If the following character is 16 thru 29, then the following data stream is to be stored in the appropriate special buffer addressed 1 thru 14 respectively. This data stream will then be terminated with a combination SOH (1) followed by either 16 thru 29 to jump to another special buffer address for loading a data stream, a 2 thru 15 to jump to a special buffer for spooling to the printer, or any character greater than 29 to simply terminate the load process. This AP/M's print data tokens are 11000001 (binary) followed by 01010101 (binary). 11100000 (0 × E0; followed by 0 × 55 (01010101 binary)) These two characters precede a string of data to be sent out to all AP/M's in broadcast fashion for display on the terminal screen. 11100001 (0 × E1; followed by 0 × 55 (01010101 binary)) These two characters precede a string of data to be sent out to all AP/M's |

| Step | Description |
|---|---|
|  | in broadcast fashion for spooling to the printer. |
| 289 | As can be seen from studying the binary forms of the various tokens, the first three bits from the left indicate the function of the token and the remaining five bits from the AP/M address for which the token is intended. Check the poll character's first three bits. |
| 290 | Case ON OFF OFF (or 100). This is a poll for service token. |
| 291 | The lower five bits of this character can make up to 32 ON/OFF combinations. These combinations are used to determine the AP/M address for which polling is directed. In the case of this AP/M address = 1, the bit pattern would be OFF OFF OFF OFF ON (00001). If the lower five bits DO NOT EQUAL 00001, then this token is for a different AP/M. GOTO 307. |
| 292 | Token character is equal to 10000001 which is intended for this AP/M. Check the SEND DATA FLAG to see if data resides in a buffer for sending to the Controller. |
| 293 | IF "SEND DATA FLAG" is NOT SET, then GOTO 295. |
| 294 | OUTPUT a '&' character on the RS485 network. This tells the Controller that data is to follow. Following the '&' character the AP/M sends the data stored in the appropriate KEYPAD ENTRY PACKET out on the RS485 network to the Controller. GOTO 33. |
| 295 | OUTPUT a '%' character on the RS485 network. This tells the Controller "I'm Here, and I have nothing to send". GOTO 307. |
| 296 | Case ON OFF ON (or 101). This is a send to display token. |
| 297 | The lower five bits of this character can make up to 32 ON/OFF combinations. These combinations are used to determine the AP/M address for which polling is directed. In the case of this AP/M address = 1, the bit pattern would be OFF OFF OFF OFF ON (00001). If the lower five bits DO NOT EQUAL 0001, then this token is for a different AP/M. GOTO 307. |
| 298 | Token character is equal to 10100001 which is intended for this AP/M. Continue reading the rest of the display data packet. |
| 299 | Send data from the display data packet to the AP/M'S LCD display. GOTO 307. |
| 300 | Case ON ON OFF (or 110). This is a send to printer token. |
| 301 | The lower five bits of this character can make up to 32 ON/OFF combinations. These combinations are used to determine the AP/M address for which polling is directed. In the case of this AP/M address = 1, the bit pattern would be OFF OFF OFF OFF ON (00001). If the lower five bits DO NOT EQUAL 00001, then this token is for a different AP/M. GOTO 307. |
| 302 | Token character is equal to 11000001 which is intended for this AP/M. |

| Step | Description |
|---|---|
|  | Continue reading the rest of the print data packet. |
| 303 | Send data from the print data packet to the AP/M'S RS232 port for the printer. GOTO 307. |
| 304 | Case ON ON ON (or 111). This is a BROADCAST token which is intended for every AP/M on the network. |
| 305 | The lowest bit of this character determines whether the data following is to be directed to the printer (bit is ON) or to the display (bit is OFF). |
| 306 | If the low order bit is ON (11100001) then GOTO 302. Otherwise (bit is OFF (11100000)), then GOTO 298. |
| 307 | RETURN to calling program and resume at Step 280. |

Whereas many of the examples described herein illustrate generation of coupons based upon dollar purchases by customer, it should be understood that similar types of targeted marketing will also be provided by the system based upon the types of products bought by the purchaser or the departments in the store from which the products were bought. As previously described, the system contemplates the use of the UPC data received by the passive listening device 964 (FIG. 19) to provide specific indications of the products purchased by customers. This would not only provide information about the type of product purchased, but also the size and type of the product. This information is stored by the system and can be used to provide targeted marketing by generating incentive coupons particularly directed to types of products which has been shown that the customer desires. Thus, although the examples herein illustrate coupons generated based on dollar volume, the same types of procedures can be used to generate coupons which are based upon products purchased by the customer. This concept is illustrated in greater detail in certain of the following examples.

It will now be described that it is important to monitor how a customer responds to the incentives generated by the present system. In reality, not every single customer responds to an incentive. Experience shows that perhaps 15–20% of the customers respond to the most lucrative incentives. Once the customer meets an infrequent shopping history criteria, the present system incents them. The system records that incentive in the database as part of the history file of that individual shopper's identification. Then the system takes an additional step of monitoring the activity of that shopper.

Any one incentive given to a multiplicity of shoppers is evaluated differently by each individual customer. Take two examples: (1) consider an incentive that provides $2 Off on the next shopping visit, if the customer spends $25 and do it within a week. If the customer is a widowed, single woman living on a fixed income, that $2 might represent 10% of her weekly food budget and therefore be a pertinent valuable incentive to her. On the other hand, to a housewife who has five teenagers at home and spends $250 a week, $2 off may not be a sufficient incentive to modify her behavior in any significant way.

(2) In another example, on a product level, the same widow woman might consider an offer for a free 12-oz. box of detergent very pertinent, but the housewife with five dirty teenagers might not find that product volume a sufficient incentive to change brands.

So, each individual incentive given to a group of people is evaluated differently by those people. Assuming several thousand people shop a store twice in the prior 8 weeks, that is hardly a homogeneous group. So, it is important to provide an incentive to those who meet an infrequent' shopping history criteria, but once that incentive is made, it should be recorded in the history file of that individual shopper.

In addition to recording that incentive in the database, the system monitors the activity of that customer in a subsequent period. Monitoring can take a couple of different avenues. First, the system can monitor customers to determine if they return to the store within the appropriate time limit of the incentive and do they spend the required amount (if there is a required amount) pursuant to the terms and conditions of the incentive. So, simply monitoring future activity is indirect evidence that the incentive was complied with. On another basis, the system can scan the redemption of a coupon through the bar code reader, or the redemption act itself can be manually entered.

In order to easily scan in the redemption of coupons, bar code data may be printed on the coupons. The bar code reader of the invention can then scan the coupons and the scanned information is stored in the customer's shopping history. In the alternative, a manual input, can be used, wherein a coupon is given an ID number and that ID number can be manually input into the cash register so that the pre-programmed discount is available. Either way, the coupon is either manually input or machine read so that there is a positive feedback that the redemption act itself occurred. Subsequent activity subsequent to the incentive can thus be monitored basically one or two ways, either through redemption or through monitored customer activity.

Once the system monitors a customer's subsequent activity, subsequent to the incentive, then the system can record the response. The system may then have a preset criteria of response and if that customer meets the preset response criteria, the system may either maintain that incentive over a preselected time interval or may initially or subsequently reduce that incentive over a preselected time interval. If the response criteria is favorably met, and the retail store is happy with the performance by the customer, then the store can either maintain or reduce or maintain and subsequently reduce the value of the incentive. On the other hand, if the customer fails to meet the response criteria, as is often the case, the incentive may be increased or changed.

For example, a store may offer an incentive to come back again in the next seven day period and if the customer does, the store gives $2 off the shopping visit. The store then monitors that customer to see if he performed according to the terms and conditions. Did he come back and do what the incentive provided that he should do? If not, then the value of the incentive may be increased.

Recognizing that every group of customers, and in fact, every individual customer has different valuations of an incentive, and depending on whether or not a store has the product or whether the store is short of on inventory a product, the incentive may be changed. If customer response is monitored and the customer does not respond, the incentive can be increased in successive layers until the store finally gets the desired response. This approach provides for an enormous amount of efficiency, because in the "$2 off your next shopping visit" example, if the store provided this incentive to the 2,767 customers that are in Table 5 who shopped only twice in the last 8 weeks, it is unlikely that greater than a 15% participation would be obtained. If so, that 15% may be left at a $2 incentive because it works for them. But the 85% that the program did not work for will need to have their incentive increased. The present system allows a store to customize the incentive, whether it is on a shopping visit criteria, or a product group, or a department, or an individual specific product basis.

With respect to Coupon "M" as described herein, a criteria is set of prior purchases and an attempt is made to incent someone to increase that historical level of prior purchases. Taking that historical purchase level as a base, Coupon "M" seeks to incent above that by providing customer response monitoring to each to an incentive. An incentive is provided to increase customer purchases, the system monitors and records that incentive in the customer history file, then the system monitors and records the response. If the customer meets that response criteria, the store can either maintain that incentive over a preselected time or the store can reduce that incentive over a preselected time either immediately or subsequently. Alternatively, the store can maintain the incentive a while and then choose to increase it or the store can increase the incentive if the customer has not favorably met a response criteria. The coupon increase can be organized in successive layers. A new incentive can be issued, the response is monitored and if they meet the response, the system can choose among the alternatives of maintaining or reducing. If they do not meet the response criteria, the system can increase the coupon value, or differentiate subsequent coupons, until the desired reaction is obtained from the individual customer or household.

While the prior disclosure has described infrequent shopping history criteria in terms of store purchases, department purchases or specific product purchases, it is important also to use arbitrary groupings of products and use that as a target criteria. This grouping of products may not include just all cookies for example, but an arbitrary grouping of products might include any number of different types of snack foods. It is important to include arbitrary groupings of products, because if a single product is set up as a criteria and someone is infrequent to that criteria, a manufacturer might believe the customer is not buying chocolate chip cookies and the customer needs to be incented to buy chocolate cookies. In fact, the manufacturer may make many different varieties of cookies, and the customer may buy a different type cookie. Thus, the manufacturer may then be substituting one cookie in the product line for another and having a commensurate reduction in gross profit because they would be using an incentive to do so.

It should also be considered in this grouping the concept of buying cycles that are specific to the type of product in question. In certain prior systems, if a shopping basket does not include a particular product and so is not scanned in this current transaction, then the prior system prints out a coupon for that product. Without stored customer history, the prior system is not capable of considering whether or not the customer just bought yesterday or last week that very product and will not be incented. The present system retains a stored shopping history in order to make an intelligent decision as to incent or not. Buying cycles can in some instances be quite long. For example, a 3 lb. can of coffee might only be bought every 6 to 8 weeks and the customer's average shopping visit to supermarkets is twice a week. Thus, one out of every sixteen visits somebody buys a 3 lb. can of coffee. So the buying cycle is an important consideration as to how to incent a customer.

The history of products being purchased is stored and organized into arbitrary groups by manufacturer in the present database, so that a manufacture does not take business from himself. An average buying cycle may be determined over the entire customer base. As an example, assume for this entire store or this entire region, the average consumption of a coffee product is 4 ounces per week. Although the coffee is only bought every eight weeks, the consumption rate of that coffee is 4 oz. a week. The system may store the average consumption rate for the customer base as a whole so that the store can use that as a starting point for saying that a customer is at or below this consumption rate. That says nothing about the individual household, but the average consumption rate is a starting point that says on a new customer or a new promotion for a coffee, the store has a standard to begin with. Therefore, a customer who buys 3 oz. a week should be incented.

A more sophisticated embellishment of that concept is to track the consumption rate per customer ID, so that the store knows what the single woman living alone consumption rate is for clothes washing detergent vis-a-vis the family of seven. Because for each there is a different buying cycle to be sure, but also there is a different consumption rate. It is the consumption rate that is very important to determine, not the buying cycle, because the buying cycle is largely determined or influenced by what size is bought. The woman living alone might have a 8 month buying cycle because she buys a tub of clothes washing detergent but uses very little.

So, if the store obtains the consumption rate of a product group, then the store can obtain a much more refined criteria by which to judge the individual ID or customer ID or individual household. The store or manufacturer of a product can thus structure an inducement based on the customer's consumption rate. It may be inappropriate to give the single woman an inducement 50¢ off a 5 lb. can of Folgers when that is a two year supply for her. So, it is important to establish the consumption rate for an individual ID and or household and then set up a criteria with respect to an individual manufacturer's product group. While a customer is consuming from this general group of products, "X" amount per week, the customer is detected as consuming very little of a particular manufacturer's product. The store can then incent that customer because he is an infrequent customer to the particular product. The incentive can be based on something that is appropriate to the customer's consumption rate. It can be an incentive on a big size if the customer is a big user, or a small size if the customer is a small user. The present system can thus determine and distribute an individualized, personalized, custom-tailored, inducement based on individualized consumption rate monitoring.

The groupings of products can be manipulated based on any number of variables. For example, it may be desired to manipulate a product group based on seasonality. A manufacturer, for example, might want to include hot cereals in the four winter months and exclude it from their product group in the summer months. The group of products may thus be manipulated to bring products in and out of that group based on holidays or based on any number of variables that are pertinent to the manufacturer. While the retailer may look at infrequent shoppers more from the perspective of store visits and department visits and purchases, the manufacturer looks at the shopper from the perspective of meeting an infrequent criteria with respect to their product group, arbitrary product group or a specific product.

Once those two groups are arrived at, they may be overlaid such to incent someone who is infrequent to a department or to the store and it is desired to incent them from the retailer standpoint. For example, it may be noted that a store's customers are not buying a manufacturer's ham and the grocer says people are not frequenting his pharmacy. So by combining forces to go after a common customer, the manufacturer and the retailer can target market people who are infrequent to the pharmacy and use ham as an incentive of those who are infrequent to ham. This approach provides cost sharing between the retailer and the manufacturer, because a refined population that is infrequent to both can be targeted, costs can be shared and the incentive can be increased. For example, using the example of ham and the pharmacy, the manufacturer of ham might agree to reduce the cost of ham and the retailer agrees to pay for the other half of the ham if the customer will come to the pharmacy. By combining forces, the customer gets a free ham, the manufacturer and store reduce costs, and the value of the incentive is heightened.

Another feature of the invention may be termed a "Grab Bag" coupon technique. A coupon "Grab Bag" is a group of incentives which are accessed in succession for dispensing to a particular customer segment. The "Grab Bag" may be accessed in a random fashion in the same way as a single coupon. The "Grab Bag" may also be directed to a particular target such as Coupon "A's". In the current system up to 10 incentives may be grouped into a single "Grab Bag".

EXAMPLE 1

A store wishes to test redemption rates for varying "dollar off" coupons for Coupon "A" shoppers. A "Grab Bag" is set up to choose one incentive on a 1:1 ratio (every time) from the following five coupons in a grab bag:

Grab Bag Coupon #1—$1.00 off with a minimum purchase of $25.00

Grab Bag Coupon #2—$2.00 off with a minimum purchase of $25.00

Grab Bag Coupon #3—$3.00 off with a minimum purchase of $25.00

Grab Bag Coupon #4—$4.00 off with a minimum purchase of $25.00

Grab Bag Coupon #5—$5.00 off with a minimum purchase of $25.00

Once this "Grab Bag" is activated, the first Coupon "A" shopper receives a $1.00 off coupon and that coupon's database record is updated to reflect one issuance. The second Coupon "A" shopper receives a $2.00 off coupon, the third a $3.00 off coupon, the fourth a $4.00 off coupon, and the fifth a $5.00 off coupon with each coupon's database record updated to reflect an issuance. The sixth Coupon "A" shopper receives a $1.00 off coupon and thus the cycle is repeated for the number of coupons indicated for dispersing in the coupon database. In this way a truly random, yet uniform and easily tracked number of Coupon "A" shoppers have been issued "dollar off" coupons of varying values. Redemptions may now be analyzed in order to more intelligently decide which incentive would be most appropriate for this particular customer segment.

EXAMPLE 2

A store has been allowed 15,000 promotional items by the manufacturer to give away in their NOW-Coupon system. These promotional items are made up of 3,000 each of five different flavors of edible widgets. A decision is made to direct 1,000 of each flavor as Coupon "A" incentives and direct 500 of each flavor to the B,C,D, and E categories. Since less edible widgets are allotted to the primary shopper categories, a "Grab Bag" is set up for each with a random ratio to control the rate at which the coupons are dispersed. The following is the configuration for Coupon "B's".

Coupon category: Coupon "B"
Random ratio: 1:5
Grab Bag Coupon #1—Free Box of Edible Widgets—Grape (Issue:500)
Grab Bag Coupon #2—Free Box of Edible Widgets—Cherry (Issue: 500)
Grab Bag Coupon #3—Free Box of Edible Widgets—Strawberry (Issue: 500)
Grab Bag Coupon #4—Free Box of Edible Widgets—Lemon (Issue: 500)
Grab Bag Coupon #5—Free Box of Edible Widgets—Orange (Issue: 500)

Once this "Grab Bag" is activated, the first four Coupon "B" shoppers would not receive a coupon for edible widgets. The fifth Coupon "B" shopper would receive a coupon for a box of Grape. The next four Coupon "B" shoppers receive no coupon from this "Grab Bag". The tenth shopper overall receives a coupon for a box of Cherry, and so on until 500 of each flavor has been issued to Coupon "B" shoppers.

The coupons generated by the system have various fields used for plugging dynamic dates based on coupon definition and amounts based on the specific customer's spending level. For example, a coupon may be set to expire at an 'exact' date, such as Jul. 4, 1993. Or the coupon may be set to expire a specified amount of time from the issue date (called the 'delta' date). For example, if today is Jun. 21, 1993, and the 'delta' date is 604,800 seconds (1 week), then the expiration date printed on the coupon will be Jun. 28, 1993. Amounts may be plugged onto a coupon based on a percentage of the current purchase (including percentages greater than 100%), or on a Maxxer base or target for specifying minimum purchase qualifiers.

The identifiers listed below are available for display on any coupon printed by the system. These special macros are flagged with a preceding '@'. For example, if a beginning valid date is indicated on the coupon, a "@DB" would be placed on the line: Coupon Valid @DB The @DB tells the program to calculate the date equal to the specified number of seconds from right now. For example, if on Jun. 21, 1993 the above line is encountered and the record specifies that @DB should be 86,400 seconds from the present date, the line on the coupon would read:
Coupon Valid Jun. 22, 1993

| | |
|---|---|
| @DB = Delta Begin Valid: | calculate a beginning date n seconds from now as specified by 'dbegin' in the coupon's header record. |
| @EB = Exact Begin Valid: | display the exact beginning date specified by 'ebegin' in the coupon's header record. |
| @DB = Delta End Valid: | calculate an ending date n seconds from now as specified by 'dend' in the record. |
| @EB = Exact End Valid: | display the exact ending date specified by 'eend' in the record. |
| @TV = Maxxer Target Value: | used for minimum purchase message. Uses the Maxxer target in the ID record. |
| @TP = This Purchase amount: | used for typing dollars spent to a value displayed on the coupon. Uses 'in_ratio' from the customer record to calculate a percentage of the purchase amount (including percentages of 100% and over). |
| @FQ = Weekly Frequency: | Demonstration and display purposes only, generates a bit map of the prior 8 weeks attendance; ie 00100000 shows 1 week attended 3 weeks ago. |
| @AD = AVG dollar: | Displays the average dollar expenditure. |
| @SC = Secondary Class: | Displays the Secondary Class (such as A 1). Could be embedded in a serial number for identification purposes. |
| @PC = Primary Class: | Displays the Primary Class (such as B, C, D, etc) Could be embedded in a serial number for identification purposes. |
| @FL = Issuance flags: | Demonstration and display purposes only, generates a bit map of coupons classes issued. |
| @RT = Registered Trademark: | Generates the special character to identify a registered trademark. |
| @TM = Trademark: | Generates a special character containing the "TM" in one character space. |
| @CP = Copyright: | Generates the special character for Copyright notices. |

It may thus be seen that the present invention provides the ability to generate a large number of different types of coupons depending upon the customer's prior shopping history. The following Tables 7–10 provide specific examples illustrating the generation of different types of incentive coupons based upon prior shopping history of a customer.

Table 7 illustrates a coupon configuration which may be entered into the data storage of the present system in order to determine the types of coupons to be issued. For example, COUPON "A" will be issued to a customer having less than five weekly attendances in the last eight weeks. COUPON "A" Levels A1–A5 denote different types of coupon levels depending upon the attendances and purchases by a customer in an eight week period. COUPONS "B"–"E" are determined by the amount of purchases made by a customer on the average. For example, a COUPON "B" will be provided to customers who have an average purchase of 0–$24.99 per each store visit. For the coupon configuration of Table 7, the scanned data by the bar code reader is not utilized, but an example of the utilization of such scanned product data will be subsequently noted.

Utilizing the coupon configuration set forth in Table 7, a Customer No. 1 profile is provided in order to indicate a customer to which would be provided a COUPON "B" by the printer. It may seen in this instance, Customer No. 1 has made a total of 223 trips to the store with an average purchase of $22.43. The current purchase being made by the customer is $24.98. In the last eight weeks, the customer has attended the store six times, once one week ago, once two weeks ago, once four weeks ago, once five weeks ago, once six weeks ago, and once seven weeks ago. This customer is denoted a frequent shopper and thus will not be provided a COUPON "A" which would be reserved for an infrequent shopper. Thus, Customer No. 1 would be provided with a COUPON "B".

Paragraph 2 of Table 7 illustrates a Customer No. 2 profile who would receive a COUPON "C". It may be seen that this customer has a higher average purchase than customer No. 1 and has had five attendances in the last eight weeks. Again, Customer No. 2 would not be determined to be an infrequent shopper, but instead would be determined to be a frequent shopper. Thus, this customer would not be provided with COUPON "A" but would be provided with a COUPON "C" because of his higher average purchase.

Paragraph 3 of Table 7 illustrates the various coupons which would be generated by the system for Customer No. 1. Six standard coupons would be first spooled out by the printer of the invention, which would include informational coupons advertising the store's new delicatessen. The standard coupons would also provide installment coupons of 25 "turkey bucks". The customer could accumulate the turkey bucks until a certain number had been reached, at which time he or she could receive a turkey. Coupons also include an outside coupon providing a free drink at Rod's sandwich shop with the purchase of a sandwich. A discount coupon would also be spooled off to the customer which provides 50¢ off canned peas, another discount coupon providing 75¢ off chicken fryers and a sixth coupon providing a $3.00 discount off of a new prescription. Customer No. 1, being denoted as a COUPON "B" type of customer, would be provided with two "B" COUPONS providing a discount of 50¢ off a laundry detergent and another coupon providing 25¢ off a cereal.

The coupons spooled off to Customer No. 1 may be compared to the coupons spooled off to Customer No. 2, which are set forth in Paragraph 4. Customer No. 2 receives essentially the same standard six coupons, with the exception that this customer obtains 48 turkey bucks due to the higher level of his purchases, the current purchase being approximately $48. Customer No. 2 receives two "C" COUPONS, one providing a discount of $1.00 off a bakery purchase of $5.00 or more and a second providing a discount of 50¢ off of ½ gallon ice cream.

Paragraph 5 of Table 7 provides a profile of Customer No. 3 who receives a "D" COUPON. It may be seen that this customer has a higher dollar average of purchases than Customer 1 and 2 and has seven attendances in the last eight weeks, thus making him or her a frequent shopper.

Paragraph 6 illustrates a Customer No. 4 profile who is to receive an "E" COUPON. It may be seen that this customer has an even higher average in purchases and has seven attendances in the last eight weeks. This makes him/her a frequent, high volume shopper.

Paragraph 7 lists the coupons provided to Customer No. 3. It may be seen that the six standard coupons are the same as previously described, except that Customer No. 3 receives 59 turkey bucks because of his higher purchase. Customer No. 3 receives two "D" COUPONS, the first providing $2.00 off of the purchase of meat of $10.00 or more and a $1.00 discount off a deli pizza.

Paragraph 8 indicates the coupons to be spooled off by the printer to Customer No. 4. Again, the six standard coupons are provided, with the exception that 127 turkey bucks are provided to the customer because of the high purchases. In this instance, the customer is provided with two discount "E" COUPONS, the first providing a $2.00 discount off a deli purchase of $10.00 or more and a $3.00 discount off of any five gourmet style frozen entre. In addition, a random lottery COUPON "E" is provided wherein one coupon is randomly generated out of each 100 accesses of the COUPON "E" database. If Customer No. 4 was the lucky winner of the random 1 out of 100 access, Customer No. 4 would be provided a coupon indicating that he or she is a lucky winner of a free ten pound turkey. This random lottery feature generates excitement among high volume purchasers.

Paragraph 9 is a profile of a Customer No. 5 who has made 81 visits to the store and in the past has had relatively high purchase levels. However, the system has detected that Customer No. 5 has not attended the store in the last eight weeks. The system defines this Customer No. 5 as an infrequent shopper and determines that the customer is to receive a COUPON "A-5".

Paragraphs 10–22 indicate the various coupons which are provided to Customer No. 5 in the next thirteen trips made to the store by Customer No. 5. In other words, the system determines that Customer No. 5 is an infrequent shopper and determines to induce the shopper to return to the store in a series of visits. The coupons spooled out to Customer No. 5 in the next thirteen trips to the store are determined by the shopping activity of a customer. In the program illustrated by paragraphs 10–22, the customer does return to the store and is successfully induced to become a frequent shopper. Paragraphs 10–22 thus indicate how the system provides inducement to an infrequent shopper.

Paragraph 10 illustrates the first trip back to the store by Customer No. 5 after at least an 8 week absence. The COUPON "A" level 5 procedure is implemented such that the customer is provided with the six standard coupons previously noted. However, in this instance, the customer is also provided with COUPON "D" providing the customer with discounts off of meat and the deli pizza. In addition, this customer is provided with a substantial inducement discount of $8.00 off the next purchase of $40.00 or more or $4.00 off the next purchase of $25.00 or more. In addition, the customer is provided with three additional discount coupons for discounts off of soda, milk and eggs.

Paragraph 11 indicates that the customer was indeed induced to return back to the store 7 days later by the high coupon values and purchased $71.78 worth of groceries. Again, the customer was provided with the six standard coupons and was provided with two "D" COUPONS. The customer was provided four A-5 coupons providing a discount of $4.00 off the next purchase of $25.00 or more plus discounts off of soda, milk and eggs.

Paragraph 12 indicates a return by the customer 5 days later and a purchase of $54.81. Again, the six standard coupons were generated to the customer, along with two "D" COUPONS. Four A-5 coupons were provided, one providing a discount of $4.00 off the next purchase of $25 or more and discounts on soda, milk and eggs.

The remaining paragraphs 13–22 indicate subsequent returns of the customer and indicates that continued inducements are provided to the customer to insure that the customer returns. At paragraph 16, it may be noted that the amount of discount dollars off the next purchase are reduced, since the customer is becoming a frequent shopper. Paragraph 18 indicates that the A-5 coupon discounts are becoming of less value. It may be seen that trips 11 and 12 shown in paragraphs 20 and 21 provided the customer with only a single A-5 coupon. Finally, at trip number 13 as indicated by paragraph 22, the program is determined to be complete as the customer has become a frequent shopper. No additional A-5 discount coupons are provided to the customer, but only the six standard coupons along with the two "D" COUPONS. The customer would continue to be monitored by the system and if the customer again became an infrequent shopper, the system would then again implement an infrequent shopping program for that customer.

Table 8 illustrates a COUPON "M" program wherein a normal or frequent shopper is detected, but where it is desired to attempt to increase the customer's shopping level. As shown in table 8, paragraph 1 illustrates a typical COUPON "M" configuration. COUPON "A" level and purchase levels are identical to the coupon configuration shown in table 7. However, in this instance the COUPON "M" routine is turned on and a COUPON "M" is determined to attempt to provide a 10% increase on an average purchase of $50 or less. The effectiveness of the program will be detected after three trips by the customer.

Paragraph 2 of Table 8 indicates a profile of Customer No. 6 in order to illustrate the generation of a COUPON "M" program. Customer No. 6 is determined by the system to have made 223 total trips to the store and has an average purchase or $22.43. The customer has attended the store six times in the last eight weeks and is therefore a frequent shopper. However, the system determines the "Maxxer base" or average purchase of the customer now to be $22 each store visit and the program will attempt to induce the customer to increase his or her average purchases to $25 per visit within a three visit program. Paragraph 3 of Table 8 illustrates the coupons that are generated by the COUPON "M" program. The customer is provided with the normal six standard coupons previously noted and two "B" COUPONS. However, the customer is also distributed a "M" COUPON providing a discount $1.00 off of the next grocery purchase of $25 or more, in order to attempt to induce the customer to increase his average purchase.

Paragraph 4 illustrates trip number two, seven days later wherein the customer indeed does increase his purchases to $31.68. The customer is again generated the six standard coupons and two "B" COUPONS, but is additionally generated another "M" COUPON which provides him with a $1.00 discount off the next grocery purchase of $25 or more. Paragraph 5 illustrates the next visit of the customer seven days later wherein a purchase of $36.45 is made. Again, the standard coupons and two B COUPONS are generated, along with a "M" COUPON again providing a $1.00 discount off the next purchase of $25 or more. Paragraph 6 illustrates trip number four wherein a $29.67 purchase is made, providing an average purchase since the M program began of $32.60. The program is determined to be successful and complete and the "M" COUPON program is deleted. The customer then receives the standard six coupons along with two B COUPONS but in this instance does no longer receive a "M" COUPON.

Paragraph 7 of Table 8 illustrates a Customer No. 7 profile wherein the customer is a frequent shopper and has an average purchase $66.41. The system determines that the Maxxer or current average base of the customer of $66 per visit is so high that it is not practical to attempt to increase that customer's purchases. Thus, the customer is determined to be out of range for a COUPON "M".

Consequently, paragraph 8 indicates that the customer at that visit is generated only the six standard coupons and two "D" COUPONS and is not provided with the COUPON "M" as previously noted.

Table 9 illustrates a SUPER "A" COUPON program wherein a series of program steps are implemented in order to attempt to induce an infrequent shopper with high incentive coupons. Paragraph 1 of Table 9 illustrates the coupon configuration previously denoted, with the COUPON "M" and scanned data techniques turned off. However, the coupon configuration indicates that the SUPER "A" COUPON configuration is energized and is applied to the customers presently involved in the Coupon "A" program, and who have been absent from the store 30 or more days. The coupon configuration, indicates the duration of the SUPER "A" program is three trips.

Paragraph 2 of Table 9 profiles Customer No. 8 who has previously visited the store with an average purchase of $73.62, but who has recorded only 2 attendances in the prior 8 weeks and is thus noted as an infrequent shopper. Paragraph 3 thus indicates the coupons spooled to Customer No. 8 in the next visit to the store. Six standard coupons and two "D" COUPONS are generated to the customer as previously described. However, this system's high incentive coupons noted determine as coupons A3 are provided to the customer. One A-3 discount coupon provides a $6 discount off the next purchase of $40 or more or $3 of the next purchase of $25 or more. The other two A-3 discount coupons provide free soda and free bread. The free coupons are high incentive coupons in order to insure that the customer comes back to the store to obtain the free merchandise at a subsequent visit.

Paragraph 4 illustrates the second visit to the store made by Customer No. 8, wherein three high incentive A-3 coupons are provided to the customer. Paragraph 5 illustrates the number three trip by Customer No. 8 wherein three A-3 discount coupons were provided.

Paragraph 6 illustrates the fourth trip made by Customer No. 8. It will be noted that trip number four is made 35 days after trip number three. The system detects the length of time between the third and fourth visits and begins a SUPER "A" program on Customer No. 8 to incent his return by adding higher value coupons. With this visit, the Customer No. 8 is provided with the six standard coupons and two "D" COUPONS. However, the customer is now provided with five SUPER "A" COUPONS. One coupon provides a discount of $8 off the next purchase of $40 or more or $4 off the next purchase of $25 or more. The customer is provided with a coupon for a free 12 pack of soda, free ice cream and a free whole chicken fryer, along with 25 bonus turkey bucks.

As shown in Paragraph 7, since the customer began a SUPER "A" program in paragraph 6, the system determines this visit to be trip 2 on a SUPER "A" program. This trip to the store is seven days from the start of SUPER "A" program and results in the purchase of $48.92. The customer is provided with the six standard coupons, two D COUPONS and five SUPER "A" COUPONS to continue the high incentive.

Paragraph 8 illustrates the next visit by the customer to the store, with a resulting purchase of $55.63. The program determines the SUPER "A" program to be successful and complete. At this visit, the customer is provided with five SUPER "A-3" coupons. However, Paragraph 9 indicates that the next trip places the customer back on the COUPON "A" program and the next visit by the customer is determined to be trip number four on the COUPON "A" program. In other words, the customer's hiatus in visiting the store during the "A" COUPON program kicked the customer into a SUPER "A" program for a series of visits until the customer again became a more frequent visitor. Paragraph 9 thus illustrates then the generation of only three A-3 coupons rather than the SUPER "A-3" coupons previously noted. Paragraph 10 illustrates trip number 5 on a COUPON "A" program and shows the generation of only two A-3 coupons. Paragraphs 11–18 illustrate successive visits by the customer and indicate subtle reductions in the coupons as the customer becomes a more frequent shopper, until the customer begins to receive the standard coupons on trip number 13 as indicated in paragraph 18. If the customer subsequently again becomes an infrequent, the system automatically detects this and may again implement higher incentive programs.

Table 10 illustrates the use of the scan data function of the present invention wherein the bar code reader generates data indicating the specific articles purchased by a customer and this data is utilized by the present system to incent the customer. Paragraph 1 of Table 10 illustrates that the system is set with the coupon and purchase levels as previously described. The coupon configuration however is set to provide a COUPON "M" and SUPER "M" coupon. Scanned data is used to build ECHO coupons and customer profiles as previously described.

Paragraph 2 defines the profile of a Customer No. 9 and illustrates a COUPON "M" and SUPER "M" program using ECHO coupons for incenting. This table will assume that the customer has previously purchased disposable diapers and baby food at that store and those articles have been scanned in by the system and stored. Customer No. 9 may be seen to be a frequent shopper, having an average purchase of $22.43 and having six attendances in the last eight weeks. It is determined by the system to attempt to incent this purchaser up to a Maxxer target of $25 per visit, or an increase of approximately 10% in the average purchase.

Paragraph 3 thus indicates the coupons generated to Customer No. 9 on the first trip after beginning the COUPON "M" program. Six standard coupons are generated along with two standard "B" COUPONS. However, in this instance, an ECHO COUPON of $1 off disposable diapers on a purchase of $25 or more at the store is generated to the customer. The system has previously determined that this customer is subject to desiring coupons for purchasing diapers. It is believed that the generation of this coupon will highly incent the customer to return to the store and spend $25 or more in order to receive a $1 off disposable diapers. Paragraph 4 thus indicates trip two of Customer No. 9 seven days from the start of the program. The customer only purchased $21.68 worth of groceries, therefore did not use the ECHO COUPON provided on trip one. The system generates the same coupons as previously generated, including the ECHO COUPON of $1 discount off of disposable diapers if the customer purchases $25 or more of total groceries.

Paragraph 5 illustrates the third trip by the customer and indicates that the customer only purchased $16.45. The system again generates the ECHO COUPON providing $1 discount off disposable diapers.

Paragraph 6 illustrates trip number four wherein the system evaluates the success of the ECHO and COUPON "M" program. It is determined that there has been no increase in average purchases by the customer since the implementation of the program. Thus, a SUPER "M" program is instituted to provide higher incentive in order to incent this particular customer. Thus, two SUPER "M" ECHO COUPONS are provided to the customer on this fourth visit. One ECHO COUPON provides a free box of disposable diapers with a purchase of $25 or more and $1 off of baby wipes with a purchase of $25 or more on the next visit.

Paragraph 7 illustrates the next visit nine days later by the customer wherein a purchase of $36.84 is noted. This indicates that the program is indeed working and again two SUPER "M" ECHO COUPONS of free disposable diapers and a discount off of baby wipes are generated to the customer.

Paragraph 8 indicates the third SUPER "M" trip visit 40 days from the start of the program and indicates the purchase of $32.32. The system thus determines that the duration of SUPER "M" program is complete and the two SUPER "M" ECHO COUPONS are issued.

Paragraph 9 illustrates coupons spooled to the customer on the visit 46 days from the program start.

Paragraph 10 thus indicates the coupons spooled off to the Customer No. 9 on the next visit. On this visit, a purchase of $29.11 was made by the customer. This purchase provides the system indicating that the average purchases by the customer since the program began is over $25 and thus the COUPON "M" system is successful and is complete. Consequently, the customer is no longer provided with the higher incentive coupons but is only provided with the six standard coupons and two "B" COUPONS. The system has incented the customer to raise the customer's average purchases to a higher level and the system will thereafter monitor the customer to insure that the purchases are maintained at that higher level. If the customer's visits become less frequent or if the dollar volume decreases, the system will automatically institute a higher incentive program to incent that customer.

The following provides additional information on how the present system enables targeted marketing to households which are infrequent shoppers of a particular product group. Assume a manufacturer of five varieties of chocolate chip cookies (BRAND A) wants to target marketing at households who historically demonstrate an infrequency to their product group. The following parameters are set in a group of grocery stores utilizing the present invention:

Householding is activated linking the various accounts of various payment instruments within a single household based on the household's telephone number.

Historical shopping history is transferred between stores to ensure purchases at all locations is merged.

The consumption of the following products are tracked in order to arrive at an average rate of consumption of bakery type snack products (PRODUCT TYPE):
1. Manufacturer's own product group.
2. Other manufacturer's chocolate chip cookies (BRANDS B, C, and D)

UPC's and product sizes in ounces are stored in the Bar Code Tracking Table (BCTT).

Cookies other than chocolate chip (i.e. BRAND E'S creme filled Cookies).

Other bakery type snack items such as BRAND F's cupcakes and other cake type snack items.

The following Levels of Coupon "A" are set with each level providing incentives for 5 trips. The "deal" represents the discount offered off of list price for each level, as shown on Table 11.

BRAND A is indifferent to which of their variety of chocolate chip cookies is purchased, so a "grab bag" is set up to rotate through the five variations in the following manner:

Item 1—BRAND A chocolate chip cookie—original
Item 2—BRAND A chocolate chip cookie—w/fudge stripes
Item 3—BRAND A chocolate chip cookie—chewy
Item 4—BRAND A chocolate chip cookie—w/big chips
Item 5—BRAND A chocolate chip cookie—w/candy coated chips In this way, the first time the "grab bag" is accessed, the "original" BRAND A is used. The second time, BRAND A "w/fudge stripes" is used. The third time, "chewy" is used, and so on, looping through the five varieties in succession.

The criteria for infrequency to the product group are as follows:

A tracking period of 10 or more weeks must be collected for an account (or accounts within a single household) before targeting that account.

Of the consumption rate accumulated for the whole PRODUCT TYPE, a consumption rate of 50% or less of BRAND A's product group is considered infrequent.

The product sizes shown in Table 12 are used as incentives based on average consumption levels of PRODUCT TYPE. The idea being to avoid using an inappropriate product size such as a 32 ounce size used as an incentive for a household that only consumes 3 ounces per week.

The criteria for Super "A" will be the failure to redeem the coupon dispensed the prior week. The following Levels of Super "A" are set with each level providing incentives for 2 trips, as shown in Table 13.

The shopping profiles shown in Table 14 demonstrate how a variety of incentives may be directed toward different households based on their actual consumption.

The delta shown in Table 15 demonstrates various Product Group Coupon "A" Programs.

Household #1's consumption shown in Table 14 was tracked for 10 weeks and found to average 17 ounces per week of the overall PRODUCT TYPE (all bakery type snack items), but averaged only 4 ounces per week of BRAND A. This 24% consumption falls short of the preset criteria for infrequency and falls into a Coupon "A" Level 3 as shown in Table 11. Additionally, referring to Table 12, the 20 ounce package size will be used for incentives to this household. Table 15 shows the initial offering to Household #1 and the following weeks of activity. Note the initial offering is 60¢ OFF the 20 ounce package of BRAND A. This offering was arrived at based on the "Deal" indicated in Table 11 (25% OFF for Level 3) applied to the list price indicated in Table 12 ($2.50 for the 20 oz. package) rounded to the nearest 5¢. The scenario for Household #1 is that every following week this customer redeems the 60¢ OFF coupon and therefore receives that same incentive until the program runs out (5 trips).

Household #2's consumption shown in Table 14 was tracked for 14 weeks and found to average 12 ounces per week of the overall PRODUCT TYPE (all bakery type snack items), but averaged only 2 ounces per week of BRAND A. This 17% consumption falls short of the preset criteria for infrequency and falls into a Coupon "A" Level 2 as shown in Table 11. Additionally, referring to Table 12, the 12 ounce package size will be used for incentives to this household.

Table 15 shows the initial offering to Household #1 and the following weeks of activity. Note the initial offering is 60¢ OFF the 12 ounce package of BRAND A. This offering was arrived at based on the "Deal" indicated in Table 11 (40% OFF for Level 2) applied to the list price indicated in Table 12 ($1.50 for the 12 oz package) rounded to the nearest 5¢. It is important to note the difference between the Coupon "A" campaign for Household #2 vs Household #1. First, Household #2 had a lower PRODUCT TYPE consumption rate than Household #1 and therefore is being incented with the 12 oz package size rather than the 20 oz. Second, Household #2 had a lower percentage consumption of BRAND A vs PRODUCT TYPE and therefore received a higher incentive (40% OFF vs 25% OFF). In Household #2's campaign shown in Table 15, note that in week #2 this customer did NOT redeem the coupon dispensed in the prior week. This failure to respond to an incentive puts this customer's status to the first level of Super "A".

As indicated in Table 13, the first level of Super "A" results in an incentive equal to a 20% increase over the original incentive, or, in this case, 70¢ OFF of the 12 oz package. In week #3, the customer once again fails to respond to the incentive and therefore moves to level 2 of Super "A" with a higher incentive of 85¢ OFF of the 12 oz size. In week #4, the customer redeems the coupon and receives another coupon for 85¢ since this has proven to work. In week #5, the customer once again redeems the Super "A" coupon. This redemption results in the completion of Super "A" and the customer resumes the Coupon "A" program receiving the original incentive of 60¢. Weeks #6 and #7 result in redemptions, so the customer once again receives a coupon for 60¢. In week #8, however, this customer once again fails to respond to the incentive and once again begins the Super "A" campaign at level 1. This time, the first Super "A" coupon for 70¢ is redeemed in week #9 but the second one is not redeemed in week #10 and therefore advances to level 2 once again with a Super "A" coupon for 85¢. This incentive once again proves sufficient for getting the customer to purchase BRAND A and once again falls back to Coupon "A" for week #12 and upon redemption in week #13, this Coupon "A" program is concluded.

The subsequent households portray additional examples of this method of targeted marketing whereas:

1. A household's consumption of BRAND A and PRODUCT TYPE is collected and a history maintained.
2. The percentage of BRAND A vs PRODUCT TYPE is analyzed and applied to preset criteria in order to determine infrequency. (Note Household #4 simply portrays a customer who is NOT infrequent to the product group and so receives no incentive.)
3. The consumption rate of PRODUCT TYPE is analyzed to determine what size is most appropriate for each particular household.
4. Incentives are issued.
5. Responses are monitored to determine if greater incentive (Super "A") is needed in order to obtain the desired results.

It should be noted that while for demonstration purposes all incentives for a particular Coupon "A" and Super "A" level were the same, these certainly could have varied. For example, level 1 of Coupon "A" could have been 50% OFF for the first two incentives and then tapered off to 40%, 30%, 20%, etc. on subsequent incentives. Additionally, Super "A" incentives could have gradually moved back down to the original incentive as well. For example, Household #6 advanced to level 5 of Super "A" before redemptions were recorded. Upon successful completion of Super "A" at level 5, Coupon "A" was immediately resumed. An alternative to this could have been moving back through Super "A" levels 4 through 1 prior to dropping back to Coupon "A" to make the drop more gradual.

Figure 42:
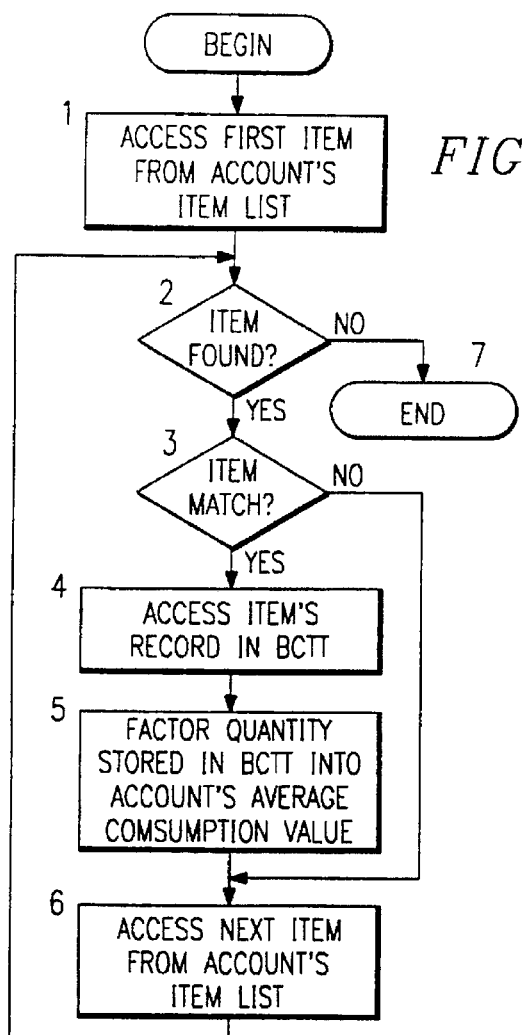
FIG. 42 is a program flow diagram for the routine of determining a criteria for infrequency to a product or product group based on actual consumption.

FIG. 42 is a program flow chart illustrating the tailoring of a criteria for infrequency to a product or product group based on actual consumption of that product. The system operates according to the following steps:

| Step | Description |
| --- | --- |
| 1 | This procedure is executed on account's ITEM LIST of scanned items that matched items in the Bar Code Tracking Table. Access first item from ITEM LIST. |
| 2 | If no items left in ITEM LIST, GOTO 7. |
| 3 | For each product or product group is maintained a set of UPC codes reflecting products to be used for |

| Step | Description |
|---|---|
|  | determining consumption levels. For example, if a manufacturer of chocalate chip cookies wants to determine infrequency to their product, it may include the UPC codes from the following products in order to track consumptions:<br>- Its own chocalate chip cookie product group.<br>- Chocalate chip cookies from other manufacturers.<br>- Other cookie products.<br>- Other bakery type snack products such as snack cakes.<br>Tracking consumptions from these UPC codes, the manufacturer can tailor a definition of infrequeny to its product group of chocalate chip cookies based on each account's average consumption rate of all bakery type snack products. In addition, incentives may be tailored to the account's consumption level as well.<br>Assume a single adult historically consumed an average of 6 ounces of bakery type snack products per week. If this same account shows an average consumption of 1.5 ounces of this manufacturer's chocalate chip cookie product group, then this account would logically receive an incentive offering a discount on the smaller 12 ounce size.<br>Conversely, assume a "large" family historically consumed an average of 60 ounces of bakery type snack products per week. If this same account shows an average consumption of 5 ounces of this manufacturer's chocalate chip cookie product group, then this account would logically receive an incentive offering a discount on the 3 lb. economy "Tub O'Cookies" size.<br>Search list of items for tracking consumption levels for this product or product group.<br>If item does not match, GOTO 7. |
| 4 | Access item in BCTT. |
| 5 | Factor product size stored into BCTT into account's average consumption level. |
| 6 | Access next item from ITEM LIST. GOTO 2. |
| 7 | End of Process. |

Figure 43:
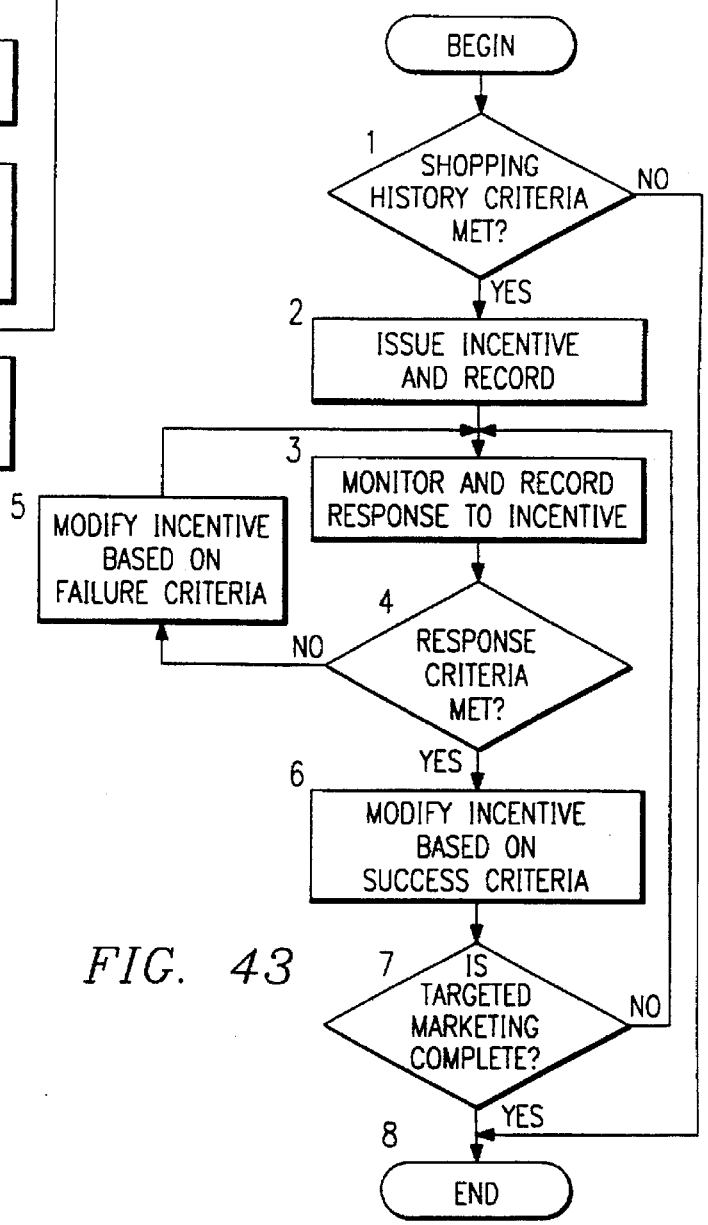
FIG. 43 is a program flow diagram for the routine for response driven marketing based on shopping history criteria.

FIG. 43 is program flow chart illustrating the operation of the system to provide response driven marketing based on shopping history criteria. The program steps include:

| Step | Description |
|---|---|
| 1 | Determine if this account is to receive incentives based on shopping history criteria pertaining to store visits, purchases to departments, purchases to a product group, or purchases to a single product. If account does not receive incentives, GOTO 8. |
| 2 | Issue incentive and record incentive in customer record. |
| 3 | Monitor and record in customer record customer's response to incentive. |
| 4 | If a preset response criteria is met GOTO 6 |
| 5 | Preset response criteria was not met. Incentive may be modified in response to failure to meet response criteria such as:<br>- Varying the value of the incentive<br>- Changing the conditional terms of the incentive<br>- Varying the product of the incentive (i.e. Offering cash discount versus merchandise)<br>- No modification, retry incentive GOTO 3. |
| 6 | Preset response criteria was met. Incentive may be modified in response to success in meeting response criteria such as:<br>- Reducing the incentive over preselected period of time so as to gradually taper off incentives<br>- Varying the product in order to accomplish same as above<br>- No modification, maintain incentive over preselected period of time |
| 7 | If targeted marketing campaign is NOT complete, GOTO 3 |
| 8 | END OF PROCESS |

Figure 44A:
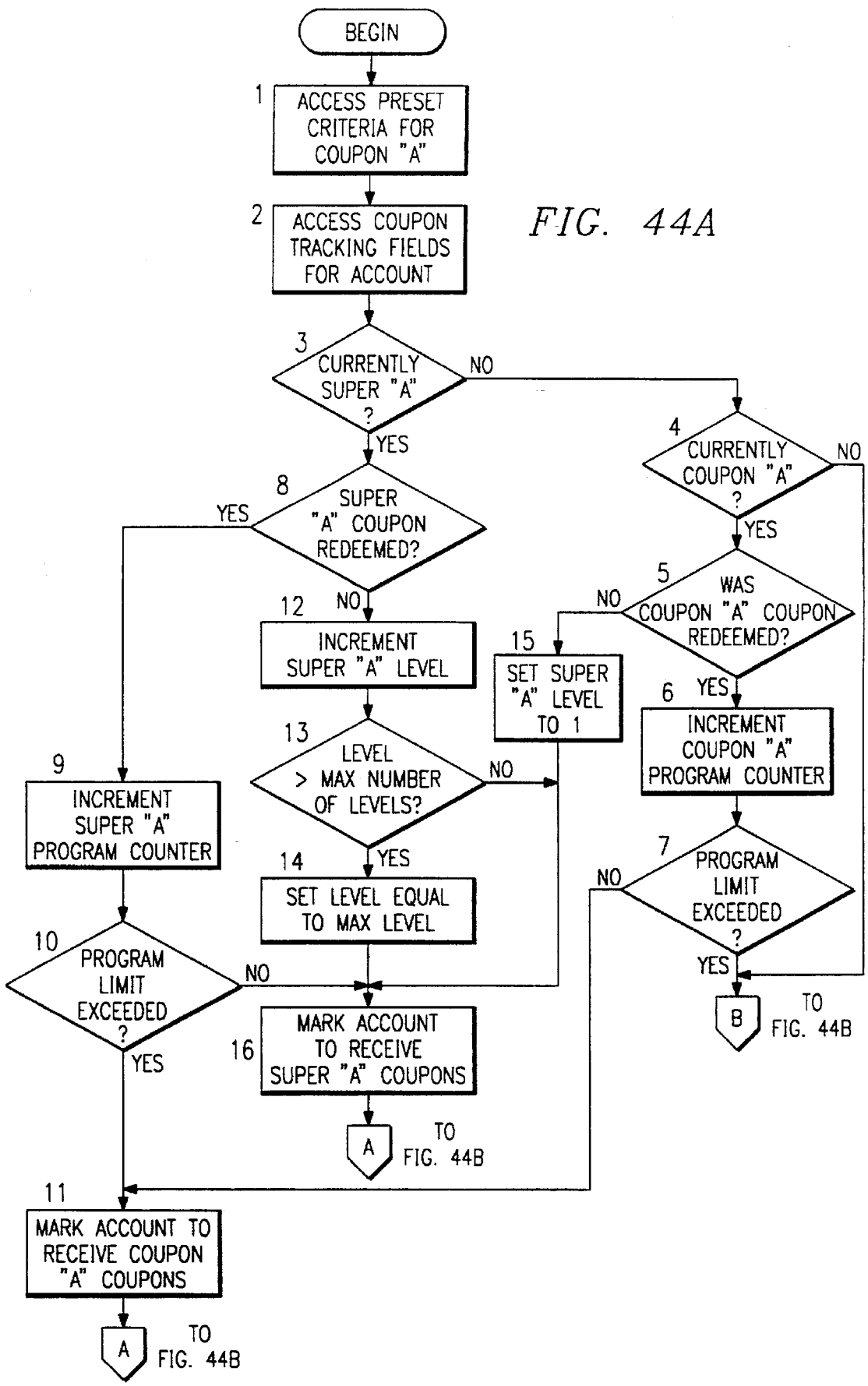
FIGS. 44A and B are a program flow diagram for a method of tracking infrequency to a product group and using Coupon "A"

FIGS. 44A and B illustrate a program flow chart of the present system providing a method of tracking infrequency to a product group, by genating Coupon "A". The program steps include:

| Step | Description |
|---|---|
| 1 | CVC Controller 965 accesses preset criteria for Coupon "A" for a product group. A product group may consist of similar products offered by a manufacturer (such as the variations of chocalate chip cookies offered by the same manufacturer) or products in a department.<br>These preset criteria may comprise:<br>- Number of weeks for analyzing consumption of a product or product group<br>- UPC's of product or groups of products for tracking<br>- Levels of product consumption for infrequency (Coupon "A" Levels)<br>- Levels of incentives that relate to above levels of consumption infrequencies<br>- Program durations (i.e. numbers of trips or numbers of weeks) for each Coupon "A" level<br>- Varying Super "A" levels for response to an unsuccessful Coupon "A" attempt<br>- Program durations for each Super "A" level |
| 2 | CVC Controller 965 accesses Coupon "A" tracking fields for this account (or accounts if more than 1 in a household). These fields determine if Coupon "A" and/or Super "A" incentives are currently in effect for this account. As previously mentioned, incentives for up to 32 |

115
-continued

| Step | Description |
|---|---|
| | trips or periods may be contained in a Coupon "A" and/or Super "A" marketing campaign. These counters keep track of the current position in a Coupon "A" and/or Super "A" campaign for this account. |
| 3 | If customer is currently in a Super "A" program, GOTO 8. |
| 4 | If customer is NOT currently in a Coupon "A" program, GOTO 17. |
| 5 | If customer has NOT RESPONDED to the Coupon "A" incentive program by redeeming the coupon (or purchasing the desired product without the coupon), GOTO 15. |
| 6 | Increment the field for number of trips as Coupon "A". |
| 7 | If Coupon "A" program is complete, GOTO 17. OTHERWISE, GOTO 11. |
| 8 | If customer has not responded to this level of the Super "A" program by redeeming the coupon (or purchasing the desired product without the coupon), GOTO 12. |
| 9 | Increment the field for number of trips in Super "A". |
| 10 | If Super "A" program is complete, customer falls back into Coupon "A" program where they left off. If super "A" program is NOT COMPLETE, GOTO 16. |
| 11 | Mark account to receive the Coupon "A" coupon(s) for this product or product group. This information will be used later when building a list of coupons to be spooled to the customer. GOTO 22. |
| 12 | This level of Super "A" incentive has proven inadequate; increment the level of Super "A" for incenting this account. |
| 13 | If the Super "A" level is greater than the maximum number of levels, GOTO 14. OTHERWISE, GOTO 16 |
| 14 | Set the Super "A" level to the highest available level. GOTO 16 |
| 15 | Set the Super "A" level to the first level. |
| 16 | Mark account to receive the Super "A" coupon(s) at the indicated Super "A" level for this product or product group. This information will be used later when building a list of coupons to be spooled to the customer. GOTO 22. |
| 17 | Access the criteria for this product group. This criteria is either based on preset criteria or on the actual average consumption of this product and related products by this account. |
| 18 | Calculate the actual consumption rate for this product or product group for this account for the preset number of weeks. |
| 19 | If the consumption rate is less than the criteria set for this account, GOTO 20. OTHERWISE, 23. |
| 20 | Initialize fields for tracking this Coupon "A" program to zeros and mark account as Coupon "A" for this product or product group. |
| 21 | Access preset criteria for assigning an incentive level based on consumption. For example, the criteria may assign the following levels based on consumption: level 1 - for no consumption of |

116
-continued

| Step | Description |
|---|---|
| | product or product group, level 2 - 1–20% of the preset consumption criteria, level 3 - 21–40% of the preset consumption criteria, level 4 - 41–60% of the preset consumption criteria, etc. |
| 22 | Dispense incentive(s) to customer either at the point-of-sale or through direct mail. |
| 23 | END OF PROCESS. |

Figure 45A:
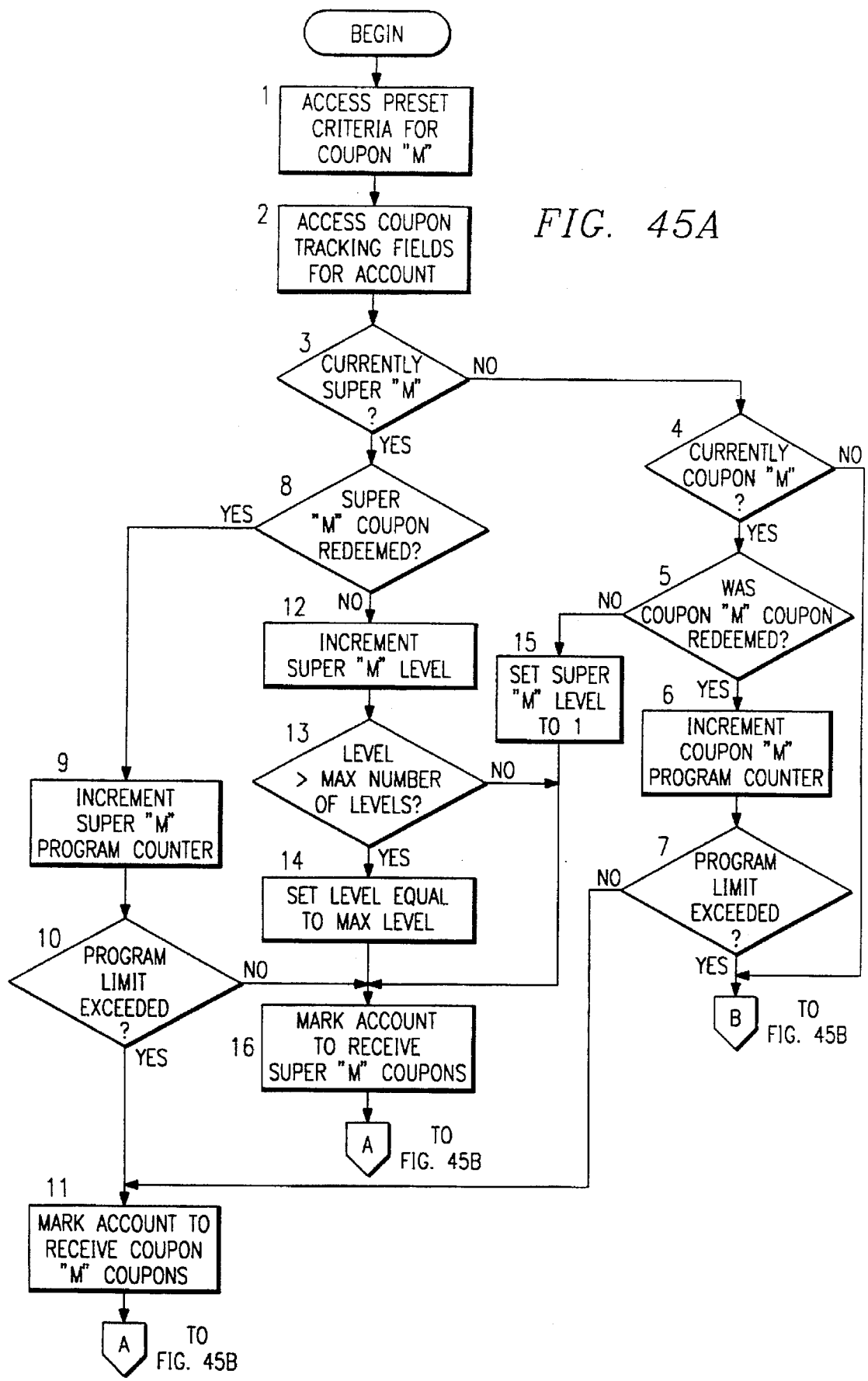
FIGS. 45A and B are a program flow diagram for a method of maximizing purchases to a product group with Coupon "M"
Figure 45B:
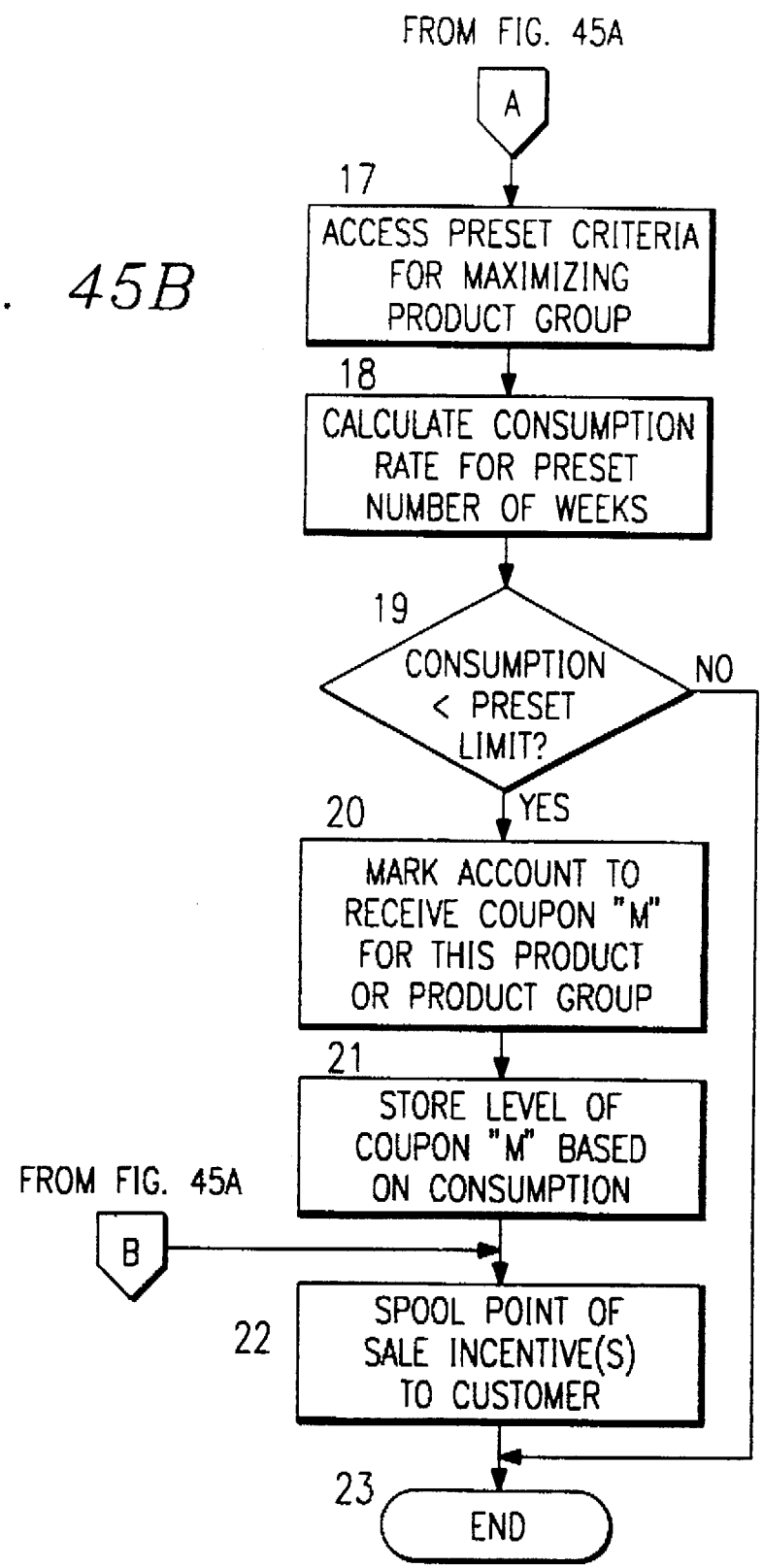

FIGS. 45A–B illustrate a program flow chart of the operation of the system to provide a method of maximizing purchases to a product group, in order to generate a Coupon "M". The steps include:

| Step | Description |
|---|---|
| 1 | CVC Controller accesses preset criteria for maximizing purchases (Coupon "M") for a product group. A product group may consist of similar products offered by a manufacturer (such as the variations of chocalate chip cookies offered by the same manufacturer) or products in a department. These preset criteria may consist of: - Number of weeks for analyzing consumption of a product or product group - UPC's of product or groups of products for tracking - Levels of product consumption for maximizing (Coupon "M" Levels) - Levels of incentives that relate to above levels of consumption maximizing. - Program durations (i.e. numbers of trips or numbers of weeks) for each Coupon "M" level - Varying Super "M" levels for response to an unsuccessful Coupon "M" attempt - Program durations for each Super "M" level |
| 2 | CVC Controller accesses Coupon "M" tracking fields for this account (or accounts if more than 1 in a household). These fields determine if Coupon "M" and/or Super "M" incentives are currently in effect for this account. As previously mentioned, incentives for up to 32 trips or periods may be contained in a Coupon "M" and/or Super "M" marketing campaign. These counters keep track of the current position in a Coupon "M" and/or Super "M" campaign for this account. |
| 3 | If customer is currently in a Super "M" program, GOTO 8. |
| 4 | If customer is NOT currently in a Coupon "M" program, GOTO 17. |
| 5 | If customer has NOT RESPONDED to the Coupon "M" incentive program by redeeming the coupon (or purchasing the desired product without the coupon), GOTO 15. |
| 6 | Increment the field for number of trips as Coupon "M". |
| 7 | If Coupon "M" program is complete, GOTO 17. OTHERWISE, GOTO 11. |
| 8 | If customer has NOT RESPONDED to this level of the Super "M" program by |

-continued

| | |
|---|---|
| | redeeming the coupon (or purchasing the desired product without the coupon), GOTO 12. |
| 9 | Increment the field for number of trips in Super "M". |
| 10 | If Super "M" program is complete, customer falls back into Coupon "M" program where they left off. If Super "M" program is NOT COMPLETE, GOTO 16. |
| 11 | Mark account to receive the Coupon "M" coupon(s) for this product or product group. This information will be used later when building a list of coupons to be spooled to the customer. GOTO 22. |
| 12 | This level of Super "M" incentive has proven inadequate; increment the level of Super "M" for incenting this account. |
| 13 | If the Super "M" level is greater than the maximum number of levels, GOTO 14. OTHERWISE, GOTO 16 |
| 14 | Set the Super "M" level to the highest available level. GOTO 16 |
| 15 | Set the Super "M" level to the first level. |
| 16 | Mark account to receive the Super "M" coupon(s) at the indicated Super "M" level for this product or product group. This information will be used later when building a list of coupons to be spooled to the customer. GOTO 22. |
| 17 | Access the criteria for this product group. This criteria is either based on preset criteria or on the actual average consumption of this product and related products by this account. |
| 18 | Calculate the actual consumption rate for this product or product group for this account for the preset number of weeks. |
| 19 | If the consumption rate is less than the criteria set for this account, GOTO 20. OTHERWISE, 23. |
| 20 | Initialize fields for tracking this Coupon "M" program to zeros and mark account as Coupon "M" for this product or product group. |
| 21 | Access preset criteria for assigning an incentive level based on consumption. For example, the criteria may assign the following levels based on consumption: level 1 - for no consumption of product or product group, level 2 - 1-20% of the preset consumption criteria, level 3 - 21-40% of the preset consumption criteria, level 4 - 41-60% of the preset consumption criteria, etc. |
| 22 | Dispense incentive(s) to customer either at the point-of-sale or through direct mail. |
| 23 | END OF PROCESS. |

Figure 46A:
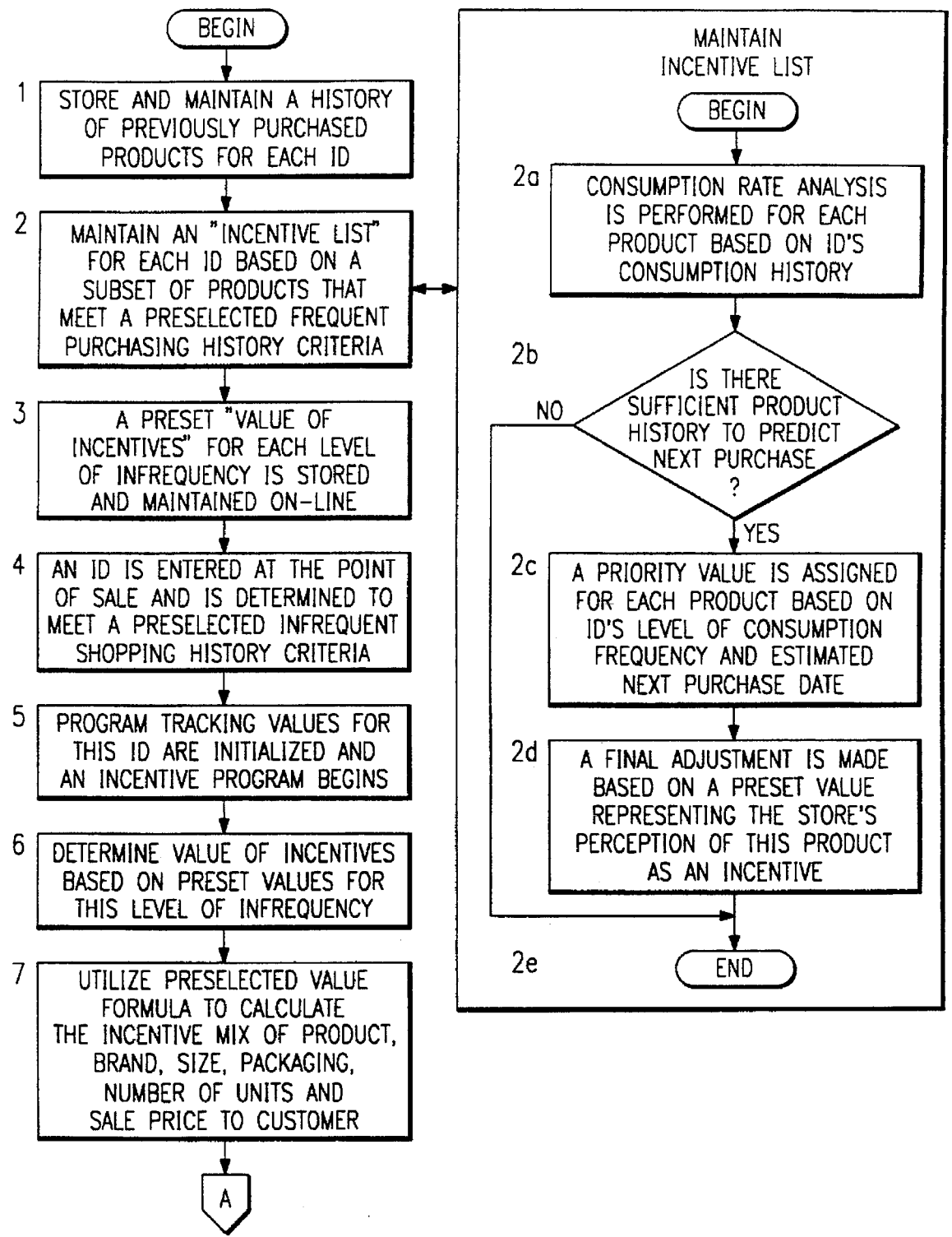
FIGS. 46A and B are a program flow diagram illustrating the use of a value formula and consumption rate analysis in the generation of incentive coupons.
Figure 47:
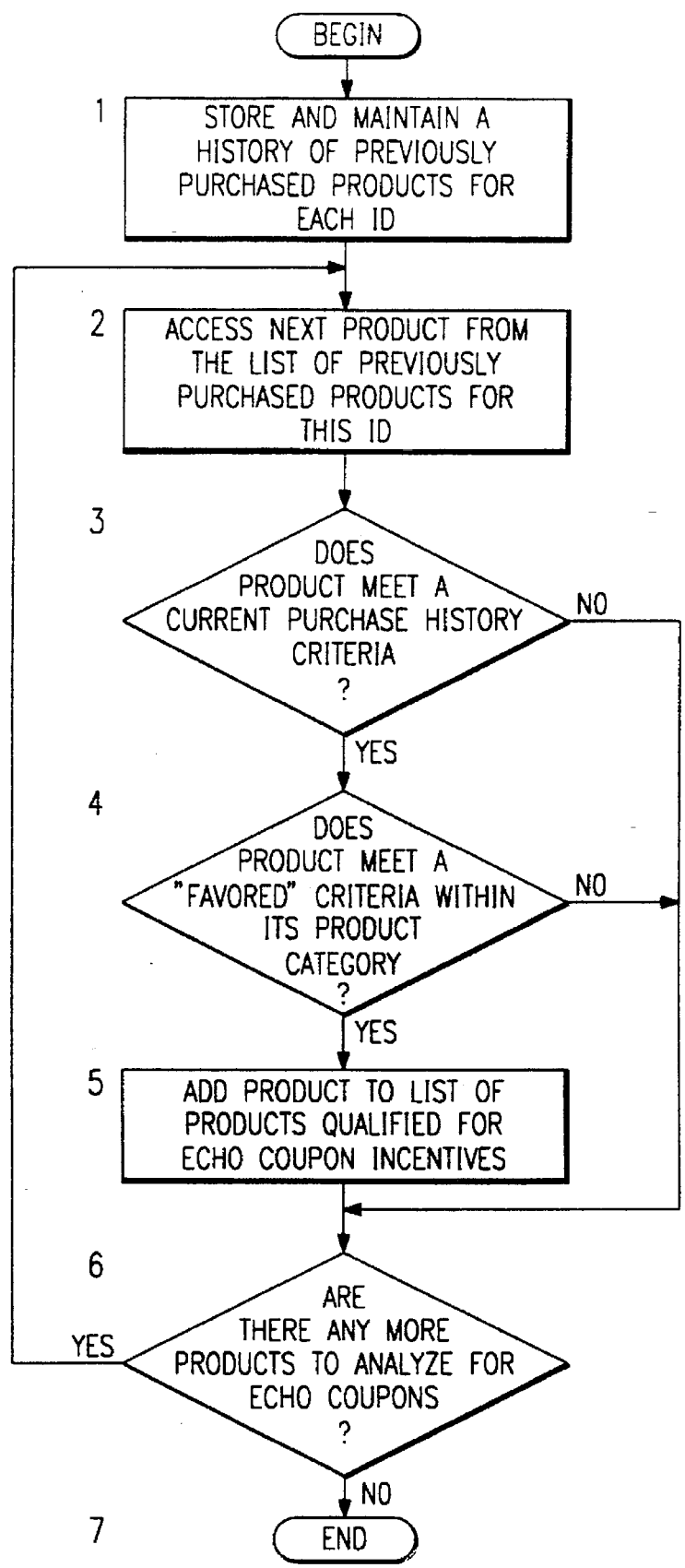
FIG. 47 is a program flow diagram illustrating the selection of products for use as ECHO coupon incentives.

FIGS. 46A–B and 47 illustrate flow diagrams of further aspects of the operation of the system previously described in FIGS. 19 through 45A–B. The ECHO coupon has been previously described, and is issued in response to stored data of a customer's prior purchases of products. From this stored data, a subset list of products frequently previously purchased by the customer in previous visits is accumulated. Previously purchased products are then used as the incenting product for coupons to the customer. In other words, if the customer consistently purchases a type of cookies, the system issues coupons which provide discounts on those cookies for future visits to the store. This ensures that the customer receives coupons that he/she is attracted to, because of the customer's prior history of purchasing the products, so that the customer is incented to return to the store. In some instances, however, a particular customer may have previously purchased a large number of products. For example, some customers may over a period of time purchase over 100 different products. Techniques are thus provided to select a subset of products from such long lists for use with incentive coupons.

First, the technique purges, or determines not to use, products in the stored list that have had a predetermined period of inactivity. In other words, if the customer's history indicates that the customer has not purchased a product for a certain period of time, this product is determined not to be a product which can be used to incent that customer and that product is not used on a discount coupon. Further, products are purged or ignored that have relative inactivity to other products. For example, if a customer has purchased four different kinds of cookies over a period of time, the cookie which has the greatest and most recent purchasing activity is chosen as an incentive and the remaining three are purged or ignored. The greatest purchasing activity may be measured in dollars, ounces, or the like. Thus, the present invention not only stores a list of products previously purchased by a customer, but applies predetermined formulas to pick the best products for use as an incentive.

In addition, a "value formula" is used by the system to further refine the list of products for use on incentive coupons. A store will normally establish a total dollar value of coupons to be delivered to each level of customer. For example, the store may determine to award an infrequent shopper with coupons having a value of $5, while a more frequent shopper would only be rewarded with a $1 value coupon. An incentive value formula must be utilized to pick the products which provide these values of reward or incentive, based upon the stored database of products previously purchased by a customer. The value formula is necessary because each customer has a different list of frequently purchased prior products. The formula may vary from store to store, but will normally include the following parameters.

A determination is first made as to whether or not the worth of the merchandise is to be calculated at retail, at retailer's cost, at discount off of retail, or at discount off of retailer's cost.

Assume that the value formula is programmed to use retailer's cost as a basis for calculating the $5 incentive to a customer. A determination is made as to whether or not the incentive value of $5 will be provided with a single product or with multiple products. If multiple products are being utilized, the brand of the product is first determined by the formula. For example, a generic brand and a national advertised brand often have radically different cost structures to the retailer. The quantity of the product is then determined and put into the formula. Then a determination is made as to the size of the product. In other words, is a six ounce size or a 32 ounce size to be awarded to the customer. Next, the formula must establish the number of units of the product to be used as an incentive.

The value formula used by the present invention thus takes an answer, which in this instance is a $5 incentive award and determines the number, cost, brand, size and type of products to be selected from the customer's particular database of previously purchased products to derive a coupon reward. The formula may be designed to ensure that the store does not provide an incentive of more than 50¢ below the retailer's cost on any one item. The store might decide to design the formula such that no more than two of any one item will be used.

Using these limits in the formula, the controller 965 selects a series of products from each customer's product database, the sum of which at 50¢ apiece and utilizing not more than two items would represent $5 in retailer's cost. The formula calculates this information based upon the retailer's cost and subtract 50¢ and prints out the price on an incentive coupon to the customer. For example, if a certain type of bathroom tissue is selected by the formula and costs 79¢, when the 50¢ discount is subtracted from 79¢, a 29¢ selling price is determined. As part of the $5 incentive, a coupon is printed out by the system and is provided to the customer, the coupon indicating that the customer may buy two packs of bathroom tissue at a future time at 29¢ each. Since the system has determined that the customer has previously bought this brand of bathroom tissue, the customer is incented to come back to the store to redeem the coupon, and hopefully to purchase other products.

In addition to the above selection processes made by the processor on previously purchased products, the controller 965 also utilizes the consumption rate analysis previously described. In other words, the processor determines when the customer last purchased a product, such as coffee, and utilizing the customer's prior history, determines whether or not the customer would have had time to at least partially consume the amount of coffee previously bought. If the time period has not yet expired when the customer would have at least partially used up the coffee, then coffee would not be used as an incentive product for the customer's incentive coupon. Rather, another product would be given to the customer, on the assumption the customer would be more likely to use a coupon for that product rather than coffee.

The controller 965 thus applies a consumption rate analysis to determine if a product meets a minimum consumption criteria; that is, was the product purchased a sufficient time ago in order that the consumer would have time to at least partially consume the amount of product purchased. Such a minimum consumption criteria might be that the customer would have had time to consume at least one half or three fourths of the quantity purchased. The minimum consumption criteria might alternatively require that the product is not a part of the present purchase, unless the product is a very frequently purchased and consumed product such as bread of milk. Thus, when the controller 965 next determines that, using the consumption rate analysis, the customer has had time to at least partially consume the coffee last purchased, then coffee will again be utilized as an incentive product for an incentive coupon for the customer. An important aspect of the present invention is thus the generation of ECHO coupons which are particulary adapted to a customer based upon a customer's prior shopping history of products. The most frequently purchased products may thus be selectively used to incent the customer.

ECHO coupons are further enhanced by using a value formula determined by the store, such that previously purchased products by a customer are screened by the value formula to provide a mix of products which meet financial constraints imposed by the store. Further, consumption rate analysis is performed on previously purchased products to ensure that the consumer has had time to at least partially consume the product so that the product may be used as a real incentive. Further, continuous monitoring of the return of coupons is maintained so that future coupons may be tailored to continue to induce the customer, as previously described.

In further summary of this aspect of the invention, products previously purchased by a customer are stored in the database. The customer's identification code is entered at the point-of-sale by scanning the MICR code of the check or by scanning a credit card as previously described. Products are selected from the product database which meet a frequent purchasing history criteria, determined by period of purchase and or a dollar value. At this time, a consumption rate analysis may be performed on the products and if a product meets a predetermined consumption criteria, this product is designated as eligible for use as an incentive.

The incentive value for infrequent shopping history criteria is established. An incentive value formula is applied by the controller 965 to the products which meet the frequent purchasing history criteria. The system then determines whether or not the identification entered at the point-of-sale meets an infrequent shopping history criteria. For example, a determination may be made that a particular customer is to receive a simple COUPON A or a SUPER A coupon, based upon the selected incentive products. The system then issues first incentive coupons whose value is contingent upon a future transaction. A response criteria is then established to determine whether or not the issuing of a incentive coupon has been a success. Future transactions by the customer are monitored in order to determine the success of the first incentive coupons. If the customer fails to meet predetermined response criteria, additional incentive coupons of differentiated value are then issued by the system in order to further incent the customer as previously described.

FIGS. 46A and B illustrate a flow diagram of the software routine for performing the initial selection of products to be used as an incentive for a customer, and illustrating the use of the value formula and the consumption rate analysis in order to generate desired coupons for the customer. Referring to the routine shown in FIGS. 46A–B, the following steps are performed:

| Step | Description |
| --- | --- |
| 1 | Store and maintain a history of previously purchased products for each ID. This is accomplished by capturing UPC data as it is scanned by the UPC reader, matching the UPC with products contained in the Bar Code Tracking Table (BCTT), and, if a match exits in the BCTT, recording the purchase in a database that links product purchase history with individual ID's. |
| 2 | The list of products stored and maintained in Step #1 may potentially be used as incentives for a customer. An analysis is made to determine which products would be best suited for incenting the customer each time that customer's ID is received. If sufficient data has been recorded in the short term, a consumption rate analysis (2a–2e) is performed to further identify which products would be best suited as incentives. These products make up an "Incentive List" and are prioritized by incentive value in the following manner: |
| 2a | A consumption rate analysis is performed based on historical product purchases. Nonperishable products that may typically be consumed over a period of more than one week are analyzed to determine the rate in which they are consumed for each ID. |
| 2b | If there is not enough recent shopping data for this ID, then GOTO 2e. |
| 2c | This consumption rate is compared with the date of last purchase so that a prediction of next purchase may be made. A priority value is assigned for each product based on the product's anticipated next purchase date (i.e. if a next purchase is past due, the priority is increased, and if the product was just purchased and the estimated next purchase date is a month off, the priority is decreased). For example, assume ID #12345 buys a 16 ounce package of Brand A decaf coffee in automatic drip filters an average of every four weeks, and the last purchase date shown was 20 days ago. If the system should need to incent this customer |

| Step | Description |
|---|---|
| | for any reason, a discount on a 16 ounce package of Brand A coffee in automatic drip filters (since historically the system has predicted that this customer will buy the product in approximately 8 days) would most likely be used. |
| 2d | Finally, an "incentive rating" is stored for each product in the BCTT that represents the store's perception of the product as an incentive. The priority value is adjusted based on this "incentive rating". For example, milk, bread, and soda may be high consumption products for many people, but since these items are commonly loss leaders available at a steep discount at most grocery stores, they may not be best suited as incentives. Therefore, these items would carry a lower "incentive rating" that would decrease the priority value. Conversely, items with very high profit margins such as bakery and deli items may be very attractive to grocers as incentives. These items would carry a higher "incentive rating" and therefore increase the priority value. |
| 2e | End of Incentive List process |
| 3 | Tables containing the "value of incentives" for varying levels of infrequency to a store, department, product group, and/or product are stored and maintained on line. Logically, the value of incentives is directly related to the level of infrequency, i.e. a higher incentive going to a frequency of one activity in eight weeks versus four activities in eight weeks. Increasing values are also available in varying levels in the event that the customer does not respond. |
| 4 | An ID entered at the point-of-sale is determined to fall short of a preset level of infrequency. An incentive program utilizing the methods discussed in #1 through #3 begins. |
| 5 | Fields in the ID's record used for incentive program tracking are initialized and the beginning of the incentive program is recorded. |
| 6 | The table discussed in #3 is accessed and the value of incentives to dispense is determined. |
| 7 | A value formula designed by the store is used to arrive at a combination of product, brand, unit size and number of units necessary to satisfy a preselected total value of incentive. The incentive will utilize those products that meet a frequent purchasing history criteria as a basis for promotion. |
| 8 | The incentive list for this ID is accessed in order of decreasing priority values. Using unit costs stored in the BCTT, coupons are created and dispensed until the "value of incentives" is met in accordance with the parameters of the value formula for the particular store. Should the number of incentives fall short of this "value of incentives", default items or "dollars off next purchase" are substituted. All of these incentives are contingent on a future transaction. |
| 9 | Monitor the transactions for this ID subsequent to the issuance of the incentives. |
| 10 | Establish a response criteria to determine if further incentive is necessary. |
| 11 | If the customer falls short of this response criteria, GOTO 11; otherwise, GOTO 12. |
| 12 | It is evident that the prior incentives were insufficient for motivating the customer to respond. The "value of incentive" will now be increased as determined by the tables discussed in #3. GOTO 7. |
| 13 | The customer demonstrated that the prior incentives were sufficient for achieving a desired response. If the program is complete, GOTO 13; otherwise, GOTO 7. |
| 14 | END OF PROCESS |

The following example of the technique illustrated in FIGS. 46A–B will now be set forth:

ABC Foods, Inc. has set the following incentive values for incenting customers demonstrating an infrequency to their store. Incentive values may be specified as amounts off of retail or store's cost.

| Infrequency over last 8 weeks | COUPON A | Incentive Value |
|---|---|---|
| No Trips | Level 5 | $5.00 off cost |
| 1 Trip | Level 4 | $4.00 off cost |
| 2 Trips | Level 3 | $3.00 off cost |
| 3 Trips | Level 2 | $2.00 off cost |
| 4 trips | Level 1 | $1.00 off cost |

The store has set an infrequent shopping history criteria of less than five shopping trips in the prior eight weeks will be incented.

The store has set a criteria that a discount of no more than $2.00 will be given for any one product. Products with a cost of less than $2.00 may be offered in quantity (i.e. a product costing $1.18 may be offered at two for 36¢ in order to obtain a $2.00 discount).

The store has set a criteria that a limit of two of any one product will be utilized.

The criteria for SUPER A will be set at 14 days from the issuance of a COUPON A incentive(s). The following table contains the increased incentive values for SUPER A programs:

| Coupon Program | SA1 | SA2 | SA3 | SA4 | SA5 |
|---|---|---|---|---|---|
| Level 5 | $6.00 | $7.00 | $8.00 | $9.00 | $10.00 |
| Level 4 | $5.00 | $6.00 | $7.00 | $8.00 | $9.00 |
| Level 3 | $4.00 | $5.00 | $6.00 | $7.00 | $8.00 |
| Level 2 | $3.00 | $4.00 | $5.00 | $6.00 | $7.00 |
| Level 1 | $2.00 | $3.00 | $4.00 | $5.00 | $6.00 |

SUPER A programs are utilized when responses to the COUPON A program fall short of the desired response criteria.

Scanned data is captured and stored for each ID. This stored data is based on matches in the Bar Code Tracking Table (BCTT). These items will be used as incentives for customers in the COUPON A program.

ID #12345 is entered into the present system and the stored hisotry of the ID number indicates that they have shopped ABC Foods, Inc. twice in the prior eight weeks. Referring to the previous table of incentive values, ID #12345 meets the preset infrequent shopping history criteria and begins a LEVEL 3 COUPON A program, and is to receive $3.00 worth of incentives. Before becoming infrequent to ABC Foods, this customer shopped the store regularly for 6 months and scanned data was captured and stored for this ID. Among other products, the following purchasing patterns are identified:

| Item | Frequency | Last Purchased | Store's Cost |
|---|---|---|---|
| Brand A Decaf Coffee in the automatic drip filters | 1 lb. package every 20 days | 83 days ago | $1.79 |
| Brand B Liquid Detergent with Bleach | 1 gal. bottle every 28 days | 77 days ago | $4.73 |
| Brand C Dog Food with Real Beef Flavor | 50 lb. bag every 45 days | 20 days ago | $3.25 |
| Brand D Barbecue Sauce - Hickory Smoke, Extra Hot | 1 qt. bottle every 19 days | 0 days ago | $.65 |
| Large Pizza from the Deli | 1 large pizza every 6 days | 0 days ago | $1.00 |
| Brand E 2% Low Fat Milk | 1 gallon bottle every 8 days | 0 days ago | $.99 |

ID #12345 has been infrequent to the store in the short term, so it is not possible to accurately predict the timeliness of products Brand A or B. Their trip 20 days ago (1 of the 2 in the prior 8 weeks) did however show that they purchased the Brand C dog food. Based on the consumption rate analysis made for this product, a next purchase date is estimated to be in 25 days. Since the incentive is targeted at drawing the customer back into the store next week, this estimated purchase date is too far for use at this time. The same is true for the Brand D Barbecue Sauce which was purchased on the immediate trip and therefore is estimated for next purchase in 19 days.

The pizza and the Brand E milk just purchased, however, have a higher frequency; so even though they were just purchased, these products are estimated for purchase again in a timely matter that makes them suitable for incentive in the short term. Since each of these items cost $1.00, the two pizzas and the one milk satisfy the $3.00 incentive value for this level of 1COUPON A.

Examples of the coupons printed at the point-of-sale printer are as follows:

```
Store Coupon - Good
08/01/93 thru 08/08/93
2 FREE
LARGE PIZZAS FROM THE
DELI
With Coupon - Good on your
next visit with purchase
of $25.00 or more
Store Coupon - Good
08/01/93 thru 08/08/93
FREE
1 GALLON BRAND E 2% LOW
FAT MILK
With Coupon - Good on your
next visit with purchase
of $25.00 or more
```

Assume now that 15 days pass before ID #12345 returns to the store. The customer has exceeded the 14 days since receiving the COUPON A incentives and is now elevated to SUPER A (SA1 for LEVEL 3 of COUPON A). Referring to the previous table of incentive values, this customer is now to receive $4.00 in value of incentives. An updated table of the items previously analyzed for this customer follows:

| Item | Frequency | Last Purchased | Store's Cost |
|---|---|---|---|
| Brand A Decaf Coffee in the automatic drip filters | 1 lb. package every 20 days | 0 days ago | $1.79 |
| Brand B Liquid Detergent with Bleach | 1 gal. bottle every 28 days | 0 days ago | $4.73 |
| Brand C Dog Food with Real Beef Flavor | 50 lb. bag every 45 days | 35 days ago | $3.25 |
| Brand D Barbecue Sauce - Hickory Smoke, Extra Hot | 1 qt. bottle every 19 days | 15 days ago | $.65 |
| Large Pizza from the Deli | 1 large pizza every 6 days | 15 days ago | $1.00 |
| Brand E 2% Low Fat Milk | 1 gallon bottle every 8 days | 0 days ago | $.99 |

Brand A and Brand B have just been purchased and therefore will not be available as incentives for a couple of weeks. Brand C and D are estimated to be purchased again within the time frame the store is attempting to get the customer to shop again so they will be issued. The Deli Pizza would not necessarily be considered past due, since it may have been purchased elsewhere in the 15 days the customer was probably shopping elsewhere. It is favored over milk as an incentive, however, so it will be issued again to complete the $4.00 value of incentives. The coupons issued follow:

```
Store Coupon - Good
08/16/93 thru 08/23/93
SPECIAL $1.25/50 LB. BAG
BRAND C DOG FOOD
W/REAL BEEF FLAVOR
With Coupon - Good on your
next visit with purchase
of $25.00 or more
Store Coupon - Good
08/16/93 thru 08/23/93
2 BOTTLES - 29¢
BRAND D BARBECUE SAUCE -
HICKORY SMOKED, EXTRA HOT
With Coupon - Good on your
next visit with purchase
of $25.00 or more
Store Coupon - Good
08/16/93 thru 08/23/93
FREE
LARGE PIZZA FROM THE DELI
With Coupon - Good on your
next visit with purchase
of $25.00 or more
```

Assuming that this customer responds to these coupons and continues on the COUPON A program for the following weeks, the logical incentive in two weeks will be the 1 lb. package of Brand A Decaf Coffee in the automatic drip filters, and the week after that the 1 gallon bottle of Brand B Liquid Detergent with Bleach. In other words, exact products in exact sizes tailored to the purchasing history of each discreet ID will be used in order to incent this customer to shop ABC Foods more frequently.

FIG. 47 is a program flow diagram which illustrates in further detail the choosing of products for use as ECHO coupon incentives in the present system.

In the present system, scanned data from products purchased is maintained for each individual ID. When an ECHO coupon is to be printed, the list of previously purchased products is analyzed to arrive at the product(s) that are best suited as incentives for each particular ID. The program flow diagram of FIG. 47 describes this analysis as follows:

| Step | Description |
|---|---|
| 1 | Each time a customer shops, the products scanned are captured at the controller and a history of products purchased are stored and maintained with that customer's unique ID. Assume an ID has been entered and an ECHO coupon is to be spooled. Proceed to Step 2 to access the first item for this ID. |
| 2 | Access the next item from the list of previously purchased products that have been stored and maintained for this particular ID. |
| 3 | Check to see if this product meets a "current purchase history criteria" (i.e., products purchased within a current time period and/or within a preset recent number of shopping transactions). For example, assume Customer A has 16 shopping transactions within the last four months. Also assume that Brand A cookies have been purchased 50 times over the life of this ID, but have not been purchased in the last four months. Although Brand A cookies show an overall frequent purchase history, the fact that they have not been purchased in the last four months indicates that they are no longer favored by this customer and therefore will not be selected for use as an ECHO coupon incentive. Assume Customer B has no shopping transactions within the last four months. Also assume that Brand A cookies have been purchased 50 times over the life of this ID and that Brand A cookies were purchased in some of the most recent transactions when Customer B was shopping four months ago. Although the stored data does not show a purchase of Brand A cookies in the last four months, there are not enough transactions since the last purchase of Brand A cookies to warrant the assumption that Brand A has |

-continued

| Step | Description |
|---|---|
| | fallen out of Customer B's favor. Therefore, Brand A cookies will be considered as a candidate for ECHO coupon incentive. If this product meets the "current purchase history criteria", then GOTO 4; otherwise, GOTO 6. |
| 4 | Check to see if this product meets a "relative most favored status criteria" within the product category (i.e. products purchased with relative greater frequency of transactions, relative greatest dollars, or relative greatest volume per unit of time). For example, assume that only one item from a particular product group is to be used as an ECHO COUPON incentive. Assume also that Customer A has frequently purchased Brand A cookies, but also has frequently purchased Brand B, Brand C and Brand D cookies. Assuming that Brand C cookies were purchased more frequently than the other three brands in this product group, then Brand C cookies would be considered as a candidate for an ECHO COUPON incentive. Brand A, Brand B and Brand D, though frequently purchased, would not be selected as candidates since one item has already been chosen from the cookie product group. If this product meets the "relative most favored status criteria" within its product category, then GOTO 5; otherwise, GOTO 6. |
| 5 | Add product to the list of products qualified for consideration for use as an ECHO COUPON incentive. |
| 6 | If there are more products for analysis, then GOTO 2; otherwise, GOTO 7. |
| 7 | END OF PROCESS. |

Although the present invention has been described in detail, it should be understood that various changes, substitutions and alterations can be made herein without departing from the spirit and scope of the invention which is solely defined by the appended claims.

TABLE 1

CUSTOMER RECORD DESCRIPTION

| Field Name | Description |
|---|---|
| char id [25]; | /*customer's bank id */ |
| unsigned long phone; | /*customer's phone # for householding Digit 1 - multiple account flag Digit 2–8 - Phone # Digit 9–10 - Account counter */ |
| struct { | |
| int hitcnt; | /*total hitcnt */ |
| long totamt; | /*total cents amount verified */ |
| long amount; | /*last cents amount verified */ |
| long dayamt [7]; | /*Last 7 days cents verified */ |
| long date; | /*last verify access date/time */ |
| }verify; | |
| struct { | |
| char status; | /*current status */ |
| char flags; | /*id user flags */ |
| long lastdate; | /*last access date (for transfer use) */ |
| long currdate; | /*last access date (for rolling id) */ |
| long statdate; | /*date status changed */ |
| }current; | |
| struct { | |
| unsigned daysago : 11; | /*# days ago from last date (11 bits) */ |
| unsigned hits : 5; | /*Hits for that day (5 bits) */ |
| unsigned amt; | /*Amount in whole dollars */ |
| }history [30]; | |
| struct { | |
| char status; | /*previous status before current */ |
| int hitcnt; | /*previous local hitcnt */ |
| long totamt; | /*previous local dollar amount */ |
| long statdate; | /*previous status date */ |
| }previous; | |
| struct { | |
| unsigned int type; | /*Bit Mask of coupons issued */ |
| char flags; | /*Miscellaneous coupon flags */ |
| unsigned char Acntr; | /*Tally counters as Coupon "A" */ |
| unsigned char SAcntr; | /*Tally counters as Super "A" */ |
| unsigned char Mcntr; | /*Tally counters as Coupon "M" */ |
| unsigned char Mloop; | /*Number of Maxxer loops */ |

TABLE 1-continued

CUSTOMER RECORD DESCRIPTION

| Field Name | Description |
|---|---|
| unsigned char Floop; | /*Number of failure loops */ |
| unsigned int maxbase; | /*Base avg for maxxing */ |
| unsigned int suctarg; | /*Last successful target */ |
| char Slevel; | /*Standard series run */ |
| char Alevel; | /*Coupon "A" Level */ |
| }Coupon; | |

TABLE 2

NEGATIVE STATUS RECORD SPECIFICATION

| Field Name | Description |
|---|---|
| char id | customer's bank id |
| char COlocid | location showing CASH ONLY |
| char Nlocid | location showing negative |
| char Nstatus | current record status NEGATIVE |
| CHAR COstatus | current record status CASH ONLY |
| long currdate | current access date |
| long COstatdate | date became CASH ONLY |
| long Nstatdate | date became negative |
| int hitcnt | total bad checks against location |
| long totamt | total bad dollars against location |

TABLE 3

SYSTEM CONTROL FILE DESCRIPTION

| Field | Definition |
|---|---|
| char locid | system id |
| KpdPortDef keypad | keypad definition |
| int port | modum comm port value |
| int baud | max baud rate of installed modem |
| char tone | tone/pulse dial mode |
| long strttime | system start time (machine turned on) |
| long currtime | current system time |
| long timebomb | timebomb date/time |
| char errfile[FLNMSIZE] | error filename |
| char logfile[FLNMSIZE] | screen log filename |
| char password[LOCSIZE] | system access password |
| char privpass[LOCSIZE] | privileged password (for tech) |
| int timepass | factor to change time password |
| char flags | system control flags |
| char flags2 | 2nd set system control flags |
| char CMS_flags1 | future use CardLess flags |
| char CMS_flags2 | another set of CardLess flags |
| char dayflag | flag for day/second roll limits |
| long ctnroll | caution to positive limit |
| long cntlim | caution purge limit |
| long neglim | negative purge limit |
| long poslim | positive purge limit |
| long colim | cash only purge limit |
| long sclim | stolen purge limit |
| VerifyLimit dmax | day maximum call manager limits |
| VerifyLimit wmax | week maximum call manager limits |
| VerifyLimit tmin | total minimum call manager limits |
| long break1 | break value 1 for POS coupons |
| long break2 | break value 2 for POS coupons |
| long break3 | break value 3 for POS coupons |
| int cms | latest CardLess version making contact |
| int collect | latest ColleCheck version making contact |
| int cvs | current CVS version |
| long set_date | date counters were set to zero |
| long to_date | ending date for this set of counters |
| long couponA | number qualifying for Coupon "A" |
| long amtA | dollars Coupon "A" spent |
| long couponB | number qualifying for Coupon "B" |
| long amtB | dollars Coupon "B" spent |
| long couponC | number qualifying for Coupon "C" |

TABLE 3-continued

SYSTEM CONTROL FILE DESCRIPTION

| Field | Definition |
|---|---|
| long amtC | dollars Coupon "C" spent |
| long caution | number of Cautions |
| long amt_caut | dollars Cautions spent |
| long positive | number of Positives |
| long amt_pos | dollars Positives spent |

COUPON CONTROL DEFINITION

| Field | Definition |
|---|---|
| char locid[10]; | /*system id */ |
| int flags; | /*Bitwise flags for general coupon system */ |
| int Issue; | /*Bitwise flags for available check coupons */ |
| int cash; | /*Bitwise flags for available cash coupons */ |
| struct { | |
| char det; | /* How do we determine secondary shopper? 0= Use $ vs Daylimits 1= Use shopping frequency method */ |
| int slim; | /*$/trips less than this is Secondary Shopper */ |
| char dlim; | /*# of days/weeks for determination */ |
| char avgdet; | /*How do we determine A vs AA vs AAA? Using $ determination<br>0 = $ in last DayLimit days<br>1 = Weighted avg based on "n" trips<br>2 = Weighted avg based on $ in "n" weeks<br>3 = Weighted avg within last "n" days<br>4 = Mean avg based on "n" trips<br>5 = Mean avg based on $ in "n" weeks<br>6 = Mean avg within last "n" days<br>7 = Weeks attended in "n" weeks*/ |
| int per; | /*"n" trips/days/weeks to analyze avg $ */ |
| char mintrp; | /*Minimum # trips before det Secondary */ |
| char high1; | /*High $ in last "per" triggers AA,A */ |
| char high2; | /*High $ in last "per" triggers AAA,AA */ |
| char high3; | /*High $ in last "per" triggers 3A, 4A */ |
| char high4; | /*High $ in last "per" triggers 4A, 3A */ |
| char perks; | /*# trips for Secondary coupons */ |
| char super_perks; | /*# trips for Super Secondary */ |
| char super_lag; | /*# days before Super Secondary */ |
| }Secondary; | |
| struct{ | |
| char det; | /*How do we determine Primary Status<br>0 = $ in last DayLimit days<br>1 = Weighted avg based on "n" trips<br>2 = Weighted avg based on $ in "n" weeks<br>3 = Weighted avg within last "n" days<br>4 = Mean avg based on "n" trips<br>5 = Mean avg based on $ in "n" weeks<br>6 = Mean avg within last "n" days<br>7 = Weeks attended in "n" weeks */ |
| char Limit; | /*"n" trips/days/weeks for $ determination */ |
| int CouponB; | /*$ minimum for Coupon "B" */ |
| int CouponC; | /*$ minimum for Coupon "C" */ |
| int CouponD; | /*$ minimum for Coupon "D" */ |
| int CouponE; | /*$ minimum for Coupon "E" */ |
| }Primary; | |
| struct{ | |
| char det; | /*How do we determine avg<br>1 = Weighted avg based on "n" trips<br>3 = Weighted avg within last "n" days<br>4 = Mean avg based on "n" trips<br>6 = Mean avg within last "n" days */ |
| unsigned char mbase; | /*Maximum base for playing Maxxer */ |
| unsigned char percent; | /*Increase percent for Maxxing */ |
| unsigned char loops; | /*Number of passes at above percentage 0 = keep looping until failure */ |
| unsigned char mintrp; | /*Minimum # trips before using Maxxer */ |
| unsigned char trips; | /*# trips for establishing base avg */ |
| unsigned char super; | /*Number of trips til Super Max testing */ |
| unsigned char mdur; | /*Number of trips til give up Maxxer */ |
| unsigned char Floops; | /*Number of loops to retry failures */ |
| char maxiflags; | /*Maxxer Flags */ |
| }Maxxer; | |
| struct{ | |
| long set_date; | /*Date counters were set to zero */ |
| long to_date; | /*Ending date for this set of counters */ |
| long hits [15]; | /*Counters from Coupon "A1" to Coupon "E" */ |
| long amts [15]; | /*and Ctn's, Pos's, and No $ */ |
| }counters[3]; | /* 3 sets of cntrs; 2 for me */ |
| struct{ | |
| long set_date; | /* Start date for coupon Tracking */ |
| long to_date; | /* End date for coupon Tracking */ |
| unsigned int cntr [100]; | /* Coupons issued for date range */ |
| }CpnIssue[2]; | |
| char Slevels; | /* Number of standard series */ |
| char Slags; | /* Lag time before back to standard series 1 */ |
| char Alags; | /* Lag Time for Coupon "A" */ |
| char BElags; | /* Lag Time for Coupons "B"–"E" */ |
| char maxissue; | /* Max issued per trip */ |
| char header[22]; | /* Header for coupon */ |
| char footer[29]; | /* Footer for coupon */ |
| long ResetDate; | /* Date to reset standard issue lags */ |
| int mpurchase; | /* Minimum purchase */ |

COUPON RECORD DEFINITION

| Field | Definition |
|---|---|
| struct { | |
| char type [2]; | /* Coupon type 1=A, 2=AA, 3=AA, etc. 99 = gen */ |
| unsigned char seq; | /* Sequence number in this type */ |
| char lineno; | /* Line number for coupon, 0=coupon line */ |
| unsigned int serial; | /* Unique serial number for coupon access */ |
| }key; | |
| union { | |
| struct { | |
| int flags; | /* Bit flags for coupon */ |
| int Adist[2]; | /* Bit flags for Coupon "A" issue det (32 trips) */ |
| long begdate; | /* Start date for issuing this coupon */ |
| long enddate; | /* Exact end date for issuing coupon */ |
| long issuelim; | /* If applicable, limits number to issue */ |
| long issued; | /* Number of this coupon printed */ |
| long redeemed; | /* Number of this coupon redeemed */ |
| long ebegin; | /* Exact begin good for coupon */ |
| long dbegin; | /* Delta from today begin for coupon */ |
| long eend; | /* Exact end date for coupon */ |
| long dend; | /* Delta from today end for coupon */ |
| int maxmin; | /* Minimum Maxxer base dollar for issue */ |
| int maxmax; | /* Maximum Maxxer base dollar for issue */ |
| char grab; | /* Total coupons in grab bag */ |
| char take; | /* Number of coupons to take from the grab bag */ |
| char next; | /* next coupon from grab bag */ |
| int seed; | /* Random seed */ |
| int rcnt; | /* Random counter */ |
| int in_ratio; | /* Installment ratio 0 = 100 = 100 percent */ |
| int s_link; | /* Tie to next serial number */ |
| int i_serial; | /* Tie to same coupons */ |
| }control; | |
| struct { | |
| int flags; | /* Line flags */ |
| char data[80]; | /* Data for this line */ |
| }print; | |
| struct { | |
| int flags; | /* Line flags */ |
| char HRI; | /* Human readable interface positioning */ |
| char height; | /* Height of bar code in dots */ |
| char system; | /* Select bar code system */ |
| char data[40]; | /*Bar code data */ |
| }barcode; | |
| }rec; | |

TABLE 4

FUNCTION CODE SPECIFICATION

Function: F1
Description: Query ID, displaying current data
Keypad Input: [id] F1
Keypad Output: Status Dhitcnt Whitcnt Thitcnt
$totamt StatDate ID
Function: F2
Description: List Negative Locations for entered ID
Keypad Input: [id] F2
Keypad Output: NEG LOCATIONS
LOC1 LOC2 LOC3 ... LOC10
Function: F3
Description: Query Negative location ID as found on F2
Keypad Input: [id] F3 $n
*n - LOCn as shown on F2 display
Keypad Output: Neg Inquiry
LOCn Thitcnt $totamt negdate
Function: F4
Description: Query Location ID
Keypad Input: [id] F4
Keypad Output: LOC locid
locname
Function: F5
Description: Query ID Hitcounts and Dollar Amounts
Keypad Input: [id] F5
Keypad Output: Status Dhitcnt; amount Whitcnt; amount Thitcnt; amount
Function: F40
Description: Add Cash only ID
Keypad Input: id F40
Keypad Output: CASH ONLY FILE
id
Function: F41
Description: Add Stolen ID
Keypad Input: id F41
Keypad Output: STOLEN FILE
id
Function: F42
Description: Add Preapproved ID
Keypad Input: id F42
Keypad Output: PREAPPROVED
Function: F43
Description: Add Manager Only
Keypad Input: id F43
Keypad Output: MANAGER ONLY
id
Function: F44
Description: Add Negative ID with location
Keypad Input: id F44
Keypad Output: NEGATIVE FILE
id
Function: F55
Description: Verify ID. If F55 is not included, verify is assumed
Keypad Input: id [F55]
Keypad Output: *if any limits are exceeded:
CALL MANAGER
id
*status is caution:
CAUTION hitcnt
id
*status is negative:
NEGATIVE
id
*status is positive:
POS Dhitcnt Whitcnt Thitcnt
id
*status is cash only:
CASH ONLY
id
*status is stolen:
STOLEN
id
Function: F60
Description: Delete Cash only ID
Keypad Input: id F160
Keypad Output: CHECKS ACCEPTED
id
Function: F61
Description: Delete Stolen ID

TABLE 4-continued

FUNCTION CODE SPECIFICATION

| | |
|---|---|
| Keypad Input: | id F61 |
| Keypad Output: | CHECKS ACCEPTED |
| id | |
| Function: | F66 |
| Description: | Add Positive ID. Remove stolen list |
| Keypad Input: | id F66 |
| Keypad Output: | PAID OFF FILE |
| id | |
| Function: | F77 |
| Description: | Login to system to gain access to privileged commands |
| Keypad Input: | id F77 |
| Keypad Output: | Login Valid |
| Begin session | |
| Function: | F62 |
| Description: | Delete Preapproved |
| Keypad Input: | id F62 |
| Keypad Output: | PREAPPROVED |
| Function: | F43 |
| Description: | Delete Manager Only |
| Keypad Input: | id F63 |
| Keypad Output: | MANAGER ONLY |
| Function: | F88 |
| Description: | Logout from system |
| Keypad Input: | F88 |
| Keypad Output: | End Session |
| Bye! | |
| Function: | F900 |
| Description: | Return System Author Information |
| Keypad Input: | F900 |
| Keypad Output: | CVS v4.20 (c) 1989 CVC, by Scott Wood, CCP |
| Function: | F901 |
| Description: | Return System Internal Date & Time |
| Keypad Input: | F901 |
| Keypad Output: | System Date |
| mm/dd/yy - hh: | mm:ss |
| Function: | F902 |
| Description: | Return System Memory Usage |
| Keypad Input: | F902 |
| Keypad Output: | System Memory |
| b Bytes Free | |
| Function: | F903 |
| Description: | Return Disk Usage |
| Keypad Input: | n F903 |
| *n − 3 = Drive C | |
| *n − 4 = Drive D | |
| Keypad Output: | Disk Usage (CID) |
| Bytes: | n Total, n Free |
| Function: | F904 |
| Description: | Return ID Database Size |
| Keypad Input: | F904 |
| Keypad Output: | ID Database |
| n Records | |
| Function: | F905 |
| Description: | Return Negative ID Database Size |
| Keypad Input: | F905 |
| Keypad Output: | Negative dBase |
| n Records | |
| Function: | F906 |
| Description: | Return System Information depending on n |
| Keypad Input: | n F906 |
| Keypad Output: | *n–0 - System ID |
| Location ID | |
| locid | |
| *n=1 - Keypad Data | |
| Keypad Info | |
| Port:n, Poll:n, Recv:n | |
| *n=2 - Modem Data | |
| Modem Info | |
| Port 0:n, Port 1:n | |
| *n=3 - System Start Time | |
| Start Time | |
| mm/dd/yy - hh:mm:ss | |
| *n=4 - System Current Time | |
| Current Time | |
| mm/dd/yy - hh:mm:ss | |
| *n=5 - System Password | |
| Password | |

TABLE 4-continued

FUNCTION CODE SPECIFICATION

```
passid
*n=6 - System Flags
Flags n
*n=7 - Caution Roll Period
Caution Roll
n seconds
*n=8 - Caution Purge Limit
Caution Limit
n seconds
*n=9 - Negative Purge Limit
Negative Limit
n seconds
*n=10 - Positive Purge Limit
Positive Limit
n seconds
*n=11 - Cash Only Purge Limit
Cash only Limit
n seconds
*n=12 - Stolen Purge Limit
Stolen Limit

*n=13 - Caution Call Manager
Limits
Caution Callmgr
Dhitcnt,amount -
Whitcnt,amount -
Thitcnt,amount
*n=14 - Negative Call Manager
Limits
Negative Callmgr
Dhitcnt,amount -
Whitcnt,amount -
Thitcnt,amount
*n=15 - Positive Call Manager
Limits
Positive Callmgr
Dhitcnt,amount -
Whitcnt,amount -
Thitcnt,amount -
*n=16 - Cash only Call Manager
Limits
Cash only Callmgr
Dhitcnt,amount -
Whitcnt,amount -
Thitcnt,amount -
*n=17 - Stolen Call Manager
Limits
Stolen Callmgr
Dhitcnt,amount -
Whitcnt,amount -
Thitcnt,amount -
```

| | |
|---|---|
| Function: | F940 |
| Description: | Toggle Screen Logging |
| Keypad Input: | n F940 |
| *n=0:Off, 1:On | |
| Keypad Output: | Screen Log |
| (ON\|OFF) | |
| Function: | F950 |
| Description: | Start Event Activity for event n |
| Keypad Input: | n F950 [mmddmmss] |
| *n=event number | |
| Keypad Output: | Event n |
| Stopped | |
| Function: | F951 |
| Description: | Stop Event Activity for event n |
| Keypad Input: | n F951 |
| Keypad Output: | Event n |
| Stopped | |
| Function: | F952 |
| Description: | Get Event Activity for event n |
| Keypad Input: | n F952 |
| *n=event number | |
| Keypad Output: | mm/dd/yy - hh:mm:ss |
| act1 act2 act3 ... act10 | |
| Function: | F953 |
| Description: | Get Activity Status for activity n |
| Keypad Input: | n F953 |

TABLE 4-continued

FUNCTION CODE SPECIFICATION

| | |
|---|---|
| *n=event number | |
| Keypad Output: | activity description |
| activity data | |
| Function: | F960 |
| Description: | Toggle Keypad Debug Mode |
| Keypad Input: | n F960 |
| *n=0:Off, 1:On | |
| Keypad Output: | Keypad Debut |
| (ON|OFF) | |
| Function: | F961 |
| Description: | Return Keypad number associated with current pad |
| Keypad Input: | F961 |
| Keypad Output: | Keypad Number |
| n | |
| Function: | F970 |
| Description: | |
| Keypad Input: | F970 |
| Keypad Output: | Modem Debug |
| (ON|OFF) | |
| Function: | F971 |
| Description: | Reset Modem |
| Keypad Input: | F971 |
| Keypad Output: | Reset Modem |
| Function: | F980 |
| Description: | Toggle Data Manager Debug Mode |
| Keypad Input: | n F980 |
| *n=0:Off, 1:On | |
| Keypad Output: | DataBase Debug |
| Function: | F981 |
| Description: | Open database system if currently closed |
| Keypad Input: | F981 |
| Keypad Output: | Open dBase |
| Function: | F982 |
| Description: | Close database system if currently open |
| Keypad Input: | F982 |
| Keypad Output: | Close dBase |
| Function: | F983 |
| Description: | Return Internal Database Status |
| Keypad Input: | F983 |
| Keypad Output: | Database Status |
| B:bsyflag, H:hltflag, | |
| C:clsflag, Dbg:Dbgflag, | |
| E:error, D:doserr | |
| Function: | F990 |
| Description: | Toggle System Supervisor Debug Mode |
| Keypad Input: | n F990 |
| *n=0:Off, 1:On | |
| Keypad Output: | SysServe Debut |
| (ON|OFF) | |
| Function: | F999 |
| Description: | Shut System Down |
| Keypad Input: | password F999 |
| Keypad Output: | System Halted |

TABLE 5

CUSTOMER SHOPPING FREQUENCY
Time Period: 8 Weeks, 4 Days [frequency > 20 omitted]

| Shopping Frequency per Customer | Total Customers | % Customers Shopping for Period | % Total Customer Base | Total $ Spent for Period | % Total $ Spent for Period | Average Check per Visit | Average $ Spent per Customer |
|---|---|---|---|---|---|---|---|
| 20 | 36 | 0.23 | 0.12 | 25600 | 1.27 | 35.56 | 711.11 |
| 19 | 28 | 0.18 | 0.09 | 22044 | 1.09 | 41.44 | 787.28 |
| 18 | 42 | 0.27 | 0.14 | 31751 | 1.57 | 42.00 | 755.98 |
| 17 | 51 | 0.32 | 0.17 | 32326 | 1.60 | 37.28 | 633.84 |
| 16 | 51 | 0.32 | 0.17 | 29088 | 1.44 | 35.65 | 570.35 |
| 15 | 52 | 0.33 | 0.17 | 34410 | 1.70 | 44.12 | 661.73 |
| 14 | 70 | 0.44 | 0.24 | 49382 | 2.44 | 50.39 | 705.46 |
| 13 | 64 | 0.40 | 0.21 | 37923 | 1.88 | 45.58 | 592.55 |
| 12 | 80 | 0.51 | 0.27 | 41916 | 2.07 | 43.66 | 523.95 |
| 11 | 92 | 0.58 | 0.31 | 46311 | 2.29 | 45.76 | 503.38 |
| 10 | 137 | 0.87 | 0.46 | 60992 | 3.02 | 44.52 | 445.20 |

TABLE 5-continued

CUSTOMER SHOPPING FREQUENCY
Time Period: 8 Weeks, 4 Days [frequency > 20 omitted]

| Shopping Frequency per Customer | Total Customers | % Customers Shopping for Period | % Total Customer Base | Total $ Spent for Period | % Total $ Spent for Period | Average Check per Visit | Average $ Spent per Customer |
|---|---|---|---|---|---|---|---|
| 9 | 155 | 0.98 | 0.52 | 73404 | 3.63 | 52.62 | 473.57 |
| 8 | 210 | 1.33 | 0.71 | 90403 | 4.47 | 53.81 | 430.49 |
| 7 | 261 | 1.65 | 0.88 | 93222 | 4.61 | 51.02 | 357.17 |
| 6 | 377 | 2.38 | 1.27 | 114366 | 5.66 | 50.56 | 303.36 |
| 5 | 406 | 2.56 | 1.36 | 122223 | 6.05 | 60.21 | 301.04 |
| 4 | 801 | 5.06 | 2.69 | 191331 | 9.46 | 59.72 | 238.87 |
| 3 | 1122 | 7.09 | 3.77 | 210922 | 10.43 | 62.66 | 187.99 |
| 2 | 2767 | 17.48 | 9.29 | 305223 | 15.10 | 55.15 | 110.31 |
| 1 | 8794 | 55.55 | 29.52 | 408702 | 20.22 | 46.46 | 46.48 |
| TOTALS | 15830 | 100.00 | 53.15 | 2021539 | 100.00 | 47.91 | 127.70 |

Date Range: from 10/01/91 to 12/01/91
Total Customer Base: 29,786

TABLE 6

Infrequent Customer Analysis
Time Period: 8 weeks

| Total Customers | % Total Customer Base | Total $ Spent for Period | Average Check per Visit | Average $ Spent per Customer | Total Visits per Customer | Average Visits per Customer |
|---|---|---|---|---|---|---|
| 5581 | 24.30 | 305763 | 50.66 | 54.79 | 6036 | 1.08 |

Active: from 10/05/91 to 11/03/92
Inactive: from 11/03/91 to 12/01/91

TABLE 7

COUPON CONFIGURATION

| | |
|---|---|
| Coupon A: | Less than 5 weekly attendances in last 8 weeks. |
| A levels: | Based on attendance |
| A1: | 4 weekly attendances in last 8 weeks |
| A2: | 3 weekly attendances in last 8 weeks |
| A3: | 2 weekly attendances in last 8 weeks |
| A4: | 1 weekly attendances in last 8 weeks |
| A5: | 0 weekly attendances in last 8 weeks |
| Purchase Levels: | |
| Coupon B: | $0–$24.99 average purchase |
| Coupon C: | $25–$49.99 average purchase |
| Coupon D: | $50–$74.99 average purchase |
| Coupon E: | $75+ average purchase |
| Coupon M: | OFF |
| Scanned data: | OFF |

1. Customer #1 Profile
   Illustrate Coupon B

| | |
|---|---|
| Total trips | 223 |
| Average Purchase | $22.43 |
| Current Purchase | $24.98 |
| Prior Attendance: | 6 |
| 1 week ago | Yes |
| 2 weeks ago | Yes |
| 3 weeks ago | No |
| 4 weeks ago | Yes |
| 5 weeks ago | Yes |
| 6 weeks ago | Yes |
| 7 weeks ago | Yes |
| 8 weeks ago | No |
| Customer Status | Frequent |
| Coupon A Level | N/A |
| Purchase Level | B |

2. Customer #2 Profile
   Illustrate Coupon C

| | |
|---|---|
| Total trips | 89 |
| Average Purchase | $41.83 |
| Current Purchase | $48.38 |
| Prior Attendance: | 5 |
| 1 week ago | Yes |
| 2 weeks ago | Yes |
| 3 weeks ago | No |
| 4 weeks ago | Yes |
| 5 weeks ago | Yes |
| 6 weeks ago | No |
| 7 weeks ago | Yes |
| 8 weeks ago | No |
| Customer Status | Frequent |
| Coupon A Level | N/A |
| Purchase Level | C |

3. Coupons to spool Customer #1

| Class | Type | Description |
|---|---|---|
| Std | Info | Shop our NEW Deli |
| Std | Install | 25 Turkey Bucks |
| Std | Outside Ad | Free drink at Rod's Sandwich shop w/Sandwich Purchase |
| Std | Discount | 50¢ OFF Canned Peas |
| Std | Discount | 75¢ OFF Chicken Fryers |
| Std | Discount | $3.00 OFF New Prescription |
| B | Discount | 50¢ OFF Laundry Detergent |
| B | Discount | 25¢ OFF Cereal |

TABLE 7-continued

COUPON CONFIGURATION

4. Coupons to spool Customer #2

| Class | Type | Description |
|---|---|---|
| Std | Info | Shop our NEW Deli |
| Std | Install | 48 Turkey Bucks |
| Std | Outside Ad | Free drink at Rod's Sandwich Shop w/ Sandwich Purchase |
| Std | Discount | 50¢ OFF Canned Peas |
| Std | Discount | 75¢ OFF Chicken Fryers |
| Std | Discount | $3.00 OFF New Prescription |
| C | Discount | $1.00 OFF Bakery Purchase of $5.00 or more |
| C | Discount | 50¢ OFF ½ Gallon Ice Cream |

5. Customer #3 Profile
Illustrate Coupon D

| | |
|---|---|
| Total trips | 123 |
| Average Purchase | $66.41 |
| Current Purchase | $58.93 |
| Prior Attendance: | 7 |
| 1 week ago | Yes |
| 2 weeks ago | Yes |
| 3 weeks ago | Yes |
| 4 weeks ago | Yes |
| 5 weeks ago | Yes |
| 6 weeks ago | No |
| 7 weeks ago | Yes |
| 8 weeks ago | Yes |
| Customer Status | Frequent |
| Coupon A Level | N/A |
| Purchase Level | D |

6. Customer #4 Profile
Illustrate Coupon E

| | |
|---|---|
| Total trips | 77 |
| Average Purchase | $112.69 |
| Current Purchase | $127.48 |
| Prior Attendance: | 7 |
| 1 week ago | No |
| 2 weeks ago | Yes |
| 3 weeks ago | Yes |
| 4 weeks ago | Yes |
| 5 weeks ago | Yes |
| 6 weeks ago | Yes |
| 7 weeks ago | Yes |
| 8 weeks ago | Yes |
| Customer Status | Frequent |
| Coupon A Level | N/A |
| Purchase Level | E |

7. Coupons to spool Customer #3

| Class | Type | Description |
|---|---|---|
| Std | Info | Shop our NEW Deli |
| Std | Install | 59 Turkey Bucks |
| Std | Outside Ad | Free drink at Rod's Sandwich Shop w/ Sandwich Purchase |
| Std | Discount | 50¢ OFF Canned Peas |
| Std | Discount | 75¢ OFF Chicken Fryers |
| Std | Discount | $3.00 OFF New Prescription |
| D | Discount | $2.00 OFF Meat Department Purchase of $10.00 or more |
| D | Discount | $1.00 OFF Deli Pizza |

8. Coupons to spool Customer #4

| Class | Type | Description |
|---|---|---|
| Std | Info | Shop our NEW Deli |
| Std | Install | 127 Turkey Bucks |
| Std | Outside Ad | Free drink at Rod's Sandwich Shop w/ Sandwich Purchase |
| Std | Discount | 50¢ OFF Canned Peas |
| Std | Discount | 75¢ OFF Chicken Fryers |
| Std | Discount | $3.00 OFF New Prescription |
| E | Discount | $2.00 OFF Delicatessen Purchase of $10.00 or more |
| E | Random | Lucky Winner of a FREE 10 lb. Turkey (100:1)* |
| E | Discount | $3.00 OFF any 5 gourmet style frozen entrees |

9. Customer #5 Profile
Illustrate Coupon A, Level 5

| | |
|---|---|
| Total trips | 81 |
| Average Purchase | $73.62 |
| Current Purchase | $87.09 |
| Prior Attendance: | 0 |
| 1 week ago | No |
| 2 weeks ago | No |
| 3 weeks ago | No |
| 4 weeks ago | No |
| 5 weeks ago | No |
| 6 weeks ago | No |
| 7 weeks ago | No |
| 8 weeks ago | No |
| Customer Status | Infrequent |
| Coupon A Level | 5 |
| Purchase Level | D |

10. Coupons to spool Customer #5
Trip #1 – (Begin Coupon A Level 5)

| Class | Type | Description |
|---|---|---|
| Std | Info | Shop our NEW Deli |
| Std | Install | 87 Turkey Bucks |
| Std | Outside Ad | Free drink at Rod's Sandwich Shop w/ Sandwich Purchase |
| Std | Discount | 50¢ OFF Canned Peas |
| Std | Discount | 75¢ OFF Chicken Fryers |
| Std | Discount | $3.00 OFF New Prescription |
| D | Discount | $2.00 OFF Meat Department Purchase of $10.00 or more |
| D | Discount | $1.00 OFF Deli Pizza |
| A5 | Discount | $8.00 OFF Next Purchase of $40.00 or more -- OR -- $4.00 OFF Next Purchase of $25.00 or more |
| A5 | Discount | FREE 12 pack Soda |
| A5 | Discount | FREE 1 gallon milk |
| A5 | Discount | FREE 1 dozen large Grade A Eggs |

11. Coupons to spool Customer #5
Trip #2 – 7 days from start of program
Purchase = $71.78

| Class | Type | Description |
|---|---|---|
| Std | Info | Shop our NEW Deli |
| Std | Install | 72 Turkey Bucks |
| Std | outside Ad | Free drink at Rod's Sandwich Shop w/ Sandwich Purchase |
| Std | Discount | 50¢ OFF Canned Peas |
| Std | Discount | 75¢ OFF Chicken Fryers |
| Std | Discount | $3.00 OFF New Prescription |
| D | Discount | $2.00 OFF Meat Department Purchase of $10.00 or more |
| D | Discount | $1.00 OFF Deli Pizza |
| A5 | Discount | $4.00 OFF Next Purchase of $25.00 or more |
| A5 | Discount | FREE 12 pack Soda |
| A5 | Discount | FREE 1 gallon Milk |
| A5 | Discount | FREE 1 dozen large Grade A Eggs |

12. Coupons to spool Customer #5
Trip #3 – 12 days from start of program
Purchase = $54.81

| Class | Type | Description |
|---|---|---|
| Std | Info | Shop our NEW Deli |
| Std | Install | 55 Turkey Bucks |
| Std | Outside Ad | Free drink at Rod's Sandwich shop w/ Sandwich Purchase |
| Std | Discount | 50¢ OFF Canned Peas |
| Std | Discount | 75¢ OFF Chicken Fryers |
| Std | Discount | $3.00 OFF New Prescription |
| D | Discount | $2.00 OFF Meat Department Purchase of $10.00 or more |
| D | Discount | $1.00 OFF Deli Pizza |
| A5 | Discount | $4.00 OFF Next Purchase of $25.00 or more |

TABLE 7-continued

COUPON CONFIGURATION

| Class | Type | Description |
|---|---|---|
| A5 | Discount | FREE 12 pack Soda |
| A5 | Discount | FREE 1 gallon Milk |
| A5 | Discount | FREE 1 dozen large Grade A Eggs |

13. Coupons to spool Customer #5
    Trip #4 -- 21 days from start of program
    Purchase = $63.09

| Class | Type | Description |
|---|---|---|
| Std | Info | Shop our NEW Deli |
| Std | Install | 63 Turkey Bucks |
| Std | Outside Ad | Free drink at Rod's Sandwich Shop w/ Sandwich Purchase |
| Std | Discount | 50¢ OFF Canned Peas |
| Std | Discount | 75¢ OFF Chicken Fryers |
| Std | Discount | $3.00 OFF New Prescription |
| D | Discount | $2.00 OFF Meat Department Purchase of $10.00 or more |
| D | Discount | $1.00 OFF Deli Pizza |
| A5 | Discount | $6.00 OFF Next Purchase of $40.00 or more -- OR -- $3.00 OFF Next Purchase of $25.00 or more |
| A5 | Discount | FREE 12 pack Soda |
| A5 | Install | 20 BONUS Turkey Bucks |

14. Coupons to spool Customer #5
    Trip #5 -- 35 days from start of program
    Purchase = $118.68

| Class | Type | Description |
|---|---|---|
| Std | Info | Shop our NEW Deli |
| Std | Install | 119 Turkey Bucks |
| Std | Outside Ad | Free drink at Rod's Sandwich Shop w/ Sandwich Purchase |
| Std | Discount | 50¢ OFF Canned Peas |
| Std | Discount | 75¢ OFF Chicken Fryers |
| Std | Discount | $3.00 OFF New Prescription |
| D | Discount | $2.00 OFF Meat Department Purchase of $10.00 or more |
| D | Discount | $1.00 OFF Deli Pizza |
| A5 | Discount | $6.00 OFF Next Purchase of $40.00 or more -- OR -- $3.00 OFF Next Purchase of $25.00 or more |
| A5 | Discount | FREE 12 pack Soda |
| A5 | Install | 20 BONUS Turkey Bucks |

15. Coupons to spool Customer #5
    Trip #6 -- 39 days from start of program
    Purchase = $44.11

| Class | Type | Description |
|---|---|---|
| Std | Info | Shop our NEW Deli |
| Std | Install | 44 Turkey Bucks |
| Std | Outside Ad | Free drink at Rod's Sandwich Shop w/ Sandwich Purchase |
| Std | Discount | 50¢ OFF Canned Peas |
| Std | Discount | 75¢ OFF Chicken Fryers |
| Std | Discount | $3.00 OFF New Prescription |
| D | Discount | $2.00 OFF Meat Department Purchase of $10.00 or more |
| D | Discount | $1.00 OFF Deli Pizza |
| A5 | Discount | $6.00 OFF Next Purchase of $40.00 or more -- OR -- $3.00 OFF Next Purchase of $25.00 or more |
| A5 | Discount | FREE 12 pack Soda |
| A5 | Install | 20 BONUS Turkey Bucks |

16. Coupons to spool Customer #5
    Trip #7 -- 48 days from start of program
    Purchase = $72.53

| Class | Type | Description |
|---|---|---|
| Std | Info | Shop our NEW Deli |
| Std | Install | 73 Turkey Bucks |
| Std | Outside Ad | Free drink at Rod's Sandwich Shop w/ Sandwich Purchase |
| Std | Discount | 50¢ OFF Canned Peas |
| Std | Discount | 75¢ OFF Chicken Fryers |
| Std | Discount | $3.00 OFF New Prescription |
| D | Discount | $2.00 OFF Meat Department Purchase of $10.00 or more |
| D | Discount | $1.00 OFF Deli Pizza |
| A5 | Discount | $3.00 OFF Next Purchase of $25.00 or more |
| A5 | Discount | FREE 12 pack Soda |
| A5 | Discount | 20 OFF on ALL Deli Purchases |

17. Coupons to spool Customer #5
    Trip #8 -- 58 days from start of program
    Purchase = $80.39

| Class | Type | Description |
|---|---|---|
| Std | Info | Shop our NEW Deli |
| Std | Install | 80 Turkey Bucks |
| Std | Outside Ad | Free drink at Rod's Sandwich Shop w/ Sandwich Purchase |
| Std | Discount | 50¢ OFF Canned Peas |
| Std | Discount | 75¢ OFF Chicken Fryers |
| Std | Discount | $3.00 OFF New Prescription |
| D | Discount | $2.00 OFF Meat Department purchase of $10.00 or more |
| D | Discount | $1.00 OFF Deli Pizza |
| A5 | Discount | $3.00 OFF Next Purchase of $25.00 or more |
| A5 | Discount | FREE 12 pack Soda |
| A5 | Discount | 20 OFF on ALL Deli Purchases |

18. Coupons to spool Customer #5
    Trip #9 -- 67 days from start of program
    Purchase = $66.34

| Class | Type | Description |
|---|---|---|
| Std | Info | Shop our NEW Deli |
| Std | Install | 66 Turkey Bucks |
| Std | Outside Ad | Free drink at Rod's Sandwich Shop w/ Sandwich Purchase |
| Std | Discount | 50¢ OFF canned Peas |
| Std | Discount | 75¢ OFF Chicken Fryers |
| Std | Discount | $3.00 OFF New Prescription |
| D | Discount | $2.00 OFF Meat Department Purchase of $10.00 or more |
| D | Discount | $1.00 OFF Deli Pizza |
| A5 | Discount | $2.00 OFF Next Purchase of $25.00 or more |
| A5 | Discount | FREE 12 pack Soda |

19. Coupons to spool Customer #5
    Trip #10 -- 72 days from start of program
    Purchase = $48.61

| Class | Type | Description |
|---|---|---|
| Std | Info | Shop our NEW Deli |
| Std | Install | 49 Turkey Bucks |
| Std | Outside Ad | Free drink at Rod's Sandwich Shop w/ Sandwich Purchase |
| Std | Discount | 50¢ OFF Canned Peas |
| Std | Discount | 75¢ OFF Chicken Fryers |
| Std | Discount | $3.00 OFF New Prescription |
| D | Discount | $2.00 OFF Meat Department Purchase of $10.00 or more |
| D | Discount | $1.00 OFF Deli Pizza |
| A5 | Discount | $2.00 OFF Next Purchase of $25.00 or more |
| A5 | Discount | FREE 12 pack Soda |

20. Coupons to spool Customer #5
    Trip #11 -- 80 days from start of program
    Purchase = $81.42

| Class | Type | Description |
|---|---|---|
| Std | Info | Shop our NEW Deli |
| Std | Install | 81 Turkey Bucks |
| Std | Outside Ad | Free drink at Rod's Sandwich Shop w/ Sandwich Purchase |
| Std | Discount | 50¢ OFF Canned Peas |
| Std | Discount | 75¢ OFF Chicken Fryers |
| Std | Discount | $3.00 OFF New Prescription |

TABLE 7-continued

COUPON CONFIGURATION

| | | |
|---|---|---|
| D | Discount | $2.00 OFF Meat Department Purchase of $10.00 or more |
| D | Discount | $1.00 OFF Deli Pizza |
| A5 | Discount | FREE 12 pack Soda |

21. Coupons to spool Customer #5
Trip #12 -- 87 days from start of program
Purchase = $112.49

| Class | Type | Description |
|---|---|---|
| Std | Info | Shop our NEW Deli |
| Std | Install | 112 Turkey Bucks |
| Std | Outside Ad | Free drink at Rod's Sandwich shop w/ Sandwich Purchase |
| Std | Discount | 50¢ OFF Canned Peas |
| Std | Discount | 75¢ OFF Chicken Fryers |
| Std | Discount | $3.00 OFF New Prescription |
| D | Discount | $2.00 OFF Meat Department Purchase of $10.00 or more |
| D | Discount | $1.00 OFF Deli Pizza |
| A5 | Discount | FREE 12 pack Soda |

22. Coupons to spool Customer #5
Trip #13 -- Program is complete
Purchase = $61.00

| Class | Type | Description |
|---|---|---|
| Std | Info | Shop our NEW Deli |
| Std | Install | 61 Turkey Bucks |
| Std | Outside Ad | Free drink at Rod's Sandwich Shop w/ Sandwich Purchase |
| Std | Discount | 50¢ OFF Canned Peas |
| Std | Discount | 75¢ OFF Chicken Fryers |
| Std | Discount | $3.00 OFF New Prescription |
| D | Discount | $2.00 OFF Meat Department Purchase of $10.00 or more |
| D | Discount | $1.00 OFF Deli Pizza |

*Random coupon set to spool 1 out of 100 accesses

TABLE 8

Coupon M Configuration

1. Coupon A: Less than 5 weekly attendances in last 8 weeks.
A levels: Based on attendance
   A1: 4 weekly attendances in last 8 weeks
   A2: 3 weekly attendances in last 8 weeks
   A3: 2 weekly attendances in last 8 weeks
   A4: 1 weekly attendances in last 8 weeks
   A5: 0 weekly attendances in last 8 weeks
Purchase Levels:

Coupon B: $0 – $24.99 average purchase
   Coupon C: $25 – $49.99 average purchase
   Coupon D: $50 – $74.99 average purchase
   Coupon E: $75 + average purchase
   Coupon M: 10% increase on Average $50 or less
   Test effectiveness after 3 trips
   Scanned data: OFF

TABLE 8-continued

Coupon M Configuration

2. Customer #6 Profile
Illustrate Coupon M

| | |
|---|---|
| Total trips | 223 |
| Average Purchase | $22.43 |
| Current Purchase | $24.98 |
| Prior Attendance: | 6 |
| 1 week ago | Yes |
| 2 weeks ago | Yes |
| 3 weeks ago | No |
| 4 weeks ago | Yes |
| 5 weeks ago | Yes |
| 6 weeks ago | Yes |
| 7 weeks ago | Yes |
| 8 weeks ago | No |
| Customer Status | Frequent |
| Coupon A Level | N/A |
| Purchase Level | B |
| Maxxer Base | $22 |
| Maxxer Target | $25 |
| Rounded to | $5 |

3. Coupons to spool Customer #6
Trip #1 (Begin Coupon M Program)

| Class | Type | Description |
|---|---|---|
| Std | Info | Shop our NEW Deli |
| Std | Install | 25 Turkey Bucks |
| Std | Outside Ad | Free drink at Rod's Sandwich Shop w/ Sandwich Purchase |
| Std | Discount | 50¢ OFF Canned Peas |
| Std | Discount | 75¢ OFF Chicken Fryers |
| Std | Discount | $3.00 OFF New Prescription |
| B | Discount | 50¢ OFF Laundry Detergent |
| B | Discount | 25¢ OFF Cereal |
| M | Discount | $1.00 OFF Next Grocery Purchase of $25.00 or more |

4. Coupons to spool Customer #6
Trip #2 -- 7 days from start of Program
Purchase $31.68

| Class | Type | Description |
|---|---|---|
| Std | Info | Shop our NEW Deli |
| Std | Install | 32 Turkey Bucks |
| Std | Outside Ad | Free drink at Rod's Sandwich Shop w/ Sandwich Purchase |
| Std | Discount | 50¢ OFF Canned Peas |
| Std | Discount | 75¢ OFF Chicken Fryers |
| Std | Discount | $3.00 OFF New Prescription |
| B | Discount | 50¢ OFF Laundry Detergent |
| B | Discount | 25¢ OFF Cereal |
| M | Discount | $1.00 OFF Next Grocery Purchase of $25.00 or more |

5. Coupons to spool Customer #6
Trip #3 -- 14 days from start of Program
Purchase $36.45

| Class | Type | Description |
|---|---|---|
| Std | Info | Shop our NEW Deli |
| Std | Install | 36 Turkey Bucks |
| Std | Outside Ad | Free drink at Rod's Sandwich Shop w/ Sandwich Purchase |
| Std | Discount | 50¢ OFF Canned Peas |
| Std | Discount | 75¢ OFF Chicken Fryers |
| Std | Discount | $3.00 OFF New Prescription |
| B | Discount | 50¢ OFF Laundry Detergent |
| B | Discount | 25¢ OFF Cereal |
| M | Discount | $1.00 OFF Next Grocery Purchase of $25.00 or more |

TABLE 8-continued

Coupon M Configuration

6. Coupons to spool Customer #6
   Trip #4 -- 14 days from start of Program
   Purchase = $29.67
   Average since program began = $32.60
   Program is complete

| Class | Type | Description |
|---|---|---|
| Std | Info | Shop our NEW Deli |
| Std | Install | 30 Turkey Bucks |
| Std | Outside Ad | Free drink at Rod's Sandwich Shop w/ Sandwich Purchase |
| Std | Discount | 50¢ OFF Canned Peas |
| Std | Discount | 75¢ OFF Chicken Fryers |
| Std | Discount | $3.00 OFF New Prescription |
| B | Discount | 50¢ OFF Laundry Detergent |
| B | Discount | 25¢ OFF Cereal |

7. Customer #7 Profile
   Illustrate Out of Range for Coupon M

Total trips 123
Average Purchase $66.41
Current Purchase $58.93
Prior Attendance: 7
1 week ago Yes
2 weeks ago Yes
3 weeks ago Yes
4 weeks ago Yes
5 weeks ago Yes
6 weeks ago No
7 weeks ago Yes
8 weeks ago Yes
Customer Status Frequent
Coupon A Level N/A
Purchase Level D
Maxxer Base $66
Maxxer Target* N/A

* Base above $50 ceiling
8. Coupons to spool Customer #7

| Class | Type | Description |
|---|---|---|
| Std | Info | Shop our NEW Deli |
| Std | Install | 59 Turkey Bucks |
| Std | Outside Ad | Free drink at Rod's Sandwich Shop w/ Sandwich Purchase |
| Std | Discount | 50¢ OFF Canned Peas |
| Std | Discount | 75¢ OFF Chicken Fryers |
| Std | Discount | $3.00 OFF New Prescription |
| D | Discount | $2.00 OFF Meat Department Purchase of $10.00 or more |
| D | Discount | $1.00 OFF Deli Pizza |

TABLE 9

Super A Coupon Configuration

1. Coupon A: Less than 5 weekly attendances in last 8 weeks.
   A levels: Based on attendance
   A1: 4 weekly attendances in last 8 weeks
   A2: 3 weekly attendances in last 8 weeks
   A3: 2 weekly attendances in last 8 weeks
   A4: 1 weekly attendances in last 8 weeks
   A5: 0 weekly attendances in last 8 weeks
   Super A: Applied to 30 or more days absent
   Duration of program is 3 trips
   Purchase Levels:

Coupon B: $0 -- $24.99 average purchase
   Coupon C: $25 -- $49.99 average purchase
   Coupon D: $50 -- $74.99 average purchase
   Coupon E: $75 + average purchase

TABLE 9-continued

Super A Coupon Configuration

Coupon M OFF
Scanned data: OFF

2. Customer #8 Profile
   Illustrate Coupon A, Level 3
   and Super A

Total trips 81
Average Purchase $73.62
Current Purchase $87.09
Prior Attendance: 0
1 week ago No
2 weeks ago No
3 weeks ago No
4 weeks ago No
5 weeks ago No
6 weeks ago Yes
7 weeks ago Yes
8 weeks ago No
Customer Status Infrequent
Coupon A Level 3
Purchase Level D 3. Coupons to spool Customer #8
   Trip #1 -- (Begin Coupon A Level 3)

| Class | Type | Description |
|---|---|---|
| Std | Info | Shop our NEW Deli |
| Std | Install | 87 Turkey Bucks |
| Std | Outside Ad | Free drink at Rod's Sandwich Shop w/ Sandwich Purchase |
| Std | Discount | 50¢ OFF Canned Peas |
| Std | Discount | 75¢ OFF Chicken Fryers |
| Std | Discount | $3.00 OFF New Prescription |
| D | Discount | $2.00 OFF Meat Department Purchase of $10.00 or more |
| D | Discount | $1.00 OFF Deli Pizza |
| A3 | Discount | $6.00 OFF Next Purchase of $40.00 or more -- OR -- $3.00 OFF Next Purchase of $25.00 or more |
| A3 | Discount | FREE 12 pack Soda |
| A3 | Discount | FREE 1 loaf of bread |

4. Coupons to spool Customer #8
   Trip #2 -- 7 days from start of program
   Purchase = $71.78

| Class | Type | Description |
|---|---|---|
| Std | Info | Shop our NEW Deli |
| Std | Install | 72 Turkey Bucks |
| Std | Outside Ad | Free drink at Rod's Sandwich Shop w/ Sandwich Purchase |
| Std | Discount | 50¢ OFF Canned Peas |
| Std | Discount | 75¢ OFF Chicken Fryers |
| Std | Discount | $3.00 OFF New Prescription |
| D | Discount | $2.00 OFF Meat Department Purchase of $10.00 or more |
| D | Discount | $1.00 OFF Deli Pizza |
| A3 | Discount | $6.00 OFF Next Purchase of $40.00 or more -- OR -- $3.00 OFF Next Purchase of $25.00 or more |
| A3 | Discount | FREE 12 pack Soda |
| A3 | Discount | FREE 1 loaf of bread |

5. Coupons to spool Customer #8
   Trip #3 -- 12 days from start of program
   Purchase = $54.81

| Class | Type | Description |
|---|---|---|
| Std | Info | Shop our NEW Deli |
| Std | Install | 55 Turkey Bucks |
| Std | Outside Ad | Free drink at Rod's Sandwich Shop w/ Sandwich Purchase |
| Std | Discount | 50¢ OFF Canned Peas |

TABLE 9-continued

Super A Coupon Configuration

| Class | Type | Description |
|---|---|---|
| Std | Discount | 75¢ OFF Chicken Fryers |
| Std | Discount | $3.00 OFF New Prescription |
| D | Discount | $2.00 OFF Meat Department Purchase of $10.00 or more |
| D | Discount | $1.00 OFF Deli Pizza |
| A3 | Discount | $6.00 OFF Next Purchase of $40.00 or more -- OR -- $3.00 OFF Next Purchase of $25.00 or more |
| A3 | Discount | FREE 12 pack Soda |
| A3 | Discount | FREE 1 loaf of bread |

6. Coupons to spool Customer #8
Trip #4 -- 47 days from start of program
Purchase = $63.09
Begin SUPER A Program

| Class | Type | Description |
|---|---|---|
| Std | Info | Shop our NEW Deli |
| Std | Install | 63 Turkey Bucks |
| Std | Outside Ad | Free drink at Rod's Sandwich Shop w/ Sandwich Purchase |
| Std | Discount | 50¢ OFF Canned Peas |
| Std | Discount | 75¢ OFF Chicken Fryers |
| Std | Discount | $3.00 OFF New Prescription |
| D | Discount | $2.00 OFF Meat Department Purchase of $10.00 or more |
| D | Discount | $1.00 OFF Deli Pizza |
| SA3 | Discount | $8.00 OFF Next Purchase of $40.00 or more -- OR -- $4.00 OFF Next Purchase of $25.00 or more |
| BA3 | Discount | FREE 12 pack Soda |
| SA3 | Install | 25 BONUS Turkey Bucks |
| SA3 | Discount | FREE ½ Gallon Ice Cream |
| SA3 | Discount | FREE 10 lb Whole Chicken Fryer |

7. Coupons to spool Customer #8
Trip #2 -- 7 days from start of Super A program
Purchase = $48.92

| Class | Type | Description |
|---|---|---|
| Std | Info | Shop our NEW Deli |
| Std | Install | 49 Turkey Bucks |
| Std | Outside Ad | Free drink at Rod's Sandwich Shop w/ Sandwich Purchase |
| Std | Discount | 50¢ OFF Canned Peas |
| Std | Discount | 75¢ OFF Chicken Fryers |
| Std | Discount | $3.00 OFF New Prescription |
| D | Discount | $2.00 OFF Meat Department Purchase of $10.00 or more |
| D | Discount | $1.00 OFF Deli Pizza |
| SA3 | Discount | $8.00 OFF Next Purchase of $40.00 or more -- OR -- $4.00 OFF Next Purchase of $25.00 or more |
| SA3 | Discount | FREE 12 pack Soda |
| SA3 | Install | 25 BONUS Turkey Bucks |
| SA3 | Discount | FREE ½ Gallon Ice Cream |
| SA3 | Discount | FREE 10 lb Whole Chicken Fryer |

8. Coupons to spool Customer #8
Trip #3 -- 17 days from start of Super A program
Purchase = $55.63
SUPER A is complete, Next Visit resumes
Coupon A Program at trip #4

| Class | Type | Description |
|---|---|---|
| Std | Info | Shop our NEW Deli |
| Std | Install | 56 Turkey Bucks |
| Std | Outside Ad | Free drink at Rod's Sandwich Shop w/ Sandwich Purchase |
| Std | Discount | 50¢ OFF Canned Peas |
| Std | Discount | 75¢ OFF Chicken Fryers |
| Std | Discount | $3.00 OFF New Prescription |
| D | Discount | $2.00 OFF Meat Department Purchase of $10.00 or more |
| D | Discount | $1.00 OFF Deli Pizza |
| SA3 | Discount | $8.00 OFF Next Purchase of $40.00 or more -- OR -- $4.00 OFF Next Purchase of $25.00 or more |
| SA3 | Discount | FREE 12 pack Soda |
| SA3 | Install | 25 BONUS Turkey Bucks |
| SA3 | Discount | FREE ½ Gallon Ice Cream |
| SA3 | Discount | FREE 10 lb Whole Chicken Fryer |

9. Coupons to spool Customer #8
Trip #4 -- 76 days from start of program
Purchase = $72.18

| Class | Type | Description |
|---|---|---|
| Std | Info | Shop our NEW Deli |
| Std | Install | 72 Turkey Bucks |
| Std | Outside Ad | Free drink at Rod's Sandwich Shop w/ Sandwich Purchase |
| Std | Discount | 50¢ OFF Canned Peas |
| Std | Discount | 75¢ OFF Chicken Fryers |
| Std | Discount | $3.00 OFF New Prescription |
| D | Discount | $2.00 OFF Meat Department Purchase of $10.00 or more |
| D | Discount | $1.00 OFF Deli Pizza |
| A3 | Discount | $6.00 OFF Next Purchase of $40.00 or more -- OR -- $3.00 OFF Next Purchase of $25.00 or more |
| A3 | Discount | FREE 12 pack Soda |
| A3 | Discount | FREE 1 loaf of bread |

10. Coupons to spool Customer #8
Trip #5 -- 84 days from start of program
Purchase = $118.68

| Class | Type | Description |
|---|---|---|
| Std | Info | Shop our NEW Deli |
| Std | Install | 119 Turkey Bucks |
| Std | Outside Ad | Free drink at Rod's Sandwich Shop w/ Sandwich Purchase |
| Std | Discount | 50¢ OFF Canned Peas |
| Std | Discount | 75¢ OFF Chicken Fryers |
| Std | Discount | $3.00 OFF New Prescription |
| D | Discount | $2.00 OFF Meat Department Purchase of $10.00 or more |
| D | Discount | $1.00 OFF Deli Pizza |
| A3 | Discount | $3.00 OFF Next Purchase of $25.00 or more |
| A3 | Discount | FREE 12 pack Soda |

11. Coupons to spool Customer #8
Trip #6 -- 93 days from start of program
Purchase = $44.11

| Class | Type | Description |
|---|---|---|
| Std | Info | Shop our NEW Deli |
| Std | Install | 44 Turkey Bucks |
| Std | Outside Ad | Free drink at Rod's Sandwich Shop W/ Sandwich Purchase |
| Std | Discount | 50¢ OFF Canned Peas |
| Std | Discount | 75¢ OFF Chicken Fryers |
| Std | Discount | $3.00 OFF New Prescription |
| D | Discount | $2.00 OFF Meat Department Purchase of $10.00 or more |
| D | Discount | $1.00 OFF Deli Pizza |
| A3 | Discount | $3.00 OFF Next Purchase of $25.00 or more |
| A3 | Discount | FREE 12 pack Soda |

12. Coupons to spool Customer #8
Trip #7 -- 99 days from start of program
Purchase = $72.53

| Class | Type | Description |
|---|---|---|
| Std | Info | Shop our NEW Deli |
| Std | Install | 73 Turkey Bucks |

TABLE 9-continued

Super A Coupon Configuration

| Class | Type | Description |
|---|---|---|
| Std | Outside Ad | Free drink at Rod's Sandwich Shop w/ Sandwich Purchase |
| Std | Discount | 50¢ OFF Canned Peas |
| Std | Discount | 75¢ OFF Chicken Fryers |
| Std | Discount | $3.00 OFF New Prescription |
| D | Discount | $2.00 OFF Meat Department Purchase of $10.00 or more |
| D | Discount | $1.00 OFF Deli Pizza |
| A3 | Discount | FREE 12 pack Soda |
| A3 | Discount | 20 OFF on ALL Deli Purchases |

13. Coupons to spool Customer #8
    Trip #8 -- 108 days from start of program
    Purchase = $80.39

| Class | Type | Description |
|---|---|---|
| Std | Info | Shop our NEW Deli |
| Std | Install | 80 Turkey Bucks |
| Std | Outside Ad | Free drink at Rod's Sandwich Shop w/ Sandwich Purchase |
| Std | Discount | 50¢ OFF Canned Peas |
| Std | Discount | 75¢ OFF Chicken Fryers |
| Std | Discount | $3.00 OFF New Prescription |
| D | Discount | $2.00 OFF Meat Department Purchase of $10.00 or more |
| D | Discount | $1.00 OFF Deli Pizza |
| A5 | Discount | FREE 12 pack Soda |
| A5 | Discount | 20 OFF on ALL Deli Purchases |

14. Coupons to spool Customer #8
    Trip #9 -- 117 days from start of program
    Purchase = $66.34

| Class | Type | Description |
|---|---|---|
| Std | Info | Shop our NEW Deli |
| Std | Install | 66 Turkey Bucks |
| Std | Outside Ad | Free drink at Rod's Sandwich Shop w/ Sandwich Purchase |
| Std | Discount | 50¢ OFF Canned Peas |
| Std | Discount | 75¢ OFF Chicken Fryers |
| Std | Discount | $3.00 OFF New Prescription |
| D | Discount | $2.00 OFF Meat Department Purchase of $10.00 or more |
| D | Discount | $1.00 OFF Deli Pizza |
| A5 | Discount | FREE 12 pack Soda |

15. Coupons to spool Customer #8
    Trip #10 -- 122 days from start of program
    Purchase = $48.61

| Class | Type | Description |
|---|---|---|
| Std | Info | Shop our NEW Deli |
| Std | Install | 49 Turkey Bucks |
| Std | Outside Ad | Free drink at Rod's Sandwich Shop w/ Sandwich Purchase |
| Std | Discount | 50¢ OFF Canned Peas |
| Std | Discount | 75¢ OFF Chicken Fryers |
| Std | Discount | $3.00 OFF New Prescription |
| D | Discount | $2.00 OFF Meat Department Purchase of $10.00 or more |
| D | Discount | $1.00 OFF Deli Pizza |
| A5 | Discount | FREE 12 pack Soda |

16. Coupons to spool Customer #8
    Trip #11 -- 130 days from start of program
    Purchase = $81.42

| Class | Type | Description |
|---|---|---|
| Std | Info | Shop our NEW Deli |
| Std | Install | 81 Turkey Bucks |
| Std | Outside Ad | Free drink at Rod's Sandwich Shop w/ Sandwich Purchase |
| Std | Discount | 50¢ OFF Canned Peas |
| Std | Discount | 75¢ OFF Chicken Fryers |
| Std | Discount | $3.00 OFF New Prescription |
| D | Discount | $2.00 OFF Meat Department Purchase of $10.00 or more |
| D | Discount | $1.00 OFF Deli Pizza |
| A5 | Discount | FREE 12 pack Soda |

17. Coupons to spool Customer #8
    Trip #12 -- 137 days from start of program
    Purchase = $112.49

| Class | Type | Description |
|---|---|---|
| Std | Info | Shop our NEW Deli |
| Std | Install | 112 Turkey Bucks |
| Std | Outside Ad | Free drink at Rod's Sandwich Shop w/ Sandwich Purchase |
| Std | Discount | 50¢ OFF Canned Peas |
| Std | Discount | 75¢ OFF Chicken Fryers |
| Std | Discount | $3.00 OFF New Prescription |
| D | Discount | $2.00 OFF Meat Department Purchase of $10.00 or more |
| D | Discount | $1.00 OFF Deli Pizza |
| A5 | Discount | FREE 12 pack Soda |

18. Coupons to spool Customer #8
    Trip #13 -- Program is complete
    Purchase = $61.00

| Class | Type | Description |
|---|---|---|
| Std | Info | Shop our NEW Deli |
| Std | Install | 61 Turkey Bucks |
| Std | Outside Ad | Free drink at Rod's Sandwich Shop w/ Sandwich Purchase |
| Std | Discount | 50¢ OFF Canned Peas |
| Std | Discount | 75¢ OFF Chicken Fryers |
| Std | Discount | $3.00 OFF New Prescription |
| D | Discount | $2.00 OFF Meat Department Purchase of $10.00 or more |
| D | Discount | $1.00 OFF Deli Pizza |

TABLE 10

Coupon Configuration

| | |
|---|---|
| 1. Coupon A: | Less than 5 weekly attendances in last 8 weeks. |
| A levels: | Based on attendance |
| A1: | 4 weekly attendances in last 8 weeks |
| A2: | 3 weekly attendances in last 8 weeks |
| A3: | 2 weekly attendances in last 8 weeks |
| A4: | 1 weekly attendances in last 8 weeks |
| A5: | 0 weekly attendances in last 8 weeks |
| Purchase Levels: | |
| Coupon B: | $0 – $24.99 average purchase |
| Coupon C: | $25 – $49.99 average purchase |
| Coupon D: | $50 – $74.99 average purchase |
| Coupon E: | $75 + average purchase |
| Coupon M: | 10% increase on Average $50 or less Test effectiveness after 3 trips |
| Super M: | Based on NO improvement in average purchase Run for duration of 3 trips |
| Scanned data: | ON Building Echo Coupons and Customer Profiles |

TABLE 10-continued

Coupon Configuration

2. Customer #9 Profile
Illustrate Coupon M & Super M
using Echo Coupons to incent
Assume items such as disposable
diapers and baby food have
been scanned previously

| | |
|---|---|
| Total trips | 223 |
| Average Purchase | $22.43 |
| Current Purchase | $24.98 |
| Prior Attendance: | 6 |
| 1 week ago | Yes |
| 2 weeks ago | Yes |
| 3 weeks ago | No |
| 4 weeks ago | Yes |
| 5 weeks ago | Yes |
| 6 weeks ago | Yes |
| 7 weeks ago | Yes |
| 8 weeks ago | No |
| Customer status | Frequent |
| Coupon A level | N/A |
| Purchase level | B |
| Maxxer Base | $22 |
| Maxxer Target rounded to $5 | $25 |

3. Coupons to spool Customer #9
Trip #1 (Begin Coupon M Program)

| Class | Type | Description |
|---|---|---|
| Std | Info | Shop our NEW Deli |
| Std | Install | 25 Turkey Bucks |
| Std | OutsideAd | Free drink at Rod's Sandwich Shop w/ Sandwich Purchase |
| Std | Discount | 50¢ OFF Canned Peas |
| Std | Discount | 75¢ OFF Chicken Fryers |
| Std | Discount | $3.00 OFF New Prescription |
| B | Discount | 50¢ OFF Laundry Detergent |
| B | Discount | 25¢ OFF Cereal |
| M | Echo | $1 OFF Disposable Diapers Purchase of $25.00 or more |

4. Coupons to spool Customer #9
Trip #2 -- 7 days from start of Program
Purchase $21.68

| Class | Type | Description |
|---|---|---|
| Std | Info | Shop our NEW Deli |
| Std | Install | 22 Turkey Bucks |
| Std | Outside Ad | Free drink at Rod's Sandwich Shop w/ Sandwich Purchase |
| Std | Discount | 50¢ OFF Canned Peas |
| Std | Discount | 75¢ OFF Chicken Fryers |
| Std | Discount | $3.00 OFF New Prescription |
| B | Discount | 50¢ OFF Laundry Detergent |
| B | Discount | 25¢ OFF Cereal |
| M | Echo | $1 OFF Disposable Diapers Purchase of $25.00 or more |

5. Coupons to spool Customer #9
Trip #3 -- 14 days from start of Program
Purchase $16.45

| Class | Type | Description |
|---|---|---|
| Std | Info | Shop our NEW Deli |
| Std | Install | 16 Turkey Bucks |
| Std | Outside Ad | Free drink at Rod's Sandwich Shop w/ Sandwich Purchase |
| Std | Discount | 50¢ OFF Canned Peas |
| Std | Discount | 75¢ OFF Chicken Fryers |
| Std | Discount | $3.00 OFF New Prescription |
| B | Discount | 50¢ OFF Laundry Detergent |
| B | Discount | 25¢ OFF Cereal |
| M | Echo | $1 OFF Disposable Diapers Purchase of $25.00 or more |

6. Coupons to spool Customer #9
Trip #4 -- 23 days from start of Program
Purchase = $29.67
Average since program began = $22.60
No Increase - Begin Super M Program

| Class | Type | Description |
|---|---|---|
| Std | Info | Shop our NEW Deli |
| Std | Install | 30 Turkey Bucks |
| Std | Outside Ad | Free drink at Rod's Sandwich Shop w/ Sandwich Purchase |
| Std | Discount | 50¢ OFF Canned Peas |
| Std | Discount | 75¢ OFF Chicken Fryers |
| Std | Discount | $3.00 OFF New Prescription |
| B | Discount | 50¢ OFF Laundry Detergent |
| B | Discount | 25¢ OFF Cereal |
| SM | Echo | FREE Box 24 count Disposable Diaper with Purchase of $25.00 |
| SM | Echo | $1.00 OFF Baby Wipes with Purchase of $25.00 |

7. Coupons to spool Customer #9
Super M Trip #2 -- 32 days from start of Program
Purchase = $36.84

| Class | Type | Description |
|---|---|---|
| Std | Info | Shop our NEW Deli |
| Std | Install | 37 Turkey Bucks |
| Std | Outside Ad | Free drink at Rod's Sandwich Shop w/ Sandwich Purchase |
| Std | Discount | 50¢ OFF Canned Peas |
| Std | Discount | 75¢ OFF Chicken Fryers |
| Std | Discount | $3.00 OFF New Prescription |
| B | Discount | 50¢ OFF Laundry Detergent |
| B | Discount | 25¢ OFF Cereal |
| SM | Echo | FREE Box 24 count Disposable Diaper with Purchase of $25.00 |
| SM | Echo | $1.00 OFF Baby Wipes with Purchase of $25.00 |

8. Coupons to spool Customer #9
Super M Trip #3 -- 40 days from start of Program
Purchase = $32.32
Super M Complete

| Class | Type | Description |
|---|---|---|
| Std | Info | Shop our NEW Deli |
| Std | Install | 32 Turkey Bucks |
| Std | Outside Ad | Free drink at Rod's Sandwich Shop w/ Sandwich Purchase |
| Std | Discount | 50¢ OFF Canned Peas |
| Std | Discount | 75¢ OFF Chicken Fryers |
| Std | Discount | $3.00 OFF New Prescription |
| B | Discount | 50¢ OFF Laundry Detergent |
| B | Discount | 25¢ OFF Cereal |
| SM | Echo | FREE Box 24 count Disposable Diaper with Purchase of $25.00 |
| SM | Echo | $1.00 OFF Baby Wipes with Purchase of $25.00 |

9. Coupons to spool Customer #9
Trip #3 -- 46 days from start of Program
Purchase $26.78

| Class | Type | Description |
|---|---|---|
| Std | Info | Shop our NEW Deli |
| Std | Install | 27 Turkey Bucks |
| Std | Outside Ad | Free drink at Rod's Sandwich Shop w/ Sandwich Purchase |
| Std | Discount | 50¢ OFF Canned Peas |
| Std | Discount | 75¢ OFF Chicken Fryers |
| Std | Discount | $3.00 OFF New Prescription |

TABLE 10-continued

| | | Coupon Configuration |
|---|---|---|
| B | Discount | 50¢ OFF Laundry Detergent |
| B | Discount | 25¢ OFF Cereal |
| M | Echo | $1 OFF Disposable Diapers Purchase of $25.00 or more |

10. Coupons to spool Customer #9
Trip #3 -- 50 days from start of Program
Purchase $29.11
Avg > $25.00 -- Coupon M is Complete

| Class | Type | Description |
|---|---|---|
| Std | Info | Shop our NEW Deli |
| Std | Install | 29 Turkey Bucks |
| Std | Outside Ad | Free drink at Rod's Sandwich Shop w/ Sandwich Purchase |
| Std | Discount | 50¢ OFF Canned Peas |
| Std | Discount | 75¢ OFF Chicken Fryers |
| Std | Discount | $3.00 OFF New Prescription |
| B | Discount | 50¢ OFF Laundry Detergent |
| B | Discount | 25¢ OFF Cereal |

TABLE 11

| INFREQUENCY | COUPON "A" | DEAL |
|---|---|---|
| NO Consumption | Level 1 | 50% Off |
| 1–20% of Brand A vs. all Product Type | Level 2 | 40% Off |
| 21–40% of Brand A vs. all Product Type | Level 3 | 25% Off |
| 40–50% of Brand A vs. all Product Type | Level 4 | 10% Off |

TABLE 12

| WEEKLY CONSUMPTION | PACKAGE SIZE TO USE FOR INCENTIVE | LIST PRICE |
|---|---|---|
| 0–5 ounces | 8 ounce size | $1.00 |
| 6–15 ounces | 12 ounce size | $1.50 |
| 16–25 ounces | 20 ounce size | $2.50 |
| 26 plus ounces | 32 ounce size | $4.00 |

TABLE 13

| | |
|---|---|
| Super A Level 1 | Original incentive plus 20% |
| Super A Level 2 | Original incentive plus 40% |
| Super A Level 3 | Original incentive plus 60% |
| Super A Level 4 | Original incentive plus 80% |
| Super A Level 5 | Double the original incentive |

TABLE 14

| Household | 1 | 2 | 3 | 4 | 5 | 6 | 7 | 8 |
|---|---|---|---|---|---|---|---|---|
| Weeks Tracked | 10 | 14 | 15 | 14 | 18 | 12 | 13 | 7 |
| Avg Weekly Consumption of Product Type (Ounces) | 17 | 12 | 36 | 4.5 | 5 | 12 | 44 | 18.5 |
| Avg Weekly Consumption of Brand A (Ounces) | 4 | 2 | 15 | 3 | 2 | 4.5 | 5 | 0 |
| % Brand A | 24 | 17 | 42 | 67 | 40 | 38 | 11 | 0 |
| Coupon "A" Level | 3 | 2 | 4 | N/A | 4 | 3 | 2 | 1 |

TABLE 15

| HOUSEHOLD | 1 | 2 | 3 | 4 | 5 | 6 | 7 | 8 |
|---|---|---|---|---|---|---|---|---|
| WEEK #1 | | | | | | | | |
| Coupon Type | A3 (1) | A2 (1) | A4 (1) | | A4 (1) | A3 (1) | A2 (1) | A1 (1) |
| Cents off | 60¢ | 60¢ | 40¢ | | 10¢ | 35¢ | $1.60 | $1.25 |
| Product Size (Oz) | 20 | 12 | 32 | | 8 | 12 | 32 | 20 |
| WEEK #2 | | | | | | | | |
| Prior Coupon Redeemed | Yes | No | Yes | | No | No | Yes | Yes |
| Coupon Type | A3 (2) | SA1 (1) | A4 (2) | | SA1 (1) | SA1 (1) | A2 (2) | A1 (2) |
| Cents Off | 60¢ | 70¢ | 40¢ | | 15¢ | 40¢ | $1.60 | $1.25 |
| Product Size (Oz) | 20 | 12 | 32 | | 8 | 12 | 32 | 20 |
| WEEK #3 | | | | | | | | |
| Prior Coupon Redeemed | YES | NO | YES | | YES | NO | YES | YES |
| Coupon Type | A3 (3) | SA2 (1) | A4 (3) | | SA1 (2) | SA2 (1) | A2 (3) | A1 (3) |
| Cents Off | 60¢ | 85¢ | 40¢ | | 15¢ | 50¢ | $1.60 | $1.25 |
| Product Size (Oz) | 20 | 12 | 32 | | 8 | 12 | 32 | 20 |
| WEEK #4 | | | | | | | | |
| Prior Coupon Redeemed | Yes | Yes | Yes | | Yes | No | No | Yes |
| Coupon Type | A3 (4) | SA2 (2) | SA1 (1) | | A4 (2) | SA3 (1) | SA1 (1) | A1 (4) |
| Cents Off | 60¢ | 85¢ | 50¢ | | 10¢ | 55¢ | $1.90 | $1.25 |
| Product Size (Oz.) | 20 | 12 | 32 | | 8 | 12 | 32 | 20 |
| WEEK #5 | | | | | | | | |
| Prior Coupon Redeemed | Yes | Yes | No | | Yes | No | Yes | Yes |
| Coupon Type | A3 (5) | A2 (2) | SA2 (1) | | A4 (3) | SA4 (1) | SA1 (2) | A1 (5) |
| Cents Off | 60¢ | 60¢ | 55¢ | | 10¢ | 65¢ | $1.90 | $1.25 |
| Product Size (Oz.) | 20 | 12 | 32 | | 8 | 12 | 32 | 20 |

TABLE 15-continued

| HOUSEHOLD | 1 | 2 | 3 | 4 | 5 | 6 | 7 | 8 |
|---|---|---|---|---|---|---|---|---|
| WEEK #6 | | | | | | | | |
| Prior Coupon Redeemed | Yes | Yes | Yes | | Yes | No | Yes | Yes |
| Coupon Type | | A2 (3) | SA2 (2) | | A4 (4) | SA5 (1) | A2 (4) | |
| Cents Off | | 60¢ | 55¢ | | 10¢ | 70¢ | $1.60 | |
| Product Size (Oz) | | 12 | 32 | | 8 | 12 | 32 | |
| WEEK #7 | | | | | | | | |
| Prior Coupon Redeemed | | Yes | Yes | | Yes | No | Yes | |
| Coupon Type | | A2 (4) | A4 (4) | | A4 (5) | SA5 (1) | A2 (5) | |
| Cents Off | | 60¢ | 40¢ | | 10¢ | 70¢ | $1.60 | |
| Product Size (Oz) | | 12 | 32 | | 8 | 12 | 32 | |
| WEEK #8 | | | | | | | | |
| Prior Coupon Redeemed | | No | Yes | | Yes | Yes | Yes | |
| Coupon Type | | SA1 (1) | A4 (5) | | | SA5 (2) | | |
| Cents Off | | 70¢ | 40¢ | | | 70¢ | | |
| Product Size (Oz) | | 12 | 32 | | | 12 | | |
| WEEK #9 | | | | | | | | |
| Prior Coupon Redeemed | | Yes | Yes | | | Yes | | |
| Coupon Type | | SA1 (2) | | | | A3 (2) | | |
| Cents Off | | 70¢ | | | | 35¢ | | |
| Product Size (Oz.) | | 12 | | | | 12 | | |
| WEEK #10 | | | | | | | | |
| Prior Coupon Redeemed | | No | | | | Yes | | |
| Coupon Type | | SA2 (1) | | | | A3 (3) | | |
| Cents Off | | 85¢ | | | | 35¢ | | |
| Product Size (Oz.) | | 12 | | | | 12 | | |
| WEEK #11 | | | | | | | | |
| Prior Coupon Redeemed | | Yes | | | | Yes | | |
| Coupon Type | | SA2 (2) | | | | A3 (4) | | |
| Cents Off | | 85¢ | | | | 35¢ | | |
| Product Size (Oz) | | 12 | | | | 12 | | |
| WEEK #12 | | | | | | | | |
| Prior Coupon Redeemed | | Yes | | | | Yes | | |
| Coupon Type | | A2 (5) | | | | A3 (5) | | |
| Cents Off | | 60¢ | | | | 35¢ | | |
| Product Size (Oz) | | 12 | | | | 12 | | |
| WEEK #13 | | | | | | | | |
| Prior Coupon Redeemed | | Yes | | | | Yes | | |
| Coupon Type | | | | | | | | |
| Cents Off | | | | | | | | |
| Product Size (Oz) | | | | | | | | |

What is claimed is:

1. A method for performing targeted marketing on shopping customers with a computer having a processor and memory, the method comprising the steps of:

entering into the memory selected indicia from an identification presented by customers for use as unique customer identification codes in response to presentation of customers' identification at a point-of-sale;

entering into the memory at the point-of-sale data relating to customers' shopping transactions, including data relating to a plurality of different products purchased by a specific customer;

creating a database of a store's customers' shopping transactions and identification codes in response to said identification and said data, including information regarding products more frequently purchased than others of said plurality of different products purchased by said specific customer and stored in the memory;

applying with the processor a value formula to said database of previously purchased products and shopping transaction data in order to determine a value for said more frequently purchased products for use as promotions, said value formula being variable and based on individual customers' prior purchase volumes in said store;

generating with the processor a first signal in response to entry of identification codes of customers whose prior transactions at the store meet predetermined shopping history criteria; and in response to said first signal, effecting a first sales promotion to customers who meet said predetermined shopping history criteria, said sales promotion being related to at least one of said more frequently previously purchased than others of said plurality of different products purchased by said specific customer and the value of said sales promotion determined by said value formula.

2. The method of claim 1 wherein said customer's identification code comprises a customer's checking account number.

3. The method of claim 1 wherein said customer's identification code comprises a customer's credit card number.

4. The method of claim 1 wherein said customer's identification code comprises a debit card.

5. The method of claim 1 wherein said customer's identification code comprises a merchant issued identification.

6. The method of claim 1 wherein said promotion induces said customer to make additional future purchases in addition to said previously purchased products.

7. The method of claim 6 and further comprising:
issuing said promotion to those customers whose prior shopping history meets predetermined shopping requirements.

8. The method of claim 1 wherein said promotion induces said customer to return to the store within a predetermined time period in order to receive an incentive provided by said promotion.

9. The method of claim 1 wherein said promotion induces said customer to increase future purchase values over an amount previously paid by said customer.

10. The method of claim 1 and further comprising:
monitoring whether or not said promotion has been effective; and
subsequently issuing an additional promotion depending upon results of said monitoring.

11. The method of claim 10 wherein said promotion is deemed to be effective if it is redeemed within a selected time period.

12. The method of claim 10 wherein said promotion is monitored by scanning identification numbers on said promotion when it is redeemed.

13. The method of claim 10 wherein said promotion is deemed to be effective if a customer's future purchases increase.

14. The method of claim 10 wherein said additional promotion issued in dependence upon the results of said monitoring is increased in value over said prior promotion.

15. The method of claim 1 wherein a consumption rate analysis is made on said selected products prior to utilizing said selected products as a basis for said promotion.

16. A system for performing targeted marketing on shopping customers comprising:
a terminal for entering at a point-of-sale unique customer identification codes;
circuitry associated with said terminal for entering data at the point-of-sale relating to a customer's shopping transactions, including data relating to a plurality of different products purchased by the customer;
a memory responsive to said terminal and said circuitry for creating a database of a store's customers' shopping transactions and identification codes, including information regarding products more frequently previously purchased by the customers than others of said plurality of different products purchased by said specific customer;
a processor for applying a value formula to said stored data in order to determine a value for a sales promotion, said value based on the purchase volume of said specific customer and said processor determining a subset of said more frequently previously purchased products than others of said plurality of different products purchased by said specific customer;
circuitry for generating a first signal for specific customers who have prior transactions at the store; and
apparatus, in response to said first signal, for effecting a sales promotion to said customers who have prior shopping transactions at said store, said sales promotion including at least one of said more frequently purchased products in relation to said plurality of different products purchased by said specific customer in said subset of products and the value of said sales promotion being determined by said value formula.

17. The system of claim 16 wherein said value formula determines a number of products to be used as the incentive for coupons dispensed to a specific customer.

18. The system of claim 16 wherein said value formula determines a brand of products to be used as the incentive.

19. The system of claim 16 wherein said value formula determines a size of products to be used as the incentive.

20. The system of claim 16 wherein said value formula determines an amount of discount to be applied to the price of a product to be used as the incentive.

21. The system of claim 16 wherein said processor is further operable to apply a consumption rate analysis to said subset of products to ensure that a product used as a coupon incentive was purchased a sufficient time ago to enable at least partial consumption of the product by the customer.

22. The system of claim 16 wherein said apparatus for issuing coupons is further operable to issue subsequent coupons to a customer if monitoring of a customer's activities indicates that additional incentives are required.

23. The system of claim 16 wherein said value formula determines the selling price of a product to be used as the incentive.

* * * * *